US012690590B2

(12) United States Patent
Ota et al.

(10) Patent No.: US 12,690,590 B2
(45) Date of Patent: Jul. 28, 2026

(54) PHENYL COMPOUND AND PLANT DISEASE CONTROL METHOD

(71) Applicant: SUMITOMO CHEMICAL COMPANY, LIMITED, Chuo-ku (JP)

(72) Inventors: Yusuke Ota, Osaka (JP); Teruki Takahashi, Chuo-ku (JP); Koichiro Dota, Takarazuka (JP)

(73) Assignee: SUMITOMO CHEMICAL COMPANY, LIMITED, Chuo-ku (JP)

( * ) Notice: Subject to any disclaimer, the term of this patent is extended or adjusted under 35 U.S.C. 154(b) by 718 days.

(21) Appl. No.: 17/996,732

(22) PCT Filed: Apr. 21, 2021

(86) PCT No.: PCT/JP2021/016211
§ 371 (c)(1),
(2) Date: Oct. 20, 2022

(87) PCT Pub. No.: WO2021/215480
PCT Pub. Date: Oct. 28, 2021

(65) Prior Publication Data
US 2023/0292759 A1 Sep. 21, 2023

(30) Foreign Application Priority Data
Apr. 22, 2020 (JP) ................................ 2020-075879

(51) Int. Cl.
*A01N 43/78* (2006.01)
*A01N 43/56* (2006.01)

(52) U.S. Cl.
CPC ............ *A01N 43/78* (2013.01); *A01N 43/56* (2013.01)

(58) Field of Classification Search
CPC ...................................................... A01N 43/78
See application file for complete search history.

(56) References Cited

U.S. PATENT DOCUMENTS

| | | | |
|---|---|---|---|
| 3,856,976 | A | 12/1974 | Hunter et al. |
| 4,022,607 | A | 5/1977 | Jackson |
| 4,584,376 | A | 4/1986 | Singh |
| 5,523,280 | A | 6/1996 | Chene et al. |
| 5,663,119 | A | 9/1997 | Chene et al. |
| 6,054,413 | A | 4/2000 | Zagar et al. |

(Continued)

FOREIGN PATENT DOCUMENTS

| | | | |
|---|---|---|---|
| AU | 2931295 | A | 2/1996 |
| CN | 1071162 | A | 4/1993 |

(Continued)

OTHER PUBLICATIONS

American Chemical Society. Chemical Abstract Service. RN 898508-60-6. Entered into STN: Aug. 3, 2006. (Year: 2006).*

(Continued)

*Primary Examiner* — John S Kenyon
(74) *Attorney, Agent, or Firm* — Oblon, McClelland, Maier & Neustadt, L.L.P.

(57) ABSTRACT

The present invention provides an excellent control method against plant diseases. A compound represented by formula (I)

(I)

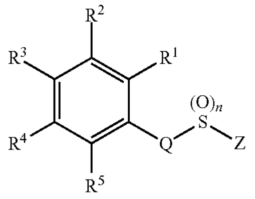

[wherein:

Z represents a C1-C6 chain hydrocarbon group or the like;

Q represents a group represented by Q1, a group represented by Q2, or a group represented by Q3 (wherein # represents the binding site to the phenyl group; and • represents the binding site to the sulfur atom);

Q1

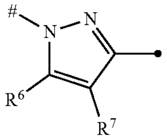

Q2

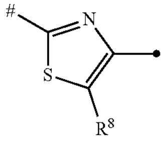

Q3

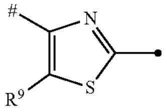

$R^1$, $R^2$, $R^3$, $R^4$, and $R^5$ are identical to or different from each other, and each represent a C1-C6 chain hydrocarbon group or the like;

$R^6$, $R^7$, $R^8$, and $R^9$ are identical to or different from each other, and each represent a hydrogen atom or the like; and n represents 0, 1, or 2] can be used for controlling plant diseases.

8 Claims, No Drawings

(56) References Cited

U.S. PATENT DOCUMENTS

| | | | |
|---|---|---|---|
| 6,518,266 | B1 | 2/2003 | Dhanoa et al. |
| 2002/0177594 | A1 | 11/2002 | Curtin et al. |
| 2013/0096160 | A1 | 4/2013 | Marugan et al. |

FOREIGN PATENT DOCUMENTS

| | | | |
|---|---|---|---|
| DE | 35 10 178 | A1 | 9/1986 |
| EP | 0 591 806 | A1 | 4/1994 |
| JP | 55-42044 | B2 | 10/1980 |
| JP | 5-262741 | A | 10/1993 |
| JP | 6-1769 | A | 1/1994 |
| JP | 10-502661 | A | 3/1998 |
| JP | 11-171702 | A | 6/1999 |
| JP | 2000-26421 | A | 1/2000 |
| JP | 2001-506581 | A | 5/2001 |
| JP | 2007-284387 | A | 11/2007 |
| WO | WO 95/09846 | A1 | 4/1995 |
| WO | WO 96/31517 | A1 | 10/1996 |
| WO | WO 98/12182 | A1 | 3/1998 |
| WO | WO 01/07413 | A1 | 2/2001 |
| WO | WO 02/06257 | A1 | 1/2002 |
| WO | WO 2005/040152 | A1 | 5/2005 |
| WO | WO 2011/130515 | A1 | 10/2011 |

OTHER PUBLICATIONS

American Chemical Society. Chemical Abstract Service. RN 1909313-78-5. Entered into STN: May 12, 2016. (Year: 2016).*

American Chemical Society. Chemical Abstract Service. RN 35534-75-9. Entered into STN: Nov. 16, 1984. (Year: 1984).*

International Preliminary Report on Patentability and Written Opinion issued Oct. 25, 2022 in PCT/JP2021/016211, 7 pages (with English translation).

International Search Report issued Jul. 6, 2021 in PCT/JP2021/016211, 7 pages (with English translation).

Rahman et al., "Reactions of Polarized Ketoketene S,N-Acetals with Thionyl Chloride: a Novel General Route to 1-Aroyl-(or-Acyl)-2-aryl-(or -ethoxycarbonyl)-4-alkylthiothiazoles by Direct Heterocyclization", Communications, Synthesis, 1984, pp. 250-252.

Hartung et al., "A New Generation of Alkoxyl Radical Precursors—Preparation and Properties of N-(Alkoxy)-4-arylthiazole-2(3H)-thiones", Eur. J. Org. Chem., 1999, pp. 1275-1290.

Kano, "Studies on Thiocyanation of Heterocyclic Compounds. 1.[1)] Thiocyanation of 2-Substituted Thiazoles", Yakugaku Zasshi, 1971, vol. 91, No. 12, pp. 1342-1353 (with English Abstract).

Ikeda et al., "α-Arylation of alkylamines with sulfonylarenes through a radical chain mechanism", Chem. Commun., 2018, vol. 54, pp. 10471-10474.

Dalla Croce et al., "1,3-Dipolar Cycloadditions with Alkynyl Phenyl Sulphones", J. Chems. Soc. Perkin Trans. I, 1985, pp. 2621-2624.

Dou et al., "S-Alkylation in heterocyclic series by phase transfer catalysis: 2-alkylthiothiazoles, 2-alkylthio-Δ-4-thiazolines and 2-alkylthiobenzothiazoles", Helvetica Chimica Acta, 1978, vol. 61, No. 301, pp. 3143-3148 (with English Abstract).

Extended European Search Report issued Mar. 27, 2024 in European Patent Application No. 21793009.8, 13 pages.

Combined Chinese Office Action and Search Report issued Oct. 18, 2023 in Chinese Patent Application No. 202180029829.2 (with English translation), 17 pages.

Liu, X. et al., "Design, Synthesis and Fungicidal Activities of Some Novel Pyrazole Derivatives," Molecules, vol. 19, 2014, pp. 14036-14051.

Ram, V. et al., "Pyrazoles and Pyrazolo[3,4-d]pyrimidines as Biologically Active Agents," Arch. Pharm. (Weinheim), vol. 312, 1979, pp. 586-590.

Wang, H. et al., "Regioselective Synthesis and Bioactivity of New 5-Amino-6-arylamino-pyrazolo[3,4-d]-pyrimidin-4(5H)-one Derivatives," Journal of Heterocyclic Chemistry, vol. 46, 2009, pp. 256-260.

Moghaddam, F. et al., "Utility of N-Bromosuccinimide-Water Combination as a Green Reagent for Synthesis of N,S-Heterocycles and Dithiocarbamates from Styrenes," Synlett, vol. 31, 2020, pp. A-E.

Chen, W. et al., "Study on Synthesis and Biological Activity of N-(Substituted)Pyrazol-5-yl-N',N'-Disubstituted Formamidine," Chinese Journal of Pesticide Science, vol. 2, Issue 2, Jun. 2000, pp. 15-21 (with English translation).

* cited by examiner

PHENYL COMPOUND AND PLANT DISEASE CONTROL METHOD

CROSS-REFERENCE TO RELATED APPLICATIONS

The present application is a 35 U.S.C. § 371 national stage patent application of International patent application PCT/JP2021/016211, filed on Apr. 21, 2021, which is based on and claims the benefits of priority to Japanese Application No. 2020-075879, filed on Apr. 22, 2020. The entire contents of these applications are incorporated herein by reference.

TECHNICAL FIELD

This application claims the priority to and the benefit of Japanese Patent Application No. 2020-075879 filed on Apr. 22, 2020, the entire contents of which are incorporated herein by reference.

The present invention relates to phenyl compounds and methods for controlling plant diseases.

BACKGROUND ART

PATENT DOCUMENT 1 discloses phenylpyrazole compounds for use as insecticidal, miticidal, and nematicidal agents.

CITATION LIST

Patent Document

PATENT DOCUMENT 1: JP2007-284387A

SUMMARY OF THE INVENTION

Problems to be Solved by the Invention

An object of the present invention is to provide excellent control methods against plant diseases.

Means to Solve Problems

The present inventors have studied to find out an excellent control method against plant diseases. As a result, they have found that a compound represented by the following formula (I) has excellent control efficacy against plant diseases.

Namely, the present invention provides the followings.

[1] A method for controlling a plant disease which comprises applying a compound represented by formula (I):

(I)

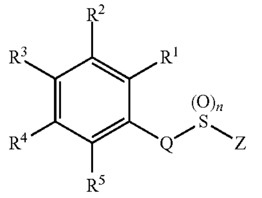

[wherein:

Z represents a C1-C6 chain hydrocarbon group optionally substituted with one or more substituent(s) selected from Group A, a C3-C6 cycloalkyl group, a C6-C10 aryl group, or a 5-10 membered aromatic heterocyclic group {wherein the C3-C6 cycloalkyl group, the C6-C10 aryl group, and the 5-10 membered aromatic heterocyclic group are optionally substituted with one or more substituent(s) selected from Group E};

Q represents a group represented by Q1, a group represented by Q2, or a group represented by Q3 (wherein # represents the binding site to the phenyl group; and • represents the binding site to the sulfur atom);

Q1

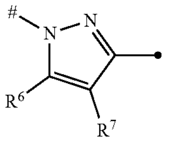

Q2

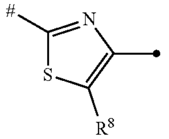

Q3

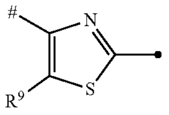

$R^1$, $R^2$, $R^3$, $R^4$, and $R^5$ are identical to or different from each other, and each represent a C1-C6 chain hydrocarbon group optionally substituted with one or more substituent(s) selected from Group D, a C3-C6 cycloalkyl group, a C6-C10 aryl group, a 5-10 membered aromatic heterocyclic group {wherein the C3-C6 cycloalkyl group, the C6-C10 aryl group, and the 5-10 membered aromatic heterocyclic group are optionally substituted with one or more substituent(s) selected from Group E}, a hydrogen atom, a halogen atom, a nitro group, a cyano group, a $-OR^{10}$, a $-S(O)_kR^{11}$, a $-C(O)R^{12}$, a $-CR^{13}=N-O-R^{14}$, a $-O-N=CR^{15}R^{16}$, a $-N=N-CR^{17}R^{18}R^{19}$, a $-C(O)NR^{20}R^{21}$, a $-NR^{22}C(O)R^{23}$, a $-C(O)N(OR^{24})R^{25}$, a $-N(OR^{26})C(O)R^{27}$, a $-NR^{28}C(O)NR^{29}R^{30}$, a $-OC(O)NR^{31}R^{32}$, a $-NR^{33}C(O)OR^{34}$, a $-NR^{35}C(O)C(O)NR^{36}R^{37}$, a $-CR^{38}R^{39}NR^{40}C(O)C(O)NR^{41}R^{42}$, or a $-NR^{43}C(O)C(O)N(OR^{44})R^{45}$; or $R^1$ and $R^2$ are optionally combined with the carbon atoms to which they are attached to form a C4-C7 carbocycle or a 5-7 membered heterocycle {wherein the C4-C7 carbocycle and the 5-7 membered heterocycle are optionally substituted with one or more substituent(s) selected from Group B}; or $R^2$ and $R^3$ are optionally combined with the carbon atoms to which they are attached to form a C4-C7 carbocycle or a 5-7 membered heterocycle {wherein the C4-C7 carbocycle and the 5-7 membered heterocycle are optionally substituted with one or more substituent(s) selected from Group B};

$R^6$, $R^7$, $R^8$, and $R^9$ are identical to or different from each other, and each represent a hydrogen atom or a fluorine atom;

$R^{10}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$, $R^{31}$, $R^{32}$, $R^{33}$, $R^{35}$, $R^{36}$, $R^{37}$, $R^{38}$, $R^{39}$, $R^{40}$, $R^{41}$, $R^{42}$, $R^{43}$, $R^{44}$, and $R^{45}$ are identical to or different from each other, and each represent a C1-C6 chain hydrocarbon group optionally substituted with one or more substituent(s) selected from Group D, a C3-C6 cycloalkyl group, a C6-C10 aryl group, a 5-10 membered aromatic heterocyclic group {wherein the C3-C6 cycloalkyl group, the C6-C10 aryl group, and the 5-10 membered aromatic heterocyclic group are optionally substituted with one or more substituent(s) selected from Group C}, or a hydrogen atom;

$R^{34}$ represents a C1-C6 chain hydrocarbon group optionally substituted with one or more substituent(s) selected from Group D, a C3-C6 cycloalkyl group, a C6-C10 aryl group, or a 5-10 membered aromatic heterocyclic group {wherein the C3-C6 cycloalkyl group, the C6-C10 aryl group, and the 5-10 membered aromatic heterocyclic group are optionally substituted with one or more substituent(s) selected from Group C};

$R^{11}$ represents a C1-C6 chain hydrocarbon group optionally substituted with one or more substituent(s) selected from Group D, or a C3-C6 cycloalkyl group {wherein the C3-C6 cycloalkyl group is optionally substituted with one or more substituent(s) selected from the group consisting of a halogen atom and a cyano group};

n represents 0, 1, or 2; and k represents 0, 1, or 2;

Group A: a group consisting of a C3-C6 cycloalkyl group, a C1-C3 alkoxy group, a C1-C3 alkylsulfanyl group, a C1-C3 alkylsulfinyl group, a C1-C3 alkylsulfonyl group {wherein the C3-C6 cycloalkyl group, the C1-C3 alkoxy group, the C1-C3 alkylsulfanyl group, the C1-C3 alkylsulfinyl group, and the C1-C3 alkylsulfonyl group are optionally substituted with one or more halogen atom(s)}, a halogen atom, and a cyano group;

Group B: a group consisting of a C1-C3 chain hydrocarbon group, a C3-C6 cycloalkyl group, a C1-C3 alkoxy group {wherein the C1-C3 chain hydrocarbon group, the C3-C6 cycloalkyl group, and the C1-C3 alkoxy group are optionally substituted with one or more halogen atom(s)}, a halogen atom, a nitro group, and a cyano group;

Group C: a group consisting of a C1-C3 chain hydrocarbon group, a C3-C6 cycloalkyl group, a C1-C3 alkoxy group, a C1-C3 alkylsulfanyl group, a C1-C3 alkylsulfinyl group, a C1-C3 alkylsulfonyl group {wherein the C1-C3 chain hydrocarbon group, the C3-C6 cycloalkyl group, the C1-C3 alkoxy group, the C1-C3 alkylsulfanyl group, the C1-C3 alkylsulfinyl group, and the C1-C3 alkylsulfonyl group are optionally substituted with one or more substituent(s) selected from the group consisting of a halogen atom and a cyano group}, a halogen atom, and a cyano group;

Group D: a group consisting of a C1-C3 alkoxy group, a C1-C3 alkylsulfanyl group, a C1-C3 alkylsulfinyl group, a C1-C3 alkylsulfonyl group {wherein the C1-C3 alkoxy group, the C1-C3 alkylsulfanyl group, the C1-C3 alkylsulfinyl group, and the C1-C3 alkylsulfonyl group are optionally substituted with one or more halogen atom(s)}, a C3-C6 cycloalkyl group, a C6-C10 aryl group, a 5-10 membered aromatic heterocyclic group {wherein the C3-C6 cycloalkyl group, the C6-C10 aryl group, and the 5-10 membered aromatic heterocyclic group are optionally substituted with one or more substituent(s) selected from Group C}, a halogen atom, and a cyano group;

Group E: a group consisting of a C1-C3 chain hydrocarbon group, a C3-C6 cycloalkyl group, a C1-C3 alkoxy group, a C1-C3 alkylsulfanyl group, a C1-C3 alkylsulfinyl group, a C1-C3 alkylsulfonyl group {wherein the C1-C3 chain hydrocarbon group, the C3-C6 cycloalkyl group, the C1-C3 alkoxy group, the C1-C3 alkylsulfanyl group, the C1-C3 alkylsulfinyl group, and the C1-C3 alkylsulfonyl group are optionally substituted with one or more halogen atom(s)}, a halogen atom, and a cyano group]

(hereinafter referred to as "Present compound N") or an N-oxide thereof, or a salt thereof (hereinafter the compound represented by formula (I) or an N-oxide thereof, or a salt thereof is referred to as "Present compound") to a plant or soil for cultivating a plant.

[2] The method according to [1], wherein the compound represented by formula (I) or an N-oxide thereof, or a salt thereof according to [1] is a compound or an N-oxide thereof, or a salt thereof wherein $R^1$, $R^2$, $R^3$, $R^4$, and $R^5$ are identical to or different from each other, and each represent a C1-C6 chain hydrocarbon group optionally substituted with one or more substituent(s) selected from Group D, a C3-C6 cycloalkyl group, a C6-C10 aryl group {wherein the C3-C6 cycloalkyl group and the C6-C10 aryl group are optionally substituted with one or more substituent(s) selected from Group E}, a hydrogen atom, a halogen atom, a nitro group, a cyano group, a $—OR^{10}$, a $—S(O)_kR^{11}$, a $—C(O)R^{12}$, a $—CR^{13}{=}N—O—R^{14}$, a $—C(O)NR^{20}R^{21}$, a $—NR^{22}C(O)R^{23}$, a $—C(O)N(OR^{24})R^{25}$, a $—N(OR^{26})C(O)R^{27}$, or a $—NR^{33}C(O)OR^{34}$; or $R^1$ and $R^2$ are optionally combined with the carbon atoms to which they are attached to form a C4-C7 carbocycle or a 5-7 membered heterocycle {wherein the C4-C7 carbocycle and the 5-7 membered heterocycle are optionally substituted with one or more substituent(s) selected from Group B}; or $R^2$ and $R^3$ are optionally combined with the carbon atoms to which they are attached to form a C4-C7 carbocycle or a 5-7 membered heterocycle {wherein the C4-C7 carbocycle and the 5-7 membered heterocycle are optionally substituted with one or more substituent(s) selected from Group B};

$R^{34}$ represents a C1-C6 chain hydrocarbon group optionally substituted with one or more substituent(s) selected from Group D, a C3-C6 cycloalkyl group, or a C6-C10 aryl group {wherein the C3-C6 cycloalkyl group and the C6-C10 aryl group are optionally substituted with one or more substituent(s) selected from Group C}; and $R^{11}$ represents a C1-C6 chain hydrocarbon group optionally substituted with one or more substituent(s) selected from Group D, or a C3-C6 cycloalkyl group {wherein the C3-C6 cycloalkyl group is optionally substituted with one or more substituent(s) selected from the group consisting of a halogen atom and a cyano group}.

[3] The method according to [1] or [2], wherein the compound represented by formula (I) or an N-oxide thereof, or a salt thereof according to [1] is a compound or an N-oxide thereof, or a salt thereof wherein $R^6$, $R^7$, $R^8$, and $R^9$ each represent a hydrogen atom.

[4] The method according to [1] or [2], wherein the compound represented by formula (I) or an N-oxide thereof, or a salt thereof according to [1] is a compound or an N-oxide thereof, or a salt thereof wherein Q represents the group represented by Q1 or the group represented by Q2; and $R^6$, $R^7$, and $R^8$ each represent a hydrogen atom.

[5] The method according to [1] or [2], wherein the compound represented by formula (I) or an N-oxide thereof, or a salt thereof according to [1] is a compound or an N-oxide thereof, or a salt thereof wherein Q represents the group represented by Q1; and $R^6$ and $R^7$ each represent a hydrogen atom.

[6] A compound represented by formula (II):

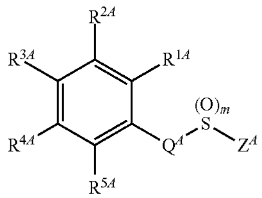

(II)

[wherein:

a combination of $Q^A$ and m represents a combination wherein $Q^A$ represents a group represented by $Q^A1$ or a group represented by $Q^A2$; and m represents 0, 1, or 2; or a combination wherein $Q^A$ represents a group represented by $Q^A3$; and m represents 1 or 2;

the group represented by $Q^A1$, the group represented by $Q^A2$, and the group represented by $Q^A3$ each represent a group represented by the following formula (wherein # represents the binding site to the phenyl group; and • represents the binding site to the sulfur atom);

$Q^A1$

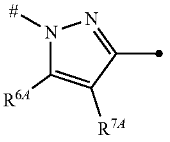

$Q^A2$

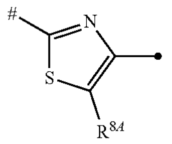

$Q^A3$

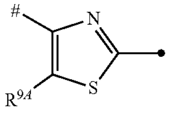

$R^{6A}$, $R^{7A}$, $R^{8A}$, and $R^{9A}$ are identical to or different from each other, and each represent a hydrogen atom or a fluorine atom;

$Z^A$ represents a C2-C6 chain hydrocarbon group, a C3-C6 cycloalkyl group {wherein the C2-C6 chain hydrocarbon group and the C3-C6 cycloalkyl group are optionally substituted with one or more halogen atom(s)}, or a 5-10 membered aromatic heterocyclic group optionally substituted with one or more substituent(s) selected from Group $E^A$;

$R^{3A}$ represents a C1-C6 chain hydrocarbon group optionally substituted with one or more substituent(s) selected from Group $A^A$, a C3-C6 cycloalkyl group, a C6-C10 aryl group, a 5-10 membered aromatic heterocyclic group {wherein the C3-C6 cycloalkyl group, the C6-C10 aryl group, and the 5-10 membered aromatic heterocyclic group are optionally substituted with one or more substituent(s) selected from Group $C^A$}, a hydrogen atom, a halogen atom, a nitro group, a cyano group, a $—OR^{10A}$, a $—S(O)_pR^{11A}$, a $—C(O)R^{12A}$, a $—CR^{13A}=N—O—R^{14A}$, a $—O—N=CR^{15A}R^{16A}$, a $—N=N—CR^{17A}R^{18A}R^{19A}$, a $—C(O)NR^{20A}R^{21A}$, a $—NR^{22A}C(O)R^{23A}$, a $—C(O)N(OR^{24A})R^{25A}$, a $—N(OR^{26A})C(O)R^{27A}$, a $—NR^{29A}C(O)NR^{29A}R^{30A}$, a $—OC(O)NR^{31A}R^{32A}$, a $—NR^{33A}C(O)OR^{34A}$, a $—NR^{35A}C(O)C(O)NR^{36A}R^{37A}$, a $—CR^{38A}R^{39A}NR^{40A}C(O)C(O)NR^{41A}R^{42A}$, or a $—NR^{43A}C(O)C(O)N(OR^{44A})R^{45A}$;

$R^{2A}$ and $R^{4A}$ are identical to or different from each other, and each represent a C1-C6 chain hydrocarbon group optionally substituted with one or more substituent(s) selected from Group $A^A$, a C3-C6 cycloalkyl group, a C6-C10 aryl group, a 5-10 membered aromatic heterocyclic group {wherein the C3-C6 cycloalkyl group, the C6-C10 aryl group, and the 5-10 membered aromatic heterocyclic group are optionally substituted with one or more substituent(s) selected from Group $C^A$}, a hydrogen atom, a halogen atom, a nitro group, a cyano group, a $—OR^{10A}$, a $—C(O)R^{12A}$, a $—CR^{13A}=N—O—R^{14A}$, a $—O—N=CR^{15A}R^{16A}$, a $—N=N—CR^{17A}R^{18A}R^{19A}$, a $—C(O)NR^{20A}R^{21A}$, a $—NR^{22A}C(O)R^{23B}$, a $—C(O)N(OR^{24A})R^{25A}$, a $—N(OR^{26A})C(O)R^{27A}$, a $—NR^{28A}C(O)NR^{29A}R^{30A}$, a $—OC(O)NR^{31A}R^{32A}$, a $—NR^{33A}C(O)OR^{34A}$, a $—NR^{35A}C(O)C(O)NR^{36A}R^{37A}$, a $—CR^{38A}R^{39A}NR^{40A}C(O)C(O)NR^{41A}R^{42A}$, or a $—NR^{43A}C(O)C(O)N(OR^{44A})R^{45A}$;

$R^{1A}$ and $R^{5A}$ are identical to or different from each other, and each represent a C1-C6 chain hydrocarbon group optionally substituted with one or more substituent(s) selected from Group $A^A$, a C3-C6 cycloalkyl group, a C6-C10 aryl group, a 5-10 membered aromatic heterocyclic group {wherein the C3-C6 cycloalkyl group, the C6-C10 aryl group, and the 5-10 membered aromatic heterocyclic group are optionally substituted with one or more substituent(s) selected from Group $C^A$}, a hydrogen atom, a halogen atom, a nitro group, a cyano group, a $—OR^{10A}$, a $—S(O)_9R^{11A}$, a $—C(O)R^{12A}$, a $—CR^{13A}=N—O—R^{14A}$, a $—O—N=CR^{15A}R^{16A}$, a $—N=N—CR^{17A}R^{18A}R^{19A}$, a $—C(O)NR^{20A}R^{21A}$, a $—NR^{22B}C(O)R^{23A}$, a $—C(O)N(OR^{24A})R^{25A}$, a $—N(OR^{26A})C(O)R^{27A}$, a $—NR^{28B}C(O)NR^{29A}R^{30A}$, a $—OC(O)NR^{31A}R^{32A}$, a $—NR^{33B}C(O)OR^{34A}$, a $—NR^{35A}C(O)C(O)NR^{36A}R^{37A}$, a $—CR^{38A}R^{39A}NR^{40A}C(O)C(O)NR^{41A}R^{42A}$, or a $—NR^{43A}C(O)C(O)N(OR^{44A})R^{45A}$;

provided that at least one of $R^{1A}$, $R^{2A}$, $R^{3A}$, $R^{4A}$, and $R^{5A}$ is not a hydrogen atom; or $R^{1A}$ and $R^{2A}$ are optionally combined with the carbon atoms to which they are attached to form a C4-C7 carbocycle or a 5-7 membered heterocycle {wherein the C4-C7 carbocycle and the 5-7 membered heterocycle are optionally substituted with one or more substituent(s) selected from Group $B^{A}$}; or $R^{2A}$ and $R^{3A}$ are optionally combined with the carbon atoms to which they are attached to form a C4-C7 carbocycle or a 5-7 membered heterocycle {wherein the C4-C7 carbocycle and the 5-7 membered heterocycle are optionally substituted with one or more substituent(s) selected from Group $B^{A}$};

$R^{10A}$, $R^{12A}$, $R^{13A}$, $R^{14A}$, $R^{15A}$, $R^{16A}$, $R^{17A}$, $R^{18A}$, $R^{19A}$, $R^{20A}$, $R^{21A}$, $R^{22A}$, $R^{23A}$, $R^{24A}$, $R^{25A}$, $R^{26A}$, $R^{27A}$, $R^{28A}$, $R^{29A}$, $R^{30A}$, $R^{31A}$, $R^{32A}$, $R^{33A}$, $R^{35A}$, $R^{36A}$, $R^{37A}$, $R^{38A}$, $R^{39A}$, $R^{40A}$, $R^{41A}$, $R^{42A}$, $R^{43A}$, $R^{44A}$, and $R^{45A}$ are identical to or different from each other, and each represent a C1-C6 chain hydrocarbon group optionally substituted with one or more substituent(s) selected from Group $D^{A}$, a C3-C6 cycloalkyl group, a C6-C10 aryl group, a 5-10 membered aromatic heterocyclic group {wherein the C3-C6 cycloalkyl group, the C6-C10 aryl group, and the 5-10 membered aromatic heterocyclic group are optionally substituted with one or more substituent(s) selected from Group $C^{A}$}, or a hydrogen atom;

$R^{34A}$, $R^{22B}$, $R^{28B}$, and $R^{33B}$ are identical to or different from each other, and each represent a C1-C6 chain hydrocarbon group optionally substituted with one or more substituent(s) selected from Group $D^{A}$, a C3-C6 cycloalkyl group, a C6-C10 aryl group, or a 5-10 membered aromatic heterocyclic group {wherein the C3-C6 cycloalkyl group, the C6-C10 aryl group, and the 5-10 membered aromatic heterocyclic group are optionally substituted with one or more substituent(s) selected from Group $C^{A}$};

$R^{23B}$ represents a C1-C6 chain hydrocarbon group optionally substituted with one or more substituent(s) selected from Group $D^{A}$, a C3-C6 cycloalkyl group, or a C6-C10 aryl group {wherein the C3-C6 cycloalkyl group and the C6-C10 aryl group are optionally substituted with one or more substituent(s) selected from Group $C^{A}$}, or a hydrogen atom;

$R^{11A}$ represents a C1-C6 chain hydrocarbon group optionally substituted with one or more substituent(s) selected from Group $D^{A}$, or a C3-C6 cycloalkyl group {wherein the C3-C6 cycloalkyl group is optionally substituted with one or more substituent(s) selected from the group consisting of a halogen atom and a cyano group}; and p represents 0, 1, or 2;

Group $A^{A}$: a group consisting of a C3-C6 cycloalkyl group, a C1-C3 alkoxy group, a C1-C3 alkylsulfanyl group, a C1-C3 alkylsulfinyl group, a C1-C3 alkylsulfonyl group {wherein the C3-C6 cycloalkyl group, the C1-C3 alkoxy group, the C1-C3 alkylsulfanyl group, the C1-C3 alkylsulfinyl group, and the C1-C3 alkylsulfonyl group are optionally substituted with one or more halogen atom(s)}, a halogen atom, and a cyano group;

Group $B^{A}$: a group consisting of a C1-C3 chain hydrocarbon group, a C3-C6 cycloalkyl group, a C1-C3 alkoxy group {wherein the C1-C3 chain hydrocarbon group, the C3-C6 cycloalkyl group, and the C1-C3 alkoxy group are optionally substituted with one or more halogen atom(s)}, a halogen atom, a nitro group, and a cyano group;

Group $C^{A}$: a group consisting of a C1-C3 chain hydrocarbon group, a C3-C6 cycloalkyl group, a C1-C3 alkoxy group, a C1-C3 alkylsulfanyl group, a C1-C3 alkylsulfinyl group, a C1-C3 alkylsulfonyl group {wherein the C1-C3 chain hydrocarbon group, the C3-C6 cycloalkyl group, the C1-C3 alkoxy group, the C1-C3 alkylsulfanyl group, the C1-C3 alkylsulfinyl group, and the C1-C3 alkylsulfonyl group are optionally substituted with one or more substituent(s) selected from the group consisting of a halogen atom and a cyano group}, a halogen atom, and a cyano group;

Group $D^{A}$: a group consisting of a C1-C3 alkoxy group, a C1-C3 alkylsulfanyl group, a C1-C3 alkylsulfinyl group, a C1-C3 alkylsulfonyl group {wherein the C1-C3 alkoxy group, the C1-C3 alkylsulfanyl group, the C1-C3 alkylsulfinyl group, and the C1-C3 alkylsulfonyl group are optionally substituted with one or more halogen atom(s)}, a C3-C6 cycloalkyl group, a C6-C10 aryl group, a 5-10 membered aromatic heterocyclic group {wherein the C3-C6 cycloalkyl group, the C6-C10 aryl group, and the 5-10 membered aromatic heterocyclic group are optionally substituted with one or more substituent(s) selected from Group $C^{A}$}, a halogen atom, and a cyano group;

Group $E^{A}$: a group consisting of a C1-C3 chain hydrocarbon group, a C3-C6 cycloalkyl group, a C1-C3 alkoxy group {wherein the C1-C3 chain hydrocarbon group, the C3-C6 cycloalkyl group, and the C1-C3 alkoxy group are optionally substituted with one or more halogen atom(s)}, a halogen atom, and a cyano group]

(hereinafter referred to as "Compound N of the present invention") or an N-oxide thereof, or a salt thereof (hereinafter the compound represented by formula (II) or an N-oxide thereof, or a salt thereof is referred to as "Compound of the present invention").

[7] The compound or an N-oxide thereof, or a salt thereof according to [6], wherein $R^{3A}$ represents a C1-C6 chain hydrocarbon group optionally substituted with one or more halogen atom(s), a C3-C6 cycloalkyl group {wherein the C3-C6 cycloalkyl group is optionally substituted with one or more substituent(s) selected from the group consisting of a C1-C3 chain hydrocarbon group and a halogen atom}, a hydrogen atom, a halogen atom, a nitro group, a cyano group, a $-OR^{10A}$, a $-S(O)_pR^{11A}$, a $-C(O)R^{12A}$, a $-CR^{13A}=N-O-R^{14A}$, a $-C(O)NR^{20A}R^{21A}$, a $-NR^{22A}C(O)R^{23A}$, a $-C(O)N(OR^{24A})R^{25A}$, a $-N(OR^{26A})C(O)R^{27A}$, or a $-NR^{33A}C(O)OR^{34A}$;

$R^{2A}$ and $R^{4A}$ are identical to or different from each other, and each represent a C1-C6 chain hydrocarbon group optionally substituted with one or more halogen atom(s), a C3-C6 cycloalkyl group {wherein the C3-C6 cycloalkyl group is optionally substituted with one or more substituent(s) selected from the group consisting of a C1-C3 chain hydrocarbon group and a halogen atom}, a hydrogen atom, a halogen atom, a nitro group, a cyano group, a $-OR^{10A}$, a $-C(O)R^{12A}$, a $-CR^{13A}=N-O-R^{14A}$, a $-C(O)NR^{20A}R^{21A}$, a $-NR^{22A}C(O)R^{23B}$, a $-C(O)N(OR^{24A})R^{25A}$, a $-N(OR^{26A})C(O)R^{27A}$, or a $-NR^{33A}C(O)OR^{34A}$; and $R^{1A}$ and $R^{5A}$ are identical to or different from each other, and each represent a C1-C6 chain hydrocarbon group optionally substituted with one or more halogen atom(s), a C3-C6 cycloalkyl group {wherein the C3-C6 cycloalkyl group is optionally substituted with one or more halogen atom(s)}, a hydrogen atom, a halogen atom, a nitro group, a cyano group, a —$OR^{10A}$, a —$S(O)_pR^{11A}$, a —$C(O)R^{12A}$, a —$CR^{13A}$=N—O—$R^{14A}$, a —$C(O)NR^{20A}R^{21A}$, a —$NR^{22B}C(O)R^{23A}$, a —$C(O)N(OR^{24A})R^{25A}$, a —$N(OR^{26A})C(O)R^{27A}$, or a —$NR^{33B}C(O)OR^{34A}$;

provided that at least one of $R^{1A}$, $R^{2A}$, $R^{3A}$, $R^{4A}$, and $R^{5A}$ is not a hydrogen atom; or $R^{1A}$ and $R^{2A}$ are optionally combined with the carbon atoms to which they are attached to form a C4-C7 carbocycle or a 5-7 membered heterocycle {wherein the C4-C7 carbocycle and the 5-7 membered heterocycle are optionally substituted with one or more substituent(s) selected from Group $B^A$}; or $R^{2A}$ and $R^{3A}$ are optionally combined with the carbon atoms to which they are attached to form a C4-C7 carbocycle or a 5-7 membered heterocycle {wherein the C4-C7 carbocycle and the 5-7 membered heterocycle are optionally substituted with one or more substituent(s) selected from Group $B^A$}.

[8] The compound or an N-oxide thereof, or a salt thereof according to [6] or [7], wherein $R^{6A}$, $R^{7A}$, $R^{8A}$, and $R^{9A}$ each represent a hydrogen atom.

[9] The compound or an N-oxide thereof, or a salt thereof according to [6] or [7], wherein $Q^A$ represents the group represented by $Q^A1$ or the group represented by $Q^A2$, and m represents 0, 1, or 2; and $R^{6A}$, $R^{7A}$, and $R^{8A}$ each represent a hydrogen atom.

[10] The compound or an N-oxide thereof, or a salt thereof according to [6] or [7], wherein $Q^A$ represents the group represented by $Q^A1$, and m represents 0, 1, or 2; and $R^{6A}$ and $R^{7A}$ each represent a hydrogen atom.

[11] A composition for controlling a plant disease comprising the compound or an N-oxide thereof, or a salt thereof according to any one of [6] to [10].

[12] A method for controlling a plant disease which comprises applying an effective amount of the compound or an N-oxide thereof, or a salt thereof according to any one of [6] to [10] to a plant or soil for cultivating a plant.

[13] Use of the compound or an N-oxide thereof, or a salt thereof according to any one of [6] to [10] for controlling a plant disease.

[14] A composition comprising one or more ingredient(s) selected from the group consisting of Group (a), Group (b), Group (c), and Group (d), and the compound or an N-oxide thereof, or a salt thereof according to any one of [6] to [10]:

Group (a): a group consisting of insecticidal active ingredients, miticidal active ingredients, and nematicidal active ingredients;

Group (b): fungicidal active ingredients;

Group (c): plant growth regulatory ingredients;

Group (d): repellent ingredients.

[15] A seed or a vegetative reproduction organ holding an effective amount of the compound represented by formula (I) or an N-oxide thereof, or a salt thereof according to any one of [1] to [5], the compound or an N-oxide thereof, or a salt thereof according to any one of [6] to [10], or the composition according to [14].

[16] A compound represented by formula (III):

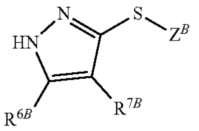

(III)

[wherein:

$R^{6B}$ and $R^{7B}$ are identical to or different from each other, and each represent a hydrogen atom or a fluorine atom; and $Z^B$ represents a C3-C6 chain hydrocarbon group or a C4-C6 cycloalkyl group {wherein the C3-C6 chain hydrocarbon group and the C4-C6 cycloalkyl group are optionally substituted with one or more halogen atom(s)}](hereinafter referred to as "Intermediate compound A").

Effect of Invention

According to the present invention, plant diseases can be controlled.

MODE FOR CARRYING OUT THE INVENTION

The substituents in the present invention are explained as follows.

The term of "halogen atom" represents a fluorine atom, a chlorine atom, a bromine atom, or an iodine atom.

When a substituent is substituted with two or more halogen atoms or groups, these halogen atoms or groups may be identical to or different from each other.

The expression of "CY-CW" as described herein means that the number of carbon atom is Y to W. For example, the expression of "C1-C6" means that the number of carbon atom is 1 to 6.

The term of "chain hydrocarbon group" represents an alkyl group, an alkenyl group, or an alkynyl group.

Examples of the term of "alkyl group" include a methyl group, an ethyl group, a propyl group, an isopropyl group, a 1,1-dimethylpropyl group, a 1,2-dimethylpropyl group, a butyl group, a sec-butyl group, a tert-butyl group, a pentyl group, and a hexyl group.

Examples of the term of "alkenyl group" include a vinyl group, a 1-propenyl group, a 2-propenyl group, a 1-methyl-1-propenyl group, a 1-methyl-2-propenyl group, a 1,2-dimethyl-1-propenyl group, a 3-butenyl group, a 4-pentenyl group, and a 5-hexenyl group.

Examples of the term of "alkynyl group" include an ethynyl group, a 1-propynyl group, a 2-propynyl group, a 1-methyl-2-propynyl group, a 1,1-dimethyl-2-propynyl group, a 2-butynyl group, a 4-pentynyl group, and a 5-hexynyl group.

Examples of the term of "cycloalkyl group" include a cyclopropyl group, a cyclobutyl group, a cyclopentyl group, and a cyclohexyl group.

Examples of the term of "alkoxy group" include a methoxy group, an ethoxy group, a propoxy group, and an isopropoxy group.

Examples of the term of "alkylsulfanyl group" include a methylsulfanyl group, an ethylsulfanyl group, a propylsulfanyl group, and an isopropylsulfanyl group.

Examples of the term of "alkylsulfinyl group" include a methylsulfinyl group, an ethylsulfinyl group, a propylsulfinyl group, and an isopropylsulfinyl group.

Examples of the term of "alkylsulfonyl group" include a methylsulfonyl group, an ethylsulfonyl group, a propylsulfonyl group, and an isopropylsulfonyl group.

Examples of the term of "aryl group" include a phenyl group, an indenyl group, an indanyl group, a naphthyl group, and a tetrahydronaphthyl group.

Examples of the term of "5-10 membered aromatic heterocyclic group" include 5 membered aromatic heterocyclic groups, 6 membered aromatic heterocyclic groups, 9 membered aromatic heterocyclic groups, and 10 membered aromatic heterocyclic groups. Examples of the term of "5 membered aromatic heterocyclic group" include a pyrrolyl group, a furyl group, a thienyl group, a pyrazolyl group, an imidazolyl group, a triazolyl group, a tetrazolyl group, an oxazolyl group, an isoxazolyl group, a thiazolyl group, an isothiazolyl group, an oxadiazolyl group, and a thiadiazolyl group. Examples of the term of "6 membered aromatic heterocyclic group" include a pyridyl group, a pyridazinyl group, a pyrimidinyl group, a pyrazinyl group, a triazinyl group, and a tetrazinyl group. Examples of the term of "9 membered aromatic heterocyclic group" include an indolyl group, an indazolyl group, a benzoimidazolyl group, an imidazopyridyl group, a benzothiophenyl group, and a benzofuranyl group. Examples of the term of "10 membered aromatic heterocyclic group" include a quinolyl group, an isoquinolyl group, a quinazolinyl group, and a quinoxalinyl group.

Examples of the term of "C4-C7 carbocycle" include a cyclobutene ring, a cyclopentene ring, a cyclopentadiene ring, a cyclohexene ring, a cyclohexadiene ring, a benzene ring, and a cycloheptene ring.

Examples of the term of "5-7 membered heterocycle" include a furan ring, a dihydrofuran ring, a thiophene ring, a dihydrothiophene ring, a pyrrole ring, a dihydropyrrole ring, a pyrazole ring, an imidazole ring, an oxazole ring, an isoxazole ring, a thiazole ring, an isothiazole ring, a 1,3-dioxole ring, a triazole ring, an oxadiazole ring, a thiadiazole ring, a pyridine ring, a pyridazine ring, a pyrimidine ring, a pyrazine ring, a pyran ring, and a dihydropyran ring.

The term "at least one of $R^{1A}$, $R^{2A}$, $R^{3A}$, $R^{4A}$, and $R^{5A}$ is not a hydrogen atom" as described herein means the same as the term "except when all of $R^{1A}$, $R^{2A}$, $R^{3A}$, $R^{4A}$, and $R^{5A}$ are hydrogen atoms".

The Present compound, the Compound of the present invention, and the Intermediate compound A may optionally have one or more stereoisomer(s). Examples of the stereoisomer(s) include enantiomers, diastereomers, atropisomers, and geometric isomers. The present invention encompasses each stereoisomer and mixtures of stereoisomers at any ratio.

The Present compound or the Compound of the present invention may be mixed with an acid such as hydrochloric acid, sulfuric acid, nitric acid, phosphoric acid, acetic acid, and benzoic acid to form an acid addition salt such as hydrochloride, sulfate, nitrate, phosphate, acetate, and benzoate.

Aspects of the Present compound N include the following compounds.

[Aspect 1] The Present compound N, wherein $R^1$, $R^2$, $R^3$, $R^4$, and $R^5$ are identical to or different from each other, and each represent a C1-C6 chain hydrocarbon group, a C3-C6 cycloalkyl group {wherein the C1-C6 chain hydrocarbon group and the C3-C6 cycloalkyl group are optionally substituted with one or more halogen atom(s)}, a hydrogen atom, a halogen atom, a —$OR^{10}$, a —$C(O)NR^{20}R^{21}$, a —$NR^{22}C(O)R^{23}$, a —$C(O)N(OR^{24})R^{25}$, a —$N(OR^{26})C(O)R^{27}$, or a —$NR^{33}C(O)OR^{34}$.

[Aspect 2] The Present compound N, wherein $R^2$, $R^3$, and $R^4$ are identical to or different from each other, and each represent a C1-C6 chain hydrocarbon group, a C3-C6 cycloalkyl group {wherein the C1-C6 chain hydrocarbon group and the C3-C6 cycloalkyl group are optionally substituted with one or more halogen atom(s)}, a hydrogen atom, a halogen atom, a —$OR^{10}$, a —$C(O)NR^{20}R^{21}$, a —$NR^{22}C(O)R^{23}$, a —$C(O)N(OR^{24})R^{25}$, a —$N(OR^{26})C(O)R^{27}$, or a —$NR^{33}C(O)OR^{34}$; and $R^1$ and $R^5$ are identical to or different from each other, and each represent a hydrogen atom or a halogen atom.

[Aspect 3] The Present compound N, wherein $R^1$ and $R^5$ are identical to or different from each other, and each represent a hydrogen atom or a halogen atom;

$R^2$ and $R^4$ are identical to or different from each other, and each represent a C1-C6 chain hydrocarbon group optionally substituted with one or more halogen atom(s), a hydrogen atom, a halogen atom, a —$OR^{10}$, or a —$NR^{33}C(O)OR^{34}$; and $R^3$ represents a C1-C6 chain hydrocarbon group optionally substituted with one or more halogen atom(s), a C3-C6 cycloalkyl group, a hydrogen atom, a halogen atom, a —$OR^{10}$, or a —$NR^{33}C(O)OR^{34}$.

[Aspect 4] The compound according to the Aspect 1, wherein $R^{10}$ represents a C1-C6 chain hydrocarbon group optionally substituted with one or more substituent(s) selected from Group F, a C3-C6 cycloalkyl group, or a 5-10 membered aromatic heterocyclic group {wherein the 5-10 membered aromatic heterocyclic group may be optionally substituted with a chain hydrocarbon group optionally substituted with one or more halogen atom(s)};

$R^{20}$, $R^{21}$, $R^{22}$, $R^{24}$, and $R^{26}$ are identical to or different from each other, and each represent a C1-C6 chain hydrocarbon group, a C3-C6 cycloalkyl group, or a hydrogen atom;

$R^{23}$, $R^{25}$, and $R^{27}$ are identical to or different from each other, and each represent a C1-C6 chain hydrocarbon group, a C3-C6 cycloalkyl group, or a phenyl group {wherein the phenyl group may be optionally substituted with one or more substituent(s) selected from Group G};

$R^{33}$ represents a C1-C6 chain hydrocarbon group, a cyclopropyl group, or a hydrogen atom; and $R^{34}$ represents a C1-C6 chain hydrocarbon group optionally substituted with one or more halogen atom(s);

Group F: a group consisting of a C6-C10 aryl group optionally substituted with one or more substituent(s) selected from Group G, and a halogen atom;

Group G: a group consisting of a C1-C3 alkoxy group, a C1-C3 chain hydrocarbon group optionally substituted with one or more halogen atom(s), a halogen atom, and a cyano group.

[Aspect 5] The compound according to the Aspect 1, wherein $R^{10}$ represents a C1-C6 chain hydrocarbon group optionally substituted with one or more substituent(s) selected from Group F, a C3-C6 cycloalkyl group, or a 5-10 membered aromatic heterocyclic group {wherein the 5-10 membered aromatic heterocyclic group may be optionally substituted with a chain hydrocarbon group optionally substituted with one or more halogen atom(s)};

$R^{20}$, $R^{21}$, $R^{22}$, $R^{24}$, and $R^{26}$ are identical to or different from each other, and each represent a C1-C6 chain hydrocarbon group, a C3-C6 cycloalkyl group, or a hydrogen atom;

$R^{23}$, $R^{25}$, and $R^{27}$ are identical to or different from each other, and each represent a C1-C6 chain hydrocarbon group, a C3-C6 cycloalkyl group, or a phenyl group {wherein the phenyl group may be optionally substituted with one or more substituent(s) selected from Group G};

$R^{33}$ represents a hydrogen atom; and $R^{34}$ represents a C1-C3 chain hydrocarbon group.

[Aspect 6] The compound according to the Aspect 3, wherein $R^{10}$ represents a C1-C6 chain hydrocarbon group optionally substituted with one or more substituent(s) selected from Group F, a C3-C6 cycloalkyl group, or a 5-10 membered aromatic heterocyclic group {wherein the 5-10 membered aromatic heterocyclic group may be optionally substituted with a chain hydrocarbon group optionally substituted with one or more halogen atom(s)};

$R^{20}$, $R^{21}$, $R^{22}$, $R^{24}$, and $R^{26}$ are identical to or different from each other, and each represent a C1-C6 chain hydrocarbon group, a C3-C6 cycloalkyl group, or a hydrogen atom;

$R^{23}$, $R^{25}$, and $R^{27}$ are identical to or different from each other, and each represent a C1-C6 chain hydrocarbon group, a C3-C6 cycloalkyl group, or a phenyl group {wherein the phenyl group may be optionally substituted with one or more substituent(s) selected from Group G};

$R^{33}$ represents a hydrogen atom; and $R^{34}$ represents a C1-C3 chain hydrocarbon group.

[Aspect 7] The Present compound N, wherein $R^1$ and $R^5$ each represent a hydrogen atom;

$R^2$ and $R^4$ are identical to or different from each other, and each represent a hydrogen atom or a halogen atom; and $R^3$ represents a C1-C6 chain hydrocarbon group optionally substituted with one or more halogen atom(s) or a halogen atom.

[Aspect 8] The Present compound N, wherein

Z represents a C1-C6 chain hydrocarbon group optionally substituted with one or more substituent(s) selected from Group A, a C3-C6 cycloalkyl group, a phenyl group, or a 6 membered aromatic heterocyclic group.

[Aspect 9] The Present compound N, wherein

Z represents a C1-C6 chain hydrocarbon group or a pyridyl group.

[Aspect 10] The Present compound N, wherein

Z represents a C1-C6 chain hydrocarbon group.

[Aspect 11] The compound according to the Aspect 4, wherein

Z represents a C1-C6 chain hydrocarbon group optionally substituted with one or more substituent(s) selected from Group A, a C3-C6 cycloalkyl group, a phenyl group, or a 6 membered aromatic heterocyclic group.

[Aspect 12] The compound according to the Aspect 4, wherein

Z represents a C1-C6 chain hydrocarbon group or a pyridyl group.

[Aspect 13] The compound according to the Aspect 4, wherein

Z represents a C1-C6 chain hydrocarbon group.

[Aspect 14] The compound according to the Aspect 6, wherein

Z represents a C1-C6 chain hydrocarbon group optionally substituted with one or more substituent(s) selected from Group A, a C3-C6 cycloalkyl group, a phenyl group, or a 6 membered aromatic heterocyclic group.

[Aspect 15] The compound according to the Aspect 6, wherein

Z represents a C1-C6 chain hydrocarbon group or a pyridyl group.

[Aspect 16] The compound according to the Aspect 6, wherein

Z represents a C1-C6 chain hydrocarbon group.

[Aspect 17] The compound according to the Aspect 7, wherein

Z represents a C1-C6 chain hydrocarbon group optionally substituted with one or more substituent(s) selected from Group A, a C3-C6 cycloalkyl group, a phenyl group, or a 6 membered aromatic heterocyclic group.

[Aspect 18] The compound according to the Aspect 7, wherein

Z represents a C1-C6 chain hydrocarbon group or a pyridyl group.

[Aspect 19] The Present compound N, wherein n represents 1 or 2.

[Aspect 20] The Present compound N, wherein n represents 2.

[Aspect 21] The compound according to the Aspect 15, wherein n represents 2.

[Aspect 22] The compound according to the Aspect 17, wherein n represents 2.

[Aspect 23] The compound according to the Aspect 18, wherein n represents 2.

[Aspect 24] The compound according to any one of the Aspects 1 to 23 or the Present compound N, wherein Q represents the group represented by Q1 or the group represented by Q2.

[Aspect 25] The compound according to any one of the Aspects 1 to 23 or the Present compound N, wherein Q represents the group represented by Q1.

[Aspect 26] The compound according to any one of the Aspects 1 to 23 or the Present compound N, wherein $R^6$ and $R^7$ each represent a hydrogen atom.

[Aspect 27] The compound according to any one of the Aspects 1 to 23 or the Present compound N, wherein $R^8$ represents a hydrogen atom.

[Aspect 28] The compound according to any one of the Aspects 1 to 23 or the Present compound N, wherein $R^9$ represents a hydrogen atom.

[Aspect 29] The compound according to any one of the Aspects 1 to 23 or the Present compound N, wherein $R^6$, $R^7$, $R^8$, and $R^9$ each represent a hydrogen atom.

[Aspect 30] The compound according to any one of the Aspects 1 to 23 or the Present compound N, wherein Q represents the group represented by Q1 or the group represented by Q2; and $R^6$, $R^7$, and $R^8$ each represent a hydrogen atom.

[Aspect 31] The compound according to any one of the Aspects 1 to 23 or the Present compound N, wherein Q represents the group represented by Q1; and $R^6$ and $R^7$ each represent a hydrogen atom.

[Aspect 32] The compound according to any one of the Aspects 1 to 18 or the Present compound N, wherein Q represents the group represented by Q1 or the group represented by Q3; and n represents 0 or 2.

[Aspect 33] The compound according to any one of the Aspects 1 to 18 or the Present compound N, wherein Q represents the group represented by Q3; and n represents 2.

[Aspect 34] The compound according to any one of the Aspects 1 to 18 or the Present compound N, wherein Q represents the group represented by Q1 or the group represented by Q3;

n represents 0 or 2; and $R^6$, $R^7$, and $R^9$ each represent a hydrogen atom.

[Aspect 35] The compound according to any one of the Aspects 1 to 18 or the Present compound N, wherein Q represents the group represented by Q3;

n represents 2; and $R^9$ represents a hydrogen atom.

[Aspect 36] The Present compound N, wherein

Q represents the group represented by Q1 or the group represented by Q2; and n represents 0 or 2.

[Aspect 37] The Present compound N, wherein

Q represents the group represented by Q1 or the group represented by Q2; and n represents 2.

[Aspect 38] The Present compound N, wherein

Q represents the group represented by Q1 or the group represented by Q3; and n represents 2.

[Aspect 39] The Present compound N, wherein

Q represents the group represented by Q1; and n represents 0 or 2.

[Aspect 40] The Present compound N, wherein

Q represents the group represented by Q3; and n represents 2.

[Aspect 41] The compound according to any one of the Aspects 36 to 40 or the Present compound N, wherein Z represents a C1-C6 chain hydrocarbon group optionally substituted with one or more halogen atom(s), a phenyl group optionally substituted with one or more substituent(s) selected from Group E, or a C3-C6 cycloalkyl group.

[Aspect 42] The compound according to any one of the Aspects 36 to 40 or the Present compound N, wherein Z represents a C2-C5 chain hydrocarbon group optionally substituted with one or more halogen atom(s), or a phenyl group {wherein the phenyl group may be optionally substituted with one or more substituent(s) selected from the group consisting of a methoxy group and a halogen atom}.

[Aspect 43] The compound according to the Aspect 41, wherein $R^3$ represents a C1-C6 chain hydrocarbon group optionally substituted with one or more halogen atom(s), a —$OR^{10}$, a hydrogen atom, or a halogen atom; and $R^{10}$ represents a C1-C6 chain hydrocarbon group optionally substituted with one or more halogen atom(s).

[Aspect 44] The compound according to the Aspect 41, wherein $R^1$ and $R^5$ each represent a hydrogen atom;

$R^2$ and $R^4$ are identical to or different from each other, and each represent a hydrogen atom or a halogen atom; and $R^3$ represents a C1-C6 chain hydrocarbon group optionally substituted with one or more halogen atom(s), a —$OR^{10}$, a hydrogen atom, or a halogen atom;

provided that at least one of $R^1$, $R^2$, $R^3$, $R^4$, and $R^5$ is not a hydrogen atom.

[Aspect 45] The compound according to the Aspect 42, wherein $R^3$ represents a C1-C6 chain hydrocarbon group optionally substituted with one or more halogen atom(s), a —$OR^{10}$, a hydrogen atom, or a halogen atom; and $R^{10}$ represents a C1-C6 chain hydrocarbon group optionally substituted with one or more halogen atom(s).

[Aspect 46] The compound according to the Aspect 42, wherein $R^1$ and $R^5$ each represent a hydrogen atom;

$R^2$ and $R^4$ are identical to or different from each other, and each represent a hydrogen atom or a halogen atom; and $R^3$ represents a C1-C6 chain hydrocarbon group optionally substituted with one or more halogen atom(s), a —$OR^{10}$, a hydrogen atom, or a halogen atom;

provided that at least one of $R^1$, $R^2$, $R^3$, $R^4$, and $R^5$ is not a hydrogen atom.

[Aspect 47] The compound according to any one of the Aspects 36 to 40 or the Present compound N, wherein Z represents a C1-C6 chain hydrocarbon group, or a C3-C6 cycloalkyl group;

$R^1$, $R^2$, $R^3$, $R^4$, and $R^5$ are identical to or different from each other, and each represent a C1-C6 chain hydrocarbon group, a C3-C6 cycloalkyl group {wherein the C1-C6 chain hydrocarbon group and the C3-C6 cycloalkyl group are optionally substituted with one or more halogen atom(s)}, a hydrogen atom, a halogen atom, a —$OR^{10}$, or a —$NHC(O)OR^{34}$;

$R^{10}$ represents a C1-C6 chain hydrocarbon group optionally substituted with one or more substituent(s) selected from Group F2, or a phenyl group optionally substituted with one or more substituent(s) selected from Group G; and $R^{34}$ represents a C1-C6 chain hydrocarbon group.

Group F2: a group consisting of a phenyl group optionally substituted with one or more substituent(s) selected from Group G, and a halogen atom.

Aspects of the Compound N of the present invention include the following compounds.

[Aspect A1] The Compound N of the present invention, wherein $R^{1A}$ and $R^{5A}$ are identical to or different from each other, and each represent a C1-C6 chain hydrocarbon group optionally substituted with one or more halogen atom(s), a hydrogen atom, a halogen atom, a —$OR^{10A}$, a —$C(O)NR^{20A}R^{21A}$, a —$NR^{22B}C(O)R^{23A}$, a —$C(O)N(OR^{24A})R^{25A}$, a —$N(OR^{26A})C(O)R^{27A}$, or a —$NR^{33B}C(O)OR^{34A}$;

provided that at least one of $R^{1A}$, $R^{2A}$, $R^{3A}$, $R^{4A}$, and $R^{5A}$ is not a hydrogen atom.

[Aspect A2] The Compound N of the present invention, wherein $R^{1A}$ and $R^{5A}$ are identical to or different from each other, and each represent a hydrogen atom or a fluorine atom;

provided that at least one of $R^{1A}$, $R^{2A}$, $R^{3A}$, $R^{4A}$, and $R^{5A}$ is not a hydrogen atom.

[Aspect A3] The Compound N of the present invention, wherein $R^{1A}$ and $R^{5A}$ each represent a hydrogen atom;

provided that at least one of $R^{1A}$, $R^{2A}$, $R^{3A}$, $R^{4A}$, and $R^{5A}$ is not a hydrogen atom.

[Aspect A4] The Compound N of the present invention, wherein $R^{2A}$ and $R^{4A}$ are identical to or different from each other, and each represent a C1-C6 chain hydrocarbon group optionally substituted with one or more halogen atom(s), a hydrogen atom, a halogen atom, a —$OR^{10A}$, a —$C(O)NR^{20A}R^{21A}$, a —$NR^{22A}C(O)R^{23B}$, a —$C(O)N(OR^{24A})R^{25A}$, a —$N(OR^{26A})C(O)R^{27A}$, or a —$NR^{33A}C(O)OR^{34A}$;

provided that at least one of $R^{1A}$, $R^{2A}$, $R^{3A}$, $R^{4A}$, and $R^{5A}$ is not a hydrogen atom.

[Aspect A5] The Compound N of the present invention, wherein $R^{2A}$ and $R^{4A}$ are identical to or different from each other, and each represent a C1-C6 chain hydrocarbon group optionally substituted with one or more halogen atom(s), a hydrogen atom, a halogen atom, a —$OR^{10A}$, or a —$NR^{33A}C(O)OR^{34A}$;

provided that at least one of $R^{1A}$, $R^{2A}$, $R^{3A}$, $R^{4A}$, and $R^{5A}$ is not a hydrogen atom.

[Aspect A6] The Compound N of the present invention, wherein $R^{3A}$ represents a C1-C6 chain hydrocarbon group, a C3-C6 cycloalkyl group {wherein the C1-C6 chain hydrocarbon group and the C3-C6 cycloalkyl group are optionally substituted with one or more halogen atom(s)}, a —$OR^{10A}$, a —$C(O)NR^{20A}R^{21A}$, a —$NR^{22A}C(O)R^{23A}$, a —$C(O)N(OR^{24A})R^{25A}$, a —$N(OR^{26A})C(O)R^{27A}$, or a —$NR^{33A}C(O)OR^{34A}$;

provided that at least one of $R^{1A}$, $R^{2A}$, $R^{3A}$, $R^{4A}$, and $R^{5A}$ is not a hydrogen atom.

[Aspect A7] The Compound N of the present invention, wherein $R^{3A}$ represents a C3-C6 cycloalkyl group, a C1-C6 chain hydrocarbon group optionally substituted with one or more halogen atom(s), a hydrogen atom, a halogen atom, a —$OR^{10A}$, or a —$NR^{33A}C(O)OR^{34A}$;

provided that at least one of $R^{1A}$, $R^{2A}$, $R^{3A}$, $R^{4A}$, and $R^{5A}$ is not a hydrogen atom.

[Aspect A8] The Compound N of the present invention, wherein $R^{1A}$ and $R^{5A}$ are identical to or different from each other, and each represent a C1-C6 chain hydrocarbon group optionally substituted with one or more halogen atom(s), a hydrogen atom, a halogen atom, a —$OR^{10A}$, a —$C(O)NR^{20A}R^{21A}$, a —$NR^{22B}C(O)R^{23A}$, a —$C(O)N(OR^{24A})R^{25A}$, a —$N(OR^{26A})C(O)R^{27A}$, or a —$NR^{33B}C(O)OR^{34A}$;

$R^{2A}$ and $R^{4A}$ are identical to or different from each other, and each represent a C1-C6 chain hydrocarbon group optionally substituted with one or more halogen atom(s), a hydrogen atom, a halogen atom, a —$OR^{10A}$, a —$C(O)NR^{20A}R^{21A}$, a —$NR^{22A}C(O)R^{23B}$, a —$C(O)N(OR^{24A})R^{25A}$, a —$N(OR^{26A})C(O)R^{27A}$, or a —$NR^{33A}C(O)OR^{34A}$; and $R^{3A}$ represents a C1-C6 chain hydrocarbon group, a C3-C6 cycloalkyl group {wherein the C1-C6 chain hydrocarbon group and the C3-C6 cycloalkyl group are optionally substituted with one or more halogen atom(s)}, a —$OR^{10A}$, a —$C(O)NR^{20A}R^{21A}$, a —$NR^{22A}C(O)R^{23A}$, a —$C(O)N(OR^{24A})R^{25A}$, a —$N(OR^{26A})C(O)R^{27A}$, or a —$NR^{33A}C(O)OR^{34A}$;

provided that at least one of $R^{1A}$, $R^{2A}$, $R^{3A}$, $R^{4A}$, and $R^{5A}$ is not a hydrogen atom.

[Aspect A9] The Compound N of the present invention, wherein $R^{1A}$ and $R^{5A}$ are identical to or different from each other, and each represent a hydrogen atom or a fluorine atom;

$R^{2A}$ and $R^{4A}$ are identical to or different from each other, and each represent a C1-C6 chain hydrocarbon group optionally substituted with one or more halogen atom(s), a hydrogen atom, a halogen atom, a —$OR^{10A}$, a —$C(O)NR^{20A}R^{21A}$, a —$NR^{22A}C(O)R^{23B}$, a —$C(O)N(OR^{24A})R^{25A}$, a —$N(OR^{26A})C(O)R^{27A}$, or a —$NR^{33A}C(O)OR^{34A}$; and $R^{3A}$ represents a C1-C6 chain hydrocarbon group, a C3-C6 cycloalkyl group {wherein the C1-C6 chain hydrocarbon group and the C3-C6 cycloalkyl group are optionally substituted with one or more halogen atom(s)}, a —$OR^{10A}$, a —$C(O)NR^{20A}R^{21A}$, a —$NR^{22A}C(O)R^{23A}$, a —$C(O)N(OR^{24A})R^{25A}$, a —$N(OR^{26A})C(O)R^{27A}$, or a —$NR^{33A}C(O)OR^{34A}$;

provided that at least one of $R^{1A}$, $R^{2A}$, $R^{3A}$, $R^{4A}$, and $R^{5A}$ is not a hydrogen atom.

[Aspect A10] The Compound N of the present invention, wherein $R^{1A}$ and $R^{5A}$ are identical to or different from each other, and each represent a hydrogen atom or a fluorine atom;

$R^{2A}$ and $R^{4A}$ are identical to or different from each other, and each represent a C1-C6 chain hydrocarbon group optionally substituted with one or more halogen atom(s), a hydrogen atom, a halogen atom, a —$OR^{10A}$, or a —$NR^{33A}C(O)OR^{34A}$; and $R^{3A}$ represents a C3-C6 cycloalkyl group, a C1-C6 chain hydrocarbon group optionally substituted with one or more halogen atom(s), a hydrogen atom, a halogen atom, a —$OR^{10A}$, or a —$NR^{33A}C(O)OR^{34A}$;

provided that at least one of $R^{1A}$, $R^{2A}$, $R^{3A}$, $R^{4A}$, and $R^{5A}$ is not a hydrogen atom.

[Aspect A11] The Compound N of the present invention, wherein $R^{1A}$ and $R^{5A}$ each represent a hydrogen atom;

$R^{2A}$ and $R^{4A}$ are identical to or different from each other, and each represent a C1-C6 chain hydrocarbon group optionally substituted with one or more halogen atom(s), a hydrogen atom, a halogen atom, a —$OR^{10A}$, or a —$NR^{33A}C(O)OR^{34A}$; and $R^{3A}$ represents a C3-C6 cycloalkyl group, a C1-C6 chain hydrocarbon group optionally substituted with one or more halogen atom(s), a hydrogen atom, a halogen atom, a —$OR^{10A}$, or a —$NR^{33A}C(O)OR^{34A}$;

provided that at least one of $R^{1A}$, $R^{2A}$, $R^{3A}$, $R^{4A}$, and $R^{5A}$ is not a hydrogen atom.

[Aspect A12] The Compound N of the present invention, wherein $R^{1A}$ and $R^{5A}$ each represent a hydrogen atom;

$R^{2A}$ and $R^{4A}$ are identical to or different from each other, and each represent a hydrogen atom or a halogen atom; and $R^{3A}$ represents a C1-C6 chain hydrocarbon group optionally substituted with one or more halogen atom(s), a hydrogen atom, or a halogen atom;

provided that at least one of $R^{1A}$, $R^{2A}$, $R^{3A}$, $R^{4A}$, and $R^{5A}$ is not a hydrogen atom.

[Aspect A13] The compound according to the Aspect A8, wherein $R^{10A}$ represents a C3-C6 cycloalkyl group, a C1-C6 chain hydrocarbon group optionally substituted with one or more substituent(s) selected from Group $F^{A}$, or a 5-10 membered aromatic heterocyclic group {wherein the 5-10 membered aromatic heterocyclic group may be optionally substituted with a chain hydrocarbon group optionally substituted with one or more halogen atom(s)};

$R^{20A}$, $R^{21A}$, $R^{22A}$, $R^{24A}$, and $R^{26A}$ are identical to or different from each other, and each represent a C1-C6 chain hydrocarbon group, a C3-C6 cycloalkyl group, or a hydrogen atom;

$R^{22B}$ represents a C1-C6 chain hydrocarbon group or a C3-C6 cycloalkyl group;

$R^{23A}$, $R^{23B}$, $R^{25A}$, and $R^{27A}$ are identical to or different from each other, and each represent a C1-C6 chain hydrocarbon group, a C3-C6 cycloalkyl group, or a phenyl group optionally substituted with one or more substituent(s) selected from Group $G^A$;

$R^{33A}$ represents a C1-C6 chain hydrocarbon group, a cyclopropyl group, or a hydrogen atom;

$R^{33B}$ represents a C1-C6 chain hydrocarbon group or a cyclopropyl group; and $R^{34A}$ represents a C1-C6 chain hydrocarbon group optionally substituted with one or more halogen atom(s);

Group $F^A$: a group consisting of a C6-C10 aryl group optionally substituted with one or more substituent(s) selected from Group $G^A$, or a halogen atom;

Group $G^A$: a group consisting of a C1-C3 alkoxy group, a C1-C3 chain hydrocarbon group optionally substituted with one or more halogen atom(s), a halogen atom, and a cyano group.

[Aspect A14] The compound according to the Aspect A9, wherein $R^{10A}$ represents a C3-C6 cycloalkyl group, a C1-C6 chain hydrocarbon group optionally substituted with one or more substituent(s) selected from Group $F^A$, or a 5-10 membered aromatic heterocyclic group {wherein the 5-10 membered aromatic heterocyclic group may be optionally substituted with a chain hydrocarbon group optionally substituted with one or more halogen atom(s)};

$R^{20A}$, $R^{21A}$, $R^{22A}$, $R^{24A}$, and $R^{26A}$ are identical to or different from each other, and each represent a C1-C6 chain hydrocarbon group, a C3-C6 cycloalkyl group, or a hydrogen atom;

$R^{23A}$, $R^{23B}$, $R^{25A}$, and $R^{27A}$ are identical to or different from each other, and each represent a C1-C6 chain hydrocarbon group, a C3-C6 cycloalkyl group, or a phenyl group optionally substituted with one or more substituent(s) selected from Group $G^A$;

$R^{33A}$ represents a C1-C6 chain hydrocarbon group, a cyclopropyl group, or a hydrogen atom; and $R^{34A}$ represents a C1-C6 chain hydrocarbon group optionally substituted with one or more halogen atom(s).

[Aspect A15] The compound according to the Aspect A10, wherein $R^{10A}$ represents a C3-C6 cycloalkyl group, a C1-C6 chain hydrocarbon group optionally substituted with one or more substituent(s) selected from Group $F^A$, or a 5-10 membered aromatic heterocyclic group {wherein the 5-10 membered aromatic heterocyclic group may be optionally substituted with a chain hydrocarbon group optionally substituted with one or more halogen atom(s)};

$R^{33A}$ represents a C1-C6 chain hydrocarbon group, a cyclopropyl group, or a hydrogen atom; and $R^{34A}$ represents a C1-C6 chain hydrocarbon group optionally substituted with one or more halogen atom(s).

[Aspect A16] The compound according to the Aspect A11, wherein $R^{10A}$ represents a C3-C6 cycloalkyl group, a C1-C6 chain hydrocarbon group optionally substituted with one or more substituent(s) selected from Group $F^A$, or a 5-10 membered aromatic heterocyclic group {wherein the 5-10 membered aromatic heterocyclic group may be optionally substituted with a chain hydrocarbon group optionally substituted with one or more halogen atom(s)};

$R^{33A}$ represents a C1-C6 chain hydrocarbon group, a cyclopropyl group, or a hydrogen atom; and $R^{34A}$ represents a C1-C6 chain hydrocarbon group optionally substituted with one or more halogen atom(s).

[Aspect A17] The Compound N of the present invention, wherein $Z^A$ represents a C2-C6 chain hydrocarbon group optionally substituted with one or more halogen atom(s), or a 6 membered aromatic heterocyclic group optionally substituted with one or more substituent(s) selected from Group $E^A$.

[Aspect A18] The Compound N of the present invention, wherein $Z^A$ represents a C2-C6 chain hydrocarbon group or a pyridyl group.

[Aspect A19] The compound according to the Aspect A9, wherein $Z^A$ represents a C2-C6 chain hydrocarbon group optionally substituted with one or more halogen atom(s), or a 6 membered aromatic heterocyclic group optionally substituted with one or more substituent(s) selected from Group $E^A$.

[Aspect A20] The compound according to the Aspect A10, wherein $Z^A$ represents a C2-C6 chain hydrocarbon group optionally substituted with one or more halogen atom(s), or a 6 membered aromatic heterocyclic group optionally substituted with one or more substituent(s) selected from Group $E^A$.

[Aspect A21] The compound according to the Aspect A11, wherein $Z^A$ represents a C2-C6 chain hydrocarbon group optionally substituted with one or more halogen atom(s), or a 6 membered aromatic heterocyclic group optionally substituted with one or more substituent(s) selected from Group $E^A$.

[Aspect A22] The compound according to the Aspect A13, wherein $Z^A$ represents a C2-C6 chain hydrocarbon group optionally substituted with one or more halogen atom(s), or a 6 membered aromatic heterocyclic group optionally substituted with one or more substituent(s) selected from Group $E^A$.

[Aspect A23] The compound according to the Aspect A14, wherein $Z^A$ represents a C2-C6 chain hydrocarbon group optionally substituted with one or more halogen atom(s), or a 6 membered aromatic heterocyclic group optionally substituted with one or more substituent(s) selected from Group $E^A$.

[Aspect A24] The compound according to the Aspect A15, wherein $Z^A$ represents a C2-C6 chain hydrocarbon group optionally substituted with one or more halogen atom(s), or a 6 membered aromatic heterocyclic group optionally substituted with one or more substituent(s) selected from Group $E^A$.

[Aspect A25] The compound according to the Aspect A16, wherein $Z^A$ represents a C2-C6 chain hydrocarbon group optionally substituted with one or more halogen atom(s), or a 6 membered aromatic heterocyclic group optionally substituted with one or more substituent(s) selected from Group $E^A$.

[Aspect A26] The compound according to the Aspect A15, wherein $Z^A$ represents a C2-C6 chain hydrocarbon group or a pyridyl group.

[Aspect A27] The compound according to the Aspect A15, wherein $Z^A$ represents a C2-C6 chain hydrocarbon group or a pyridyl group;

$R^{33A}$ represents a hydrogen atom; and $R^{34A}$ represents a C1-C3 chain hydrocarbon group.

[Aspect A28] The compound according to the Aspect A12, wherein $Z^A$ represents a C2-C6 chain hydrocarbon group optionally substituted with one or more halogen atom(s), or a 6 membered aromatic heterocyclic group optionally substituted with one or more substituent(s) selected from Group $E^A$.

[Aspect A29] The compound according to the Aspect A12, wherein $Z^A$ represents a C2-C6 chain hydrocarbon group or a pyridyl group.

[Aspect A30] The Compound N of the present invention, wherein m represents 1 or 2.

[Aspect A31] The Compound N of the present invention, wherein m represents 2.

[Aspect A32] The compound according to the Aspect A28, wherein m represents 2.

[Aspect A33] The compound according to the Aspect A29, wherein m represents 2.

[Aspect A34] The compound according to any one of the Aspects A1 to A33 or the Compound N of the present invention, wherein $Q^A$ represents the group represented by $Q^A1$ or the group represented by $Q^A2$.

[Aspect A35] The compound according to any one of the Aspects A1 to A33 or the Compound N of the present invention, wherein $Q^A$ represents the group represented by $Q^A1$.

[Aspect A36] The compound according to any one of the Aspects A1 to A33 or the Compound N of the present invention, wherein $R^{6A}$ and $R^{7A}$ each represent a hydrogen atom.

[Aspect A37] The compound according to any one of the Aspects A1 to A33 or the Compound N of the present invention, wherein $R^{8A}$ represents a hydrogen atom.

[Aspect A38] The compound according to any one of the Aspects A1 to A33 or the Compound N of the present invention, wherein $R^{9A}$ represents a hydrogen atom.

[Aspect A39] The compound according to any one of the Aspects A1 to A33 or the Compound N of the present invention, wherein $R^{6A}$, $R^{7A}$, $R^{8A}$, and $R^{9A}$ each represent a hydrogen atom.

[Aspect A40] The compound according to any one of the Aspects A1 to A33 or the Compound N of the present invention, wherein $Q^A$ represents the group represented by $Q^A1$ or the group represented by $Q^A2$; and $R^{6A}$, $R^{7A}$, and $R^{8A}$ each represent a hydrogen atom.

[Aspect A41] The compound according to any one of the Aspects A1 to A33 or the Compound N of the present invention, wherein $Q^A$ represents the group represented by $Q^A1$; and $R^{6A}$ and $R^{7A}$ each represent a hydrogen atom.

[Aspect A42] The compound according to any one of the Aspects A1 to A29 or the Compound N of the present invention, wherein $Q^A$ represents the group represented by $Q^A1$ or the group represented by $Q^A3$; and m represents 1 or 2.

[Aspect A43] The compound according to any one of the Aspects A1 to A29 or the Compound N of the present invention, wherein $Q^A$ represents the group represented by $Q^A3$; and m represents 1 or 2.

[Aspect A44] The compound according to any one of the Aspects A1 to A29 or the Compound N of the present invention, wherein $Q^A$ represents the group represented by $Q^A3$; and m represents 2.

[Aspect A45] The compound according to any one of the Aspects A1 to A29 or the Compound N of the present invention, wherein $Q^A$ represents the group represented by $Q^A1$ or the group represented by $Q^A3$;

m represents 1 or 2; and $R^{6A}$, $R^{7A}$, and $R^{9A}$ each represent a hydrogen atom.

[Aspect A46] The compound according to any one of the Aspects A1 to A29 or the Compound N of the present invention, wherein $Q^A$ represents the group represented by $Q^A3$;

m represents 2; and $R^{9A}$ represents a hydrogen atom.

[Aspect A47] The compound according to any one of the Aspects A30, A31, or the Compound N of the present invention, wherein $Q^A$ represents the group represented by $Q^A1$;

$R^{1A}$ and $R^{5A}$ are identical to or different from each other, and each represent a C1-C6 chain hydrocarbon group optionally substituted with one or more halogen atom(s), a hydrogen atom, a halogen atom, or a $—OR^{10A}$;

$R^{2A}$ and $R^{4A}$ are identical to or different from each other, and each represent a C1-C6 chain hydrocarbon group optionally substituted with one or more halogen atom(s), a hydrogen atom, a halogen atom, a $—OR^{10A}$, or a $—NHC(O)OR^{34A}$;

$R^{3A}$ represents a C1-C6 chain hydrocarbon group optionally substituted with one or more halogen atom(s), a a halogen atom, or a $—OR^{10A}$;

$R^{10A}$ represents a C1-C6 chain hydrocarbon group optionally substituted with one or more halogen atom(s); and $R^{34A}$ represents a C1-C3 chain hydrocarbon group.

[Aspect B1] The Compound N of the present invention, wherein $Z^A$ represents a C2-C6 chain hydrocarbon group optionally substituted with one or more halogen atom(s), or a C3-C6 cycloalkyl group.

[Aspect B2] The Compound N of the present invention, wherein $Z^A$ represents a C2-C5 chain hydrocarbon group optionally substituted with one or more halogen atom(s).

[Aspect B3] The Compound N of the present invention, wherein $Q^A$ represents the group represented by $Q^A1$ or the group represented by $Q^A2$; and m represents 0 or 2.

[Aspect B4] The Compound N of the present invention, wherein $Q^A$ represents the group represented by $Q^A1$ or the group represented by $Q^A2$; and m represents 2.

[Aspect B5] The Compound N of the present invention, wherein $Q^A$ represents the group represented by $Q^A1$ or the group represented by $Q^A3$; and m represents 2.

[Aspect B6] The Compound N of the present invention, wherein $Q^A$ represents the group represented by $Q^A1$; and m represents 0 or 2.

[Aspect B7] The Compound N of the present invention, wherein $Q^A$ represents the group represented by $Q^A3$; and m represents 2.

[Aspect B8] The Compound N of the present invention, wherein $Z^A$ represents a C2-C6 chain hydrocarbon group optionally substituted with one or more halogen atom(s), or a C3-C6 cycloalkyl group;

$Q^A$ represents the group represented by $Q^A1$ or the group represented by $Q^A2$; and m represents 0 or 2.

[Aspect B9] The Compound N of the present invention, wherein $Z^A$ represents a C2-C6 chain hydrocarbon group optionally substituted with one or more halogen atom(s), or a C3-C6 cycloalkyl group;

$Q^A$ represents the group represented by $Q^A1$ or the group represented by $Q^A2$; and m represents 2.

[Aspect B10] The Compound N of the present invention, wherein $Z^A$ represents a C2-C6 chain hydrocarbon group optionally substituted with one or more halogen atom(s), or a C3-C6 cycloalkyl group;

$Q^A$ represents the group represented by $Q^A1$ or the group represented by $Q^A3$; and m represents 2.

[Aspect B11] The Compound N of the present invention, wherein $Z^A$ represents a C2-C6 chain hydrocarbon group optionally substituted with one or more halogen atom(s), or a C3-C6 cycloalkyl group;

$Q^A$ represents the group represented by $Q^A1$; and m represents 0 or 2.

[Aspect B12] The Compound N of the present invention, wherein $Z^A$ represents a C2-C6 chain hydrocarbon group optionally substituted with one or more halogen atom(s), or a C3-C6 cycloalkyl group;

$Q^A$ represents the group represented by $Q^A3$; and m represents 2.

[Aspect B13] The Compound N of the present invention, wherein $Z^A$ represents a C2-C5 chain hydrocarbon group optionally substituted with one or more halogen atom(s);

$Q^A$ represents the group represented by $Q^A1$ or the group represented by $Q^A2$; and m represents 0 or 2.

[Aspect B14] The Compound N of the present invention, wherein $Z^A$ represents a C2-C5 chain hydrocarbon group optionally substituted with one or more halogen atom(s);

$Q^A$ represents the group represented by $Q^A1$ or the group represented by $Q^A2$; and m represents 2.

[Aspect B15] The Compound N of the present invention, wherein $Z^A$ represents a C2-C5 chain hydrocarbon group optionally substituted with one or more halogen atom(s);

$Q^A$ represents the group represented by $Q^A1$ or the group represented by $Q^A3$; and m represents 2.

[Aspect B16] The Compound N of the present invention, wherein $Z^A$ represents a C2-C5 chain hydrocarbon group optionally substituted with one or more halogen atom(s);

$Q^A$ represents the group represented by $Q^A1$; and m represents 0 or 2.

[Aspect B17] The Compound N of the present invention, wherein $Z^A$ represents a C2-C5 chain hydrocarbon group optionally substituted with one or more halogen atom(s);

$Q^A$ represents the group represented by $Q^A3$; and m represents 2.

[Aspect B18] The compound according to any one of the Aspects B1 to B17 or the Compound N of the present invention, wherein $R^{1A}$ and $R^{5A}$ each represent a hydrogen atom; and $R^{2A}$ and $R^{4A}$ are identical to or different from each other, and each represent a hydrogen atom or a halogen atom.

[Aspect B19] The compound according to any one of the Aspects B1 to B17 or the Compound N of the present invention, wherein $R^{3A}$ represents a C1-C6 chain hydrocarbon group optionally substituted with one or more halogen atom(s), a —$OR^{10A}$, a hydrogen atom, or a halogen atom; and $R^{10A}$ represents a C1-C6 chain hydrocarbon group optionally substituted with one or more halogen atom(s).

[Aspect B20] The compound according to any one of the Aspects B1 to B17 or the Compound N of the present invention, wherein $R^{1A}$ and $R^{5A}$ each represent a hydrogen atom;

$R^{2A}$ and $R^{4A}$ are identical to or different from each other, and each represent a hydrogen atom or a halogen atom; and $R^{3A}$ represents a C1-C6 chain hydrocarbon group optionally substituted with one or more halogen atom(s), a —$OR^{10A}$, a hydrogen atom, or a halogen atom;

provided that at least one of $R^{1A}$, $R^{2A}$, $R^{3A}$, $R^{4A}$, and $R^{5A}$ is not a hydrogen atom.

[Aspect B21] The compound according to any one of the Aspects B1 to B17 or the Compound N of the present invention, wherein $R^{1A}$, $R^{3A}$, $R^{4A}$, and $R^{5A}$ each represent a hydrogen atom;

$R^{2A}$ represents a —$OR^{10A}$; and $R^{10A}$ represents a methyl group substituted with a phenyl group optionally substituted with one or more substituent(s) selected from Group $C^A$.

Next, Production methods for the Present compounds and the Compounds of the present invention are described.

Production Method A

A compound represented by formula (I-b) (hereinafter referred to as "Compound (I-b)") or a compound represented by formula (I-c) (hereinafter referred to as "Compound (I-c)") may be prepared by reacting a compound represented by formula (I-a) (hereinafter referred to as "Compound (I-a)") with an oxidizing agent.

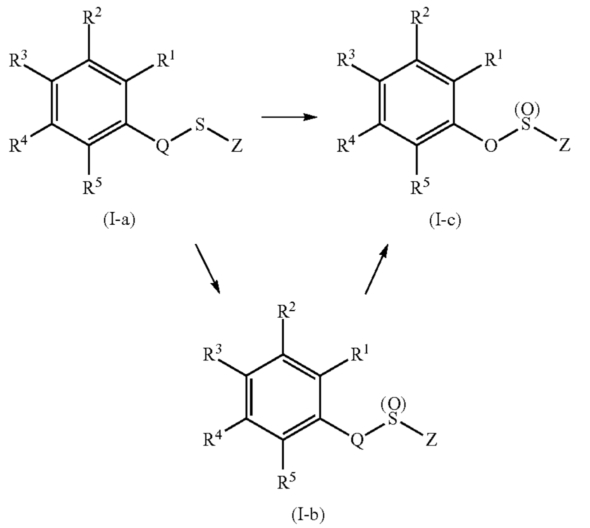

[wherein the symbols are the same as defined above.]

First, a method for producing the Compound (I-b) from the Compound (I-a) is described.

The reaction is usually carried out in a solvent. Examples of the solvent to be used in the reaction include halogenated hydrocarbons such as dichloromethane and chloroform (hereinafter collectively referred to as "halogenated hydrocarbons"); nitriles such as acetonitrile (hereinafter collectively referred to as "nitriles"); alcohols such as methanol and ethanol (hereinafter collectively referred to as "alcohols"); acetic acid; water; and mixtures of two or more of them.

Examples of the oxidizing agent to be used in the reaction include sodium periodate, m-chloroperbenzoic acid (hereinafter referred to as "mCPBA"), and hydrogen peroxide.

In the reaction, the oxidizing agent is usually used at a ratio of 1 to 1.2 mol, relative to 1 mol of the Compound (I-a).

When hydrogen peroxide is used as the oxidizing agent, a base or a catalyst may also be used as needed.

Examples of the base to be used in the reaction include sodium carbonate. The base is usually used at a ratio of 0.01 to 1 mol, relative to 1 mol of the Compound (I-a).

Examples of the catalyst to be used in the reaction include tungstic acid and sodium tungstate. The catalyst is usually used at a ratio of 0.01 to 0.5 mol, relative to 1 mol of the Compound (I-a).

The reaction temperature is usually within the range of −20 to 80° C. The reaction time is usually within the range of 0.1 to 12 hour(s).

When the reaction is completed, the reaction mixture may be subjected to adding water to the reaction mixture, extracting the resulting reaction mixture with organic solvent(s), and washing the resulting organic layer with an aqueous solution of a reducing agent (for example, sodium sulfite or sodium thiosulfate) and an aqueous solution of a base (for example, sodium hydrogen carbonate) as needed. The resulting organic layer may be dried or concentrated to give the Compound (I-b).

Next, a method for producing the Compound (I-c) from the Compound (I-b) is described. The Compound (I-c) may be prepared by reacting the Compound (I-b) with an oxidizing agent.

The reaction is usually carried out in a solvent. Examples of the solvent to be used in the reaction include halogenated hydrocarbons, nitriles, alcohols, acetic acid, water, and mixtures of two or more of them.

Examples of the oxidizing agent to be used in the reaction include mCPBA and hydrogen peroxide.

In the reaction, the oxidizing agent is usually used at a ratio of 1 to 2 mol, relative to 1 mol of the Compound (I-b).

When hydrogen peroxide is used as the oxidizing agent, a base or a catalyst may also be used as needed.

Examples of the base to be used in the reaction include sodium carbonate. The base is usually used at a ratio of 0.01 to 1 mol, relative to 1 mol of the Compound (I-b).

Examples of the catalyst to be used in the reaction include sodium tungstate. The catalyst is usually used at a ratio of 0.01 to 0.5 mol, relative to 1 mol of the Compound (I-b).

The reaction temperature is usually within the range of −20 to 120° C. The reaction time is usually within the range of 0.1 to 12 hour(s).

When the reaction is completed, the reaction mixture may be subjected to adding water to the reaction mixture, extracting the resulting reaction mixture with organic solvent(s), and washing the resulting organic layer with an aqueous solution of a reducing agent (for example, sodium sulfite or sodium thiosulfate) and an aqueous solution of a base (for example, sodium hydrogen carbonate) as needed. The resulting organic layer may be dried or concentrated to give the Compound (I-c).

Also, the Compound (I-c) may be prepared in one step reaction (one-pot) by reacting the Compound (I-a) with an oxidizing agent.

The reaction may be carried out according to the method for producing the Compound (I-c) from the Compound (I-b) by usually using the oxidizing agent at a ratio of 2 to 5 mol relative to 1 mol of the Compound (I-a).

Production Method B

A compound represented by formula (IA-a) (hereinafter referred to as "Compound (IA-a)") may be prepared by reacting a compound represented by formula (M-1) (hereinafter referred to as "Compound (M-1)") with a compound represented by formula (M-2) (hereinafter referred to as "Compound (M-2)") in the presence of a copper catalyst and a base.

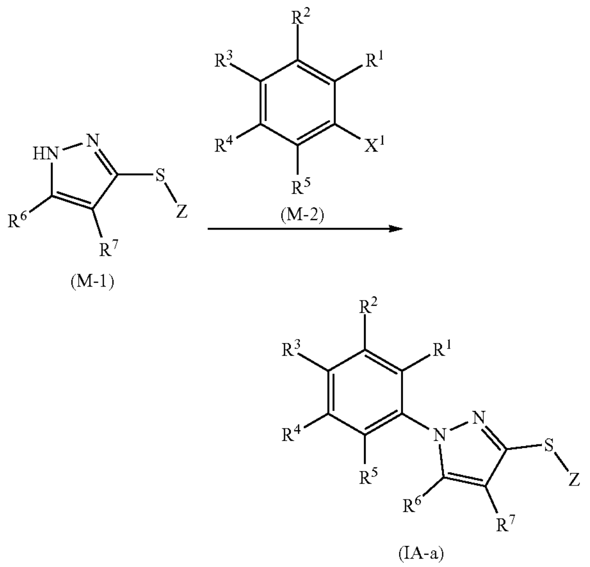

[wherein $X^1$ represents an iodine atom, a bromine atom, a chlorine atom, a trifluoromethanesulfonyloxy group, a $B(OH)_2$, or a 4,4,5,5-tetramethyl-1,3,2-dioxaborolan-2-yl group; and the other symbols are the same as defined above.]

The reaction is usually carried out in a solvent. Examples of the solvent to be used in the reaction include hydrocarbons such as hexane, toluene, and xylene (hereinafter collectively referred to as "hydrocarbons"); ethers such as methyl tert-butyl ether, tetrahydrofuran (hereinafter referred to as "THF"), and dimethoxyethane (hereinafter collectively referred to as "ethers"); halogenated hydrocarbons; amides such as N,N-dimethylformamide (hereinafter referred to as "DMF") and N-methylpyrrolidone (hereinafter collectively referred to as "amides"); esters such as methyl acetate and ethyl acetate (hereinafter collectively referred to as "esters"); nitriles; sulfoxides such as dimethylsulfoxide (hereinafter referred to as "DMSO") (hereinafter collectively referred to as "sulfoxides"); ketones such as acetone and methyl isobutyl ketone (hereinafter collectively referred to as "ketones"); alcohols; water; and mixtures of two or more of them.

Examples of the copper catalyst to be used in the reaction include copper (I) iodide.

Examples of the base to be used in the reaction include organic bases such as triethylamine and pyridine (hereinafter collectively referred to as "organic bases"); alkali metal carbonates such as sodium carbonate and potassium carbonate (hereinafter collectively referred to as "alkali metal carbonates"); alkali metal hydrogen carbonates such as sodium hydrogen carbonate and potassium hydrogen carbonate; alkali metal hydroxides such as lithium hydroxide, sodium hydroxide, potassium hydroxide, and cesium hydroxide (hereinafter collectively referred to as "alkali metal hydroxides"); and alkali metal alkoxides such as sodium tert-butoxide and potassium tert-butoxide.

In the reaction, the Compound (M-2) is usually used at a ratio of 1 to 10 mol, the base is usually used at a ratio of 1 to 10 mol, and the copper catalyst is usually used at a ratio of 0.01 to 1 mol, relative to 1 mol of the Compound (M-1).

The reaction temperature is usually within the range of −20 to 150° C. The reaction time is usually within the range of 0.1 to 120 hour(s).

When the reaction is completed, the reaction mixture may be subjected to a work-up such as mixing the reaction mixture with water, then extracting the resulting reaction mixture with organic solvent(s), and drying or concentrating the resulting organic layer to give the Compound (IA-a).

The Compound (M-2) is a commercially available compound or may be prepared by using known method(s).

Production Method C

A compound represented by formula (I-a1) (hereinafter referred to as "Compound (I-a1)") may be prepared by reacting a compound represented by formula (M-3) (hereinafter referred to as "Compound (M-3)") with a compound represented by formula (R-1) (hereinafter referred to as "Compound (R-1)") in the presence of a base.

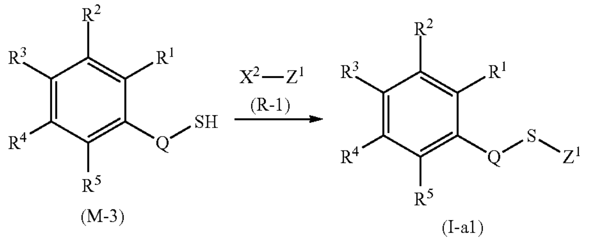

(M-3) (I-a1)

[wherein $Z^1$ represents a C1-C6 chain hydrocarbon group optionally substituted with one or more substituent(s) selected from Group A, or a C3-C6 cycloalkyl group optionally substituted with one or more substituent(s) selected from Group E; $X^2$ represents an iodine atom, a bromine atom, a chlorine atom, or a trifluoromethanesulfonyloxy group; and the other symbols are the same as defined above.]

The reaction is usually carried out in a solvent. Examples of the solvent to be used in the reaction include hydrocarbons; ethers; amides; esters; sulfoxides; ketones; nitriles; and mixtures of two or more of them.

Examples of the base to be used in the reaction include organic bases; alkali metal carbonates; alkali metal hydroxides; and alkali metal hydrides such as sodium hydride (hereinafter collectively referred to as "alkali metal hydrides").

In the reaction, the Compound (R-1) is usually used at a ratio of 1 to 10 mol, and the base is usually used at a ratio of 1 to 10 mol, relative to 1 mol of the Compound (M-3).

The reaction temperature is usually within the range of 0 to 150° C. The reaction time is usually within the range of 0.1 to 24 hour(s).

In the reaction, sodium iodide, potassium iodide, tetrabutylammonium iodide, or the like may be added to the reaction mixture as needed, and the compound is usually used at a ratio of 0.001 to 1.2 mol, relative to 1 mol of the Compound (M-3).

When the reaction is completed, the reaction mixture may be subjected to a work-up such as extracting the resulting reaction mixture with organic solvent(s), and drying or concentrating the resulting organic layer to give the Compound (I-a1).

The Compound (M-3) may be prepared according to the method described in WO 2015/147313 pamphlet, J. Med. Chem. 2015, 58, 4462, or the Reference production method C.

The Compound (R-1) is a commercially available compound or may be prepared by using known method(s).

Production Method D

The Compound (IA-a) may be prepared by reacting a compound represented by formula (M-4) (hereinafter referred to as "Compound (M-4)") with a compound represented by formula (R-2) (hereinafter referred to as "Compound (R-2)") in the presence of a base.

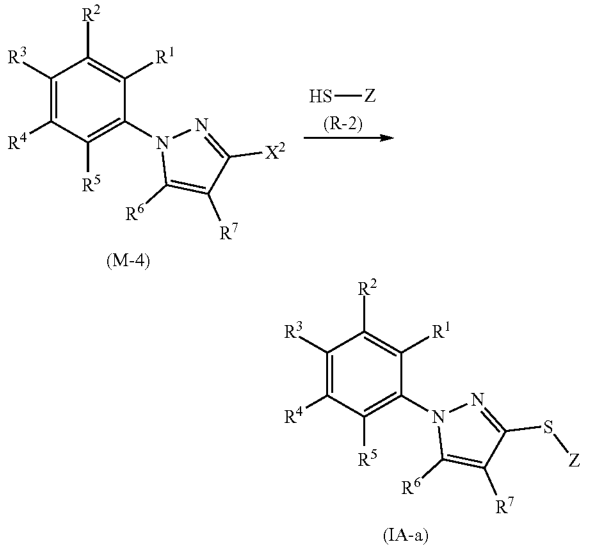

(M-4)

(IA-a)

[wherein the symbols are the same as defined above.]

The reaction is usually carried out in a solvent. Examples of the solvent to be used in the reaction include hydrocarbons; ethers; amides; esters; sulfoxides; ketones; nitriles; and mixtures of two or more of them.

Examples of the base to be used in the reaction include organic bases; alkali metal carbonates; alkali metal hydroxides; and alkali metal hydrides.

In the reaction, the Compound (R-2) is usually used at a ratio of 1 to 10 mol, and the base is usually used at a ratio of 1 to 10 mol, relative to 1 mol of the Compound (M-4).

The reaction temperature is usually within the range of 0 to 150° C. The reaction time is usually within the range of 0.1 to 24 hour(s).

When the reaction is completed, the reaction mixture may be subjected to a work-up such as extracting the resulting reaction mixture with organic solvent(s), and drying or concentrating the resulting organic layer to give the Compound (IA-a).

The Compound (M-4) may be prepared according to the method described in WO2015/147313 pamphlet.

The Compound (R-2) is a commercially available compound or may be prepared by using known method(s).

Production Method E

A compound represented by formula (IA-a2) (hereinafter referred to as "Compound (IA-a2)") may be prepared by carrying out a step of reacting a compound represented by formula (IA-a1) (hereinafter referred to as "Compound (IA-a1)") with butyllithium or isopropyimagnesium chloride to give a compound represented by formula (M-5) (hereinafter referred to as "Compound (M-5)") (1st step), and a step of reacting the Compound (M-5) with a halogenating agent to give the Compound (IA-a2) (2nd step).

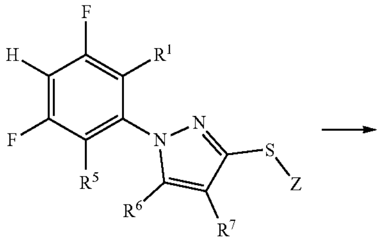

(IA-a1)

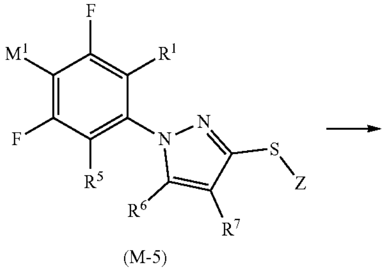

(M-5)

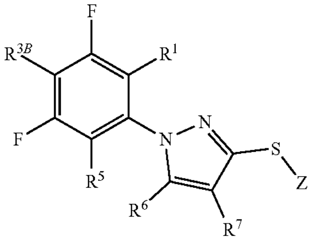

(IA-a2)

[wherein $M^1$ represents a lithium atom or a MgCl; $R^{3B}$ represents a halogen atom; and the other symbols are the same as defined above.]

The 1st step is described. The reaction is usually carried out in a solvent. Examples of the solvent to be used in the reaction include hydrocarbons; ethers; and mixtures of two or more of them.

In the reaction, butyllithium or isopropylmagnesium chloride is usually used at a ratio of 1 to 10 mol, relative to 1 mol of the Compound (IA-a1).

The reaction temperature is usually within the range of −78 to 80° C. The reaction time is usually within the range of 0.1 to 24 hour(s).

When the reaction is completed the resulting Compound (M-5) may be used in the 2nd step without a work-up.

The 2nd step is described. The reaction is usually carried out in a solvent. Examples of the solvent to be used in the reaction include hydrocarbons; ethers; and mixtures of two or more of them.

Examples of the halogenating agent to be used in the reaction include iodine, bromine, N-bromosuccinimide, N-chlorosuccinimide, and N-fluorobis(phenylsulfonyl)amine.

In the reaction, the halogenating agent is usually used at a ratio of 1 to 10 mol, relative to 1 mol of the Compound (M-5).

The reaction temperature is usually within the range of −78 to 150° C. The reaction time is usually within the range of 0.1 to 24 hour(s).

When the reaction is completed, the reaction mixture may be subjected to adding water to the reaction mixture, extracting the resulting reaction mixture with organic solvent(s), and drying or concentrating the resulting organic layer to give the Compound (IA-a2).

Production Method F

A compound represented by formula (IB-a) (hereinafter referred to as "Compound (IB-a)") may be prepared by reacting a compound represented by formula (M-6) (hereinafter referred to as "Compound (M-6)") with a compound represented by formula (R-3) (hereinafter referred to as "Compound (R-3)").

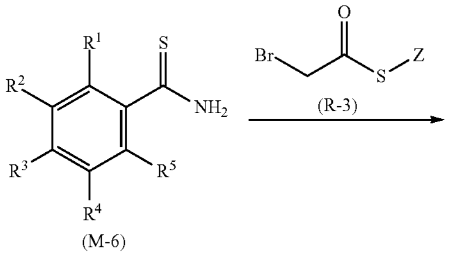

(M-6)

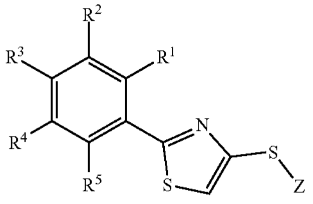

(IB-a)

[wherein the symbols are the same as defined above.]

The reaction is usually carried out in a solvent. Examples of the solvent to be used in the reaction include hydrocarbons, ethers, halogenated hydrocarbons, amides, esters, nitriles, ketones, and mixtures of two or more of them.

In the reaction, the Compound (R-3) is usually used at a ratio of 1 to 10 mol, relative to 1 mol of the Compound (M-6).

The reaction temperature is usually within the range of −78 to 80° C. The reaction time is usually within the range of 0.1 to 24 hour(s).

When the reaction is completed, the reaction mixture may be subjected to adding water to the reaction mixture, extracting the resulting reaction mixture with organic solvent(s), and drying or concentrating the resulting organic layer to give the Compound (IB-a).

The Compound (M-6) and the Compound (R-3) are commercially available compounds or may be prepared by using known method(s).

Production Method G

A compound represented by formula (I-d) (hereinafter referred to as "Compound (I-d)") may be prepared by reacting a compound represented by formula (M-13) (hereinafter referred to as "Compound (M-13)") with a compound represented by formula (R-5) (hereinafter referred to as "Compound (R-5)").

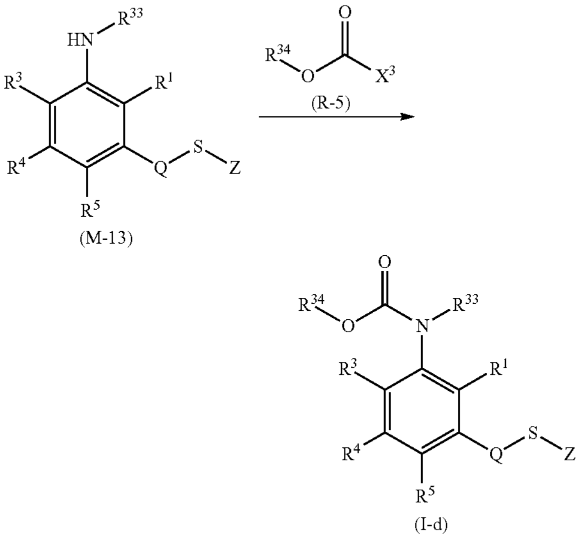

[wherein $X^3$ represents a chlorine atom, a bromine atom, or a —$OR^{34}$; and the other symbols are the same as defined above.]

The reaction is usually carried out in a solvent. Examples of the solvent to be used in the reaction include hydrocarbons, ethers, halogenated hydrocarbons, amides, esters, nitriles, ketones, and mixtures of two or more of them.

In the reaction, the Compound (R-5) is usually used at a ratio of 1 to 10 mol, relative to 1 mol of the Compound (M-13).

In the reaction, a base may be used as needed. Examples of the base to be used in the reaction include organic bases; alkali metal carbonates; and alkali metal hydroxides. The base is usually used at a ratio of 1 to 10 mol, relative to 1 mol of the Compound (M-13).

The reaction temperature is usually within the range of 0 to 150° C. The reaction time is usually within the range of 0.1 to 24 hour(s).

When the reaction is completed, the reaction mixture may be subjected to adding water to the reaction mixture, extracting the resulting reaction mixture with organic solvent(s), and drying or concentrating the resulting organic layer to give the Compound (I-d).

The Compound (M-13) may be prepared according to the Production method B, the Production method C, or the Production method D.

The Compound (R-5) is a commercially available compound or may be prepared by using known method(s).

Production Method H

A compound represented by formula (I-e) (hereinafter referred to as "Compound (I-e)") may be prepared by reacting a compound represented by formula (M-14) (hereinafter referred to as "Compound (M-14)") with the Compound (R-5).

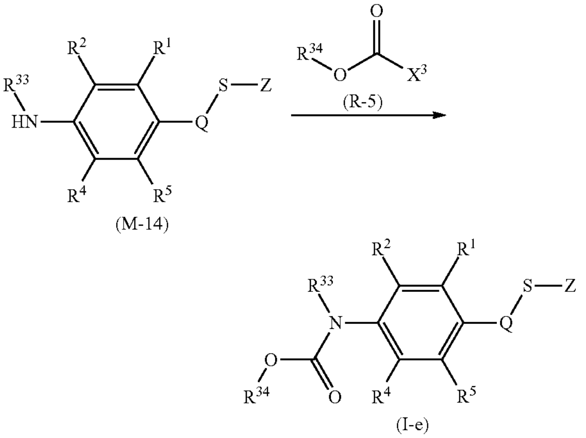

[wherein the symbols are the same as defined above.]

The reaction is usually carried out in a solvent. Examples of the solvent to be used in the reaction include hydrocarbons, ethers, halogenated hydrocarbons, amides, esters, nitriles, ketones, and mixtures of two or more of them.

In the reaction, the Compound (R-5) is usually used at a ratio of 1 to 10 mol, relative to 1 mol of the Compound (M-14).

In the reaction, a base may be used as needed. Examples of the base to be used in the reaction include organic bases; alkali metal carbonates; and alkali metal hydroxides. The base is usually used at a ratio of 1 to 10 mol, relative to 1 mol of the Compound (M-14).

The reaction temperature is usually within the range of 0 to 150° C. The reaction time is usually within the range of 0.1 to 24 hour(s).

When the reaction is completed, the reaction mixture may be subjected to adding water to the reaction mixture, extracting the resulting reaction mixture with organic solvent(s), and drying or concentrating the resulting organic layer to give the Compound (I-e).

The Compound (M-14) may be prepared according to the Production method B, the Production method C, or the Production method D.

The Compound (R-5) is a commercially available compound or may be prepared by using known method(s).

Production Method I

A compound represented by formula (IC-a) (hereinafter referred to as "Compound (IC-a)") may be prepared by reacting a compound represented by formula (M-15) (hereinafter referred to as "Compound (M-15)") with the Compound (R-2) in the presence of a base.

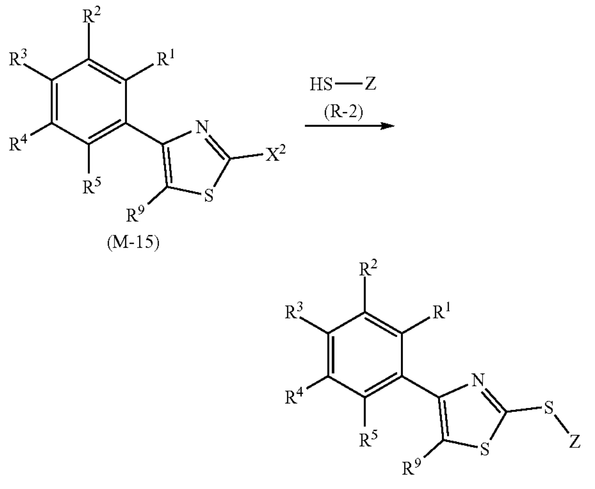

(M-15)

(IC-a)

[wherein the symbols are the same as defined above.]

The reaction is usually carried out in a solvent. Examples of the solvent to be used in the reaction include hydrocarbons; ethers; amides; esters; sulfoxides; ketones; nitriles; and mixtures of two or more of them.

Examples of the base to be used in the reaction include organic bases; alkali metal carbonates; alkali metal hydroxides; and alkali metal hydrides.

In the reaction, the Compound (R-2) is usually used at a ratio of 1 to 10 mol, and the base is usually used at a ratio of 1 to 10 mol, relative to 1 mol of the Compound (M-15).

The reaction temperature is usually within the range of 0 to 150° C. The reaction time is usually within the range of 0.1 to 24 hour(s).

When the reaction is completed, the reaction mixture may be subjected to a work-up such as extracting the resulting reaction mixture with organic solvent(s), and drying or concentrating the resulting organic layer to give the Compound (IC-a).

The Compound (M-15) may be prepared according to the method described in J. Med. Chem., 2017, 60, 10205. or Org. Lett., 2002, 4, 2485.

Production Method J

A compound represented by formula (I-f) (hereinafter referred to as "Compound (I-f)") may be prepared by reacting a compound represented by formula (M-16) (hereinafter referred to as "Compound (M-16)") with a compound represented by formula (R-6) (hereinafter referred to as "Compound (R-6)").

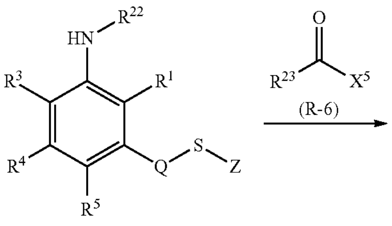

(M-16)

-continued

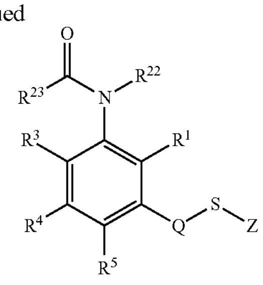

(I-f)

[wherein $X^5$ represents a chlorine atom, a bromine atom, or a —OC(O)$R^{23}$; and the other symbols are the same as defined above.]

The reaction may be carried out according to the Production method G by using the Compound (M-16) instead of the Compound (M-13), and using the Compound (R-6) instead of the Compound (R-5).

The Compound (M-16) may be prepared according to the Production method B, the Production method C, or the Production method D.

The Compound (R-6) is a commercially available compound or may be prepared by using known method(s).

Production Method K

A compound represented by formula (I-g) (hereinafter referred to as "Compound (I-g)") may be prepared by reacting a compound represented by formula (M-17) (hereinafter referred to as "Compound (M-17)") with the Compound (R-6).

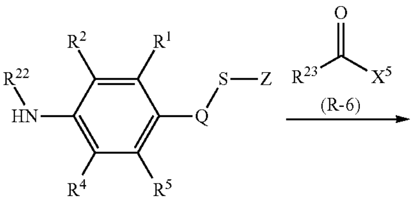

(M-17)

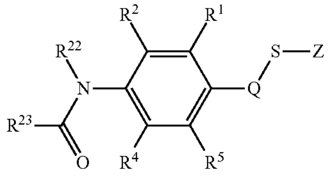

(I-g)

[wherein the symbols are the same as defined above.]

The reaction may be carried out according to the Production method G by using the Compound (M-17) instead of the Compound (M-13), and using the Compound (R-6) instead of the Compound (R-5).

The Compound (M-17) may be prepared according to the Production method B, the Production method C, or the Production method D.

Production Method L

A compound represented by formula (I-h) (hereinafter referred to as "Compound (I-h)") may be prepared by reacting a compound represented by formula (I-i) (hereinafter referred to as "Compound (I-i)") with a compound represented by formula (R-7) (hereinafter referred to as "Compound (R-7)").

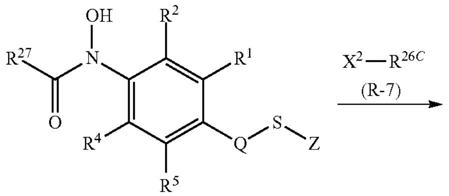

(I-i)

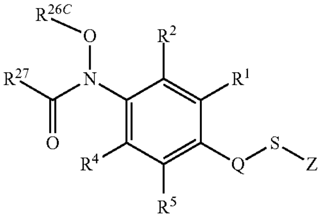

(I-h)

[wherein $R^{26C}$ represents a C1-C6 chain hydrocarbon group or a C3-C6 cycloalkyl group; and the other symbols are the same as defined above.]

The reaction is usually carried out in a solvent. Examples of the solvent to be used in the reaction include hydrocarbons, ethers, halogenated hydrocarbons, amides, esters, nitriles, ketones, and mixtures of two or more of them.

In the reaction, the Compound (R-7) is usually used at a ratio of 1 to 10 mol, relative to 1 mol of the Compound (I-i).

In the reaction, a base may be used as needed. Examples of the base to be used in the reaction include organic bases; alkali metal carbonates; and alkali metal hydroxides. The base is usually used at a ratio of 1 to 10 mol, relative to 1 mol of the Compound (I-i).

The reaction temperature is usually within the range of 0 to 150° C. The reaction time is usually within the range of 0.1 to 24 hour(s).

When the reaction is completed, the reaction mixture may be subjected to adding water to the reaction mixture, extracting the resulting reaction mixture with organic solvent(s), and drying or concentrating the resulting organic layer to give the Compound (I-h).

The Compound (R-7) is a commercially available compound or may be prepared by using known method(s).

Production Method M

A compound represented by formula (I-j) (hereinafter referred to as "Compound (I-j)") may be prepared by reacting a compound represented by formula (I-0) (hereinafter referred to as "Compound (I-o)") with the Compound (R-7).

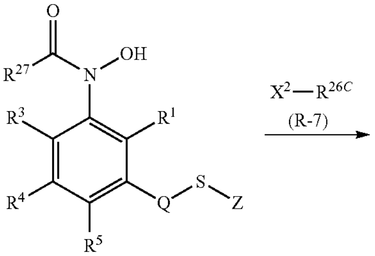

(I-o)

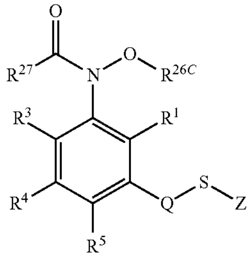

(I-j)

[wherein the symbols are the same as defined above.]

The reaction may be carried out according to the Production method L by using the Compound (I-o) instead of the Compound (I-i).

Production Method N

A compound represented by formula (I-k) (hereinafter referred to as "Compound (I-k)") may be prepared by carrying out a step of reacting a compound represented by formula (M-20) (hereinafter referred to as "Compound (M-20)") with a halogenating agent to give a compound represented by formula (M-21) (hereinafter referred to as "Compound (M-21)") (1st step), and a step of reacting the Compound (M-21) with a compound represented by formula (R-8) (hereinafter referred to as "Compound (R-8)") to give the Compound (I-k) (2nd step). The Compound (I-k) may also be prepared by reacting the Compound (M-20) with the Compound (R-8) in the presence of a condensing agent.

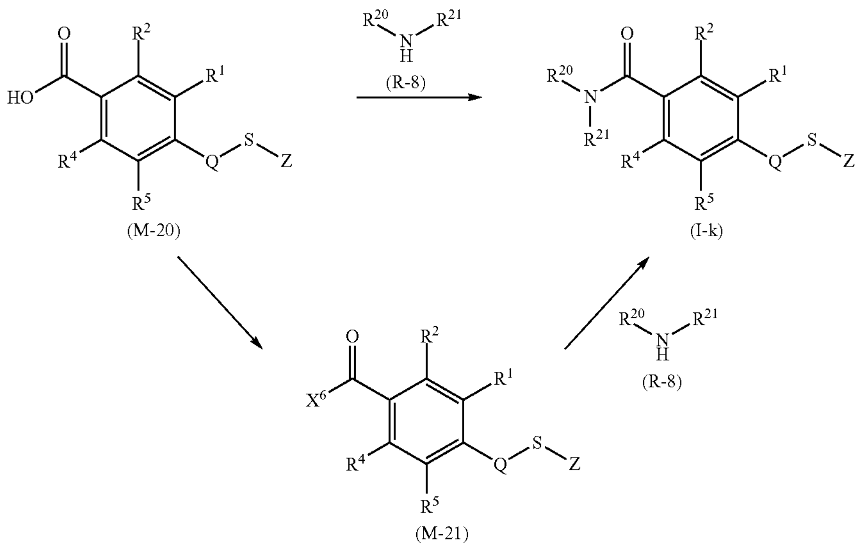

(M-20)
(I-k)
(M-21)

[wherein $X^6$ represents a chlorine atom or a bromine atom; and the other symbols are the same as defined above.]

The 1st step is described. The reaction is usually carried out in a solvent. Examples of the solvent to be used in the reaction include hydrocarbons, ethers, halogenated hydrocarbons, amides, esters, nitriles, ketones, and mixtures of two or more of them.

Examples of the halogenating agent to be used in the reaction include thionyl chloride and oxalyl chloride.

In the reaction, the halogenating agent is usually used at a ratio of 1 to 10 mol, relative to 1 mol of the Compound (M-20).

In the reaction, a base may be used as needed. Examples of the base to be used in the reaction include organic bases, alkali metal carbonates, and alkali metal hydroxides. The base is usually used at a ratio of 1 to 10 mol, relative to 1 mol of the Compound (M-20).

The reaction temperature is usually within the range of −78 to 150° C. The reaction time is usually within the range of 0.1 to 24 hour(s).

When the reaction is completed, the resulting Compound (M-21) may be used in the 2nd step without a work-up.

The 2nd step is described. The reaction is usually carried out in a solvent. Examples of the solvent to be used in the reaction include hydrocarbons, ethers, halogenated hydrocarbons, amides, esters, nitriles, ketones, and mixtures of two or more of them.

In the reaction, the Compound (R-8) is usually used at a ratio of 1 to 10 mol, relative to 1 mol of the Compound (M-21).

In the reaction, a base may be used as needed. Examples of the base to be used in the reaction include organic bases, alkali metal carbonates, and alkali metal hydroxides. The base is usually used at a ratio of 1 to 10 mol, relative to 1 mol of the Compound (M-21).

The reaction temperature is usually within the range of −78 to 150° C. The reaction time is usually within the range of 0.1 to 24 hour(s).

When the reaction is completed, the reaction mixture may be subjected to adding water to the reaction mixture, extracting the resulting reaction mixture with organic solvent(s), and drying or concentrating the resulting organic layer to give the Compound (I-k).

The Compound (R-8) is a commercially available compound or may be prepared by using known method(s).

Next, a method for producing the Compound (I-k) by reacting the Compound (M-20) with the Compound (R-8) in the presence of a condensing agent is described.

The reaction is usually carried out in a solvent. Examples of the solvent to be used in the reaction include hydrocarbons, ethers, halogenated hydrocarbons, amides, esters, nitriles, ketones, and mixtures of two or more of them.

Examples of the condensing agent to be used in the reaction include 1-[3-(dimethylamino)propyl]-3-ethylcarbodiimide, N,N'-dicyclohexylcarbodiimide, and N,N'-carbonyldiimidazole.

In the reaction, the condensing agent is usually used at a ratio of 1 to 10 mol, relative to 1 mol of the Compound (M-20).

In the reaction, a base may be used as needed. Examples of the base to be used in the reaction include organic bases, alkali metal carbonates, and alkali metal hydroxides. The base is usually used at a ratio of 1 to 10 mol, relative to 1 mol of the Compound (M-20).

The reaction temperature is usually within the range of −78 to 150° C. The reaction time is usually within the range of 0.1 to 24 hour(s).

When the reaction is completed, the reaction mixture may be subjected to adding water to the reaction mixture, extracting the resulting reaction mixture with organic solvent(s), and drying or concentrating the resulting organic layer to give the Compound (I-k).

Production Method O

A compound represented by formula (I-m) (hereinafter referred to as "Compound (I-m)") may be prepared by carrying out a step of reacting the Compound (M-20) with a halogenating agent to give the Compound (M-21) (1st step), and a step of reacting the Compound (M-21) with a compound represented by formula (R-9) (hereinafter referred to as "Compound (R-9)") to give the Compound (I-m) (2nd step). The Compound (I-m) may also be prepared by reacting the Compound (M-20) with the Compound (R-9) in the presence of a condensing agent.

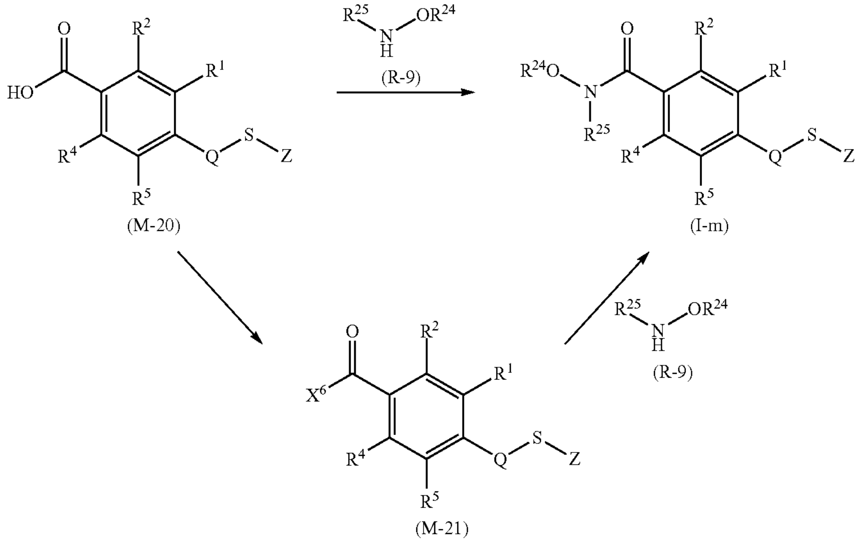

[wherein the symbols are the same as defined above.]

These reactions may be carried out according to the Production method N by using the Compound (R-9) instead of the Compound (R-8).

The Compound (R-9) is a commercially available compound or may be prepared by using known method(s).

Production Method P

A compound represented by formula (I-n) (hereinafter referred to as "Compound (I-n)") may be prepared by carrying out a step of reacting a compound represented by formula (M-22) (hereinafter referred to as "Compound (M-22)") with a halogenating agent to give a compound represented by formula (M-23) (hereinafter referred to as "Compound (M-23)") (1st step), and a step of reacting the Compound (M-23) with the Compound (R-8) to give the Compound (I-n) (2nd step). The Compound (I-n) may also be prepared by reacting the Compound (M-22) with the Compound (R-8) in the presence of a condensing agent.

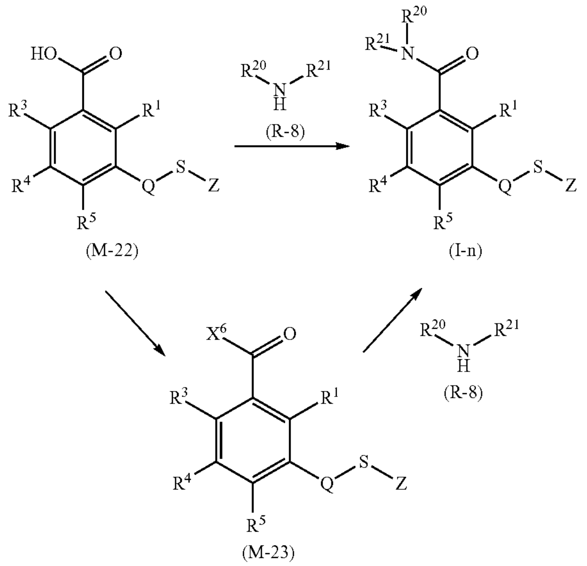

[wherein the symbols are the same as defined above.]

These reactions may be carried out according to the Production method N by using the Compound (M-22) instead of the Compound (M-20).

Production Method Q

A compound represented by formula (I-p) (hereinafter referred to as "Compound (I-p)") may be prepared by carrying out a step of reacting the Compound (M-22) with a halogenating agent to give the Compound (M-23) (1st step), and a step of reacting the Compound (M-23) with the Compound (R-9) to give the Compound (I-p) (2nd step). The Compound (I-p) may also be prepared by reacting the Compound (M-22) with the Compound (R-9) in the presence of a condensing agent.

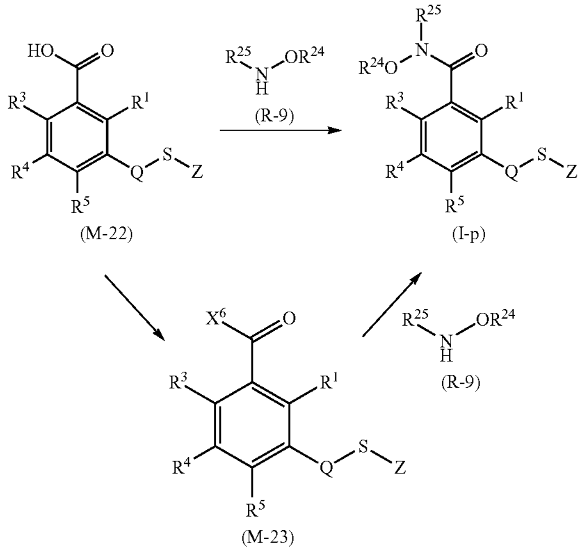

[wherein the symbols are the same as defined above.]

These reactions may be carried out according to the Production method N by using the Compound (M-22) instead of the Compound (M-20), and using the Compound (R-9) instead of the Compound (R-8).

A compound represented by formula (IA-a4) (hereinafter referred to as "Compound (IA-a4)") may be prepared by carrying out a step of reacting a compound represented by formula (IA-a3) (hereinafter referred to as "Compound (IA-a3)") with butyllithium or isopropylmagnesium chloride to give a compound represented by formula (M-24) (hereinafter referred to as "Compound (M-24)") (1st step), and a step of reacting the Compound (M-24) with a fluorinating agent to give the Compound (IA-a4) (2nd step).

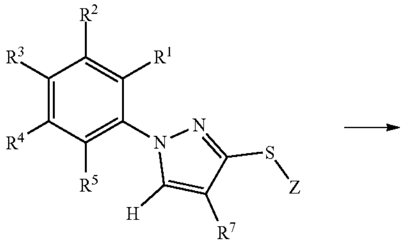

(IA-a3)

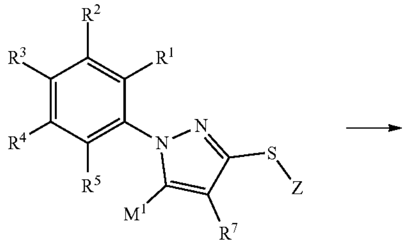

(M-24)

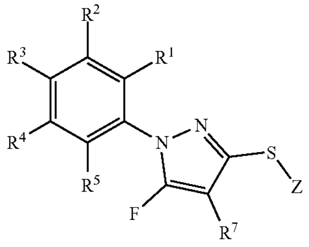

(IA-a4)

[wherein the symbols are the same as defined above.]

The 1st step is described. The reaction is usually carried out in a solvent. Examples of the solvent to be used in the reaction include hydrocarbons, ethers, and mixtures of two or more of them.

In the reaction, butyllithium or isopropylmagnesium chloride is usually used at a ratio of 1 to 10 mol, relative to 1 mol of the Compound (IA-a3).

The reaction temperature is usually within the range of −78 to 80° C. The reaction time is usually within the range of 0.1 to 24 hour(s).

When the reaction is completed, the resulting Compound (M-24) may be used in the 2nd step without a work-up.

The 2nd step is described. The reaction is usually carried out in a solvent. Examples of the solvent to be used in the reaction include hydrocarbons, ethers, and mixtures of two or more of them.

Examples of the fluorinating agent to be used in the reaction include N-fluorobis(phenylsulfonyl)amine.

In the reaction, the fluorinating agent is usually used at a ratio of 1 to 10 mol, relative to 1 mol of the Compound (M-24).

The reaction temperature is usually within the range of −78 to 150° C. The reaction time is usually within the range of 0.1 to 24 hour(s).

When the reaction is completed, the reaction mixture may be subjected to adding water to the reaction mixture, extracting the resulting reaction mixture with organic solvent(s), and drying or concentrating the resulting organic layer to give the Compound (IA-a4).

The Compound (IA-a3) may be prepared according to the Production method B, the Production method C, or the Production method D.

Production Method R

The Compound (I-i) may be prepared by reacting a compound represented by formula (M-25) (hereinafter referred to as "Compound (M-25)") with a Compound represented by formula (R-10) (hereinafter referred to as "Compound (R-10)").

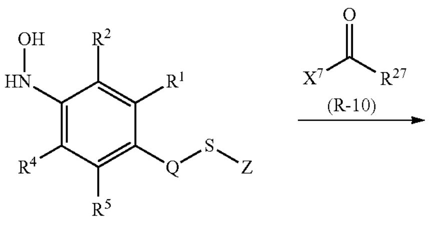

(M-25)

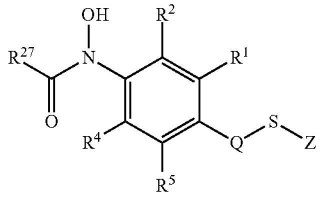

(I-i)

[wherein $X^7$ represents a chlorine atom, a bromine atom, or a —OC(O)$R^{27}$; and the other symbols are the same as defined above.]

The reaction may be carried out according to the Production method G by using the Compound (M-25) instead of the Compound (M-13), and using the Compound (R-10) instead of the Compound (R-5).

Production Method S

The Compound (I-o) may be prepared by reacting a compound represented by formula (M-26) (hereinafter referred to as "Compound (M-26)") with the Compound (R-10).

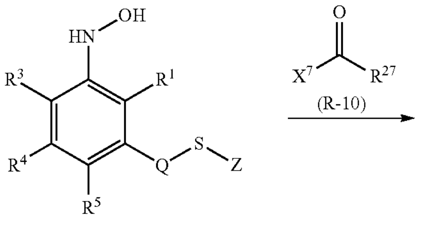

(M-26)

-continued

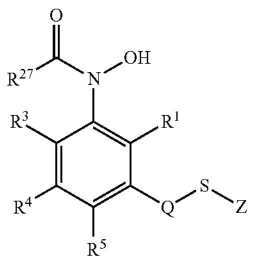

(I-o)

[wherein the symbols are the same as defined above.]

The reaction may be carried out according to the Production method G by using the Compound (M-26) instead of the Compound (M-13), and using the Compound (R-10) instead of the Compound (R-5).

Production Method T

An N-oxide of the compound represented by formula (I) can be prepared by reacting the compound represented by formula (I) with an oxidizing agent. The reaction can be carried out according to the method described in, for example, U.S. patent publication No. 2018/0009778 or WO 2016/121970 pamphlet.

Next, Production methods for the Intermediate compounds of the Present compounds and the Compounds of the present invention are described.

Reference Production Method A

The Compound (M-1) may be prepared by reacting a compound represented by formula (M-7) (hereinafter referred to as "Compound (M-7)") with an acid or a base.

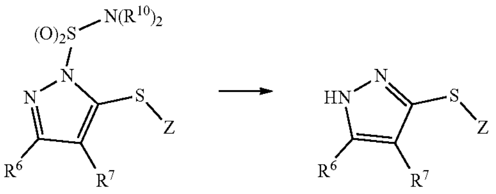

(M-7) (M-1)

[wherein $R^{10}$ represents a methyl group or an ethyl group; and the other symbols are the same as defined above.]

Examples of the acid to be used in the reaction include hydrochloric acid and trifluoroacetic acid.

Examples of the base to be used in the reaction include potassium hydroxide and sodium methoxide.

The reaction may be carried out according to the method described in J. Med. Chem., 2016, 59, 2760.

Reference Production Method B

The Compound (M-7) may be prepared by carrying out a step of reacting a compound represented by formula (M-8) (hereinafter referred to as "Compound (M-8)") with butyllithium or isopropylmagnesium chloride to give a compound represented by formula (M-9) (hereinafter referred to as "Compound (M-9)") (1st step), and a step of reacting the Compound (M-9) with a disulfide or a thiosulfonic acid ester to give the Compound (M-7) (2nd step).

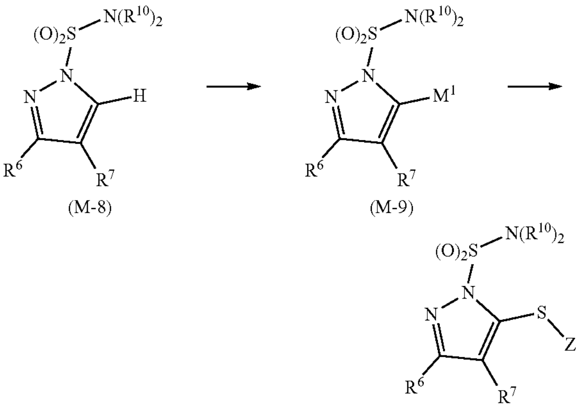

(M-8) (M-9) (M-7)

[wherein the symbols are the same as defined above.]

These reactions may be carried out according to the method described in WO 2008/129054 pamphlet.

The Compound (M-8) is a commercially available compound, or may be prepared according to the method described in J. Med. Chem., 2016, 59, 2760.

Reference Production Method C

A compound represented by formula (M-11) (hereinafter referred to as "Compound (M-11)") may be prepared by reacting a compound represented by formula (M-10) (hereinafter referred to as "Compound (M-10)") with a sulfating agent.

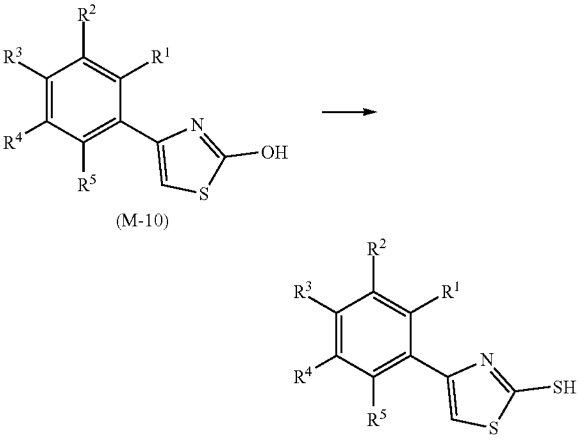

(M-10) (M-11)

[wherein the symbols are the same as defined above.]

The reaction is usually carried out in a solvent. Examples of the solvent to be used in the reaction include hydrocarbons, amides, nitriles, and mixtures of two or more of them.

Examples of the sulfating agent to be used in the reaction include phosphorus pentasulfide and Lawesson's reagent (2,4-bis(4-methoxyphenyl)-1,3,2,4-dithiadiphosphetane-2,4-disulfide).

In the reaction, the sulfating agent is usually used at a ratio of 0.5 to 10 mol, relative to 1 mol of the Compound (M-10).

The reaction temperature is usually within the range of 20 to 150° C. The reaction time is usually within the range of 0.1 to 50 hour(s).

When the reaction is completed, the reaction mixture may be subjected to adding water to the reaction mixture, extracting the resulting reaction mixture with organic solvent(s), and drying or concentrating the resulting organic layer to give the Compound (M-11).

Reference Production Method D

The Compound (M-10) may be prepared by reacting a compound represented by formula (M-12) (hereinafter referred to as "Compound (M-12)") with a compound represented by formula (R-4) (hereinafter referred to as "Compound (R-4)").

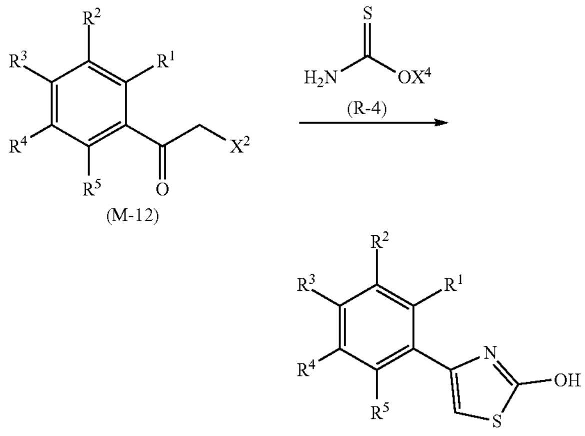

(M-12) (R-4) (M-10)

[wherein $X^4$ represents a C1-C5 chain hydrocarbon group or a C3-C6 cycloalkyl group; and the other symbols are the same as defined above.]

The reaction is usually carried out in a solvent. Examples of the solvent to be used in the reaction include hydrocarbons, ethers, halogenated hydrocarbons, amides, esters, sulfoxides, ketones, nitriles, alcohols, water, and mixtures of two or more of them.

In the reaction, the Compound (R-4) is usually used at a ratio of 1 to 10 mol, relative to 1 mol of the Compound (M-12).

The reaction temperature is usually within the range of 0 to 150° C. The reaction time is usually within the range of 0.1 to 24 hour(s).

When the reaction is completed, the reaction mixture may be subjected to adding water to the reaction mixture, extracting the resulting reaction mixture with organic solvent(s), and drying or concentrating the resulting organic layer to give the Compound (M-10).

The Compound (M-12) and the Compound (R-4) are commercially available compounds or may be prepared by using known method(s).

Reference Production Method E

The Compound (M-25) may be prepared by reacting a compound represented by formula (I-q) (hereinafter referred to as "Compound (I-q)") with zinc.

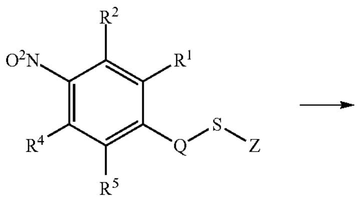

(I-q)

-continued

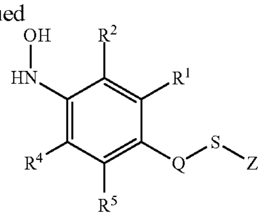

(M-25)

[wherein the symbols are the same as defined above.]

The reaction may be carried out according to the method described in, for example, Org. Lett. 2017, 19, 3059. or Angew. Chem. Int. Ed. 2014, 53, 14559.

The Compound (I-q) may be prepared according to the Production method B, the Production method C, or the Production method D.

Reference Production Method F

The Compound (M-26) may be prepared by reacting a compound represented by formula (I-r) (hereinafter referred to as "Compound (I-r)") with zinc.

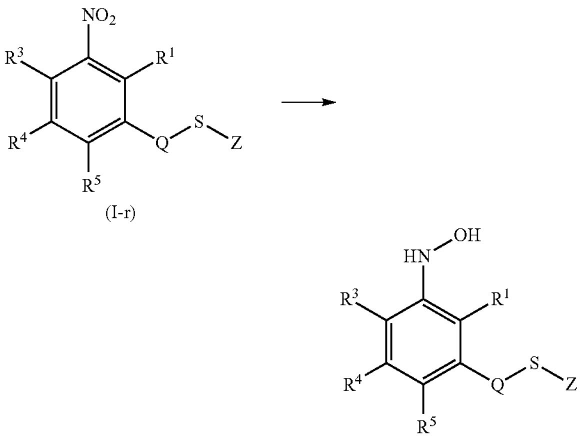

(I-r) (M-26)

[wherein the symbols are the same as defined above.]

The reaction may be carried out according to the method described in the Reference production method E using the Compound (I-r) instead of the Compound (I-q).

The Compound (I-r) may be prepared according to the Production method B, the Production method C, or the Production method D.

Reference Production Method G

The Compound (M-20) may be prepared by hydrolyzing a compound represented by formula (M-27) (hereinafter referred to as "Compound (M-27)").

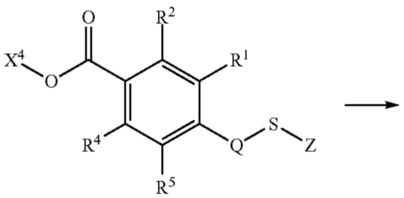

(M-27)

-continued

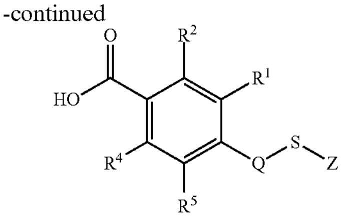

(M-20)

[wherein the symbols are the same as defined above.]

The reaction may be carried out according to the method described in J. Am. Chem. Soc. 2006, 128, 3536.

The Compound (M-27) may be prepared according to the Production method B, the Production method C, or the Production method D.

Reference Production Method H

The Compound (M-22) may be prepared by hydrolyzing a compound represented by formula (M-28) (hereinafter referred to as "Compound (M-28)").

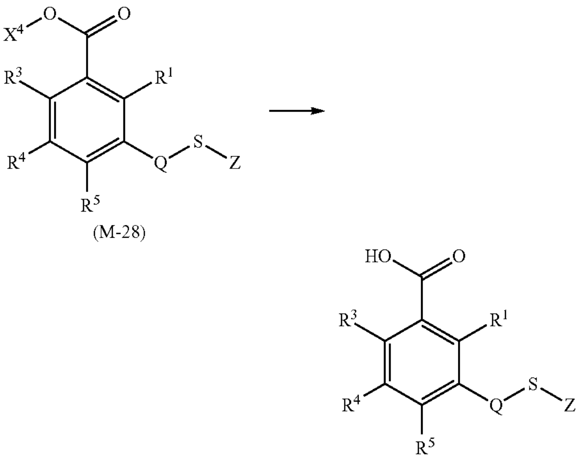

(M-28) (M-22)

[wherein the symbols are the same as defined above.]

The reaction may be carried out according to the method described in J. Am. Chem. Soc. 2006, 128, 3536.

The Compound (M-28) may be prepared according to the Production method B, the Production method C, or the Production method D.

The Present compound or the Compound of the present invention may be mixed with or used in combination with one or more ingredient(s) selected from the group consisting of the following Group (a), Group (b), Group (c), and Group (d) (hereinafter referred to as "Present ingredient").

When the Present compound or the Compound of the present invention is mixed with or used in combination with the Present ingredient, they are used simultaneously, separately, or at time intervals with each other.

When the Present compound or the Compound of the present invention is used simultaneously with the Present ingredient, the Present compound or the Compound of the present invention and the Present ingredient may be contained in separate formulations or contained in one formulation.

One aspect of the present invention provides a composition comprising one or more ingredient(s) selected from the group consisting of Group (a), Group (b), Group (c), and Group (d), and the Present compound or the Compound of the present invention (hereinafter referred to as "Composition A").

Group (a) is a group consisting of acetylcholinesterase inhibitors (for example, carbamate insecticides and organophosphate insecticides), GABA-gated chloride channel blockers (for example, phenylpyrazole insecticides), sodium channel modulators (for example, pyrethroid insecticides), nicotinic acetylcholine receptor competitive modulators (for example, neonicotinoid insecticides), nicotinic acetylcholine receptor allosteric modulators, glutamate-gated chloride channel allosteric modulators (for example, macrolide insecticides), juvenile hormone mimics, multisite inhibitors, chordotonal organ TRPV channel modulators, mite growth inhibitors, microbial disruptors of insect midgut membranes, inhibitors of mitochondrial ATP synthase, uncouplers of oxidative phosphorylation, nicotinic acetylcholine receptor channel blockers (for example, nereistoxin insecticides), inhibitors of chitin biosynthesis, moulting disruptors, ecdysone receptor agonists, octopamine receptor agonists, mitochondrial complexes I, II, III, and IV electron transport inhibitors, voltage-dependent sodium channel blockers, inhibitors of acetyl CoA carboxylase, ryanodine receptor modulators (for example, diamide insecticides), chordotonal organ modulators, and microbial insecticides, and other insecticidal active ingredients, miticidal active ingredients, and nematicidal active ingredients. These ingredients are described in the classification on the basis of action mechanism by IRAC.

Group (b) is a group consisting of nucleic acids synthesis inhibitors (for example, phenylamide fungicides and acylamino acid fungicides), cell division and cytoskeleton inhibitors (for example, MBC fungicides), respiration inhibitors (for example, QoI fungicides and QiI fungicides), amino acids synthesis and protein synthesis inhibitors (for example, anilino-pyrimidine fungicides), signal transduction inhibitors, lipid synthesis and membrane synthesis inhibitors, sterol biosynthesis inhibitors (for example, DMI fungicides such as triazole fungicides), cell wall biosynthesis inhibitors, melanin synthesis inhibitors, plant defense inducers, fungicides with multi-site contact activity, microbial fungicides, and other fungicidal active ingredients. These ingredients are described in the classification on the basis of action mechanism by FRAC.

Group (c) is a group of plant growth regulatory ingredients (including mycorrhizal fungi and root nodule bacteria).

Group (d) is a group of repellent ingredients.

Hereinafter, examples of the combination of the Present ingredient and the Present compound or the Compound of the present invention are described. For example, "alanycarb+SX" indicates a combination of alanycarb and SX.

The abbreviation of "SX" indicates any one of the Present compound or the Compound of the present invention selected from the Compound groups SX1 to SX42 described in Examples. Also, all of the following Present ingredient are known ingredients, and may be obtained from commercially available formulations, or may be prepared by known methods. When the Present ingredient is a microorganism, it may also be available from a bacterial authority depository. Further, the number in parentheses represents the CAS RN (registered trademark).

Combinations of the Present ingredient in the above Group (a) and the Present compound or the Compound of the present invention:

abamectin+SX, acephate+SX, acequinocyl+SX, acetamiprid+SX, acetoprole+SX, acrinathrin+SX, acynonapyr+SX, afidopyropen+SX, afoxolaner+SX, alanycarb+SX, aldicarb+SX, allethrin+SX, alpha-cypermethrin+SX, alpha-endosulfan+SX, aluminium phosphide+SX, amitraz+SX, azadirachtin+SX, azamethiphos+SX, azinphos-ethyl+SX, azinphos-methyl+SX, azocyclotin+SX, bark of *Celastrus angulatus*+SX, bendiocarb+SX, benfluthrin+SX, benfuracarb+SX, bensultap+SX, benzoximate+SX, benzpyrimoxan+SX, beta-cyfluthrin+SX, beta-cypermethrin+SX, bifenazate+SX, bifenthrin+SX, bioallethrin+SX, bioresmethrin+SX, bistrifluron+SX, borax+SX, boric acid+SX, broflanilide+SX, bromopropylate+SX, buprofezin+SX, butocarboxim+SX, butoxycarboxim+SX, cadusafos+SX, calcium phosphide+SX, carbaryl+SX, carbofuran+SX, carbosulfan+SX, cartap hydrochloride+SX, cartap+SX, chinomethionat+SX, chlorantraniliprole+SX, chlordane+SX, chlorethoxyfos+SX, chlorfenapyr+SX, chlorfenvinphos+SX, chlorfluazuron+SX, chlormephos+SX, chloropicrin+SX, chlorpyrifos+SX, chlorpyrifos-methyl+SX, chromafenozide+SX, clofentezine+SX, clothianidin+SX, concanamycin A+SX, coumaphos+SX, cryolite+SX, cyanophos+SX, cyantraniliprole+SX, cyclaniliprole+SX, cyclobutrifluram+SX, cycloprothrin+SX, cycloxaprid+SX, cyenopyrafen+SX, cyetpyrafen+SX, cyflumetofen+SX, cyfluthrin+SX, cyhalodiamide+SX, cyhalothrin+SX, cyhexatin+SX, cypermethrin+SX, cyphenothrin+SX, cyproflanilide+SX, cyromazine+SX, dazomet+SX, deltamethrin+SX, demeton-S-methyl+SX, diafenthiuron+SX, diazinon+SX, dichlorvos+SX, dicloromezotiaz+SX, dicofol+SX, dicrotophos+SX, diflovidazin+SX, diflubenzuron+SX, dimefluthrin+SX, dimethoate+SX, dimethylvinphos+SX, dimpropyridaz+SX, dinotefuran+SX, disodium octaborate+SX, disulfoton+SX, DNOC (2-methyl-4,6-dinitrophenol)+SX, doramectin+SX, dried leaves of *Dryopteris filix-mas*+SX, emamectin-benzoate+SX, empenthrin+SX, endosulfan+SX, EPN (O-ethyl O-(4-nitrophenyl) phenylphosphonothioate)+SX, epsilon-metofluthrin+SX, epsilon-momfluorothrin+SX, esfenvalerate+SX, ethiofencarb+SX, ethion+SX, ethiprole+SX, ethoprophos+SX, etofenprox+SX, etoxazole+SX, extract of *Artemisia absinthium*+SX, extract of *Azadirachta indica*+SX, extract of *Cassia nigricans*+SX, extract of *Clitoria ternatea*+SX, extract of *Symphytum officinale*+SX, extracts or simulated blend of *Chenopodium ambrosioides*+SX, extract of *Tanacetum vulgare*+SX, extract of *Urtica dioica*+SX, extract of *Viscum album*+SX, famphur+SX, fenamiphos+SX, fenazaquin+SX, fenbutatin oxide+SX, fenitrothion+SX, fenobucarb+SX, fenoxycarb+SX, fenpropathrin+SX, fenpyroximate+SX, fenthion+SX, fenvalerate+SX, fipronil+SX, flometoquin+SX, flonicamid+SX, fluacrypyrim+SX, fluazaindolizine+SX, fluazuron+SX, flubendiamide+SX, flucycloxuron+SX, flucythrinate+SX, fluensulfone+SX, flufenoprox+SX, flufenoxuron+SX, flufiprole+SX, flumethrin+SX, flupentiofenox+SX, flupyradifurone+SX, flupyrimin+SX, fluralaner+SX, fluvalinate+SX, fluxametamide+SX, formetanate+SX, fosthiazate+SX, furamethrin+SX, furathiocarb+SX, gamma-cyhalothrin+SX, GS-omega/kappa HXTX-Hv1a peptide+SX, halfenprox+SX, halofenozide+SX, heptafluthrin+SX, heptenophos+SX, hexaflumuron+SX, hexythiazox+SX, potassium salt of hop beta acid+SX, hydramethylnon+SX, hydroprene+SX, imicyafos+SX, imidacloprid+SX, imidaclothiz+SX, imiprothrin+SX, indoxacarb+SX, isocycloseram+SX, isofenphos+SX, isoprocarb+SX, isopropyl-O-(methoxyaminothiophosphoryl) salicylate+SX, isoxathion+SX, ivermectin+SX, kadethrin+SX, kappa-tefluthrin+SX, kappa-bifenthrin+SX, kinoprene+SX, lambda-cyhalothrin+SX, lenoremycin+SX, lepimectin+SX, lime sulfur+SX, lotilaner+SX, lufenuron+SX, machine oil+SX, malathion+SX, mecarbam+SX, meperfluthrin+SX, metaflumizone+SX, metam+SX, methamidophos+SX, methidathion+SX, methiocarb+SX, methomyl+SX, methoprene+SX, methoxychlor+SX, methoxyfenozide+SX, methyl bromide+SX, metofluthrin+SX, metolcarb+SX, metoxadiazone+SX, mevinphos+SX, milbemectin+SX, milbemycin oxime+SX, momfluorothrin+SX, monocrotophos+SX, moxidectin+SX, naled+SX, nicofluprole+SX, nicotine+SX, nicotine-sulfate+SX, nitenpyram+SX, novaluron+SX, noviflumuron+SX, oil of the seeds of *Chenopodium anthelminticum*+SX, omethoate+SX, oxamyl+SX, oxazosulfyl+SX, oxydemeton-methyl+SX, parathion+SX, parathion-methyl+SX, permethrin+SX, phenothrin+SX, phenthoate+SX, phorate+SX, phosalone+SX, phosmet+SX, phosphamidon+SX, phosphine+SX, phoxim+SX, pirimicarb+SX, pirimiphos-methyl+SX, prallethrin+SX, profenofos+SX, profluthrin+SX, propargite+SX, propetamphos+SX, propoxur+SX, propylene glycol alginate+SX, prothiofos+SX, pyflubumide+SX, pymetrozine+SX, pyraclofos+SX, pyrethrins+SX, pyridaben+SX, pyridalyl+SX, pyridaphenthion+SX, pyrifluquinazone+SX, pyrimidifen+SX, pyriminostrobin+SX, pyriprole+SX, pyriproxyfen+SX, quinalphos+SX, resmethrin+SX, rotenone+SX, ryanodine+SX, sarolaner+SX, selamectin+SX, sigma-cypermethrin+SX, silafluofen+SX, sodium borate+SX, sodium metaborate+SX, spinetoram+SX, spinosad+SX, spirodiclofen+SX, spiromesifen+SX, spiropidion+SX, spirotetramat+SX, sulfluramid+SX, sulfotep+SX, sulfoxaflor+SX, sulfur+SX, sulfuryl fluoride+SX, tartar emetic+SX, tau-fluvalinate+SX, tebufenozide+SX, tebufenpyrad+SX, tebupirimfos+SX, teflubenzuron+SX, tefluthrin+SX, temephos+SX, terbufos+SX, terpene constituents of the extract of *Chenopodium ambrosioides* near *ambrosioides*+SX, tetrachlorantraniliprole+SX, tetrachlorvinphos+SX, tetradifon+SX, tetramethrin+SX, tetramethylfluthrin+SX, tetraniliprole+SX, theta-cypermethrin+SX, thiacloprid+SX, thiamethoxam+SX, thiocyclam+SX, thiodicarb+SX, thiofanox+SX, thiometon+SX, thiosultap-disodium+SX, thiosultap-monosodium+SX, tioxazafen+SX, tolfenpyrad+SX, tralomethrin+SX, transfluthrin+SX, triazamate+SX, triazophos+SX, trichlorfon+SX, triflumezopyrim+SX, triflumuron+SX, trimethacarb+SX, tyclopyrazoflor+SX, vamidothion+SX, wood extract of *Quassia amara*+SX, XMC (3,5-dimethylphenyl N-methylcarbamate)+SX, xylylcarb+SX, zeta-cypermethrin+SX, zinc phosphide+SX, 4-[5-(3,5-dichlorophenyl)-5-(trifluoromethyl)-4,5-dihydro-1,2-oxazol-3-yl]-2-methyl-N-(1-oxothietan-3-yl)benzamide (1241050-20-3)+SX, 3-methoxy-N-(5-{5-(trifluoromethyl)-5-[3-(trifluoromethyl)phenyl]-4,5-dihydro-1,2-oxazol-3-yl}indan-1-yl)propanamide (1118626-57-5)+SX, 2-({2-fluoro-4-methyl-5-[(2,2,2-trifluoroethyl)sulfinyl]phenyl}imino)-3-(2,2,2-trifluoroethyl)-1,3-thiazolidin-4-one (1445683-71-5)+SX, (2Z)-2-({2-fluoro-4-methyl-5-[(R)-(2,2,2-trifluoroethyl)sulfinyl]phenyl}imino)-3-(2,2,2-trifluoroethyl)-1,3-thiazolidin-4-one (2377084-09-6)+SX, (3R)-3-(2-chlorothiazol-5-yl)-8-methyl-7-oxo-6-phenyl-2,3-dihydrothiazolo[3,2-a]pyrimidin-4-ium-5-olate (2249718-27-0)+SX, N-{4-chloro-3-[(1-cyanocyclopropyl)carbamoyl]phenyl}-1-methyl-4-(methanesulfonyl)-3-(1,1,2,2,2-pentafluoroethyl)-1H-pyrazole-3-carboxamide (1400768-21-9)+SX, 11-(4-chloro-2,6-dimethylphenyl)-12-hydroxy-1,4-dioxa-9-azadispiro[4.2.4.2]tetradec-11-en-10-one (907187-07-9)+SX, 3-(4'-fluoro-2,4-dimethyl[1,1'-biphenyl]-3-yl)-4-hydroxy-8-oxa-1-azaspiro[4.5]dec-3-en-2-one (1031385-91-7)+SX, N-[3-chloro-1-(pyridin-3-yl)-1H-pyrazol-4-yl]-2-(methanesulfonyl)propanamide (2396747-83-2)+SX, 1,4-dimethyl-2-[2-(pyridin-3-yl)-2H-indazol-5-yl]-1,2,4-triazolidine-3,5-dione (2171099-09-3)+SX, 2-isopropyl-5-[(3,4,4-trifluoro-3-buten-1-yl)sulfonyl]-1,3,4-thiadiazole (2058052-95-0)+SX, N-({2-fluoro-4-[(2S,3S)-2-hydroxy-3-(3,4,5-trichlorophenyl)-3-(trifluoromethyl)pyrrolidin-1-yl]phenyl}methyl) cyclopropanecarboxamide+SX, BT crop protein Cry1Ab+SX, BT crop protein Cry1Ac+SX, BT crop protein Cry1Fa+SX, BT crop protein Cry1A.105+SX, BT crop protein Cry2Ab+SX, BT crop protein Vip3A+SX, BT crop protein Cry3A+SX, BT crop protein Cry3Ab+SX, BT crop protein Cry3Bb+SX, BT crop protein Cry34Ab1/Cry35Ab1+SX, *Adoxophyes orana* granulosis virus strain BV-0001+SX, *Anticarsia gemmatalis* mNPV+SX, *Autographa californica* mNPV+SX, *Cydia pomonella* GV strain V15+SX, *Cydia pomonella* GV strain V22+SX, *Cryptophlebia leucotreta* GV+SX, *Dendrolimus punctatus* cypovirus+SX, *Helicoverpa armigera* NPV strain BV-0003+SX, *Helicoverpa zea* NPV+SX, *Lymantria dispar* NPV+SX, *Mamestra brassicae* NPV+SX, *Mamestra configurata* NPV+SX, *Neodiprion abietis* NPV+SX, *Neodiprion lecontei* NPV+SX, *Neodiprion sertifer* NPV+SX, *Nosema locustae*+SX, *Orgyia pseudotsugata* NPV+SX, *Pieris rapae* GV+SX, *Plodia interpunctella* GV+SX, *Spodoptera exigua* mNPV+SX, *Spodoptera littoralis* mNPV+SX, *Spodoptera litura* NPV+SX, *Arthrobotrys dactyloides*+SX, *Bacillus firmus* strain GB-126+SX, *Bacillus firmus* strain 1-1582+SX, *Bacillus megaterium*+SX, *Bacillus* sp. strain AQ175+SX, *Bacillus* sp. strain AQ177+SX, *Bacillus* sp. strain AQ178+SX, *Bacillus sphaericus* strain 2362+SX, *Bacillus sphaericus* strain ABTS1743+SX, *Bacillus sphaericus* Serotype strain H5a5b+SX, *Bacillus thuringiensis* strain AQ52+SX, *Bacillus thuringiensis* strain BD #32+SX, *Bacillus thuringiensis* strain CR-371+SX, *Bacillus thuringiensis* subsp. *Aizawai* strain ABTS-1857+SX, *Bacillus thuringiensis* subsp. *Aizawai* strain AM65-52+SX, *Bacillus thuringiensis* subsp. *Aizawai* strain GC-91+SX, *Bacillus thuringiensis* subsp. *Aizawai* Serotype strain H-7+SX, *Bacillus thuringiensis* subsp. *Kurstaki* strain ABTS351+SX, *Bacillus thuringiensis* subsp. *Kurstaki* strain BMP123+SX, *Bacillus thuringiensis* subsp. *Kurstaki* strain EG234+SX, *Bacillus thuringiensis* subsp. *Kurstaki* strain EG7841+SX, *Bacillus thuringiensis* subsp. *Kurstaki* strain EVB113-19+SX, *Bacillus thuringiensis* subsp. *Kurstaki* strain F810+SX, *Bacillus thuringiensis* subsp. *Kurstaki* strain HD-1+SX, *Bacillus thuringiensis* subsp. *Kurstaki* strain PB54+SX, *Bacillus thuringiensis* subsp. *Kurstaki* strain SA-11+SX, *Bacillus thuringiensis* subsp. *Kurstaki* strain SA-12+SX, *Bacillus thuringiensis* subsp. *Tenebriosis* strain NB176+SX, *Bacillus thuringiensis* subsp. *Thuringiensis* strain MPPL002+SX, *Bacillus thuringiensis* subsp. *morrisoni*+SX, *Bacillus thuringiensis* var. *colmeri*+SX, *Bacillus thuringiensis* var. *darmstadiensis* strain 24-91+SX, *Bacillus thuringiensis* var. *dendrolimus*+SX, *Bacillus thuringiensis* var. *galleriae*+SX, *Bacillus thuringiensis* var. *israelensis* strain BMP144+SX, *Bacillus thuringiensis* var. *israelensis* serotype strain H-14+SX, *Bacillus thuringiensis* var. *japonensis* strain buibui+SX, *Bacillus thuringiensis* var. *san diego* strain M-7+SX, *Bacillus thuringiensis* var. 7216+SX, *Bacillus thuringiensis* var. *aegypti*+SX, *Bacillus thuringiensis* var. T36+SX, *Beauveria bassiana* strain ANT-03+SX, *Beauveria bassiana* strain ATCC74040+SX, *Beauveria bassiana* strain GHA+SX, *Beauveria brongniartii*+SX, *Burkholderia rinojensis* strain A396+SX, *Chromobacterium subtsugae* strain PRAA4-1T+SX, *Dactyllela ellipsospora*+SX, *Dectylaria thaumasia*+SX, *Hirsutella minnesotensis*+SX, *Hirsutella rhossiliensis*+SX, *Hirsutella thompsonii*+SX, *Lagenidium giganteum*+SX, *Lecanicillium lecanii* strain KV01+SX, *Lecanicillium lecanii* conidia of strain DAOM198499+SX, *Lecanicillium lecanii* conidia of strain DAOM216596+SX, *Lecanicillium muscarium* strain Ve6+SX, *Metarhizium anisopliae* strain F52+SX, *Metarhizium anisopliae* var. *acridum*+SX, *Metarhizium anisopliae* var. *anisopliae* BIPESCO 5/F52+SX, *Metarhizium flavoviride*+SX, *Monacrosporium phymatopagum*+SX, *Paecilomyces fumosoroseus* Apopka strain 97+SX, *Paecilomyces lilacinus* strain 251+SX, *Paecilomyces tenuipes* strain T1+SX, *Paenibacillus popilliae*+SX, *Pasteuria nishizawae* strain Pn1+SX, *Pasteuria penetrans*+SX, *Pasteuria usgae*+SX, *Pasteuria thoynei*+SX, *Serratia entomophila*+SX, *Verticillium chlamydosporium*+SX, *Verticillium lecani* strain NCIM1312+SX.

Combinations of the Present ingredient in the above Group (b) and the Present compound or the Compound of the present invention:

acibenzolar-S-methyl+SX, aldimorph+SX, ametoctradin+SX, aminopyrifen+SX, amisulbrom+SX, anilazine+SX, azaconazole+SX, azoxystrobin+SX, basic copper sulfate+SX, benalaxyl+SX, benalaxyl-M+SX, benodanil+SX, benomyl+SX, benthiavalicarb+SX, benthiavalicarb-isopropyl+SX, benzovindiflupyr+SX, binapacryl+SX, biphenyl+SX, bitertanol+SX, bixafen+SX, blasticidin-S+SX, Bordeaux mixture+SX, boscalid+SX, bromothalonil+SX, bromuconazole+SX, bupirimate+SX, captafol+SX, captan+SX, carbendazim+SX, carboxin+SX, carpropamid+SX, chinomethionat+SX, chitin+SX, chloroinconazide+SX, chloroneb+SX, chlorothalonil+SX, chlozolinate+SX, colletochlorin B+SX, copper(II) acetate+SX, copper(II) hydroxide+SX, copper oxychloride+SX, copper(II) sulfate+SX, coumoxystrobin+SX, cyazofamid+SX, cyflufenamid+SX, cymoxanil+SX, cyproconazole+SX, cyprodinil+SX, dichlobentiazox+SX, dichlofluanid+SX, diclocymet+SX, diclomezine+SX, dicloran+SX, diethofencarb+SX, difenoconazole+SX, diflumetorim+SX, dimethachlone+SX, dimethirimol+SX, dimethomorph+SX, dimoxystrobin+SX, diniconazole+SX, diniconazole-M+SX, dinocap+SX, dipotassium hydrogenphosphite+SX, dipymetitrone+SX, dithianon+SX, dodecylbenzenesulphonic acid bisethylenediamine copper(II) salt+SX, dodemorph+SX, dodine+SX, edifenphos+SX, enoxastrobin+SX, epoxiconazole+SX, etaconazole+SX, ethaboxam+SX, ethirimol+SX, etridiazole+SX, extract of *Melaleuca alternifolia*+SX, extract of *Reynoutria sachalinensis*+SX, extract of the cotyledons of lupine plantlets ("BLAD")+SX, extract of *Allium sativum*+SX, extract of *Equisetum arvense*+SX, extract of *Tropaeolum majus*+SX, famoxadone+SX, fenamidone+SX, fenaminstrobin+SX, fenarimol+SX, fenbuconazole+SX, fenfuram+SX, fenhexamid+SX, fenoxanil+SX, fenpiclonil+SX, fenpicoxamid+SX, fenpropidin+SX, fenpropimorph+SX, fenpyrazamine+SX, fentin acetate+SX, fentin chloride+SX, fentin hydroxide+SX, ferbam+SX, ferimzone+SX, florylpicoxamid+SX, fluazinam+SX, flubeneteram+SX, fludioxonil+SX, flufenoxystrobin+SX, fluindapyr+SX, flumorph+SX, fluopicolide+SX, fluopyram+SX, fluopimomide+SX, fluoroimide+SX, fluoxapiprolin+SX, fluoxastrobin+SX, fluquinconazole+SX, flusilazole+SX, flusulfamide+SX, flutianil+SX, flutolanil+SX, flutriafol+SX, fluxapyroxad+SX, folpet+SX, fosetyl+SX, fosetyl-aluminium+SX, fuberidazole+SX, furalaxyl+SX, furametpyr+SX, guazatine+SX, hexaconazole+SX, hymexazole+SX, imazalil+SX, imibenconazole+SX, iminoctadine+SX, iminoctadine triacetate+SX, inpyrfluxam+SX, iodocarb+SX, ipconazole+SX, ipfentrifluconazole+SX, ipflufenoquin+SX, iprobenfos+SX, iprodione+SX, iprovalicarb+SX, isofetamid+SX, isoflucypram+SX, isoprothiolane+SX, isopyrazam+SX, isotianil+SX, kasugamycin+SX, kresoxim-methyl+SX, laminarin+SX, leaves and bark of *Quercus*+SX, mancozeb+SX, mandestrobin+SX, mandipropamid+SX, maneb+SX, mefentrifluconazole+SX, mepanipyrim+SX, mepronil+SX, meptyldinocap+SX, metalaxyl+SX, metalaxyl-M+SX, metconazole+SX, methasulfocarb+SX, metiram+SX, metominostrobin+SX, metrafenone+SX, metyltetraprole+SX, myclobutanil+SX, naftifine+SX, nuarimol+SX, octhilinone+SX, ofurace+SX, orysastrobin+SX, oxadixyl+SX, oxathiapiprolin+SX, oxine-copper+SX, oxolinic acid+SX, oxpoconazole+SX, oxpoconazole fumarate+SX, oxycarboxin+SX, oxytetracycline+SX, pefurazoate+SX, penconazole+SX, pencycuron+SX, penflufen+SX, penthiopyrad+SX, phenamacril+SX, phosphorous acid+SX, phthalide+SX, picarbutrazox+SX, picoxystrobin+SX, piperalin+SX, polyoxins+SX, potassium hydrogencarbonate+SX, potassium dihydrogenphosphite+SX, probenazole+SX, prochloraz+SX, procymidone+SX, propamidine+SX, propamocarb+SX, propiconazole+SX, propineb+SX, proquinazid+SX, prothiocarb+SX, prothioconazole+SX, pydiflumetofen+SX, pyraclostrobin+SX, pyrametostrobin+SX, pyraoxystrobin+SX, pyrapropoyne+SX, pyraziflumid+SX, pyrazophos+SX, pyribencarb+SX, pyributicarb+SX, pyridachlometyl+SX, pyrifenox+SX, pyrimethanil+SX, pyrimorph+SX, pyriofenone+SX, pyrisoxazole+SX, pyroquilon+SX, Quillaja extract+SX, quinconazole+SX, quinofumelin+SX, quinoxyfen+SX, quintozene+SX, Saponins of *Chenopodium quinoa*+SX, sedaxane+SX, silthiofam+SX, simeconazole+SX, sodium hydrogencarbonate+SX, spiroxamine+SX, streptomycin+SX, sulfur+SX, tebuconazole+SX, tebufloquin+SX, teclofthalam+SX, tecnazene+SX, terbinafine+SX, tetraconazole+SX, thiabendazole+SX, thifluzamide+SX, thiophanate+SX, thiophanate-methyl+SX, thiram+SX, thymol+SX, tiadinil+SX, tolclofos-methyl+SX, tolfenpyrad+SX, tolprocarb+SX, tolylfluanid+SX, triadimefon+SX, triadimenol+SX, triazoxide+SX, triclopyricarb+SX, tricyclazole+SX, tridemorph+SX, trifloxystrobin+SX, triflumizole+SX, triforine+SX, triticonazole+SX, validamycin+SX, valifenalate+SX, vinclozolin+SX, yellow mustard powder+SX, zinc thiazole+SX, zineb+SX, ziram+SX, zoxamide+SX, N'-[4-({3-[(4-chlorophenyl)methyl]-1,2,4-thiadiazol-5-yl}oxy)-2,5-dimethylphenyl]-N-ethyl-N-methylmethanimidamide (1202781-91-6)+SX, N'-{4-[(4,5-dichlorothiazol-2-yl)oxy]-2,5-dimethylphenyl}-N-ethyl-N-methylmethanimidamide (929908-57-6)+SX, N'-(2,5-dimethyl-4-phenoxyphenyl)-N-ethyl-N-methylmethanimidamide (1052688-31-9)+SX, N'-[5-chloro-4-(2-fluorophenoxy)-2-methylphenyl)-N-ethyl-N-methylmethanimidamide (2055589-28-9)+SX, N'-[2-chloro-4-(2-fluorophenoxy)-5-methylphenyl)-N-ethyl-N-methylmethanimidamide (2055756-21-1)+SX, N'-(2-chloro-4-phenoxy-5-methylphenyl)-N-ethyl-N-methylmethanimidamide (2062599-39-5)+SX, N'-[4-(1-hydroxy-1-phenyl-2,2,2-trifluoroethyl)-2-methyl-5-methoxyphenyl)-N-isopropyl-N-methylmethanimidamide (2101814-55-3)+SX, N'-[5-bromo-6-(1-methyl-2-propoxyethoxy)-2-methylpyridin-3-yl)-N-ethyl-N-methylmethanimidamide (1817828-69-5)+SX, 4-(2-bromo-4-fluorophenyl)-N-(2-chloro-6-fluorophenyl)-1,3-dimethyl-1H-pyrazol-5-amine (1362477-26-6)+SX, 2-[6-(3-fluoro-4-methoxyphenyl)-5-methylpyridin-2-yl]quinazoline (1257056-97-5)+SX, 5-fluoro-4-imino-3-methyl-1-tosyl-3,4-dihydropyrimidin-2 (1H)-one (1616664-98-2)+SX, ethyl (2Z)-3-amino-2-cyano-3-phenylacrylate (39491-78-6)+SX, N-[(2-chlorothiazol-5-yl)methyl]-N-ethyl-6-methoxy-3-nitropyridin-2-amine (1446247-98-8)+SX, 5-(4-chlorobenzyl)-2-(chloromethyl)-2-methyl-1-(1H-1,2,4-triazol-1-ylmethyl)cyclopentan-1-ol (1394057-11-4)+SX, (1R, 2S, 5S)-5-(4-chlorobenzyl)-2-(chloromethyl)-2-methyl-1-(1H-1,2,4-triazol-1-ylmethyl)cyclopentan-1-ol (1801930-06-2)+SX, (1S, 2R, 5R)-5-(4-chlorobenzyl)-2-(chloromethyl)-2-methyl-1-(1H-1,2,4-triazol-1-ylmethyl)cyclopentan-1-ol (1801930-07-3)+SX, 2-(chloromethyl)-5-(4-fluorobenzyl)-2-methyl-1-(1H-1,2,4-triazol-1-ylmethyl)cyclopentan-1-ol (1394057-13-6)+SX, (1R, 2S, 5S)-2-(chloromethyl)-5-(4-fluorobenzyl)-2-methyl-1-(1H-1,2,4-triazol-1-ylmethyl)cyclopentan-1-ol (1801930-08-4)+SX, (1S, 2R, 5R)-2-(chloromethyl)-5-(4-fluorobenzyl)-2-methyl-1-(1H-1,2,4-triazol-1-ylmethyl)cyclopentan-1-ol (1801930-09-5)+SX, methyl 3-[(4-chlorophenyl)methyl]-2-hydroxy-1-methyl-2-(1H-1,2,4-triazol-1-ylmethyl)cyclopentan-1-carboxylate (1791398-02-1)+SX, 1-(2,4-difluorophenyl)-2-(1H-1,2,4-triazol-1-yl)-1-[1-(4-bromo-2,6-difluorophenoxy)cyclopropyl]ethanol (2019215-86-0)+SX, 1-(2,4-difluorophenyl)-2-(1H-1,2,4-triazol-1-yl)-1-[1-(4-chloro-2,6-difluorophenoxy)cyclopropyl]ethanol (2019215-84-8)+SX, 1-[2-(1-chlorocyclopropyl)-3-(2-fluorophenyl)-2-hydroxypropyl]-1H-imidazole-5-carbonitrile (2018316-13-5)+SX, 1-[2-(1-chlorocyclopropyl)-3-(2,3-difluorophenyl)-2-hydroxypropyl]-1H-imidazole-5-carbonitrile (2018317-25-2)+SX, 4-({6-[2-(2,4-difluorophenyl)-1,1-difluoro-2-hydroxy-3-(1H-1,2,4-triazol-1-yl)propyl]pyridin-3-yl}oxy) benzonitrile (2046300-61-0)+SX, 2-[6-(4-bromophenoxy)-2-(trifluoromethyl)pyridin-3-yl]-1-(1H-1,2,4-triazol-1-yl) propan-2-ol (2082661-43-4)+SX, 2-[6-(4-chlorophenoxy)-2-(trifluoromethyl)pyridin-3-yl]-1-(1H-1,2,4-triazol-1-yl) propan-2-ol (2082660-27-1)+SX, methyl ({2-methyl-5-[1-(4-methoxy-2-methylphenyl)-1H-pyrazol-3-yl] phenyl}methyl)carbamate (1605879-98-8)+SX, 2-(difluoromethyl)-N-[1,1,3-trimethyl-2,3-dihydro-1H-inden-4-yl]pyridine-3-carboxamide (1616239-21-4)+SX, 2-(difluoromethyl)-N-[3-ethyl-1,1-dimethyl-2,3-dihydro-1H-inden-4-yl]pyridine-3-carboxamide (1847460-02-9)+SX, 2-(difluoromethyl)-N-[3-propyl-1,1-dimethyl-2,3-dihydro-1H-inden-4-yl]pyridine-3-carboxamide (1847460-05-2)+SX, (2E,3Z)-5-{[1-(4-chlorophenyl)-1H-pyrazol-3-yl]oxy}-2-(methoxyimino)-N, 3-dimethylpent-3-enamide (1445331-27-0)+SX, (2E,3Z)-5-{[1-(2,4-dichlorophenyl)-1H-pyrazol-3-yl]oxy}-2-(methoxyimino)-N, 3-dimethylpent-3-enamide (1445331-54-3)+SX, 5-chloro-4-({2-[6-(4-chlorophenoxy)pyridin-3-yl]ethyl}amino)-6-methylpyrimidine (1605340-92-8)+SX, N-(1-benzyl-1,3-dimethylbutyl)-8-fluoroquinoline-3-carboxamide (2132414-04-9)+SX, N-(1-benzyl-3,3,3-trifluoro-1-methylpropyl)-8-fluoroquinoline-3-carboxamide (2132414-00-5)+SX, 4,4-dimethyl-2-({4-[5-(trifluoromethyl)-1,2,4-oxadiazol-3-yl] phenyl}methyl)isoxazolidin-3-one (2098918-25-1)+SX, 5,5-dimethyl-2-({4-[5-(trifluoromethyl)-1,2,4-oxadiazol-3-yl]phenyl}methyl)isoxazolidin-3-one (2098918-26-2)+SX, N-ethyl-2-methyl-N-({4-[5-(trifluoromethyl)-1,2,4-oxadiazol-3-yl]phenyl}methyl)propanamide+SX, N, 2-dimethoxy-N-({4-[5-(trifluoromethyl)-1,2,4-oxadiazol-3-yl] phenyl}methyl)propanamide+SX, N-methoxy-N-({4-[5-(trifluoromethyl)-1,2,4-oxadiazol-3-yl]phenyl}methyl) cyclopropanecarboxamide+SX, N-methoxy-N'-methyl-N-({4-[5-(trifluoromethyl)-1,2,4-oxadiazol-3-yl] phenyl}methyl)urea+SX, N'-ethyl-N-methoxy-N-({4-[5-(trifluoromethyl)-1,2,4-oxadiazol-3-yl]phenyl}methyl) urea+SX, N,N'-dimethoxy-N-({4-[5-(trifluoromethyl)-1,2,4-oxadiazol-3-yl]phenyl}methyl)urea+SX, N-(2-fluorophenyl)-4-[5-(trifluoromethyl)-1,2,4-oxadiazol-3-yl] benzamide+SX, N-[2-(difluoromethoxy)phenyl]-4-[5-(trifluoromethyl)-1,2,4-oxadiazol-3-yl]benzamide+SX, N-[2-(difluoromethoxy)-4-fluorophenyl]-4-[5-(trifluoromethyl)-1,2,4-oxadiazol-3-yl]benzamide+SX, N-acetyl-2-(ethanesulfonyl)-N-[2-(methoxycarbonyl)-4-(trifluoromethoxy)phenyl]-4-(trifluoromethyl)benzamide (2043675-28-9)+SX, (2S,3S)-3-(2-methylphenyl)butan-2-yl N-[(3-acetoxy-4-methoxypyridin-2-yl)carbonyl]-L-alaninate (2376210-00-1)+SX, (2S,3S)-3-(4-fluoro-2-methylphenyl)butan-2-yl N-[(3-acetoxy-4-methoxypyridin-2-yl)carbonyl]-L-alaninate+SX, (2S,3S)-3-(4-methoxy-2-methylphenyl)butan-2-yl N-[(3-acetoxy-4-methoxypyridin-2-yl)carbonyl]-L-alaninate+SX, (2S,3S)-3-(2,4-dimethylphenyl)butan-2-yl N-[(3-acetoxy-4-methoxypyridin-2-yl)carbonyl]-L-alaninate (2376209-13-9)+SX, (2S,3S)-3-(2-methylphenyl)butan-2-yl N-({3-[(2-methylpropanoyl)oxy]-4-methoxypyridin-2-yl}carbonyl)-L-alaninate (2376210-02-3)+SX, (2S,3S)-3-(4-fluoro-2-methylphenyl)butan-2-yl N-({3-[(2-methylpropanoyl)oxy]-4-methoxypyridin-2-yl}carbonyl)-L-alaninate+SX, (2S,3S)-3-(4-methoxy-2-methylphenyl)butan-2-yl N-({3-[(2-methylpropanoyl)oxy]-4-methoxypyridin-2-yl}carbonyl)-L-alaninate (2376209-40-2)+SX, (2S,3S)-3-(2,4-dimethylphenyl)butan-2-yl N-({3-[(2-methylpropanoyl) oxy]-4-methoxypyridin-2-yl}carbonyl)-L-alaninate (2376209-15-1)+SX, (2S,3S)-3-(2-methylphenyl)butan-2-yl N-[(3-hydroxy-4-methoxypyridin-2-yl)carbonyl]-L-alaninate+SX, (2S,3S)-3-(4-fluoro-2-methylphenyl)butan-2-yl N-[(3-hydroxy-4-methoxypyridin-2-yl)carbonyl]-L-alaninate+SX, (2S,3S)-3-(4-methoxy-2-methylphenyl)butan-2-yl N-[(3-hydroxy-4-methoxypyridin-2-yl)carbonyl]-L-alaninate+SX, (2S,3S)-3-(2,4-dimethylphenyl)butan-2-yl N-[(3-hydroxy-4-methoxypyridin-2-yl)carbonyl]-L-alaninate+SX, (2S,3S)-3-(4-fluoro-2-methylphenyl)-4-methylpentan-2-yl N-[(3-acetoxy-4-methoxypyridin-2-yl)carbonyl]-L-alaninate+SX, (2S,3S)-3-(2-fluoro-4-methylphenyl)-4-methylpentan-2-yl N-[(3-acetoxy-4-methoxypyridin-2-yl)carbonyl]-L-alaninate+SX, (2S,3S)-3-(2,4-difluorophenyl)-4-methylpentan-2-yl N-[(3-acetoxy-4-methoxypyridin-2-yl) carbonyl]-L-alaninate+SX, (2S,3S)-3-(2,4-dimethylphenyl)-4-methylpentan-2-yl N-[(3-acetoxy-4-methoxypyridin-2-yl)carbonyl]-L-alaninate+SX, (2S,3S)-3-(4-fluoro-2-methoxylphenyl)-4-methylpentan-2-yl N-[(3-acetoxy-4-methoxypyridin-2-yl)carbonyl]-L-alaninate+SX, (2S,3S)-3-(4-fluoro-2-methylphenyl)-4-methylpentan-2-yl N-{[3-(acetoxymethoxy)-4-methoxypyridin-2-yl]carbonyl}-L-alaninate+SX, (2S,3S)-3-(2-fluoro-4-methylphenyl)-4-methylpentan-2-yl N-{[3-(acetoxymethoxy)-4-methoxypyridin-2-yl]carbonyl}-L-alaninate+SX, (2S,3S)-3-(2,4-difluorophenyl)-4-methylpentan-2-yl N-{[3-(acetoxymethoxy)-4-methoxypyridin-2-yl]carbonyl}-L-alaninate+SX, (2S,3S)-3-(2,4-dimethylphenyl)-4-methylpentan-2-yl N-{[3-(acetoxymethoxy)-4-methoxypyridin-2-yl]carbonyl}-L-alaninate+SX, (2S,3S)-3-(4-fluoro-2-methoxylphenyl)-4-methylpentan-2-yl N-{[3-(acetoxymethoxy)-4-methoxypyridin-2-yl]carbonyl}-L-alaninate+SX, (2S,3S)-3-(4-fluoro-2-methylphenyl)-4-methylpentan-2-yl N-({3-[(isobutyryloxy)methoxy]-4-methoxypyridin-2-yl}carbonyl)-L-alaninate+SX, (2S,3S)-3-(2-fluoro-4-methylphenyl)-4-methylpentan-2-yl N-({3-[(isobutyryloxy)methoxy]-4-methoxypyridin-2-yl}carbonyl)-L-alaninate+SX, (2S,3S)-3-(2,4-difluorophenyl)-4-methylpentan-2-yl N-({3-[(isobutyryloxy)methoxy]-4-methoxypyridin-2-yl}carbonyl)-L-alaninate+SX, (2S,3S)-3-(2,4-dimethylphenyl)-4-methylpentan-2-yl N-({3-[(isobutyryloxy)methoxy]-4-methoxypyridin-2-yl}carbonyl)-L-alaninate+SX, (2S,3S)-3-(4-fluoro-2-methoxylphenyl)-4-methylpentan-2-yl N-({3-[(isobutyryloxy)methoxy]-4-methoxypyridin-2-yl}carbonyl)-L-alaninate+SX, (2S,3S)-3-(4-fluoro-2-methylphenyl)-4-methylpentan-2-yl N-[(3-hydroxy-4-methoxypyridin-2-yl)carbonyl]-L-alaninate+SX, (2S,3S)-3-(2-fluoro-4-methylphenyl)-4-methylpentan-2-yl N-[(3-hydroxy-4-methoxypyridin-2-yl)carbonyl]-L-alaninate+SX, (2S,3S)-3-(2,4-difluorophenyl)-4-methylpentan-2-yl N-[(3-hydroxy-4-methoxypyridin-2-yl)carbonyl]-L-alaninate+SX, (2S,3S)-3-(2,4-dimethylphenyl)-4-methylpentan-2-yl N-[(3-hydroxy-4-methoxypyridin-2-yl)carbonyl]-L-alaninate+SX, (2S,3S)-3-(4-fluoro-2-methoxylphenyl)-4-methylpentan-2-yl N-[(3-hydroxy-4-methoxypyridin-2-yl)carbonyl]-L-alaninate+SX, 3-(4-bromo-7-fluoroindol-1-yl)butan-2-yl N-[(3-hydroxy-4-methoxypyridin-2-yl)carbonyl]-L-alaninate+SX, 3-(7-bromoindol-1-yl)butan-2-yl N-[(3-hydroxy-4-methoxypyridin-2-yl)carbonyl]-L-alaninate+SX, 3-(7-bromo-4-fluoroindol-1-yl)butan-2-yl N-[(3-hydroxy-4-methoxypyridin-2-yl)carbonyl]-L-alaninate+SX, 3-(3,5-dichloropyridin-2-yl)butan-2-yl N-[(3-hydroxy-4-methoxypyridin-2-yl)carbonyl]-L-alaninate+SX, 3-(3,5-dichloropyridin-2-yl)butan-2-yl N-{[3-(acetoxymethoxy)-4-methoxypyridin-2-yl]carbonyl}-L-alaninate+SX, (1S)-1-[1-(naphthalen-1-yl)cyclopropyl]ethyl N-[(3-hydroxy-4-methoxypyridin-2-yl)carbonyl]-L-alaninate+SX, (1S)-1-[1-(naphthalen-1-yl)cyclopropyl]ethyl N-[(3-acetoxy-4-methoxypyridin-2-yl)carbonyl]-L-alaninate+SX, (1S)-1-[1-(naphthalen-1-yl)cyclopropyl]ethyl N-{[3-(acetoxymethoxy)-4-methoxypyridin-2-yl]carbonyl}-L-alaninate+SX, *Agrobacterium radiobactor* strain K1026+SX, *Agrobacterium radiobactor* strain K84+SX, *Bacillus amyloliquefaciens* (Aveo (trademark) EZ Nematicide)+SX, *Bacillus amyloliquefaciens* strain AT332+SX, *Bacillus amyloliquefaciens* strain B3+SX, *Bacillus amyloliquefaciens* strain D747+SX, *Bacillus amyloliquefaciens* strain DB101+SX, *Bacillus amyloliquefaciens* strain DB102+SX, *Bacillus amyloliquefaciens* strain GB03+SX, *Bacillus amyloliquefaciens* strain FZB24+SX, *Bacillus amyloliquefaciens* strain FZB42+SX, *Bacillus amyloliquefaciens* strain IN937a+SX, *Bacillus amyloliquefaciens* strain MBI600+SX, *Bacillus amyloliquefaciens* strain QST713+SX, *Bacillus amyloliquefaciens* isolate strain B246+SX, *Bacillus amyloliquefaciens* strain F727+SX, *Bacillus amyloliquefaciens* subsp. *plantarum* strain D747+SX, *Bacillus licheniformis* strain HB-2+SX, *Bacillus licheniformis* strain SB3086+SX, *Bacillus pumilus* strain AQ717+SX, *Bacillus pumilus* strain BUF-33+SX, *Bacillus pumilus* strain GB34+SX, *Bacillus pumilus* strain QST2808+SX, *Bacillus simplex* strain CGF2856+SX, *Bacillus subtilis* strain AQ153+SX, *Bacillus subtilis* strain AQ743+SX, *Bacillus subtilis* strain BU1814+SX, *Bacillus subtilis* strain D747+SX, *Bacillus subtilis* strain DB101+SX, *Bacillus subtilis* strain FZB24+SX, *Bacillus subtilis strain GB*03+SX, *Bacillus subtilis* strain HAI0404+SX, *Bacillus subtilis* strain IAB/BSO3+SX, *Bacillus subtilis* strain MB1600+SX, *Bacillus subtilis* strain QST30002/AQ30002+SX, *Bacillus subtilis* strain QST30004/AQ30004+SX, *Bacillus subtilis* strain QST713+SX, *Bacillus subtilis* strain QST714+SX, *Bacillus subtilis* var. *Amyloliquefaciens* strain FZB24+SX, *Bacillus subtilis* strain Y1336+SX, *Burkholderia cepacia*+SX, *Burkholderia cepacia* type Wisconsin strain J82+SX, *Burkholderia cepacia* type Wisconsin strain M54+SX, *Candida oleophila* strain O+SX, *Candida saitoana*+SX, *Chaetomium cupreum*+SX, *Clonostachys rosea*+SX, *Coniothyrium minitans* strain CGMCC8325+SX, *Coniothyrium minitans* strain CON/M/91-8+SX, *Cryptococcus albidus*+SX, *Erwinia carotovora* subsp. *carotovora* strain CGE234M403+SX, *Fusarium oxysporum* strain Fo47+SX, *Gliocladium catenulatum* strain J1446+SX, *Paenibacillus polymyxa* strain AC-1+SX, *Paenibacillus polymyxa* strain BS-0105+SX, *Pantoea agglomerans* strain E325+SX, *Phlebiopsis*

*gigantea* strain VRA1992+SX, *Pseudomonas aureofaciens* strain TX-1+SX, *Pseudomonas chlororaphis* strain 63-28+SX, *Pseudomonas chlororaphis* strain AFS009+SX, *Pseudomonas chlororaphis* strain MA342+SX, *Pseudomonas fluorescens* strain 1629RS+SX, *Pseudomonas fluorescens* strain A506+SX, *Pseudomonas fluorescens* strain CL145A+SX, *Pseudomonas fluorescens* strain G7090+SX, *Pseudomonas* sp. strain CAB-02+SX, *Pseudomonas syringae* strain 742RS+SX, *Pseudomonas syringae* strain MA-4+SX, *Pseudozyma flocculosa* strain PF-A22UL+SX, *Pseudomonas rhodesiae* strain HAI-0804+SX, *Pythium oligandrum* strain DV74+SX, *Pythium oligandrum* strain M1+SX, *Streptomyces griseoviridis* strain K61+SX, *Streptomyces lydicus* strain WYCD108US+SX, *Streptomyces lydicus* strain WYEC108+SX, *Talaromyces flavus* strain SAY-Y-94-01+SX, *Talaromyces flavus* strain V117b+SX, *Trichoderma asperellum* strain ICC012+SX, *Trichoderma asperellum* SKT-1+SX, *Trichoderma asperellum* strain T25+SX, *Trichoderma asperellum* strain T34+SX, *Trichoderma asperellum* strain TVi+SX, *Trichoderma atroviride* strain CNCM 1-1237+SX, *Trichoderma atroviride* strain LC52+SX, *Trichoderma atroviride* strain IMI 206040+SX, *Trichoderma atroviride* strain SCi+SX, *Trichoderma atroviride* strain SKT-1+SX, *Trichoderma atroviride* strain T11+SX, *Trichoderma gamsii* strain ICC080+SX, *Trichoderma harzianum* strain 21+SX, *Trichoderma harzianum* strain DB104+SX, *Trichoderma harzianun* strain DSM 14944+SX, *Trichoderma harzianum* strain ESALQ-1303+SX, *Trichoderma harzianum* strain ESALQ-1306+SX, *Trichoderma harzianum* strain IIHR-Th-2+SX, *Trichoderma harzianum* strain ITEM908+SX, *Trichoderma harzianum* strain kd+SX, *Trichoderma harzianum* strain MO1+SX, *Trichoderma harzianum* strain SF+SX, *Trichoderma harzianum* strain T22+SX, *Trichoderma harzianum* strain T39+SX, *Trichoderma harzianum* strain T78+SX, *Trichoderma harzianum* strain TH35+SX, *Trichoderma polysporum* strain IMI206039+SX, *Trichoderma stromaticum*+SX, *Trichoderma virens* strain G-41+SX, *Trichoderma virens* strain GL-21+SX, *Trichoderma viride*+SX, *Variovorax paradoxus* strain CGF4526+SX, Harpin protein+SX.

Combinations of the Present ingredient in the above Group (c) and the Present compound or the Compound of the present invention:

1-methylcyclopropene+SX, 1,3-diphenylurea+SX, 2,3,5-triiodobenzoic acid+SX, IAA ((1H-indol-3-yl)acetic acid)+SX, IBA (4-(1H-indol-3-yl)butyric acid)+SX, MCPA (2-(4-chloro-2-methylphenoxy)acetic acid)+SX, MCPB (4-(4-chloro-2-methylphenoxy)butyric acid)+SX, 4-CPA (4-chlorophenoxyacetic acid)+SX, 5-aminolevulinic acid hydrochloride+SX, 6-benzylaminopurine+SX, abscisic acid+SX, AVG (aminoethoxyvinylglycine)+SX, ancymidol+SX, butralin+SX, calcium carbonate+SX, calcium chloride+SX, calcium formate+SX, calcium peroxide+SX, calcium polysulfide+SX, calcium sulfate+SX, chlormequat-chloride+SX, chlorpropham+SX, choline chloride+SX, cloprop+SX, cyanamide+SX, cyclanilide+SX, daminozide+SX, decan-1-ol+SX, dichlorprop+SX, dikegulac+SX, dimethipin+SX, diquat+SX, ethephon+SX, ethychlozate+SX, flumetralin+SX, flurprimidol+SX, forchlorfenuron+SX, formononetin+SX, Gibberellin A+SX, Gibberellin A3+SX, inabenfide+SX, Kinetin+SX, lipochitooligosaccharide SP104+SX, maleic hydrazide+SX, mefluidide+SX, mepiquat-chloride+SX, oxidized glutathione+SX, pacrobutrazol+SX, pendimethalin+SX, prohexandione-calcium+SX, prohydrojasmon+SX, pyraflufen-ethyl+SX, sintofen+SX, sodium 1-naphthaleneacetate+SX, sodium cyanate+SX, thidiazuron+SX, triapenthenol+SX, Tribufos+SX, trinexapac-ethyl+SX, uniconazole-P+SX, 2-(naphthalen-1-yl)acetamide+SX, [4-oxo-4-(2-phenylethyl)amino]butyric acid+SX, methyl 5-(trifluoromethyl)benzo[b]thiophene-2-carboxylate+SX, 3-[(6-chloro-4-phenylquinazolin-2-yl)amino]propan-1-ol+SX, *Claroideoglomus etunicatum*+SX, *Claroideoglomus claroideum*+SX, *Funneliformis mosseae*+SX, *Gigaspora margarita*+SX, *Gigaspora rosea*+SX, *Glomus aggregatum*+SX, *Glomus deserticola*+SX, *Glomus monosporum*+SX, *Paraglomus brasillianum*+SX, *Rhizophagus clarus*+SX, *Rhizophagus intraradices* RTI-801+SX, *Rhizophagus irregularis* DAOM 197198+SX, *Azorhizobium caulinodans*+SX, *Azospirillum amazonense*+SX, *Azospirillum brasilense* XOH+SX, *Azospirillum brasilense* Ab-V5+SX, *Azospirillum brasilense* Ab-V6+SX, *Azospirillum caulinodans*+SX, *Azospirillum halopraeferens*+SX, *Azospirillum irakense*+SX, *Azospirillum lipoferum*+SX, *Bradyrhizobium elkanii* SEMIA 587+SX, *Bradyrhizobium elkanii* SEMIA 5019+SX, *Bradyrhizobium japonicum* TA-11+SX, *Bradyrhizobium japonicum* USDA 110+SX, *Bradyrhizobium liaoningense*+SX, *Bradyrhizobium lupini*+SX, *Delftia acidovorans* RAY209+SX, *Mesorhizobium ciceri*+SX, *Mesorhizobium huakii*+SX, *Mesorhizobium loti*+SX, *Rhizobium etli*+SX, *Rhizobium galegae*+SX, *Rhizobium leguminosarum* bv. *Phaseoli*+SX, *Rhizobium leguminosarum* bv. *Trifolii*+SX, *Rhizobium leguminosarum* bv. *Viciae*+SX, *Rhizobium trifolii*+SX, *Rhizobium tropici*+SX, *Sinorhizobium fredii*+SX, *Sinorhizobium meliloti*+SX, Zucchini Yellow Mosaik Virus weak strain+SX.

Combinations of the Present ingredient in the above Group (d) and the Present compound or the Compound of the present invention:

anthraquinone+SX, deet+SX, icaridin+SX.

Examples of the ratio of the Present compound or the Compound of the present invention and the Present ingredient include, but are not limited to, 1000:1 to 1:1000, 500:1 to 1:500, 100:1 to 1:100, 50:1, 20:1, 10:1, 9:1, 8:1, 7:1, 6:1, 5:1, 4:1, 3:1, 2:1, 1:1, 1:2, 1:3, 1:4, 1:5, 1:6, 1:7, 1:8, 1:9, 1:10, 1:20, and 1:50, in the ratio by weight (Present compound or Compound of the present invention: Present ingredient).

The Present compound or the Compound of the present invention may be mixed with or used in combination with chemical fertilizer(s) (for example, ammonium sulfate, ammonium phosphate, ammonium nitrate, urea, and ammonium chloride).

The Present compound, the Compound of the present invention, or the Composition A can control plant diseases caused by plant pathogenic microorganisms such as fungi, Oomycete, Phytomyxea, and bacteria. Examples of the fungi include Ascomycota, Basidiomycota, Blastocladiomycota, Chytridiomycota, Mucoromycota, and Olpidiomycota. Specific examples thereof include the followings. The scientific name of plant pathogenic microorganism which causes each disease is shown in parentheses.

Rice Diseases:

blast (*Pyricularia oryzae*), brown spot (*Cochliobolus miyabeanus*), sheath blight (*Rhizoctonia solani*), bakanae disease (*Gibberella fujikuroi*), downy mildew (*Sclerophthora macrospora*), false blast and head blight (*Epicoccum nigrum*), and seedling blight (*Trichoderma viride* and *Rhizopus oryzae*);

Wheat Diseases:

powdery mildew (*Blumeria graminis*), *fusarium* blight (*Fusarium graminearum, Fusarium avenaceum, Fusarium culmorum*, and *Microdochium nivale*), stripe rust (*Puccinia striiformis*), stem rust (*Puccinia graminis*), leaf rust (*Puc-

*cinia recondita*), snow mould (*Microdochium nivale* and *Microdochium majus*), *typhula* snow blight (*Typhula incarnata* and *Typhula ishikariensis*), loose smut (*Ustilago tritici*), stinking smut (*Tilletia caries* and *Tilletia controversa*), eyespot (*Pseudocercosporella herpotrichoides*), leaf blotch (*Septoria tritici*), glume blotch (*Stagonospora nodorum*), tan spot (*Pyrenophora tritici-repentis*), *rhizoctonia* seeding blight (*Rhizoctonia solani*), take-all disease (*Gaeumannomyces graminis*), and blast (*Pyricularia graminis-tritici*);

Barley Diseases:

powdery mildew (*Blumeria graminis*), *fusarium* head blight (*Fusarium graminearum, Fusarium avenaceum, Fusarium culmorum*, and *Microdochium nivale*), stripe rust (*Puccinia striiformis*), stem rust (*Puccinia graminis*), dwarf leaf rust (*Puccinia hordei*), loose smut (*Ustilago nuda*), scald (*Rhynchosporium secalis*), net blotch (*Pyrenophora teres*), spot blotch (*Cochliobolus sativus*), stripe (*Pyrenophora graminea*), *Ramularia* disease (*Ramularia collo-cygni*), and *rhizoctonia* seeding blight (*Rhizoctonia solani*);

Corn Diseases:

rust (*Puccinia sorghi*), southern rust (*Puccinia polysora*), northern leaf blight (*Setosphaeria turcica*), tropical rust (*Physopella zeae*), southern leaf blight (*Cochliobolus heterostrophus*), anthracnose (*Colletotrichum graminicola*), gray leaf spot (*Cercospora zeae-maydis*), eyespot (*Kabatiella zeae*), *phaeosphaeria* leaf spot (*Phaeosphaeria maydis*), *diplodia* rot (*Stenocarpella maydis* and *Stenocarpella macrospora*), stalk rot (*Fusarium graminearum, Fusarium verticillioides*, and *Colletotrichum graminicola*), smut (*Ustilago maydis*), and *Physoderma* brown spot and *Physoderma* stalk rot (*Physoderma maydis*);

Cotton Diseases:

anthracnose (*Colletotrichum gossypii*), grey mildew (*Ramularia areola*), *alternaria* leaf spot (*Alternaria macrospora* and *Alternaria gossypii*), and black root rot (*Thielaviopsis basicola*);

Coffee Diseases:

rust (*Hemileia vastatrix*) and leaf spot (*Cercospora coffeicola*);

Rape Seed Diseases:

sclerotinia rot (*Sclerotinia sclerotiorum*), gray leaf spot (*Alternaria brassicae*), root rot (*Phoma* lingam), and light leaf spot (*Pyrenopeziza brassicae*);

Sugar Cane Diseases:

rust (*Puccinia melanocephala* and *Puccinia kuehnii*), and smut (*Ustilago scitaminea*);

Sunflower Diseases:

rust (*Puccinia helianthi*) and downy mildew (*Plasmopara halstedii*);

Citrus Diseases:

melanose (*Diaporthe citri*), scab (*Elsinoe fawcetti*), green mold (*Penicillium digitatum*), blue mold (*Penicillium italicum*), *Phytophthora* rot (*Phytophthora parasitica* and *Phytophthora citrophthora*), and *aspergillus* rot (*Aspergillus niger*);

Apple Diseases:

blossom blight (*Monilinia mali*), *valsa* canker (*Valsa ceratosperma*), powdery mildew (*Podosphaera leucotricha*), *alternaria* leaf spot (*Alternaria alternata* apple pathotype), scab (*Venturia inaequalis*), bitter rot (*Glomerella cingulata* and *Colletotrichum acutatum*), blotch (*Diplocarpon mali*), ring rot (*Botryosphaeria berengeriana*), crown rot (*Phytophthora cactorum*), and rust (*Gymnosporangium juniperi-virginianae* and *Gymnosporangium yamadae*);

Pear Diseases:

scab (*Venturia nashicola* and *Venturia pirina*), black spot (*Alternaria alternata* Japanese pear pathotype), and rust (*Gymnosporangium haraeanum*);

Peach Diseases:

brown rot (*Monilinia fructicola*), scab (*Cladosporium carpophilum*), *Phomopsis* rot (*Phomopsis* sp.), and leaf curl (*Taphrina deformans*);

Grapes Diseases:

anthracnose (*Elsinoe ampelina*), ripe rot (*Glomerella cingulata* and *Colletotrichum acutatum*), powdery mildew (*Uncinula necator*), rust (*Phakopsora ampelopsidis*), black rot (*Guignardia bidwellii*), and downy mildew (*Plasmopara viticola*);

Japanese Persimmon Diseases:

anthracnose (*Gloeosporium kaki* and *Colletotrichum acutatum*) and leaf spot (*Cercospora kaki* and *Mycosphaerella nawae*);

FIG Disease:

rust (*Phakopsora nishidana*);

Diseases of Gourd Family:

anthracnose (*Colletotrichum lagenarium*), powdery mildew (*Sphaerotheca fuliginea*), gummy stem blight (*Didymella bryoniae*), *Corynespora* leaf spot (*Corynespora cassiicola*), *fusarium* wilt (*Fusarium oxysporum*), downy mildew (*Pseudoperonospora cubensis*), *phytophthora* rot (*Phytophthora capsici*), and damping-off (*Pythium* sp.);

Tomato Diseases:

early blight (*Alternaria solani*), leaf mold (*Cladosporium fulvum*), *Cercospora* leaf mold (*Pseudocercospora fuligena*), late blight (*Phytophthora infestans*), and powdery mildew (*Leveillula taurica*);

Eggplant Diseases:

brown spot (*Phomopsis vexans*) and powdery mildew (*Erysiphe cichoracearum*);

Cruciferous Vegetables Diseases:

alternaria leaf spot (*Alternaria japonica*), white spot (*Cercosporella brassicae*), clubroot (*Plasmodiophora brassicae*), downy mildew (*Peronospora parasitica*), and white rust (*Albugo candida*);

Welsh Onion Disease:

rust (*Puccinia allii*);

Soybean Diseases:

purple stain (*Cercospora kikuchii*), *sphaceloma* scab (*Elsinoe glycines*), pod and stem blight (*Diaporthe phaseolorum* var. *sojae*), rust (*Phakopsora pachyrhizi*), target spot (*Corynespora cassiicola*), anthracnose (*Colletotrichum glycines* and *Colletotrichum truncatum*), *Rhizoctonia* rot (*Rhizoctonia solani*), *septoria* brown spot (*Septoria glycines*), *Cercospora* leaf spot (*Cercospora sojina*), stem rot (*Sclerotinia sclerotiorum*), powdery mildew (*Microsphaera diffusa*), *phytophthora* stem and root rot (*Phytophthora sojae*), downy mildew (*Peronospora manshurica*), sudden death syndrome (*Fusarium virguliforme*), red crown rot (*Calonectria ilicicola*), and *Diaporthe/Phomopsis* complex (*Diaporthe longicolla*);

Kidney Bean Diseases:

stem rot (*Sclerotinia sclerotiorum*), rust (*Uromyces appendiculatus*), angular leaf spot (*Phaeoisariopsis griseola*), anthracnose (*Colletotrichum lindemuthianum*), and *Fusarium* root-rot (*Fusarium solani*);

Peanut Diseases:

leaf spot (*Cercospora personata*), brown leaf spot (*Cercospora arachidicola*), southern blight (*Sclerotium rolfsii*), and Cylindrocladium black rot (*Calonectria ilicicola*);

Garden Pea Diseases:

powdery mildew (*Erysiphe pisi*) and root rot (*Fusarium solani*);

Potato Diseases:
early blight (*Alternaria solani*), late blight (*Phytophthora infestans*), Pink rot (*Phytophthora erythroseptica*), powdery scab (*Spongospora subterranea* f. sp. *subterranea*), *verticillium* wilt (*Verticillium albo-atrum, Verticillium dahliae*, and *Verticillium nigrescens*), dry rot (*Fusarium solani*), and potato wart (*Synchytrium endobioticum*);
Strawberry Disease:
powdery mildew (*Sphaerotheca humuli*);
Tea Diseases:
net blister blight (*Exobasidium reticulatum*), white scab (*Elsinoe leucospila*), gray blight (*Pestalotiopsis* sp.), and anthracnose (*Colletotrichum theae-sinensis*);
Tobacco Diseases:
brown spot (*Alternaria longipes*), anthracnose (*Colletotrichum tabacum*), blue mold (*Peronospora tabacina*), and black shank (*Phytophthora nicotianae*);
Sugar Beet Diseases:
*cercospora* leaf spot (*Cercospora beticola*), leaf blight (*Thanatephorus cucumeris*), root rot (*Thanatephorus cucumeris*), *aphanomyces* root rot (*Aphanomyces cochlioides*), and rust (*Uromyces betae*);
Rose Diseases:
black spot (*Diplocarpon rosae*) and powdery mildew (*Sphaerotheca pannosa*);
*Chrysanthemum* Diseases:
leaf blight (*Septoria chrysanthemi-indici*) and white rust (*Puccinia horiana*);
Onion Diseases:
*botrytis* leaf blight (*Botrytis cinerea, Botrytis byssoidea*, and *Botrytis squamosa*), gray-mold neck rot (*Botrytis allii*), and small sclerotial neck rot (*Botrytis squamosa*);
Various Crops Diseases:
*Botrytis* rot (*Botrytis cinerea*), *sclerotinia* rot (*Sclerotinia sclerotiorum*), and seedling blight (*Pythium aphanidermatum, Pythium irregulare*, and *Pythium ultimum*);
Japanese Radish Disease:
*alternaria* leaf spot (*Alternaria brassicicola*);
Turfgrass Diseases:
dollar spot (*Sclerotinia homnoeocarpa*), brown patch and large patch (*Rhizoctonia solani*), and *pythium* blight (*Pythium aphanidermatum*);
Banana Disease:
Sigatoka disease (*Mycosphaerella fijiensis* and *Mycosphaerella musicola*);
Lentils Disease:
ascochyta blight (*Ascochyta lentis*);
Chickpea Disease:
*ascochyta* blight (*Ascochyta rabiei*);
Green Pepper Disease:
anthracnose (*Colletotrichum scovillei*);
Mango Disease:
anthracnose (*Colletotrichum acutatum*);
Fruit Trees Diseases:
white root rot (*Rosellinia necatrix*) and violet root rot (*Helicobasidium mompa*);
Postharvest Disease of Fruits (for Example, Apple and Pear):
*Mucor* rot diseases (*Mucor piriformis*);

Seed diseases or diseases in the early stages of the growth of various plants caused by *Aspergillus* spp., *Penicillium* spp., *Fusarium* spp., *Gibberella* spp., *Tricoderma* spp., *Thielaviopsis* spp., *Rhizopus* spp., *Mucor* spp., Corticium spp., *Phoma* spp., *Rhizoctonia* spp. or *Diplodia* spp., or the like;

Viral Diseases:
Lettuce big-vein disease transmitted by *Olpidium brassicae*, and viral diseases of several crops transmitted by *Polymyxa* spp. (e.g. *Polymyxa betae* and *Polymyxa graminis*);
Diseases Caused by Bacteria:
bacterial seedling blight of rice (*Burkholderia plantarii*), bacterial spot of cucumber (*Pseudomonas syringae* pv. *lachrymans*), bacterial wilt of eggplant (*Ralstonia solanacearum*), canker of *citrus* (*Xanthomonas citri*), bacterial soft rot of Chinese cabbage (*Erwinia carotovora*), scab of potato (*Streptomyces scabiei*), Goss's wilt of corn (*Clavibacter michiganensis*), Pierce's disease of grapes, olive, peach, and the like (*Xylella fastidiosa*), and crown gall of Rosaceae plants such as apple, peach, and cherries (*Agrobacterium tumefaciens*);

and the others.

The method for controlling plant diseases of the present invention is carried out by applying an effective amount of the Present compound, the Compound of the present invention, or the Composition A to plants or soil for cultivating plants. Examples of the treatment method include foliage treatment, soil treatment, and seed treatment.

The Present compound, the Compound of the present invention, or the Composition A is usually used by mixing it with inert carrier(s) such as solid carrier(s) and liquid carrier(s), and as needed, adding surfactant(s) and/or other auxiliary agent(s) for formulation to be formulated into an emulsifiable concentrate, an oil solution, a dust formulation, a granule, a wettable powder, a granular wettable powder, a flowable, a dry flowable, a microcapsule, or the like. These formulations usually comprise 0.1 to 99% by weight of the Present compound, the Compound of the present invention, or the Composition A.

Examples of the solid carrier(s) include fine powders and granules of clays (for example, kaolin clay, diatomaceous earth, bentonite, and acid white clay), dry silica, wet silica, talc, ceramic, other inorganic minerals (for example, sericite, quartz, sulfur, active carbon, and calcium carbonate), chemical fertilizers (for example, ammonium sulfate, ammonium phosphate, ammonium nitrate, urea, and ammonium chloride), and the others; as well as synthetic resins (for example, polyester resins such as polypropylene, polyacrylonitrile, polymethylmethacrylate, and polyethylene terephthalate; nylon resins such as nylon-6, nylon-11, and nylon-66; polyamide resins; polyvinyl chloride, polyvinylidene chloride, vinyl chloride-propylene copolymers, and the others).

Examples of the liquid carrier(s) include water; alcohols (for example, methanol, ethanol, isopropyl alcohol, butanol, hexanol, benzyl alcohol, ethylene glycol, propylene glycol, and phenoxy ethanol); ketones (for example, acetone, methyl ethyl ketone, and cyclohexanone); aromatic hydrocarbons (for example, toluene, xylene, ethylbenzene, dodecylbenzene, phenyl xylyl ethane, and methylnaphthalene); aliphatic hydrocarbons (for example, hexane, cyclohexane, kerosene, and light oil); esters (for example, ethyl acetate, butyl acetate, isopropyl myristate, ethyl oleate, diisopropyl adipate, diisobutyl adipate, and propylene glycol monomethyl ether acetate); nitriles (for example, acetonitrile and isobutyronitrile); ethers (for example, diisopropyl ether, 1,4-dioxane, 1,2-dimethoxyethane, diethylene glycol dimethyl ether, diethylene glycol monomethyl ether, propylene glycol monomethyl ether, dipropylene glycol monomethyl ether, and 3-methoxy-3-methyl-1-butanol); amides (for example, DMF and N,N-dimethylacetamide); sulfoxides (for example, DMSO); propylene carbonate; and vegetable oils (for example, soybean oil and cottonseed oil).

Examples of the surfactant(s) include nonionic surfactants such as polyoxyethylene alkyl ethers, polyoxyethylene alkyl aryl ethers, and polyethylene glycol fatty acid esters; and anionic surfactants such as alkyl sulfonates, alkylbenzene sulfonates, and alkyl sulfates. Specific examples thereof include Nimbus (registered trademark), Assist (registered trademark), Aureo (registered trademark), Iharol (registered trademark), Silwet L-77 (registered trademark), BreakThru (registered trademark), SundanceII (registered trademark), Induce (registered trademark), Penetrator (registered trademark), AgriDex (registered trademark), Lutensol A8 (registered trademark), NP-7 (registered trademark), Triton (registered trademark), Nufilm (registered trademark), Emulgator NP7 (registered trademark), Emulad (registered trademark), TRITON (registered trademark)×45, AGRAL 90 (registered trademark), AGROTIN (registered trademark), ARPON (registered trademark), EnSpray N (registered trademark), and BANOLE (registered trademark).

Examples of the other auxiliary agent(s) for formulation include binders, dispersants, colorants, and stabilizers. Specific examples thereof include casein, gelatin, saccharides (for example, starch, gum arabic, cellulose derivatives, and alginic acid), lignin derivatives, bentonite, water-soluble synthetic polymers (for example, polyvinyl alcohol, polyvinyl pyrrolidone, and polyacrylic acids), acidic isopropyl phosphate, 2,6-di-tert-butyl-4-methylphenol, and BHA (a mixture of 2-tert-butyl-4-methoxyphenol and 3-tert-butyl-4-methoxyphenol).

In the present invention, the plants include whole plants and specific parts of plants. Examples of the specific parts of plants include foliages, flowers, ears, fruits, tree stems, branches, tree crowns, seeds, vegetative reproduction organs, and seedlings.

A vegetative reproduction organ means a part of plant such as root, stem, and leaf which has a growth capability even when said part is separated from the plant body and placed into soil. Examples of the vegetative reproduction organ include tuberous root, creeping root, bulb, corm or solid bulb, tuber, rhizome, stolon, rhizophore, cane cuttings, propagule, and vine cutting. Stolon is also referred to as "runner", and propagule is also referred to as "propagulum" and categorized into broad bud and bulbil. Vine cutting means a shoot (collective term of leaf and stem) of sweet potato, glutinous yam, or the like. Bulb, corm or solid bulb, tuber, rhizome, cane cuttings, rhizophore, and tuberous root are also collectively referred to as "bulb". For example, cultivation of potato starts with planting a tuber into soil, and the tuber to be used is generally referred to as "seed potato".

Examples of the seed treatment include application of the Present compound, the Compound of the present invention, or the Composition A to seeds or vegetative reproduction organs. Specific examples thereof include spray treatment wherein mist of a suspension of the Present compound, the Compound of the present invention, or the Composition A is sprayed to seed surfaces or vegetative reproduction organ surfaces; smear treatment wherein the Present compound, the Compound of the present invention, or the Composition A is smeared to seeds or vegetative reproduction organs; immersion treatment wherein seeds are immersed in a drug solution of the Present compound, the Compound of the present invention, or the Composition A for a period of time; and methods for coating seeds or vegetative reproduction organs by a carrier comprising the Present compound, the Compound of the present invention, or the Composition A (for example, film coat treatment and pellet coat treatment). Examples of the above vegetative reproduction organ include seed potato.

When the Composition A is applied to seeds or vegetative reproduction organs, a formulation of the Composition A may be applied to seeds or vegetative reproduction organs, or a plurality of different formulations of the Composition A may be applied separately in a plurality of times to seeds or vegetative reproduction organs. Examples of the method for applying a plurality of different formulations of the Composition A separately in a plurality of times include a method wherein a formulation comprising the Present compound or the Compound of the present invention only as an active ingredient is applied seeds or vegetative reproduction organs, said seeds or vegetative reproduction organs are air-dried, and a formulation comprising the Present ingredient(s) is applied thereto; and a method wherein a formulation comprising the Present compound and the Present ingredient(s) or comprising the Compound of the present invention and the Present ingredient(s) as active ingredients is applied to seeds or vegetative reproduction organs, said seeds or vegetative reproduction organs are air-dried, and then a formulation comprising the Present ingredient(s) other than the applied Present ingredient(s) is applied.

In the present invention, the seed or the vegetative reproduction organ holding the Present compound, the Compound of the present invention, or the Composition A means a seed or a vegetative reproduction organ in which the Present compound, the Compound of the present invention, or the Composition A is attached to the surface of the seed or the vegetative reproduction organ. A material other than the Present compound, the Compound of the present invention, or the Composition A may be attached to the above seed or vegetative reproduction organ holding the Present compound, the Compound of the present invention, or the Composition A before or after the Present compound, the Compound of the present invention, or the Composition A is attached to the seed or the vegetative reproduction organ.

Also, when the Composition A is attached to surfaces of seeds or vegetative reproduction organs to form layer(s), said layer(s) consist(s) of a layer or a plurality of layers. When said layer(s) consist(s) of a plurality of layers, each layer consists of a layer comprising one or more active ingredient(s), or consists of a layer comprising one or more active ingredient(s) and a layer comprising no active ingredient.

The seeds or the vegetative reproduction organs holding the Present compound, the Compound of the present invention, or the Composition A may be prepared by, for example, applying a formulation comprising the Present compound, the Compound of the present invention, or the Composition A to seeds or vegetative reproduction organs by the above seed treatment method.

The amount of the Present compound, the Compound of the present invention, or the Composition A to be applied varies depending on the climate condition, the dosage form, the application period, the application method, the application site, diseases to be controlled, crops to be protected, and the like, and is usually within the range of 1 to 500 g per 1000 $m^2$ in case of foliage treatment or soil treatment. In case of seed treatment, the amount of the Present compound, the Compound of the present invention, or the Composition A is usually within the range of 0.001 to 100 g per 1 Kg of seed. When the Present compound, the Compound of the present invention, or the Composition A is formulated into an emulsifiable concentrate, a wettable powder, a flowable, or the like, such formulation is usually applied after diluting it with water in such a way that a concentration of the active ingredient is within the range of 0.01 to 10000 ppm, and then sparging it. In the case of being formulated into a dust formulation, a granule, or the like, such formulation is usually used as itself without diluting it.

The Present compound, the Compound of the present invention, or the Composition A may be used as an agent for controlling plant diseases in croplands such as fields, paddy fields, grasses, and orchards. Examples of the plants include the followings.

corn (dent corn, flint corn, flour corn, popcorn, waxy corn, sweet corn, and field corn), rice (long grain rice, short grain rice, medium grain rice, japonica rice, tropical japonica rice, indica rice, javanica rice, paddy rice, upland rice, floating rice, direct-seeded rice, transplanted rice, and glutinous rice), wheat (bread wheat (hard wheat, soft wheat, medium wheat, red wheat, and white wheat), durum wheat, spelt wheat, and club wheat, winter wheat and spring wheat of them), barley (two-rowed barley (=barley for brewery), six-rowed barley, hull-less barley, and pearl barley, winter barley and spring barley of them), rye (winter rye and spring rye), triticale (winter triticale and spring triticale), oat (winter oat and spring oat), sorghum, cotton (upland cotton and Pima cotton), soybean (ripe seed harvest soybean, green soybeans, and early harvest soybeans, indeterminate type, determinate type, and semi-determinate type of them), peanut, buckwheat, beet (beets for sugar production, beets for feed, beets for root vegetable, beets for leaf vegetable, and beets for fuel), rapeseed (winter rapeseed and spring rapeseed), canola (winter canola and spring canola), sunflower (sunflowers for oil extraction, edible sunflowers, and sunflowers for ornamental purpose), sugar cane, tobacco, tea, mulberry, solanaceous vegetables (for example, eggplant, tomato, pimento, pepper, and potato), cucurbitaceous vegetables (for example, cucumber, pumpkin, zucchini, water melon, and melon), cruciferous vegetables (for example, Japanese radish, white turnip, horseradish, kohlrabi, Chinese cabbage, cabbage, leaf mustard, broccoli, and cauliflower), asteraceous vegetables (for example, burdock, crown daisy, artichoke, and lettuce), liliaceous vegetables (for example, welsh onion, onion, garlic, and asparagus), ammiaceous vegetables (for example, carrot, parsley, celery, and parsnip), chenopodiaceous vegetables (for example, spinach and Swiss chard), lamiaceous vegetables (for example, perilla, mint, and basil), strawberry, sweet potato, glutinous yam, eddoe, pomaceous fruits (for example, apple, pear, Japanese pear, Chinese white pear, Chinese quince, and quince), stone fleshy fruits (for example, peach, plum, nectarine, Japanese apricot (*Prunus mume*), cherry fruit, apricot, and prune), citrus fruits (for example, *Citrus unshiu*, orange, lemon, lime, and grapefruit), nuts (for example, chestnuts, walnuts, hazelnuts, almond, pistachio, cashew nuts, and macadamia nuts), berry fruits (for example, blueberry, cranberry, blackberry, and raspberry), grapes, Japanese persimmon, fig, olive, Japanese plum, banana, coffee, date palm, coconuts, ornamental plants, forest plants, turfs, grasses, and the others.

The above plants are not specifically limited as long as they are generally cultivated cultivars. The above plants also include plants which may be produced by natural breeding, plants which may be generated by mutation, F1 hybrid plants, and genetically modified crops. Examples of the genetically modified crops include plants which have resistance to HPPD (4-hydroxyphenylpyruvate dioxygenase enzyme) inhibitors such as isoxaflutole, ALS (acetolactate synthase) inhibitors such as imazethapyr and thifensulfuron-methyl, EPSP (5-enolpyruvylshikimate-3-phosphate synthase) inhibitors, glutamine synthetase inhibitors, PPO (protoporphyrinogen oxidase) inhibitors, or herbicide such as bromoxynil and dicamba; plants which can synthesize a selective toxin known in *Bacillus* spp. such as *Bacillus thuringiensis* or the like; and plants which can synthesize a gene fragment or the like which is partially identical to an endogenous gene derived from a harmful insect, and induce a gene silencing (RNAi; RNA interference) in the target harmful insect to achieve a specific insecticidal activity.

EXAMPLES

Hereinafter, the present invention is illustrated more in detail by Preparation Examples, Reference Preparation Examples, Formulation Examples, and Test Examples, but the present invention is not limited to these Examples only. In the present description, Me represents a methyl group, Et represents an ethyl group, Pr represents a propyl group, i-Pr represents an isopropyl group, c-Pr represents a cyclopropyl group, Bu represents a butyl group, i-Bu represents an isobutyl group, s-Bu represents a sec-butyl group, t-Bu represents a tert-butyl group, c-Bu represents a cyclobutyl group, Pen represents a pentyl group, i-Pen represents an isopentyl group, neo-Pen represents a neopentyl group, c-Hex represents a cyclohexyl group, Allyl represents an allyl group, Ph represents a phenyl group, 2-Py represents a 2-pyridyl group, 3-Py represents a 3-pyridyl group, and 4-Py represents a 4-pyridyl group. When a phenyl group or a pyridyl group has substituent(s), the substituent(s) is/are indicated before the symbol with the substitution position(s). For example, 2-CN-Ph represents a 2-cyanophenyl group, $3,4\text{-}F_2\text{-}Ph$ represents a 3,4-difluorophenyl group, and 4-(OMe)-Ph represents a 4-methoxyphenyl group.

Preparation Examples of the Present compound and the Compound of the present invention are shown below.

Reference Preparation Example 1

To a mixture of dimethylsulfamoylpyrazole (2.2 g) and THF (20 mL) was added dropwise butyllithium (2.6 M solution in hexane) (5.3 mL) at −78° C., and the resulting mixture was stirred at −78° C. for 30 minutes. To the resulting mixture was added diethyl disulfide (1.8 g), and the resulting mixture was stirred at room temperature for 4 hours. To the resulting mixture was added an aqueous solution of ammonium chloride, and the resulting mixture was extracted with ethyl acetate. The resulting organic layer was washed with saturated brine, dried over magnesium sulfate, and concentrated under reduced pressure. The resulting residue was subjected to silica gel column chromatography to give the Intermediate compound MA1-1 represented by the following formula (3.0 g).

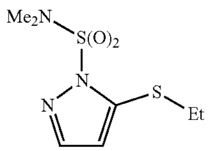

Intermediate compound MA1-1: $^1$H-NMR ($CDCl_3$) δ: 7.62 (1H, d), 6.18 (1H, d), 3.02 (6H, s), 2.96 (2H, q), 1.38 (3H, t).

Reference Preparation Example 1-1

The compounds prepared according to the Reference Preparation Example 1 and the physical properties thereof are shown below.

A compound represented by formula (MA1)

(MA1)

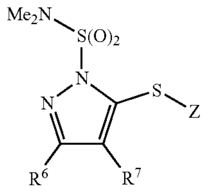

wherein the combination of $R^6$, $R^7$, and Z represents any one combination indicated in Table MA1.

TABLE MA1

| Intermediate compound | $R^6$ | $R^7$ | Z |
|---|---|---|---|
| MA1-2 | H | H | Pr |
| MA1-3 | H | H | Me |
| MA1-4 | H | H | i-Pr |
| MA1-5 | H | H | Bu |
| MA1-6 | H | H | i-Bu |
| MA1-7 | H | H | Pen |
| MA1-8 | H | H | i-Pen |
| MA1-9 | H | H | c-Hex |
| MA1-10 | H | H | Allyl |
| MA1-11 | H | H | Ph |
| MA1-12 | H | H | 4-(OMe)—Ph |
| MA1-13 | H | H | 4-Cl—Ph |
| MA1-14 | H | H | 2-(OMe)—Ph |
| MA1-15 | H | H | 2-Cl—Ph |
| MA1-16 | H | H | 4-Py |
| MA1-17 | H | H | 2-Py |
| MA1-18 | H | F | Pr |

Intermediate compound MA1-2: $^1$H-NMR ($CDCl_3$) δ: 7.61 (1H, d), 6.16 (1H, d), 3.02 (6H, s), 2.91 (2H, dd), 1.74 (2H, m), 1.06 (3H, t).

Intermediate compound MA1-3: $^1$H-NMR ($CDCl_3$) δ: 7.63 (1H, d), 6.09 (1H, d), 3.01 (6H, s), 2.49 (3H, s).

Intermediate compound MA1-4: $^1$H-NMR ($CDCl_3$) δ: 7.62 (1H, d), 6.28 (1H, d), 3.45 (1H, m), 3.03 (6H, s), 1.36 (6H, d).

Intermediate compound MA1-5: $^1$H-NMR ($CDCl_3$) δ: 7.62 (1H, d), 6.16 (1H, d), 3.02 (6H, s), 2.93 (2H, dd), 1.70 (2H, m), 1.48 (2H, m), 0.94 (3H, t).

Intermediate compound MA1-6: $^1$H-NMR ($CDCl_3$) δ: 7.61 (1H, d), 6.14 (1H, d), 3.02 (6H, s), 2.81 (2H, d), 1.96 (1H, m), 1.06 (6H, d).

Intermediate compound MA1-7: $^1$H-NMR ($CDCl_3$) δ: 7.61 (1H, d), 6.16 (1H, d), 3.02 (6H, s), 2.92 (2H, dd), 1.71 (2H, m), 1.47-1.29 (4H, m), 0.91 (3H, t).

Intermediate compound MA1-8: $^1$H-NMR ($CDCl_3$) δ: 7.62 (1H, d), 6.16 (1H, d), 3.02 (6H, s), 2.93 (2H, m), 1.74 (1H, m), 1.63-1.57 (2H, m), 0.93 (6H, d).

Intermediate compound MA1-9: $^1$H-NMR ($CDCl_3$) δ: 7.61 (1H, d), 6.26 (1H, d), 3.20 (1H, m), 3.03 (6H, s), 2.07-2.00 (2H, m), 1.83-1.76 (2H, m), 1.65-1.26 (6H, m).

Intermediate compound MA1-10: $^1$H-NMR ($CDCl_3$) δ: 7.61 (1H, d), 6.23 (1H, d), 5.88 (1H, m), 5.24 (1H, m), 5.17 (1H, m), 3.58 (2H, m), 3.02 (6H, s).

Intermediate compound MA1-11: $^1$H-NMR ($CDCl_3$) δ: 7.57-7.51 (3H, m), 7.42-7.37 (3H, m), 5.78 (1H, d), 3.04 (6H, s).

Intermediate compound MA1-12: $^1$H-NMR ($CDCl_3$) δ: 7.52 (2H, m), 7.47 (1H, d), 6.94 (2H, m), 5.56 (1H, d), 3.84 (3H, s), 3.04 (6H, s).

Intermediate compound MA1-13: $^1$H-NMR ($CDCl_3$) δ: 7.54 (1H, d), 7.45 (2H, m), 7.36 (2H, m), 5.85 (1H, d), 3.05 (6H, s).

Intermediate compound MA1-14: $^1$H-NMR ($CDCl_3$) δ: 7.52 (1H, d), 7.42-7.36 (2H, m), 6.98-6.94 (2H, m), 5.74 (1H, d), 3.84 (3H, s), 3.04 (6H, s).

Intermediate compound MA1-15: $^1$H-NMR ($CDCl_3$) δ: 7.59 (1H, d), 7.48 (1H, m), 7.40 (1H, m), 7.32 (1H, m), 7.26 (1H, m), 5.89 (1H, d), 3.05 (6H, s).

Intermediate compound MA1-16: $^1$H-NMR ($CDCl_3$) δ: 8.46 (2H, m), 7.75 (1H, d), 7.05 (2H, m), 6.57 (1H, d), 3.07 (6H, s).

Intermediate compound MA1-17: $^1$H-NMR ($CDCl_3$) δ: 8.45 (1H, m), 7.73 (1H, d), 7.57 (1H, m), 7.12-7.08 (2H, m), 6.60 (1H, d), 3.04 (6H, s).

Intermediate compound MA1-18: $^1$H-NMR ($CDCl_3$) δ: 7.56 (1H, d), 3.08 (6H, s), 2.90 (2H, t), 1.62 (2H, m), 1.01 (3H, t).

Reference Preparation Example 2

A mixture of the Intermediate compound MA1-1 (3.0 g) and trifluoroacetic acid (30 mL) was stirred at 50° C. for 2 hours. To the resulting mixture was added water, and the resulting mixture was extracted with chloroform. The resulting organic layer was washed with saturated sodium hydrogen carbonate water, dried over magnesium sulfate, and concentrated under reduced pressure. The resulting residue was subjected to silica gel column chromatography to give the Intermediate compound MA2-1 (0.9 g) represented by the following formula.

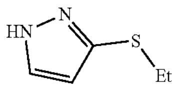

Intermediate compound MA2-1: $^1$H-NMR ($CDCl_3$) δ: 7.62 (1H, d), 6.37 (1H, d), 2.90 (2H, q), 1.30 (3H, t).

Reference Preparation Example 2-1

The compounds prepared according to the Reference Preparation Example 2 and the physical properties thereof are shown below.

A compound represented by formula (MA2)

(MA2)

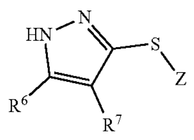

wherein the combination of $R^6$, $R^7$, and Z represents any one combination indicated in Table MA2.

TABLE MA2

| Intermediate compound | $R^6$ | $R^7$ | Z |
|---|---|---|---|
| MA2-2 | H | H | Pr |
| MA2-3 | H | H | Me |
| MA2-4 | H | H | i-Pr |
| MA2-5 | H | H | Bu |

TABLE MA2-continued

| Intermediate compound | $R^6$ | $R^7$ | Z |
|---|---|---|---|
| MA2-6 | H | H | i-Bu |
| MA2-7 | H | H | Pen |
| MA2-8 | H | H | i-Pen |
| MA2-9 | H | H | c-Hex |
| MA2-10 | H | H | Allyl |
| MA2-11 | H | H | Ph |
| MA2-12 | H | H | 4-(OMe)—Ph |
| MA2-13 | H | H | 4-Cl—Ph |
| MA2-14 | H | H | 2-(OMe)—Ph |
| MA2-15 | H | H | 2-Cl—Ph |
| MA2-16 | H | H | 4-Py |
| MA2-17 | H | H | 2-Py |
| MA2-18 | H | F | Pr |

Intermediate compound MA2-2: $^1$H-NMR ($CDCl_3$) δ: 7.62 (1H, d), 6.35 (1H, d), 2.86 (2H, dd), 1.65 (2H, m), 1.00 (3H, t).

Intermediate compound MA2-3: $^1$H-NMR ($CDCl_3$) δ: 7.60 (1H, d), 6.31 (1H, d), 2.51 (3H, s).

Intermediate compound MA2-4: $^1$H-NMR ($CDCl_3$) δ: 7.65 (1H, d), 6.41 (1H, d), 3.28 (1H, m), 1.29 (6H, d).

Intermediate compound MA2-5: $^1$H-NMR ($CDCl_3$) δ: 7.59 (1H, d), 6.35 (1H, d), 2.88 (2H, dd), 1.62 (2H, m), 1.42 (2H, m), 0.90 (3H, t).

Intermediate compound MA2-6: $^1$H-NMR ($CDCl_3$) δ: 7.65 (1H, br s), 6.37 (1H, br s), 2.83 (2H, d), 1.86 (1H, m), 1.02 (6H, d).

Intermediate compound MA2-7: $^1$H-NMR ($CDCl_3$) δ: 7.58 (1H, d), 6.34 (1H, d), 2.88 (2H, dd), 1.64 (2H, m), 1.43-1.26 (4H, m), 0.88 (3H, t).

Intermediate compound MA2-8: $^1$H-NMR ($CDCl_3$) δ: 7.59 (1H, d), 6.34 (1H, d), 2.89 (2H, dd), 1.70 (1H, m), 1.52 (2H, m), 0.89 (6H, d).

Intermediate compound MA2-9: $^1$H-NMR ($CDCl_3$) δ: 7.60 (1H, d), 6.39 (1H, d), 3.03-2.94 (1H, m), 2.01-1.93 (2H, m), 1.79-1.71 (2H, m), 1.63-1.55 (1H, m), 1.41-1.18 (5H, m).

Intermediate compound MA2-10: $^1$H-NMR ($CDCl_3$) δ: 7.62 (1H, br s), 6.38 (1H, br s), 5.89 (1H, m), 5.11-5.03 (2H, m), 3.50 (2H, m).

Intermediate compound MA2-11: $^1$H-NMR ($CDCl_3$) δ: 7.54 (1H, d), 7.28-7.14 (5H, m), 6.43 (1H, d).

Intermediate compound MA2-12: $^1$H-NMR ($CDCl_3$) δ: 7.54 (1H, br s), 7.34 (2H, m), 6.83 (2H, m), 6.31 (1H, br s), 3.78 (3H, s).

Intermediate compound MA2-13: $^1$H-NMR ($CDCl_3$) δ: 7.60 (1H, d), 7.26-7.15 (4H, m), 6.44 (1H, d).

Intermediate compound MA2-14: $^1$H-NMR ($CDCl_3$) δ: 7.63 (1H, d), 7.19 (1H, m), 6.96 (1H, m), 6.90-6.81 (2H, m), 6.48 (1H, d), 3.92 (3H, s).

Intermediate compound MA2-15: $^1$H-NMR ($CDCl_3$) δ: 7.67 (1H, d), 7.38-7.33 (1H, m), 7.12-7.05 (2H, m), 6.89-6.84 (1H, m), 6.55 (1H, d).

Intermediate compound MA2-16: $^1$H-NMR ($CDCl_3$) δ: 8.37 (2H, m), 7.74 (1H, d), 6.89 (2H, m), 6.60 (1H, d).

Intermediate compound MA2-17: $^1$H-NMR ($CDCl_3$) δ: 8.44 (1H, d), 7.70 (1H, m), 7.50 (1H, m), 7.07-6.98 (2H, m), 6.56 (1H, d).

Intermediate compound MA2-18: $^1$H-NMR ($CDCl_3$) δ: 10.56 (1H, br s), 7.48 (1H, d), 2.79 (2H, t), 1.62 (2H, m), 1.00 (3H, t).

Reference Preparation Example 3

To a mixture of 1-(4-chlorophenyl)-1H-pyrazol-3-ol (3.0 g) and pyridine (6.0 mL) was added dropwise trifluoromethanesulfonic anhydride (5.0 g) at 0° C., and the resulting mixture was stirred at 0° C. for 2 hours. To the resulting mixture was added sodium hydrogen carbonate water, and the resulting mixture was extracted with ethyl acetate. The resulting organic layer was dried over sodium sulfate, and concentrated under reduced pressure to give the Intermediate compound MA3-1 (5.3 g) represented by the following formula.

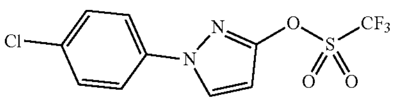 [SMILES: O=S(=O)(Oc1ccn(-c2ccc(Cl)cc2)n1)C(F)(F)F]

Intermediate Compound MA3-1

Reference Preparation Example 4

A mixture of the Intermediate compound MA2-2 (1.4 g), 3-iodoaniline (2.6 g), copper(I) iodide (1.5 g), trans-N,N'-dimethylcyclohexane-1,2-diamine (1.4 g), potassium carbonate (2.8 g), and DMF (25 mL) was stirred at 80° C. for 10 hours. To the resulting mixture was added water, and the resulting mixture was filtered. The resulting filtrate was extracted with ethyl acetate, then the resulting organic layer was dried over magnesium sulfate, and concentrated under reduced pressure. The resulting residue was subjected to silica gel column chromatography (hexane:ethyl acetate=70:30) to give the Intermediate compound MA4-1 represented by the following formula (2.2 g).

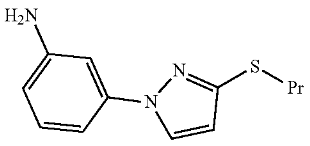

Intermediate compound MA4-1: $^1$H-NMR ($CDCl_3$) δ: 7.82 (1H, d), 7.18 (1H, t), 7.09 (1H, t), 6.97 (1H, m), 6.57 (1H, m), 6.38 (1H, d), 3.81 (2H, br s), 2.99 (2H, m), 1.74 (2H, m), 1.04 (3H, t).

Reference Preparation Example 4-1

The compounds prepared according to the Reference Preparation Example 4 and the physical properties thereof are shown below.

A compound represented by formula (MA4)

(MA4)

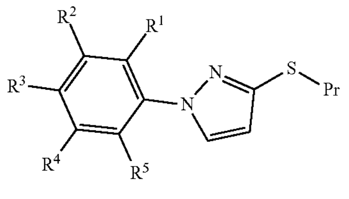

wherein the combination of $R^1$, $R^2$, $R^3$, $R^4$, and $R^5$ represents any one combination indicated in Table MA4.

TABLE MA4

| Intermediate compound | $R^1$ | $R^2$ | $R^3$ | $R^4$ | $R^5$ |
|---|---|---|---|---|---|
| MA4-2 | H | H | $NH_2$ | H | H |
| MA4-3 | H | F | $NH_2$ | H | H |
| MA4-4 | H | H | C(O)OEt | H | H |
| MA4-5 | H | C(O)OEt | H | H | H |

Intermediate compound MA4-2: $^1$H-NMR ($CDCl_3$) δ: 7.72 (1H, d), 7.42 (2H, m), 6.72 (2H, m), 6.37 (1H, d), 3.72 (2H, br s), 2.97 (2H, m), 1.73 (2H, m), 1.03 (3H, t).

Intermediate compound MA4-3: $^1$H-NMR ($CDCl_3$) δ: 7.72 (1H, d), 7.37 (1H, m), 7.21 (1H, m), 6.81 (1H, t), 6.37 (1H, d), 3.76 (2H, br s), 2.98 (2H, t), 1.74 (2H, m), 1.03 (3H, t).

Intermediate compound MA4-4: $^1$H-NMR ($CDCl_3$) δ: 8.12 (2H, m), 7.95 (1H, d), 7.74 (2H, m), 6.44 (1H, d), 4.39 (2H, q), 3.05 (2H, t), 1.77 (2H, m), 1.41 (3H, t), 1.06 (3H, t).

Intermediate compound MA4-5: $^1$H-NMR ($CDCl_3$) δ: 8.27 (1H, m), 7.95-7.92 (3H, m), 7.52 (1H, t), 6.44 (1H, d), 4.42 (2H, q), 3.04 (2H, t), 1.77 (2H, m), 1.42 (3H, t), 1.05 (3H, t).

Reference Preparation Example 5

A mixture of the Intermediate compound MA4-5 (7.8 g), potassium hydroxide (2.9 g), ethanol (40 mL), and water (20 mL) was stirred at 50° C. for 4 hours. To the resulting mixture was added 2.0 M hydrochloric acid (30 mL), and the resulting mixture was stirred for 1 hour. The resulting mixture was filtered, and the resulting solids were dried under reduced pressure to give the Intermediate compound MA5-1 represented by the following formula (5.8 g).

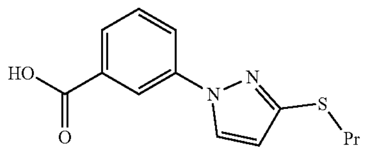

Intermediate compound MA5-1: $^1$H-NMR ($CDCl_3$) δ: 8.31 (1H, m), 8.02-7.99 (2H, m), 7.96 (1H, d), 7.56 (1H, t), 6.45 (1H, d), 3.05 (2H, t), 1.77 (2H, m), 1.06 (3H, t).

Reference Preparation Example 5-1

The Intermediate compound MA5-2 represented by the following formula was prepared according to the Reference Preparation Example 5 by using the Intermediate compound MA4-4 instead of the Intermediate compound MA4-5.

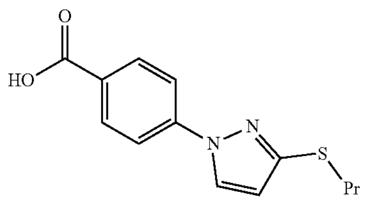

Intermediate compound MA5-2: $^1$H-NMR (DMSO-d6) δ: 8.57 (1H, m), 8.03 (2H, m), 7.85 (2H, m), 6.58 (1H, m), 3.01 (2H, t), 1.65 (2H, m), 0.97 (3H, t).

Reference Preparation Example 6

A mixture of the Compound of the present invention IIA-150 (4.2 g), ammonium chloride (0.8 g), zinc (2.8 g), THF (20 mL), and water (10 mL) was stirred at 0° C. for 2 hours. The resulting mixture was filtered, and then the resulting filtrate was extracted with MTBE. The resulting organic layer was dried over magnesium sulfate, and concentrated under reduced pressure. The resulting residue was subjected to silica gel column chromatography to give the Intermediate compound MA6-1 represented by the following formula (2.8 g).

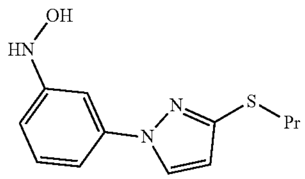

Intermediate compound MA6-1: $^1$H-NMR ($CDCl_3$) δ: 7.85 (1H, d), 7.38 (1H, m), 7.30 (1H, t), 7.21-7.18 (1H, m), 6.88-6.84 (2H, m), 6.40 (1H, d), 5.64 (1H, br s), 3.00 (2H, t), 1.74 (2H, m), 1.04 (3H, t).

Reference Preparation Example 6-1

The Intermediate compound MA6-2 represented by the following formula was prepared according to the Reference Preparation Example 6 by using the Compound of the present invention IIA-149 instead of the Compound of the present invention IIA-150.

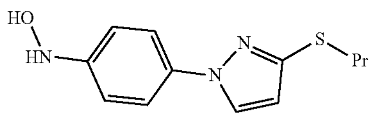

Intermediate compound MA6-2: $^1$H-NMR ($CDCl_3$) δ: 7.78 (1H, d), 7.55 (2H, m), 7.03 (2H, m), 6.83 (1H, br s), 6.39 (1H, d), 5.58 (1H, br s), 2.99 (2H, t), 1.74 (2H, m), 1.04 (3H, t).

Preparation Example 1

A mixture of the Intermediate compound MA2-1 (0.38 g), 4-iodotoluene (0.78 g), copper(I) iodide (0.46 g), trans-N, N'-dimethylcyclohexane-1,2-diamine (0.43 g), potassium carbonate (0.87 g), and DMF (10 mL) was stirred at 80° C. for 4 hours. To the resulting mixture was added water, and the resulting mixture was filtered. The resulting filtrate was extracted with ethyl acetate. The resulting organic layer was dried over magnesium sulfate, and concentrated under reduced pressure. The resulting residue was subjected to silica gel column chromatography (hexane:ethyl acetate=20:1) to give the Compound of the present invention IIA-1 represented by the following formula (0.61 g).

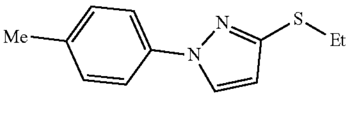 [SMILES: CCSc1ccn(-c2ccc(C)cc2)n1]

Compound of the present invention IIA-1: $^1$H-NMR ($CDCl_3$) δ: 7.83 (1H, d), 7.55 (2H, m), 7.22 (2H, m), 6.40 (1H, d), 3.03 (2H, q), 2.37 (3H, s), 1.38 (3H, t).

Preparation Example 1-1

The compounds prepared according to the Preparation Example 1 and the physical properties thereof are shown below.

A compound represented by formula (A1)

(A1)

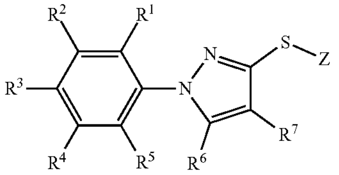

wherein the combination of Z, $R^1$, $R^2$, $R^3$, $R^4$, $R^5$, $R^6$, and $R^7$ represents any one combination indicated in Table IIA1-1, Table IIA1-2, and Table IA1.

TABLE IIA1-1

| Compound of the present invention | Z | $R^1$ | $R^2$ | $R^3$ | $R^4$ | $R^5$ | $R^6$ | $R^7$ |
|---|---|---|---|---|---|---|---|---|
| IIA-2 | Et | H | H | $CF_3$ | H | H | H | H |
| IIA-3 | Et | H | H | OMe | H | H | H | H |
| IIA-4 | Et | H | H | H | H | H | H | H |
| IIA-5 | Et | H | H | F | H | H | H | H |
| IIA-6 | Et | H | H | CN | H | H | H | H |
| IIA-7 | Et | H | H | $OCF_3$ | H | H | H | H |
| IIA-8 | Et | H | H | Br | H | H | H | H |
| IIA-9 | Et | H | H | I | H | H | H | H |
| IIA-10 | Et | H | Cl | H | H | H | H | H |
| IIA-11 | Et | H | OMe | H | H | H | H | H |
| IIA-12 | Et | Cl | H | H | H | H | H | H |
| IIA-13 | Et | OMe | H | H | H | H | H | H |
| IIA-14 | Et | H | F | H | H | H | H | H |
| IIA-15 | Et | H | Cl | Cl | H | H | H | H |
| IIA-16 | Et | F | H | H | H | H | H | H |
| IIA-17 | Et | H | Cl | H | Cl | H | H | H |
| IIA-18 | Et | Et | H | H | H | H | H | H |
| IIA-19 | Et | H | Ph | H | H | H | H | H |
| IIA-20 | Et | Me | H | H | H | Me | H | H |
| IIA-21 | Et | H | F | Cl | H | H | H | H |
| IIA-22 | Et | H | F | Br | H | H | H | H |
| IIA-23 | Et | F | H | Me | H | H | H | H |
| IIA-24 | Et | F | H | I | H | H | H | H |
| IIA-25 | Et | F | H | Cl | H | H | H | H |
| IIA-26 | Et | H | H | i-Pr | H | H | H | H |
| IIA-27 | Et | H | H | neo-Pen | H | H | H | H |
| IIA-28 | Et | H | H | c-Pr | H | H | H | H |
| IIA-29 | Et | H | OMe | OMe | H | H | H | H |
| IIA-30 | Et | H | Me | OMe | H | H | H | H |

Compound of the present invention IIA-2: $^1$H-NMR ($CDCl_3$) δ: 7.93 (1H, d), 7.80 (2H, m), 7.69 (2H, m), 6.45 (1H, d), 3.08 (2H, q), 1.41 (3H, t).

Compound of the present invention IIA-3: $^1$H-NMR ($CDCl_3$) δ: 7.77 (1H, d), 7.57 (2H, m), 6.95 (2H, m), 6.40 (1H, d), 3.83 (3H, s), 3.02 (2H, q), 1.37 (3H, t).

Compound of the present invention IIA-4: $^1$H-NMR ($CDCl_3$) δ: 7.87 (1H, d), 7.67 (2H, m), 7.43 (2H, m), 7.26 (1H, m), 6.42 (1H, d), 3.05 (2H, q), 1.39 (3H, t).

Compound of the present invention IIA-5: $^1$H-NMR ($CDCl_3$) δ: 7.81 (1H, d), 7.66-7.60 (2H, m), 7.16-7.09 (2H, m), 6.41 (1H, d), 3.04 (2H, q), 1.38 (3H, t).

Compound of the present invention IIA-6: $^1$H-NMR ($CDCl_3$) δ: 7.93 (1H, d), 7.82-7.71 (4H, m), 6.45 (1H, d), 3.10 (2H, q), 1.41 (3H, t).

Compound of the present invention IIA-7: $^1$H-NMR ($CDCl_3$) δ: 7.85 (1H, d), 7.70 (2H, m), 7.29 (2H, m), 6.43 (1H, d), 3.06 (2H, q), 1.39 (3H, t).

Compound of the present invention IIA-8: $^1$H-NMR ($CDCl_3$) δ: 7.84 (1H, d), 7.58-7.52 (4H, m), 6.42 (1H, d), 3.05 (2H, q), 1.39 (3H, t).

Compound of the present invention IIA-9: $^1$H-NMR ($CDCl_3$) δ: 7.84 (1H, d), 7.73 (2H, m), 7.44 (2H, m), 6.42 (1H, d), 3.05 (2H, q), 1.39 (3H, t).

Compound of the present invention IIA-10: $^1$H-NMR ($CDCl_3$) δ: 7.85 (1H, d), 7.73 (1H, t), 7.56-7.52 (1H, ddd), 7.35 (1H, t), 7.24-7.21 (1H, m), 6.42 (1H, d), 3.06 (2H, q), 1.39 (3H, t).

Compound of the present invention IIA-11: $^1$H-NMR ($CDCl_3$) δ: 7.86 (1H, d), 7.34-7.28 (2H, m), 7.20 (1H, m), 6.81 (1H, m), 6.41 (1H, d), 3.86 (3H, s), 3.05 (2H, q), 1.39 (3H, t)

Compound of the present invention IIA-12: $^1$H-NMR ($CDCl_3$) δ: 7.85 (1H, d), 7.61 (1H, m), 7.50 (1H, m), 7.39-7.28 (2H, m), 6.42 (1H, d), 3.04 (2H, q), 1.38 (3H, t).

Compound of the present invention IIA-13: $^1$H-NMR ($CDCl_3$) δ: 8.03 (1H, d), 7.77 (1H, m), 7.27 (1H, m), 7.07-7.01 (2H, m), 6.38 (1H, d), 3.88 (3H, s), 3.03 (2H, q), 1.38 (3H, t).

Compound of the present invention IIA-14: $^1$H-NMR ($CDCl_3$) δ: 7.86 (1H, d), 7.48-7.35 (3H, m), 6.96 (1H, m), 6.42 (1H, d), 3.07 (2H, q), 1.40 (3H, t).

Compound of the present invention IIA-15: $^1$H-NMR ($CDCl_3$) δ: 7.84-7.82 (2H, m), 7.52-7.46 (2H, m), 6.42 (1H, d), 3.06 (2H, q), 1.39 (3H, t).

Compound of the present invention IIA-16: $^1$H-NMR ($CDCl_3$) δ: 8.00-7.90 (2H, m), 7.27-7.17 (3H, m), 6.42 (1H, d), 3.06 (2H, q), 1.39 (3H, t).

Compound of the present invention IIA-17: $^1$H-NMR ($CDCl_3$) δ: 7.83 (1H, d), 7.59 (2H, d), 7.23 (1H, t), 6.42 (1H, d), 3.07 (2H, q), 1.40 (3H, t).

Compound of the present invention IIA-18: $^1$H-NMR ($CDCl_3$) δ: 7.53 (1H, d), 7.35 (2H, m), 7.28 (2H, m), 6.39 (1H, d), 3.02 (2H, q), 2.60 (2H, q), 1.36 (3H, t), 1.11 (3H, t).

Compound of the present invention IIA-19: $^1$H-NMR ($CDCl_3$) δ: 7.94 (1H, d), 7.91-7.91 (1H, m), 7.65-7.33 (8H, m), 6.45 (1H, d), 3.06 (2H, q), 1.40 (3H, t).

Compound of the present invention IIA-20: $^1$H-NMR ($CDCl_3$) δ: 7.40 (1H, d), 7.23 (1H, m), 7.12 (2H, m), 6.43 (1H, d), 3.00 (2H, q), 2.04 (6H, s), 1.34 (3H, t).

Compound of the present invention IIA-21: $^1$H-NMR ($CDCl_3$) δ: 7.84 (1H, d), 7.56 (1H, m), 7.40 (1H, m), 7.38 (1H, m), 7.42 (1H, d), 3.07 (2H, q), 1.40 (3H, t).

Compound of the present invention IIA-22: $^1$H-NMR ($CDCl_3$) δ: 7.84 (1H, d), 7.58 (1H, m), 7.54 (1H, m), 7.33 (1H, m), 7.42 (1H, d), 3.07 (2H, q), 1.40 (3H, t).

Compound of the present invention IIA-23: $^1$H-NMR ($CDCl_3$) δ: 7.92 (1H, t), 7.77 (1H, t), 7.05-6.99 (2H, m), 6.41 (1H, d), 3.04 (2H, q), 2.38 (3H, s), 1.38 (3H, t).

Compound of the present invention IIA-24: $^1$H-NMR ($CDCl_3$) δ: 7.86 (1H, d), 7.76 (1H, m), 7.48 (1H, m), 7.23 (1H, m), 7.42 (1H, d), 3.07 (2H, q), 1.40 (3H, t).

Compound of the present invention IIA-25: $^1$H-NMR ($CDCl_3$) δ: 7.96-7.88 (2H, m), 7.26-7.21 (2H, m), 6.42 (1H, d), 3.06 (2H, q), 1.39 (3H, t).

Compound of the present invention IIA-26: $^1$H-NMR ($CDCl_3$) δ: 7.84 (1H, d), 7.58 (2H, d), 7.28 (2H, d), 6.41 (1H, d), 3.04 (2H, m), 2.99-2.89 (1H, m), 1.38 (3H, t), 1.27 (6H, d).

Compound of the present invention IIA-27: $^1$H-NMR ($CDCl_3$) δ: 7.85 (1H, d), 7.56 (2H, d), 7.18 (2H, d), 6.41 (1H, d), 3.04 (2H, q), 2.51 (2H, s), 1.38 (3H, t), 1.34 (9H, s).

Compound of the present invention IIA-29: $^1$H-NMR ($CDCl_3$) δ: 7.80 (1H, d), 7.31 (1H, d), 7.08 (1H, dd), 6.89 (1H, d), 6.42 (1H, d), 3.95 (3H, s), 3.91 (3H, s), 3.02 (2H, q), 1.38 (3H, t).

Compound of the present invention IIA-30: $^1$H-NMR ($CDCl_3$) δ: 7.76 (1H, d), 7.45 (1H, m), 7.40 (1H, m), 6.84 (1H, d), 6.39 (1H, d), 3.85 (3H, s), 3.01 (2H, q), 2.26 (3H, s), 1.37 (3H, t).

TABLE IIA1-2

| Compound of the present invention | Z | $R^1$ | $R^2$ | $R^3$ | $R^4$ | $R^5$ | $R^6$ | $R^7$ |
|---|---|---|---|---|---|---|---|---|
| IIA-31 | Et | H | F | Me | H | H | H | H |
| IIA-32 | Et | H | F | OMe | H | H | H | H |
| IIA-33 | Et | H | F | $CF_3$ | H | H | H | H |
| IIA-34 | Et | H | F | F | F | H | H | H |
| IIA-35 | Et | H | F | Cl | F | H | H | H |
| IIA-36 | Et | H | F | Me | F | H | H | H |
| IIA-37 | Et | H | F | H | F | H | H | H |
| IIA-38 | Et | H | F | $CF_3$ | F | H | H | H |
| IIA-39 | Et | H | F | OMe | F | H | H | H |
| IIA-40 | Pr | H | H | Cl | H | H | H | H |
| IIA-41 | Pr | H | H | Me | H | H | H | H |
| IIA-42 | Pr | H | H | t-Bu | H | H | H | H |
| IIA-43 | Pr | H | F | Me | H | H | H | H |
| IIA-44 | Pr | H | F | Cl | H | H | H | H |
| IIA-45 | Pr | H | F | $CF_3$ | H | H | H | H |
| IIA-46 | Pr | H | F | Me | F | H | H | H |
| IIA-47 | Pr | H | F | Cl | F | H | H | H |
| IIA-48 | Pr | H | F | $CF_3$ | F | H | H | H |
| IIA-49 | Pr | H | H | $CF_3$ | H | H | H | H |
| IIA-50 | i-Pr | H | H | Cl | H | H | H | H |
| IIA-51 | Bu | H | H | Cl | H | H | H | H |
| IIA-52 | i-Bu | H | H | Cl | H | H | H | H |
| IIA-53 | Pen | H | H | Cl | H | H | H | H |
| IIA-54 | i-Pen | H | H | Cl | H | H | H | H |
| IIA-55 | c-Hex | H | H | Cl | H | H | H | H |
| IIA-56 | Allyl | H | H | Cl | H | H | H | H |
| IIA-57 | 2-Py | H | H | Cl | H | H | H | H |
| IIA-58 | 4-Py | H | H | Cl | H | H | H | H |
| IIA-59 | Pr | H | $OCH_2Ph$ | H | H | H | H | H |
| IIA-149 | Pr | H | H | $NO_2$ | H | H | H | H |
| IIA-150 | Pr | H | $NO_2$ | H | H | H | H | H |
| IIA-151 | Pr | H | H | Cl | H | H | H | F |

Compound of the present invention IIA-31: $^1$H-NMR ($CDCl_3$) δ: 7.82 (1H, d), 7.39 (1H, m), 7.32 (1H, m), 7.21 (1H, m), 6.40 (1H, d), 3.05 (2H, q), 2.29 (3H, d), 1.39 (3H, t).

Compound of the present invention IIA-32: $^1$H-NMR ($CDCl_3$) δ: 7.77 (1H, d), 7.47 (1H, m), 7.35 (1H, m), 7.00 (1H, m), 6.38 (1H, d), 3.92 (3H, s), 3.03 (2H, q), 1.38 (3H, t).

Compound of the present invention IIA-33: $^1$H-NMR ($CDCl_3$) δ: 8.07 (1H, d), 7.76 (1H, m), 7.70 (1H, m), 7.63 (1H, m), 7.06 (1H, d), 3.37 (2H, q), 1.41 (3H, t).

Compound of the present invention IIA-34: $^1$H-NMR ($CDCl_3$) δ: 7.78 (1H, d), 7.34 (2H, m), 6.42 (1H, d), 3.07 (2H, q), 1.40 (3H, t).

Compound of the present invention IIA-35: $^1$H-NMR ($CDCl_3$) δ: 7.81 (1H, d), 7.35 (2H, m), 6.41 (1H, d), 3.08 (2H, q), 1.40 (3H, t).

Compound of the present invention IIA-36: $^1$H-NMR ($CDCl_3$) δ: 7.80 (1H, d), 7.20 (2H, m), 6.40 (1H, d), 3.06 (2H, q), 2.19 (3H, t), 1.40 (3H, t).

Compound of the present invention IIA-37: $^1$H-NMR ($CDCl_3$) δ: 7.83 (1H, d), 7.24 (2H, m), 6.96 (1H, m), 6.42 (1H, d), 3.08 (2H, q), 1.40 (3H, t).

Compound of the present invention IIA-38: $^1$H-NMR ($CDCl_3$) δ: 7.86 (1H, d), 7.34 (2H, m), 6.44 (1H, d), 3.11 (2H, q), 1.42 (3H, t).

Compound of the present invention IIA-39: $^1$H-NMR ($CDCl_3$) δ: 7.76 (1H, d), 7.26 (2H, m), 6.40 (1H, d), 4.00 (3H, m), 3.06 (2H, q), 1.39 (3H, t).

Compound of the present invention IIA-40: $^1$H-NMR ($CDCl_3$) δ: 7.83 (1H, d), 7.60 (2H, m), 7.39 (2H, m), 6.40 (1H, d), 3.01 (2H, t), 1.75 (2H, m), 1.04 (3H, t).

Compound of the present invention IIA-41: $^1$H-NMR ($CDCl_3$) δ: 7.82 (1H, d), 7.54 (2H, m), 7.23 (2H, m), 6.39 (1H, d), 3.00 (2H, t), 2.37 (3H, s), 1.79-1.70 (2H, m), 1.04 (3H, t).

Compound of the present invention IIA-42: $^1$H-NMR ($CDCl_3$) δ: 7.83 (1H, d), 7.58 (2H, m), 7.44 (2H, m), 6.39 (1H, d), 3.00 (2H, dd), 1.75 (2H, m), 1.34 (9H, s), 1.04 (3H, t).

Compound of the present invention IIA-43: $^1$H-NMR ($CDCl_3$) δ: 7.81 (1H, d), 7.39 (1H, dd), 7.31 (1H, dd), 7.24-7.19 (1H, m), 6.39 (1H, d), 3.01 (2H, t), 2.29 (3H, s), 1.80-1.71 (2H, m), 1.04 (3H, t).

Compound of the present invention IIA-44: $^1$H-NMR ($CDCl_3$) δ: 7.83 (1H, d), 7.55 (1H, m), 7.47-7.36 (2H, m), 6.41 (1H, d), 3.03 (2H, dd), 1.76 (2H, m), 1.05 (3H, t).

Compound of the present invention IIA-45: $^1$H-NMR ($CDCl_3$) δ: 7.90 (1H, d), 7.65 (1H, m), 7.60 (1H, m), 7.50 (1H, m), 6.43 (1H, d), 3.07 (2H, dd), 1.78 (2H, m), 1.06 (3H, t).

Compound of the present invention IIA-46: $^1$H-NMR ($CDCl_3$) δ: 7.79 (1H, d), 7.19 (2H, m), 6.39 (1H, d), 3.03 (2H, t), 2.19 (3H, s), 1.76 (2H, m), 1.05 (3H, t).

Compound of the present invention IIA-47: $^1$H-NMR ($CDCl_3$) δ: 7.81 (1H, d), 7.34 (2H, m), 6.41 (1H, d), 3.05 (2H, t), 1.77 (2H, m), 1.05 (3H, t).

Compound of the present invention IIA-48: $^1$H-NMR ($CDCl_3$) δ: 7.85 (1H, d), 7.34 (2H, m), 6.44 (1H, d), 3.08 (2H, t), 1.78 (2H, m), 1.06 (3H, t).

Compound of the present invention IIA-49: $^1$H-NMR ($CDCl_3$) δ: 7.93 (1H, d), 7.79 (2H, d), 7.69 (2H, d), 6.44 (1H, d), 3.05 (2H, t), 1.77 (2H, m), 1.05 (3H, t).

Compound of the present invention IIA-50: $^1$H-NMR ($CDCl_3$) δ: 7.85 (1H, d), 7.63 (2H, m), 7.40 (2H, m), 6.46 (1H, d), 3.52 (1H, m), 1.37 (6H, d).

Compound of the present invention IIA-51: $^1$H-NMR ($CDCl_3$) δ: 7.83 (1H, d), 7.61 (2H, m), 7.40 (2H, m), 6.41 (1H, d), 3.04 (2H, t), 1.71 (2H, m), 1.48 (2H, m), 0.94 (3H, t).

Compound of the present invention IIA-52: $^1$H-NMR ($CDCl_3$) δ: 7.83 (1H, d), 7.61 (2H, m), 7.40 (2H, m), 6.39 (1H, d), 2.95 (2H, d), 1.97 (1H, m), 1.05 (6H, d).

Compound of the present invention IIA-53: $^1$H-NMR ($CDCl_3$) δ: 7.83 (1H, d), 7.61 (2H, m), 7.40 (2H, m), 6.41 (1H, d), 3.03 (2H, t), 1.73 (2H, m), 1.47-1.30 (4H, m), 0.90 (3H, t).

Compound of the present invention IIA-54: $^1$H-NMR ($CDCl_3$) δ: 7.84 (1H, d), 7.61 (2H, m), 7.40 (2H, m), 6.40 (1H, d), 3.05 (2H, m), 1.75 (1H, m), 1.61 (2H, m), 0.93 (6H, d).

Compound of the present invention IIA-55: $^1$H-NMR ($CDCl_3$) δ: 7.84 (1H, d), 7.63 (2H, m), 7.41 (2H, m), 6.45 (1H, d), 3.26 (1H, m), 2.69 (2H, m), 1.79 (2H, m), 1.61-1.24 (6H, m).

Compound of the present invention IIA-56: $^1$H-NMR ($CDCl_3$) δ: 7.83 (1H, d), 7.61 (2H, m), 7.40 (2H, m), 6.43 (1H, d), 5.98 (1H, m), 5.20 (1H, m), 5.10 (1H, m), 3.67 (2H, m).

Compound of the present invention IIA-57: $^1$H-NMR ($CDCl_3$) δ: 8.44 (1H, m), 8.00 (1H, d), 7.69 (2H, m), 7.50 (1H, m), 7.44 (2H, m), 7.12 (1H, d), 7.03 (1H, m), 6.72 (1H, d).

Compound of the present invention IIA-58: $^1$H-NMR ($CDCl_3$) δ: 8.39 (2H, m), 8.02 (1H, d), 7.69 (2H, m), 7.46 (2H, m), 7.10 (2H, m), 6.68 (1H, d).

Compound of the present invention IIA-59: $^1$H-NMR (DMSO-$D_6$) δ: 8.52 (1H, d), 7.49-7.32 (8H, m), 6.96-6.92 (1H, m), 6.55 (1H, d), 5.18 (2H, s), 3.00 (2H, t), 1.71-1.62 (2H, m), 0.98 (3H, t).

Compound of the present invention IIA-149: $^1$H-NMR ($CDCl_3$) δ: 8.32 (2H, m), 7.97 (1H, d), 7.83 (2H, m), 6.46 (1H, d), 3.08 (2H, t), 1.79 (2H, m), 1.07 (3H, t).

Compound of the present invention IIA-150: $^1$H-NMR ($CDCl_3$) δ: 8.51 (1H, m), 8.10 (1H, m), 8.05 (1H, m), 7.97 (1H, d), 7.62 (1H, t), 6.46 (1H, d), 3.07 (2H, t), 1.78 (2H, m), 1.07 (3H, t).

Compound of the present invention IIA-151: $^1$H-NMR ($CDCl_3$) δ: 7.76 (1H, d), 7.56 (2H, m), 7.41 (2H, m), 2.97 (2H, t), 1.72 (2H, m), 1.04 (3H, t).

TABLE IA1

| Present compound | Z | $R^1$ | $R^2$ | $R^3$ | $R^4$ | $R^5$ | $R^6$ | $R^7$ |
|---|---|---|---|---|---|---|---|---|
| IA-1 | Me | H | H | Cl | H | H | H | H |
| IA-2 | Ph | H | H | Cl | H | H | H | H |
| IA-3 | Ph | H | F | Cl | H | H | H | H |
| IA-4 | Ph | H | H | OMe | H | H | H | H |
| IA-5 | 4-(OMe)—Ph | H | H | Cl | H | H | H | H |
| IA-6 | 4-Cl—Ph | H | H | Cl | H | H | H | H |
| IA-7 | 2-(OMe)—Ph | H | H | Cl | H | H | H | H |
| IA-8 | 2-Cl—Ph | H | H | Cl | H | H | H | H |

Present compound IA-1: $^1$H-NMR ($CDCl_3$) δ: 7.84 (1H, d), 7.61 (2H, m), 7.40 (2H, m), 6.39 (1H, d), 2.59 (3H, s).

Present compound IA-2: $^1$H-NMR ($CDCl_3$) δ: 7.88 (1H, d), 7.65 (2H, m), 7.44-7.39 (4H, m), 7.31-7.20 (3H, m), 6.45 (1H, d).

Present compound IA-3: $^1$H-NMR ($CDCl_3$) δ: 7.88 (1H, d), 7.58 (1H, m), 7.49-7.40 (4H, m), 7.33-7.23 (3H, m), 6.43 (1H, d).

Present compound IA-4: $^1$H-NMR ($CDCl_3$) δ: 7.84 (1H, d), 7.61 (2H, m), 7.38 (2H, m), 7.27 (2H, m), 7.19 (1H, m), 6.97 (2H, m), 6.46 (1H, d), 3.85 (3H, s).

Present compound IA-5: $^1$H-NMR ($CDCl_3$) δ: 7.81 (1H, d), 7.62 (2H, m), 7.47 (2H, m), 7.40 (2H, m), 6.87 (2H, m), 6.27 (1H, d), 3.81 (3H, s).

Present compound IA-6: $^1$H-NMR ($CDCl_3$) δ: 7.90 (1H, d), 7.64 (2H, m), 7.43 (2H, m), 7.33 (2H, m), 7.26 (2H, m), 6.46 (1H, d).

Present compound IA-7: $^1$H-NMR ($CDCl_3$) δ: 7.90 (1H, d), 7.66 (2H, m), 7.41 (2H, m), 7.26-7.14 (2H, m), 6.90-6.83 (2H, m), 6.48 (1H, d), 3.90 (3H, s).

Present compound IA-8: $^1$H-NMR ($CDCl_3$) δ: 7.97 (1H, d), 7.67 (2H, m), 7.43 (2H, m), 7.37 (1H, m), 7.14-7.07 (3H, m), 6.58 (1H, d).

Preparation Example 2

A mixture of the Intermediate compound MA3-1 (1.0 g), sodium ethanethiolate (1.0 g), and DMF (10 mL) was stirred at 120° C. for 5 hours. To the resulting mixture was added sodium hydrogen carbonate water, and the resulting mixture was extracted with ethyl acetate. The resulting organic layer was dried over sodium sulfate, and concentrated under reduced pressure to give a crude product of the Compound of the present invention IIA-60 represented by the following formula (1.3 g).

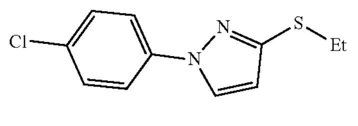 [SMILES: CCSc1ccn(-c2ccc(Cl)cc2)n1]

Compound of the present invention IIA-60: $^1$H-NMR ($CDCl_3$) δ: 7.84 (1H, d), 7.61 (2H, m), 7.40 (2H, m), 6.42 (1H, d), 3.05 (2H, q), 1.39 (3H, t).

Preparation Example 3

To a mixture of the Compound of the present invention IIA-37 (0.27 g) and THF (10 mL) was added dropwise butyllithium (2.6 M solution in hexane) (0.58 mL) at −78° C., and the resulting mixture was stirred at −78° C. for 30 minutes. To the resulting mixture was added 1,2-dibromo-1,1,2,2-tetrachloroethane (0.65 g), the resulting mixture was stirred for 30 minutes, and then stirred at room temperature for 4 hours. To the resulting mixture was added an aqueous solution of ammonium chloride, and the resulting mixture was extracted with ethyl acetate. The resulting organic layer was washed with saturated brine, dried over magnesium sulfate, and concentrated under reduced pressure. The resulting residue was subjected to silica gel column chromatography (hexane:ethyl acetate=98:2) to give the Compound of the present invention IIA-61 represented by the following formula (0.16 g).

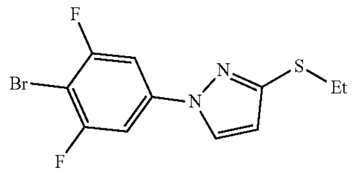 [SMILES: CCSc1ccn(-c2cc(F)c(Br)c(F)c2)n1]

Compound of the present invention IIA-61: $^1$H-NMR ($CDCl_3$) δ: 7.83 (1H, d), 7.33 (2H, m), 6.42 (1H, d), 3.08 (2H, q), 1.41 (3H, t).

Preparation Example 4

To a mixture of the Compound of the present invention IIA-1 (0.22 g) and chloroform (5 mL) was added mCPBA (purity: 75%, water content: 25%) (0.25 g) at 0° C., and the resulting mixture was stirred at 0° C. for 2 hours. To the resulting mixture was added an aqueous solution of sodium sulfite, and the resulting mixture was extracted with chloroform. The resulting organic layer was washed with sodium hydrogen carbonate water, dried over magnesium sulfate, and concentrated under reduced pressure. The resulting residue was subjected to silica gel column chromatography (hexane:ethyl acetate=50:50) to give the Compound of the present invention IIA-62 represented by the following formula (0.21 g).

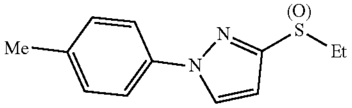

Compound of the present invention IIA-62: $^1$H-NMR ($CDCl_3$) δ: 7.97 (1H, d), 7.56 (2H, m), 7.27 (2H, m), 6.93 (1H, d), 3.21-3.06 (2H, m), 2.40 (3H, s), 1.33 (3H, t).

Preparation Example 4-1

The compounds prepared according to the Preparation Example 4 and the physical properties thereof are shown below.

A compound represented by formula (A2)

(A2)

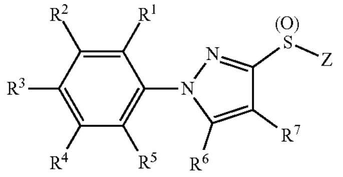

wherein the combination of Z, $R^1$, $R^2$, $R^3$, $R^4$, $R^5$, $R^6$, and $R^7$ represents any one combination indicated in Table IIA2 and Table IA2.

TABLE IIA2

| Compound of the present invention | Z | $R^1$ | $R^2$ | $R^3$ | $R^4$ | $R^5$ | $R^6$ | $R^7$ |
|---|---|---|---|---|---|---|---|---|
| IIA-63 | Et | H | H | $CF_3$ | H | H | H | H |
| IIA-64 | Et | F | H | H | H | H | H | H |

Compound of the present invention IIA-63: $^1$H-NMR ($CDCl_3$) δ: 8.10 (1H, d), 7.84 (2H, m), 7.75 (2H, m), 7.01 (1H, d), 3.15 (2H, m), 1.35 (3H, t).

Compound of the present invention IIA-64: $^1$H-NMR ($CDCl_3$) δ: 8.02 (1H, d), 7.51-7.40 (3H, m), 7.10-7.02 (1H, m), 6.98 (1H, d), 3.14 (2H, m), 1.34 (3H, t).

TABLE IA2

| Present compound | Z | $R^1$ | $R^2$ | $R^3$ | $R^4$ | $R^5$ | $R^6$ | $R^7$ |
|---|---|---|---|---|---|---|---|---|
| IA-9 | 2-(OMe)—Ph | H | H | Cl | H | H | H | H |
| IA-10 | 2-Cl—Ph | H | H | Cl | H | H | H | H |

Present compound IA-9: $^1$H-NMR ($CDCl_3$) δ: 8.20 (1H, m), 7.92 (1H, d), 7.64-7.55 (3H, m), 7.41 (2H, m), 7.15-7.90 (2H, m), 6.96 (1H, d), 3.85 (3H, s).

Present compound IA-10: $^1$H-NMR ($CDCl_3$) δ: 0.18 (1H, m), 7.87 (1H, d), 7.65-7.56 (3H, m), 7.50-7.38 (4H, m), 6.47 (1H, d).

Preparation Example 5

To a mixture of the Compound of the present invention IIA-1 (0.22 g) and chloroform (5 mL) was added mCPBA (purity: 75%, water content: 25%) (0.54 g) at 0° C., and the resulting mixture was stirred at room temperature for 4 hours. To the resulting mixture was added an aqueous solution of sodium sulfite, and the resulting mixture was extracted with chloroform. The resulting organic layer was washed with sodium hydrogen carbonate water, dried over magnesium sulfate, and concentrated under reduced pressure. The resulting residue was subjected to silica gel column chromatography (hexane:ethyl acetate=80:20) to give the Compound of the present invention IIA-65 represented by the following formula (0.25 g).

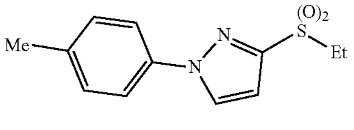

Compound of the present invention IIA-65: $^1$H-NMR ($CDCl_3$) δ: 7.95 (1H, d), 7.60 (2H, m), 7.29 (2H, m), 6.98 (1H, d), 3.35 (2H, q), 2.41 (3H, s), 1.39 (3H, t).

Preparation Example 5-1

The compounds prepared according to the Preparation Example 5 and the physical properties thereof are shown below.

A compound represented by formula (A3)

(A3)

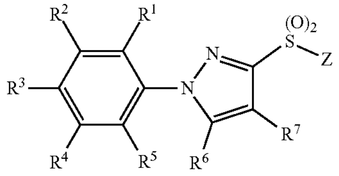

wherein the combination of Z, $R^1$, $R^2$, $R^3$, $R^4$, $R^5$, $R^6$, and $R^7$ represents any one combination indicated in Table IIA3-1, Table IIA3-2, Table IIA3-3, Table IIA3-4, Table IIA3-5, and Table IA3.

TABLE IIA3-1

| Compound of the present invention | Z | $R^1$ | $R^2$ | $R^3$ | $R^4$ | $R^5$ | $R^6$ | $R^7$ |
|---|---|---|---|---|---|---|---|---|
| IIA-66 | Et | H | H | $CF_3$ | H | H | H | H |
| IIA-67 | Et | H | H | OMe | H | H | H | H |
| IIA-68 | Et | H | H | H | H | H | H | H |
| IIA-69 | Et | H | H | F | H | H | H | H |
| IIA-70 | Et | H | H | CN | H | H | H | H |
| IIA-71 | Et | H | H | $OCF_3$ | H | H | H | H |
| IIA-72 | Et | H | H | Br | H | H | H | H |
| IIA-73 | Et | H | H | I | H | H | H | H |
| IIA-74 | Et | H | Cl | H | H | H | H | H |
| IIA-75 | Et | H | OMe | H | H | H | H | H |
| IIA-76 | Et | Cl | H | H | H | H | H | H |
| IIA-77 | Et | OMe | H | H | H | H | H | H |
| IIA-78 | Et | H | F | H | H | H | H | H |
| IIA-79 | Et | H | Cl | Cl | H | H | H | H |
| IIA-80 | Et | F | H | H | H | H | H | H |
| IIA-81 | Et | H | Cl | H | Cl | H | H | H |
| IIA-82 | Et | Et | H | H | H | H | H | H |
| IIA-83 | Et | H | Ph | H | H | H | H | H |
| IIA-84 | Et | Me | H | H | Me | H | H | H |
| IIA-85 | Et | H | F | Cl | H | H | H | H |

TABLE IIA3-1-continued

| Compound of the present invention | Z | $R^1$ | $R^2$ | $R^3$ | $R^4$ | $R^5$ | $R^6$ | $R^7$ |
|---|---|---|---|---|---|---|---|---|
| IIA-86 | Et | H | F | Br | H | H | H | H |
| IIA-87 | Et | F | H | Me | H | H | H | H |
| IIA-88 | Et | F | H | I | H | H | H | H |
| IIA-89 | Et | F | H | Cl | H | H | H | H |
| IIA-90 | Et | H | H | i-Pr | H | H | H | H |
| IIA-91 | Et | H | H | neo-Pen | H | H | H | H |
| IIA-92 | Pr | H | H | c-Pr | H | H | H | H |
| IIA-93 | Et | H | OMe | OMe | H | H | H | H |
| IIA-94 | Et | H | Me | OMe | H | H | H | H |

Compound of the present invention IIA-66: $^1$H-NMR ($CDCl_3$) δ: 8.10 (1H, d), 7.89 (2H, m), 7.72 (2H, m), 7.04 (1H, d), 3.37 (2H, q), 1.41 (3H, t).

Compound of the present invention IIA-67: $^1$H-NMR ($CDCl_3$) δ: 7.90 (1H, d), 7.62 (2H, m), 7.01-6.95 (3H, m), 3.86 (3H, s), 3.34 (2H, q), 1.39 (3H, t).

Compound of the present invention IIA-68: $^1$H-NMR ($CDCl_3$) δ: 8.01 (1H, d), 7.73 (2H, m), 7.51 (2H, m), 7.41 (1H, m), 7.00 (1H, d), 3.36 (2H, q), 1.40 (3H, t).

Compound of the present invention IIA-69: $^1$H-NMR ($CDCl_3$) δ: 7.96 (1H, d), 7.71 (2H, m), 7.20 (2H, m), 6.99 (1H, d), 3.35 (2H, q), 1.40 (3H, t).

Compound of the present invention IIA-70: $^1$H-NMR ($CDCl_3$) δ: 8.09 (1H, d), 7.90 (2H, m), 7.82 (2H, m), 7.06 (1H, d), 3.37 (2H, q), 1.41 (3H, t).

Compound of the present invention IIA-71: $^1$H-NMR ($CDCl_3$) δ: 8.00 (1H, d), 7.78 (2H, m), 7.36 (2H, m), 7.02 (1H, d), 3.36 (2H, q), 1.40 (3H, t).

Compound of the present invention IIA-72: $^1$H-NMR ($CDCl_3$) δ: 7.98 (1H, d), 7.63 (4H, s), 7.01 (1H, d), 3.35 (2H, q), 1.40 (3H, t).

Compound of the present invention IIA-73: $^1$H-NMR ($CDCl_3$) δ: 7.99 (1H, d), 7.82 (2H, m), 7.49 (2H, m), 7.00 (1H, d), 3.35 (2H, q), 1.40 (3H, t).

Compound of the present invention IIA-74: $^1$H-NMR ($CDCl_3$) δ: δ: 8.01 (1H, d), 7.81 (1H, m), 7.62 (1H, m), 7.44 (1H, m), 7.38 (1H, m), 7.01 (1H, d), 3.36 (2H, q), 1.40 (3H, t).

Compound of the present invention IIA-75: $^1$H-NMR ($CDCl_3$) δ: 7.99 (1H, d), 7.39 (1H, t), 7.31 (1H, m), 7.26 (1H, m), 6.99 (1H, d), 6.94 (1H, m), 3.89 (3H, s), 3.36 (2H, q), 1.40 (3H, t).

Compound of the present invention IIA-76: $^1$H-NMR ($CDCl_3$) δ: 7.92 (1H, d), 7.63-7.54 (2H, m), 7.47-7.41 (2H, m), 6.99 (1H, d), 3.36 (2H, q), 1.40 (3H, t).

Compound of the present invention IIA-77: $^1$H-NMR ($CDCl_3$) δ: 8.11 (1H, d), 7.75 (1H, m), 7.39 (1H, m), 7.09 (2H, m), 6.94 (1H, d), 3.91 (3H, s), 3.35 (2H, q), 1.39 (3H, t).

Compound of the present invention IIA-78: $^1$H-NMR ($CDCl_3$) δ: 8.00 (1H, d), 7.51 (3H, m), 7.11 (1H, m), 7.01 (1H, d), 3.36 (2H, q), 1.41 (3H, t).

Compound of the present invention IIA-79: $^1$H-NMR ($CDCl_3$) δ: 7.99 (1H, d), 7.91 (1H, m), 7.59 (2H, m), 7.02 (1H, d), 3.36 (2H, q), 1.40 (3H, t).

Compound of the present invention IIA-80: $^1$H-NMR ($CDCl_3$) δ: 8.08 (1H, t), 7.91 (1H, m), 7.40 (1H, m), 7.33-7.25 (2H, m), 7.00 (1H, d), 3.36 (2H, q), 1.40 (3H, t).

Compound of the present invention IIA-81: $^1$H-NMR ($CDCl_3$) δ: 8.00 (1H, d), 7.68 (2H, d), 7.39 (1H, t), 7.02 (1H, d), 3.36 (2H, q), 1.40 (3H, t).

Compound of the present invention IIA-82: $^1$H-NMR ($CDCl_3$) δ: $^1$H-NMR ($CDCl_3$) δ: 7.68 (1H, d), 7.46-7.38 (2H, m), 7.32-7.31 (2H, m), 6.98 (1H, d), 3.35 (2H, q), 2.53 (2H, q), 1.39 (3H, t), 1.11 (3H, t).

Compound of the present invention IIA-83: $^1$H-NMR ($CDCl_3$) δ: 8.06 (1H, d), 7.95 (1H, m), 7.70-7.39 (8H, m), 7.02 (1H, d), 3.38 (2H, q), 1.41 (3H, t).

Compound of the present invention IIA-84: $^1$H-NMR ($CDCl_3$) δ: 1H-NMR ($CDCl_3$) δ: 7.58 (1H, d), 7.30 (1H, t), 7.16 (2H, d), 7.01 (1H, d), 3.34 (2H, q), 2.02 (6H, s), 1.37 (3H, t).

Compound of the present invention IIA-85: $^1$H-NMR ($CDCl_3$) δ: 7.99 (1H, d), 7.63 (1H, m), 7.54 (1H, m), 7.48 (1H, m), 7.02 (1H, d), 3.36 (2H, q), 1.40 (3H, t).

Compound of the present invention IIA-86: $^1$H-NMR ($CDCl_3$) δ: 8.00 (1H, d), 7.69 (1H, dd), 7.61 (1H, dd), 7.43 (1H, m), 7.02 (1H, m), 3.60 (2H, q), 1.41 (3H, t).

Compound of the present invention IIA-87: $^1$H-NMR ($CDCl_3$) δ: 8.02 (1H, t), 7.76 (1H, m), 7.11-7.06 (2H, m), 6.98 (1H, d), 3.35 (2H, q), 2.42 (3H, s), 1.40 (3H, t).

Compound of the present invention IIA-88: $^1$H-NMR ($CDCl_3$) δ: 8.00 (1H, d), 7.87 (1H, dd), 7.54 (1H, dd), 7.32 (1H, dd), 7.02 (1H, d), 3.36 (2H, q), 1.40 (3H, t).

Compound of the present invention IIA-89: $^1$H-NMR ($CDCl_3$) δ: 8.06 (1H, t), 7.89 (1H, m), 7.35-7.28 (2H, m), 7.01 (1H, d), 3.35 (2H, q), 1.40 (3H, t).

Compound of the present invention IIA-90: $^1$H-NMR ($CDCl_3$) δ: 7.96 (1H, d), 7.63 (2H, m), 7.35 (2H, m), 6.98 (1H, d), 3.35 (2H, q), 3.01-2.94 (1H, m), 1.39 (3H, t), 1.28 (6H, d).

Compound of the present invention IIA-91: $^1$H-NMR ($CDCl_3$) δ: 7.97 (1H, d), 7.61 (2H, m), 7.24 (2H, m), 6.98 (1H, d), 3.36 (2H, q), 2.55 (2H, s), 1.40 (3H, t), 0.92 (9H, s).

Compound of the present invention IIA-92: $^1$H-NMR ($CDCl_3$) δ: 7.93 (1H, d), 7.59 (2H, m), 7.17 (2H, m), 6.96 (1H, d), 3.30 (2H, m), 1.99-1.83 (3H, m), 1.09-1.01 (5H, m), 0.75-0.71 (2H, m).

Compound of the present invention IIA-93: $^1$H-NMR ($CDCl_3$) δ: 7.93 (1H, d), 7.31 (1H, d), 7.16 (1H, m), 6.97 (1H, d), 6.93 (1H, d), 3.97 (3H, s), 3.94 (3H, s), 3.35 (2H, q), 1.40 (3H, t).

Compound of the present invention IIA-94: $^1$H-NMR ($CDCl_3$) δ: 7.89 (1H, d), 7.50 (1H, m), 7.46 (1H, m), 6.95 (1H, d), 6.88 (1H, d), 3.88 (3H, s), 3.34 (2H, q), 2.28 (3H, s), 1.39 (3H, t).

TABLE IIA3-2

| Compound of the present invention | Z | $R^1$ | $R^2$ | $R^3$ | $R^4$ | $R^5$ | $R^6$ | $R^7$ |
|---|---|---|---|---|---|---|---|---|
| IIA-95 | Et | H | F | Me | H | H | H | H |
| IIA-96 | Et | H | F | OMe | H | H | H | H |
| IIA-97 | Et | H | F | $CF_3$ | H | H | H | H |
| IIA-98 | Et | H | F | F | F | H | H | H |
| IIA-99 | Et | H | F | Cl | F | H | H | H |
| IIA-100 | Et | H | F | Me | F | H | H | H |
| IIA-101 | Et | H | F | H | F | H | H | H |
| IIA-102 | Et | H | F | $CF_3$ | F | H | H | H |
| IIA-103 | Et | H | F | OMe | F | H | H | H |
| IIA-104 | Pr | H | H | Cl | H | H | H | H |
| IIA-105 | Pr | H | H | Me | H | H | H | H |
| IIA-106 | Pr | H | H | t-Bu | H | H | H | H |
| IIA-107 | Pr | H | F | Me | H | H | H | H |
| IIA-108 | Pr | H | F | Cl | H | H | H | H |
| IIA-109 | Pr | H | F | $CF_3$ | H | H | H | H |
| IIA-110 | Pr | H | F | Me | F | H | H | H |

TABLE IIA3-2-continued

| Compound of the present invention | Z | $R^1$ | $R^2$ | $R^3$ | $R^4$ | $R^5$ | $R^6$ | $R^7$ |
|---|---|---|---|---|---|---|---|---|
| IIA-111 | Pr | H | F | Cl | F | H | H | H |
| IIA-112 | Pr | H | F | $CF_3$ | F | H | H | H |
| IIA-113 | Pr | H | H | $CF_3$ | H | H | H | H |
| IIA-114 | i-Pr | H | H | Cl | H | H | H | H |
| IIA-115 | Bu | H | H | Cl | H | H | H | H |
| IIA-116 | i-Bu | H | H | Cl | H | H | H | H |
| IIA-117 | Pen | H | H | Cl | H | H | H | H |
| IIA-118 | i-Pen | H | H | Cl | H | H | H | H |
| IIA-119 | c-Hex | H | H | Cl | H | H | H | H |
| IIA-120 | Allyl | H | H | Cl | H | H | H | H |
| IIA-121 | 4-Py | H | H | Cl | H | H | H | H |
| IIA-122 | 2-Py | H | H | Cl | H | H | H | H |
| IIA-123 | Et | H | H | Cl | H | H | H | H |
| IIA-124 | Et | H | F | Br | F | H | H | H |

Compound of the present invention IIA-95: $^1$H-NMR ($CDCl_3$) δ: 8.01 (1H, d), 7.45 (1H, m), 7.39 (1H, m), 7.29 (1H, m), 6.97 (1H, m), 3.35 (2H, q), 2.31 (3H, s), 1.40 (3H, t).

Compound of the present invention IIA-96: $^1$H-NMR ($CDCl_3$) δ: 7.92 (1H, d), 7.52 (1H, m), 7.43 (1H, m), 7.05 (1H, t), 6.98 (1H, d), 2.95 (3H, s), 3.35 (2H, q), 1.40 (3H, t).

Compound of the present invention IIA-97: $^1$H-NMR ($CDCl_3$) δ: 8.07 (1H, d), 7.76 (1H, m), 7.70 (1H, m), 7.63 (1H, m), 7.06 (1H, d), 3.37 (2H, q), 1.41 (3H, t).

Compound of the present invention IIA-98: $^1$H-NMR ($CDCl_3$) δ: 7.95 (1H, d), 7.44 (2H, m), 7.02 (1H, d), 3.35 (2H, q), 1.40 (3H, t).

Compound of the present invention IIA-99: $^1$H-NMR ($CDCl_3$) δ: 7.99 (1H, d), 7.46 (2H, m), 7.03 (1H, d), 3.36 (2H, q), 1.41 (3H, t).

Compound of the present invention IIA-100: $^1$H-NMR ($CDCl_3$) δ: 7.95 (1H, d), 7.29 (2H, m), 7.00 (1H, d), 3.51 (2H, q), 2.24 (3H, t), 1.40 (3H, t).

Compound of the present invention IIA-101: $^1$H-NMR ($CDCl_3$) δ: 8.00 (1H, d), 7.33 (2H, m), 7.02 (1H, d), 6.86 (1H, m), 3.36 (2H, q), 1.41 (3H, t).

Compound of the present invention IIA-102: $^1$H-NMR ($CDCl_3$) δ: 8.05 (1H, d), 7.48 (2H, m), 7.07 (1H, d), 3.37 (2H, q), 1.41 (3H, t).

Compound of the present invention IIA-103: $^1$H-NMR ($CDCl_3$) δ: 7.92 (1H, d), 7.34 (2H, m), 7.00 (1H, d), 4.05 (3H, t), 3.35 (2H, q), 1.40 (3H, t).

Compound of the present invention IIA-104: $^1$H-NMR ($CDCl_3$) δ: 7.97 (1H, d), 7.68 (2H, m), 7.48 (2H, m), 7.00 (1H, d), 3.30 (2H, m), 1.89 (2H, m), 1.06 (3H, t).

Compound of the present invention IIA-105: $^1$H-NMR ($CDCl_3$) δ: 7.94 (1H, d), 7.60 (2H, m), 7.30-7.28 (2H, m), 6.97 (1H, d), 3.31 (2H, m), 2.41 (3H, s), 1.89 (2H, m), 1.04 (3H, t).

Compound of the present invention IIA-106: $^1$H-NMR ($CDCl_3$) δ: 7.95 (1H, d), 7.64 (2H, m), 7.50 (2H, m), 6.97 (1H, d), 3.31 (2H, m), 1.88 (2H, m), 1.36 (9H, s), 1.05 (3H, t).

Compound of the present invention IIA-107: $^1$H-NMR ($CDCl_3$) δ: 7.95 (1H, d), 7.45 (1H, m), 7.39 (1H, m), 7.30 (1H, m), 6.98 (1H, d), 3.31 (2H, m), 2.33 (3H, s), 1.89 (2H, m), 1.06 (3H, t).

Compound of the present invention IIA-108: $^1$H-NMR ($CDCl_3$) δ: 7.98 (1H, d), 7.63 (1H, m), 7.56-7.46 (2H, m), 7.01 (1H, d), 3.31 (2H, m), 1.89 (2H, m), 1.07 (3H, t).

Compound of the present invention IIA-109: $^1$H-NMR ($CDCl_3$) δ: 8.07 (1H, d), 7.76 (1H, m), 7.70 (1H, m), 7.63 (1H, m), 7.04 (1H, d), 3.32 (2H, m), 1.90 (2H, m), 1.07 (3H, t).

Compound of the present invention IIA-110: $^1$H-NMR ($CDCl_3$) δ: 7.94 (1H, d), 7.29 (2H, m), 6.99 (1H, d), 3.31 (2H, m), 2.24 (3H, t), 1.89 (2H, m), 1.06 (3H, t).

Compound of the present invention IIA-ill: $^1$H-NMR ($CDCl_3$) δ: 7.99 (1H, d), 7.46 (2H, m), 7.02 (1H, d), 3.31 (2H, m), 1.89 (2H, m), 1.07 (3H, t).

Compound of the present invention IIA-112: $^1$H-NMR ($CDCl_3$) δ: 8.04 (1H, d), 7.48 (2H, m), 7.06 (1H, d), 3.32 (2H, m), 1.89 (2H, m), 1.08 (3H, t).

Compound of the present invention IIA-113: $^1$H-NMR ($CDCl_3$) δ: 8.07 (1H, d), 7.89 (2H, m), 7.78 (2H, m), 7.40 (1H, d), 3.32 (2H, m), 8.90 (2H, m), 1.07 (3H, t).

Compound of the present invention IIA-114: $^1$H-NMR ($CDCl_3$) δ: 7.99 (1H, d), 7.69 (2H, m), 7.47 (2H, m), 7.00 (1H, d), 3.45 (1H, m), 1.41 (6H, d).

Compound of the present invention IIA-115: $^1$H-NMR ($CDCl_3$) δ: 7.97 (1H, d), 7.68 (2H, m), 7.48 (2H, m), 7.00 (1H, d), 3.33 (2H, m), 1.83 (2H, m), 1.46 (2H, m), 0.93 (3H, t).

Compound of the present invention IIA-116: $^1$H-NMR ($CDCl_3$) δ: 7.96 (1H, d), 7.68 (2H, m), 7.48 (2H, m), 7.00 (1H, d), 3.25 (2H, d), 2.39 (1H, m), 1.11 (6H, d).

Compound of the present invention IIA-117: $^1$H-NMR ($CDCl_3$) δ: 7.97 (1H, d), 7.68 (2H, m), 7.48 (2H, m), 7.00 (1H, d), 3.32 (2H, m), 1.85 (2H, m), 1.44-1.28 (4H, m), 0.89 (3H, t).

Compound of the present invention IIA-118: $^1$H-NMR ($CDCl_3$) δ: 7.97 (1H, d), 7.68 (2H, m), 7.48 (2H, m), 7.00 (1H, d), 3.33 (2H, m), 1.77-1.66 (3H, m), 0.92 (6H, d).

Compound of the present invention IIA-119: $^1$H-NMR ($CDCl_3$) δ: 7.97 (1H, d), 7.69 (2H, m), 7.48 (2H, m), 6.98 (1H, d), 3.17 (1H, m), 2.18 (2H, m), 1.90 (2H, m), 1.73-1.13 (6H, m).

Compound of the present invention IIA-120: $^1$H-NMR ($CDCl_3$) δ: 7.96 (1H, d), 7.68 (2H, m), 7.48 (2H, m), 6.97 (1H, d), 5.90 (1H, m), 5.41 (1H, dd), 5.32 (1H, d), 4.05 (2H, d).

Compound of the present invention IIA-121: $^1$H-NMR ($CDCl_3$) δ: 8.88 (2H, m), 7.95-7.91 (3H, m), 7.62 (2H, m), 7.45 (2H, m), 7.05 (1H, d).

Compound of the present invention IIA-122: $^1$H-NMR ($CDCl_3$) δ: 8.72 (1H, m), 8.31 (1H, d), 8.00-7.95 (2H, m), 7.63 (2H, m), 7.51 (1H, m), 7.43 (2H, m), 7.19 (1H, d).

Compound of the present invention IIA-123: $^1$H-NMR ($CDCl_3$) δ: 7.98 (1H, d), 7.68 (2H, m), 7.48 (2H, m), 7.01 (1H, d), 3.35 (2H, q), 1.40 (3H, t).

Compound of the present invention IIA-124: $^1$H-NMR ($CDCl_3$) δ: 8.01 (1H, d), 7.43 (2H, m), 7.03 (1H, d), 3.36 (2H, q), 1.41 (3H, t).

TABLE IIA3-3

| Compound of the present invention | Z | $R^1$ | $R^2$ | $R^3$ | $R^4$ | $R^5$ | $R^6$ | $R^7$ |
|---|---|---|---|---|---|---|---|---|
| IIA-125 | Pr | H | $OCH_2Ph$ | H | H | H | H | H |
| IIA-126 | Pr | H | $OCH_2$-(4-Me—Ph) | H | H | H | H | H |
| IIA-127 | Pr | H | $OCH_2$-(3-Me—Ph) | H | H | H | H | H |

TABLE IIA3-3-continued

| Compound of the present invention | Z | $R^1$ | $R^2$ | $R^3$ | $R^4$ | $R^5$ | $R^6$ | $R^7$ |
|---|---|---|---|---|---|---|---|---|
| IIA-128 | Pr | H | $OCH_2$-(2-Me—Ph) | H | H | H | H | H |
| IIA-129 | Pr | H | O(6-$CF_3$-2-Py) | H | H | H | H | H |
| IIA-130 | Pr | H | O(5-$CF_3$-2-Py) | H | H | H | H | H |
| IIA-132 | Pr | H | $OCH_2$-(3-$CF_3$—Ph) | H | H | H | H | H |
| IIA-133 | Pr | H | $OCH_2$-(3-CN—Ph) | H | H | H | H | H |
| IIA-134 | Pr | H | $OCH_2$-(3-MeO—Ph) | H | H | H | H | H |
| IIA-135 | Pr | H | OPh | H | H | H | H | H |
| IIA-136 | Pr | H | Oc-Bu | H | H | H | H | H |

Compound of the present invention IIA-125: $^1$H-NMR (DMSO-$D_6$) δ: 8.78 (1H, d), 7.56-7.33 (8H, m), 7.12-7.07 (2H, m), 5.21 (2H, s), 3.41-3.37 (2H, m), 1.73-1.64 (2H, m), 0.96 (3H, t).

Compound of the present invention IIA-126: $^1$H-NMR (DMSO-$D_6$) δ: 8.77 (1H, d), 7.54-7.53 (1H, m), 7.48-7.47 (2H, m), 7.37 (2H, d), 7.21 (2H, d), 7.09-7.06 (2H, m), 5.16 (2H, s), 3.40-3.37 (2H, m), 2.31 (3H, s), 1.73-1.64 (2H, m), 0.96 (3H, t).

Compound of the present invention IIA-127: $^1$H-NMR (DMSO-$D_6$) δ: 8.77 (1H, d), 7.55-7.55 (1H, m), 7.49-7.47 (2H, m), 7.30-7.26 (3H, m), 7.16 (1H, d), 7.10-7.07 (2H, m), 5.16 (2H, s), 3.40-3.35 (2H, m), 2.33 (3H, s), 1.73-1.64 (2H, m), 0.96 (3H, t).

Compound of the present invention IIA-128: $^1$H-NMR (DMSO-$D_6$) δ: 8.78 (1H, d), 7.58-7.57 (1H, m), 7.50-7.49 (2H, m), 7.45 (1H, d), 7.29-7.20 (3H, m), 7.14-7.11 (1H, m), 7.08 (1H, d), 5.19 (2H, s), 3.41-3.35 (2H, m), 2.36 (3H, s), 1.73-1.64 (2H, m), 0.96 (3H, t).

Compound of the present invention IIA-129: $^1$H-NMR (DMSO-$D_6$) δ: 8.79 (1H, d), 8.17 (1H, t), 7.85-7.82 (2H, m), 7.70-7.63 (2H, m), 7.43 (1H, d), 7.31-7.28 (1H, m), 7.09 (1H, d), 3.39-3.33 (2H, m), 1.72-1.63 (2H, m), 0.95 (3H, t).

Compound of the present invention IIA-130: $^1$H-NMR (DMSO-$D_6$) δ: 8.79 (1H, d), 8.60-8.59 (1H, m), 8.29 (1H, dd), 7.85-7.81 (2H, m), 7.66 (1H, t), 7.35 (1H, d), 7.32-7.29 (1H, m), 7.09 (1H, d), 3.40-3.32 (2H, m), 1.72-1.63 (2H, m), 0.95 (3H, t).

Compound of the present invention IIA-132: $^1$H-NMR ($CDCl_3$) δ: 7.98 (1H, d), 7.74 (1H, s), 7.63 (2H, t), 7.54 (1H, t), 7.44-7.40 (2H, m), 7.31-7.29 (1H, m), 7.02-6.98 (2H, m), 5.19 (2H, s), 3.33-3.29 (2H, m), 1.94-1.84 (2H, m), 1.06 (3H, t).

Compound of the present invention IIA-133: $^1$H-NMR ($CDCl_3$) δ: 7.99 (1H, d), 7.78 (1H, br s), 7.70-7.64 (2H, m), 7.53 (1H, t), 7.44-7.40 (2H, m), 7.32-7.29 (1H, m), 7.00-6.97 (2H, m), 5.17 (2H, s), 3.33-3.29 (2H, m), 1.94-1.84 (2H, m), 1.06 (3H, t).

Compound of the present invention IIA-134: $^1$H-NMR ($CDCl_3$) δ: 7.96 (1H, d), 7.41-7.37 (2H, m), 7.32 (1H, t), 7.29-7.26 (1H, m), 7.04-6.97 (4H, m), 6.89 (1H, dd), 5.12 (2H, s), 3.83 (3H, s), 3.33-3.29 (2H, m), 1.93-1.84 (2H, m), 1.06 (3H, t).

Compound of the present invention IIA-135: $^1$H-NMR ($CDCl_3$) δ: 7.95 (1H, d), 7.45-7.36 (5H, m), 7.20-7.15 (1H, m), 7.08-7.05 (2H, m), 7.01-6.99 (1H, m), 6.97 (1H, d), 3.32-3.28 (2H, m), 1.92-1.83 (2H, m), 1.05 (3H, t).

Compound of the present invention IIA-136: $^1$H-NMR ($CDCl_3$) δ: 7.95 (1H, d), 7.36 (1H, t), 7.26-7.23 (1H, m), 7.20 (1H, t), 6.97 (1H, d), 6.84-6.82 (1H, m), 4.75-4.68 (1H, m), 3.33-3.29 (2H, m), 2.52-2.45 (2H, m), 2.24-2.14 (2H, m), 1.94-1.84 (3H, m), 1.78-1.66 (1H, m), 1.05 (3H, t).

TABLE IIA3-4

| Compound of the present invention | Z | $R^1$ | $R^2$ | $R^3$ | $R^4$ | $R^5$ | $R^6$ | $R^7$ |
|---|---|---|---|---|---|---|---|---|
| IIA-143 | Pr | H | NHC(O)OMe | H | H | H | H | H |
| IIA-144 | Pr | H | NHC(O)OEt | H | H | H | H | H |
| IIA-145 | Pr | H | NHC(O)Oi-Pr | H | H | H | H | H |
| IIA-146 | Pr | H | H | NHC(O)OMe | H | H | H | H |
| IIA-147 | Pr | H | H | NHC(O)OEt | H | H | H | H |
| IIA-148 | Pr | H | H | NHC(O)Oi-Pr | H | H | H | H |

Compound of the present invention IIA-143: $^1$H-NMR ($CDCl_3$) δ: 8.01 (1H, d), 7.92 (1H, br s), 7.43-7.35 (3H, m), 6.97 (1H, d), 6.92 (1H, br s), 3.81 (3H, s), 3.31 (2H, m), 1.88 (2H, m), 1.06 (3H, t).

Compound of the present invention IIA-144: $^1$H-NMR ($CDCl_3$) δ: 8.01 (1H, d), 7.94 (1H, br), 7.43-7.34 (3H, m), 6.97 (1H, d), 6.86 (1H, br), 4.25 (2H, q), 3.31 (2H, m), 1.88 (2H, m), 1.33 (3H, t), 1.05 (3H, t).

Compound of the present invention IIA-145: $^1$H-NMR ($CDCl_3$) δ: 8.01 (1H, d), 7.95 (1H, br s), 7.43-7.38 (2H, m), 7.32 (1H, m), 6.97 (1H, d), 6.75 (1H, br s), 5.03 (1H, m), 3.30 (2H, m), 1.88 (2H, m), 1.32 (6H, d), 1.06 (3H, t).

Compound of the present invention IIA-146: $^1$H-NMR ($CDCl_3$) δ: 7.93 (1H, d), 7.65 (2H, m), 7.54 (2H, m), 6.97 (1H, d), 6.81 (1H, br s), 3.81 (3H, s), 3.30 (2H, m), 1.89 (2H, m), 1.05 (3H, t).

Compound of the present invention IIA-147: $^1$H-NMR ($CDCl_3$) δ: 7.93 (1H, d), 7.65 (2H, m), 7.53 (2H, m), 6.97 (1H, d), 6.76 (1H, br s), 4.25 (2H, q), 3.30 (2H, m), 1.89 (2H, m), 1.33 (3H, t), 1.05 (3H, t).

Compound of the present invention IIA-148: $^1$H-NMR ($CDCl_3$) δ: 7.93 (1H, d), 7.65 (2H, m), 7.53 (2H, m), 6.97 (1H, d), 6.78 (1H, br s), 5.04 (1H, m), 3.30 (2H, m), 1.89 (2H, m), 1.32 (6H, d), 1.05 (3H, t).

TABLE IIA3-5

| Compound of the present invention | Z | $R^1$ | $R^2$ | $R^3$ | $R^4$ | $R^5$ | $R^6$ | $R^7$ |
|---|---|---|---|---|---|---|---|---|
| IIA-152 | Pr | H | H | $NO_2$ | H | H | H | H |
| IIA-153 | Pr | H | $NO_2$ | H | H | H | H | H |
| IIA-154 | Pr | H | H | Cl | H | H | H | F |
| IIA-155 | Pr | H | F | NHC(O)Me | H | H | H | H |
| IIA-156 | Pr | H | F | NHC(O)c-Pr | H | H | H | H |
| IIA-157 | Pr | H | F | NHC(O)Bu | H | H | H | H |
| IIA-158 | Pr | H | F | NHC(O)-(4-(OMe)—Ph) | H | H | H | H |
| IIA-159 | Pr | H | F | NHC(O)-4-Cl—Ph) | H | H | H | H |
| IIA-160 | Pr | H | F | NHC(O)-(2-thienyl) | H | H | H | H |
| IIA-161 | Pr | H | NHC(O)-(4-Cl—Ph) | H | H | H | H | H |
| IIA-162 | Pr | H | NHC(O)c-Pr | H | H | H | H | H |
| IIA-163 | Pr | H | NHC(O)Et | H | H | H | H | H |
| IIA-164 | Pr | H | C(O)NH(4-Me—Ph) | H | H | H | H | H |
| IIA-165 | Pr | H | C(O)NH(4-MeO—Ph) | H | H | H | H | H |
| IIA-166 | Pr | H | C(O)NH(4-Cl—Ph) | H | H | H | H | H |
| IIA-167 | Pr | H | C(O)NH(3-Cl—Ph) | H | H | H | H | H |
| IIA-168 | Pr | H | C(O)NMePh | H | H | H | H | H |
| IIA-169 | Pr | H | C(O)NHc-Pr | H | H | H | H | H |
| IIA-170 | Pr | H | C(O)NHPr | H | H | H | H | H |
| IIA-171 | Pr | H | C(O)NMe(OMe) | H | H | H | H | H |
| IIA-172 | Pr | H | H | C(O)NHPh | H | H | H | H |
| IIA-173 | Pr | H | H | C(O)NHc-Pr | H | H | H | H |
| IIA-174 | Pr | H | H | C(O)NMe(OMe) | H | H | H | H |
| IIA-175 | Pr | H | N(OMe)C(O)Ph | H | H | H | H | H |
| IIA-176 | Pr | H | H | N(OMe)C(O)Ph | H | H | H | H |
| IIA-177 | Pr | H | H | Cl | H | H | F | H |
| IIA-178 | Pr | H | H | Cl | H | H | F | F |

Compound of the present invention IIA-152: $^1$H-NMR ($CDCl_3$) δ: 8.40 (2H, m), 8.13 (1H, di), 7.96 (2H, ma), 7.07 (1H, d), 3.33 (2H, m), 1.91 (2H, m), 1.08 (3H, t).

Compound of the present invention IIA-153: $^1$H-NMR ($CDCl_3$) δ: 8.61 (1H, t), 8.27 (1H, m), 8.17-8.13 (2H, m), 7.73 (1H, t), 7.06 (1H, d), 3.34 (2H, m), 1.90 (2H, m), 1.08 (3H, t).

Compound of the present invention IIA-154: $^1$H-NMR ($CDCl_3$) δ: 7.88 (1H, d), 7.63 (2H, m), 7.48 (2H, m), 3.31 (2H, m), 1.92 (2H, m), 1.08 (3H, t).

Compound of the present invention IIA-155: $^1$H-NMR ($CDCl_3$) δ: 8.51 (1H, t), 7.96 (1H, d), 7.62 (1H, m), 7.45-7.41 (2H, m), 6.99 (1H, d), 3.30 (2H, m), 2.27 (3H, s), 1.89 (2H, m), 1.06 (3H, t).

Compound of the present invention IIA-156: $^1$H-NMR ($CDCl_3$) δ: 8.51 (1H, m), 7.96 (1H, d), 7.67-7.60 (2H, m), 7.41 (1H, m), 6.98 (1H, d), 3.30 (2H, m), 1.89 (2H, m), 1.60 (1H, m), 1.14 (2H, m), 1.06 (3H, t), 0.94 (2H, m).

Compound of the present invention IIA-157: $^1$H-NMR ($CDCl_3$) δ: 8.53 (1H, t), 7.96 (1H, d), 7.62 (1H, m), 7.45-7.39 (2H, m), 6.98 (1H, d), 3.30 (2H, m), 2.45 (2H, t), 1.89 (2H, m), 1.75 (2H, m), 1.43 (2H, m), 1.06 (3H, t), 0.97 (3H, t).

Compound of the present invention IIA-158: $^1$H-NMR ($CDCl_3$) δ: 8.66 (1H, t), 8.07 (1H, br s), 7.99 (1H, d), 7.88 (2H, m), 7.67 (1H, m), 7.49 (1H, m), 7.04-6.99 (3H, m), 3.90 (3H, s), 3.31 (2H, m), 1.89 (2H, m), 1.07 (3H, t).

Compound of the present invention IIA-159: $^1$H-NMR ($CDCl_3$) δ: 8.63 (1H, t), 8.09 (1H, br s), 8.00 (1H, d), 7.86 (2H, m), 7.69 (1H, m), 7.53-7.48 (3H, m), 7.00 (1H, d), 3.31 (2H, m), 1.89 (2H, m), 1.07 (3H, t).

Compound of the present invention IIA-160: $^1$H-NMR ($CDCl_3$) δ: 8.60 (1H, t), 8.00-7.96 (2H, m), 7.70-7.66 (2H, m), 7.63 (1H, m), 7.49 (1H, m), 7.18 (1H, m), 7.00 (1H, d), 3.31 (2H, m), 1.89 (2H, m), 1.07 (3H, t).

Compound of the present invention IIA-161: $^1$H-NMR ($CDCl_3$) δ: 8.25 (1H, br s), 8.10 (1H, m), 8.01 (1H, d), 7.88 (2H, m), 7.70 (1H, m), 7.50-7.44 (4H, m), 6.95 (1H, d), 3.27 (2H, m), 1.86 (2H, m), 1.04 (3H, t).

Compound of the present invention IIA-162: $^1$H-NMR ($CDCl_3$) δ: 8.08 (1H, m), 8.00 (1H, m), 7.77-7.66 (1H, br s), 7.49-7.37 (3H, m), 6.96 (1H, m), 3.30 (2H, m), 1.87 (2H, m), 1.56 (1H, m), 1.11 (2H, m), 1.05 (3H, t), 0.90 (2H, m).

Compound of the present invention IIA-163: $^1$H-NMR ($CDCl_3$) δ: 8.11-7.99 (2H, m), 7.52-7.34 (4H, m), 6.95 (1H, m), 3.29 (2H, m), 2.45 (2H, m), 1.88 (2H, m), 1.27 (3H, m), 1.05 (3H, m).

Compound of the present invention IIA-164: $^1$H-NMR ($CDCl_3$) δ: 8.21 (1H, m), 8.10 (1H, br s), 8.05 (1H, d), 7.89-7.86 (2H, m), 7.62-7.54 (3H, m), 7.18 (2H, m), 6.97 (1H, d), 3.30 (2H, m), 2.35 (3H, s), 1.87 (2H, m), 1.05 (3H, t).

Compound of the present invention IIA-165: $^1$H-NMR ($CDCl_3$) δ: 8.23 (1H, m), 8.07 (1H, d), 8.02 (1H, br s), 7.91-7.87 (2H, m), 7.63-7.56 (3H, m), 6.99 (1H, d), 6.92 (2H, m), 3.83 (3H, s), 3.30 (2H, m), 1.88 (2H, m), 1.06 (3H, t).

Compound of the present invention IIA-166: $^1$H-NMR ($CDCl_3$) δ: 8.21 (1H, m), 8.17 (1H, br s), 8.06 (1H, d), 7.90-7.87 (2H, m), 7.66-7.60 (3H, m), 7.35 (2H, m), 6.98 (1H, d), 3.29 (2H, m), 1.87 (2H, m), 1.05 (3H, t).

Compound of the present invention IIA-167: $^1$H-NMR ($CDCl_3$) δ: 8.29 (1H, br s), 8.19 (1H, m), 8.05 (1H, d), 7.90-7.85 (2H, m), 7.82 (1H, m), 7.60 (1H, t), 7.55 (1H, m), 7.30 (1H, t), 7.17-7.14 (1H, m), 6.96 (1H, d), 3.29 (2H, m), 1.87 (2H, m), 1.05 (3H, t).

Compound of the present invention IIA-168: $^1$H-NMR ($CDCl_3$) δ: $^1$H-NMR ($CDCl_3$) δ: 7.79 (1H, d), 7.71-7.70 (1H, m), 7.67-7.65 (1H, m), 7.29-7.17 (5H, m), 7.09 (2H, d), 6.94 (1H, d), 3.54 (3H, s), 3.31-3.27 (2H, m), 1.91-1.82 (2H, m), 1.06 (3H, t).

Compound of the present invention IIA-169: $^1$H-NMR ($CDCl_3$) δ: 8.10 (1H, m), 8.05 (1H, d), 7.84 (1H, m), 7.76

(1H, m), 7.55 (1H, t), 6.97 (1H, m), 6.58 (1H, br s), 3.30 (2H, m), 2.95 (1H, m), 1.88 (2H, m), 1.06 (3H, t), 0.91 (2H, m), 0.70 (2H, m).

Compound of the present invention IIA-170: $^1$H-NMR ($CDCl_3$) δ: 8.15 (1H, m), 8.07 (1H, d), 7.87 (1H, m), 7.78 (1H, m), 7.56 (1H, t), 6.99 (1H, m), 6.41 (1H, br s), 3.46 (2H, q), 3.31 (2H, m), 1.88 (2H, m), 1.68 (2H, m), 1.06 (3H, t), 1.01 (3H, t).

Compound of the present invention IIA-171: $^1$H-NMR ($CDCl_3$) δ: 8.05-8.03 (2H, m), 7.87 (1H, m), 7.73 (1H, m), 7.56 (1H, t), 7.01 (1H, d), 3.58 (3H, s), 3.41 (3H, s), 3.32 (2H, m), 1.89 (2H, m), 1.06 (3H, t).

Compound of the present invention IIA-172: $^1$H-NMR ($CDCl_3$) δ: 8.08 (1H, m), 8.03 (2H, m), 7.90-7.85 (3H, m), 7.67 (2H, m), 7.41 (2H, m), 7.19 (1H, m), 7.02 (1H, m), 3.33 (2H, m), 1.90 (2H, m), 1.07 (3H, t).

Compound of the present invention IIA-173: $^1$H-NMR ($CDCl_3$) δ: 8.05 (1H, d), 7.89 (2H, m), 7.79 (2H, m), 7.00 (1H, m), 6.34 (1H, br s), 3.31 (2H, m), 2.93 (1H, m), 1.89 (2H, m), 1.06 (3H, t), 0.90 (2H, m), 0.67 (2H, m).

Compound of the present invention IIA-174: $^1$H-NMR ($CDCl_3$) δ: 8.08 (1H, d), 7.87 (2H, m), 7.80 (2H, m), 7.01 (1H, d), 3.56 (3H, s), 3.40 (3H, s), 3.32 (2H, m), 1.90 (2H, m), 1.07 (3H, t).

Compound of the present invention IIA-175: $^1$H-NMR ($CDCl_3$) δ: 8.04 (1H, m), 8.01 (1H, d), 7.74-7.71 (2H, m), 7.64-7.57 (2H, m), 7.54-7.48 (2H, m), 7.46-7.41 (2H, m), 6.99 (1H, d), 3.67 (3H, s), 3.32 (2H, m), 1.89 (2H, m), 1.07 (3H, t).

Compound of the present invention IIA-176: $^1$H-NMR ($CDCl_3$) δ: 8.00 (1H, d), 7.75 (2H, m), 7.71-7.68 (4H, m), 7.49 (1H, m), 7.42 (2H, m), 7.00 (1H, d), 3.68 (3H, s), 3.31 (2H, m), 1.89 (2H, m), 1.06 (3H, t).

Compound of the present invention IIA-177: $^1$H-NMR ($CDCl_3$) δ: 7.63 (2H, m), 7.50 (2H, m), 6.50 (1H, d), 3.29 (2H, m), 1.90 (2H, m), 1.07 (3H, t).

Compound of the present invention IIA-178: $^1$H-NMR ($CDCl_3$) δ: 7.61 (2H, m), 7.51 (2H, m), 3.30 (2H, m), 1.92 (2H, m), 1.09 (3H, t).

TABLE IA3

| Present compound | Z | $R^1$ | $R^2$ | $R^3$ | $R^4$ | $R^5$ | $R^6$ | $R^7$ |
|---|---|---|---|---|---|---|---|---|
| IA-11 | Me | H | H | Cl | H | H | H | H |
| IA-12 | Ph | H | H | Cl | H | H | H | H |
| IA-13 | Ph | H | F | Cl | H | H | H | H |
| IA-14 | Ph | H | H | OMe | H | H | H | H |
| IA-15 | 4-(OMe)—Ph | H | H | Cl | H | H | H | H |
| IA-16 | 4-Cl—Ph | H | H | Cl | H | H | H | H |
| IA-17 | 2-(OMe)—Ph | H | H | Cl | H | H | H | H |
| IA-18 | 2-Cl—Ph | H | H | Cl | H | H | H | H |

Present compound IA-11: $^1$H-NMR ($CDCl_3$) δ: 7.97 (1H, d), 7.68 (2H, m), 7.48 (2H, m), 7.00 (1H, d), 3.27 (3H, s).

Present compound IA-12: $^1$H-NMR ($CDCl_3$) δ: 8.10-8.08 (2H, m), 7.90 (1H, d), 7.62 (3H, m), 7.55 (2H, m), 7.43 (2H, m), 7.00 (1H, d).

Present compound IA-13: $^1$H-NMR ($CDCl_3$) δ: 8.09 (2H, m), 7.91 (1H, d), 7.63 (1H, m), 7.58-7.53 (3H, m), 7.49 (1H, m), 7.41 (1H, m), 7.01 (1H, d).

Present compound IA-14: $^1$H-NMR ($CDCl_3$) δ: 8.09 (2H, m), 7.82 (1H, d), 7.62-7.51 (5H, m), 6.97-6.94 (3H, m), 3.84 (3H, s).

Present compound IA-15: $^1$H-NMR ($CDCl_3$) δ: 0.01 (2H, m), 7.88 (1H, d), 7.61 (2H, m), 7.43 (2H, m), 7.00 (2H, m), 6.96 (1H, d), 3.86 (3H, s).

Present compound IA-16: $^1$H-NMR ($CDCl_3$) δ: 8.02 (2H, m), 7.91 (1H, d), 7.61 (2H, m), 7.51 (2H, m), 7.44 (2H, m), 7.00 (1H, d).

Present compound IA-17: $^1$H-NMR ($CDCl_3$) δ: 8.04 (1H, m), 7.84 (1H, d), 7.64 (2H, m), 7.49 (1H, m), 7.43 (2H, m), 7.23 (1H, m), 6.91 (1H, d), 6.45 (1H, d). 3.78 (3H, s).

Preparation Example 6

A mixture of 4-chlorobenzthioamide (1.03 g), 2-bromothioacetic acid S-ethyl ester (0.92 g), and ethanol (15 mL) was stirred at 80° C. for 8 hours. The resulting mixture was concentrated under reduced pressure, and the resulting residue was subjected to silica gel column chromatography (hexane:ethyl acetate=98:2) to give the Compound of the present invention IIB-1 represented by the following formula (0.42 g).

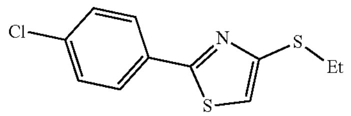 [SMILES: CCSc1csc(-c2ccc(Cl)cc2)n1]

Compound of the present invention IIB-1: $^1$H-NMR ($CDCl_3$) δ: 7.89 (2H, m), 7.40 (2H, m), 7.04 (1H, s), 3.09 (2H, q), 1.37 (3H, t).

Preparation Example 6-1

The compound prepared according to the Preparation Example 6 and the physical property thereof are shown below.

A compound represented by formula (B1)

(B1)

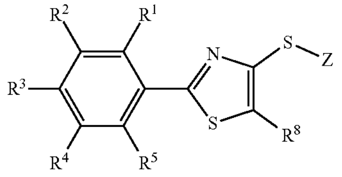

wherein the combination of Z, $R^1$, $R^2$, $R^3$, $R^4$, $R^5$, and $R^8$ represents the combination indicated in Table IIB1.

TABLE IIB1

| Compound of the present invention | Z | $R^1$ | $R^2$ | $R^3$ | $R^4$ | $R^5$ | $R^8$ |
|---|---|---|---|---|---|---|---|
| IIB-2 | Pr | H | H | Cl | H | H | H |

Compound of the present invention IIB-2: $^1$H-NMR ($CDCl_3$) δ: 7.84 (2H, m), 7.23 (2H, m), 6.98 (1H, s), 3.05 (2H, m), 1.73 (2H, m), 1.04 (3H, t).

Preparation Example 7

To a mixture of the Compound of the present invention IIB-1 (0.42 g) and chloroform (5 mL) was added mCPBA (purity: 75%, water content: 25%) (1.2 g) at 0° C., and the resulting mixture was stirred at room temperature for 2 hours. To the resulting mixture was added an aqueous solution of sodium sulfite, and the resulting mixture was extracted with chloroform. The resulting organic layer was washed with sodium hydrogen carbonate water, dried over magnesium sulfate, and concentrated under reduced pressure. The resulting residue was subjected to silica gel column chromatography (hexane:ethyl acetate=80:20) to give the Compound of the present invention IIB-3 represented by the following formula (93 mg).

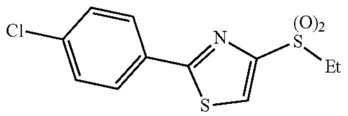

Compound of the present invention IIB-3: $^1$H-NMR ($CDCl_3$) δ: 8.12 (1H, s), 7.93 (2H, m), 7.46 (2H, m), 3.40 (2H, q), 1.37 (3H, t).

Preparation Example 7-1

The compound prepared according to the Preparation Example 7 and the physical property thereof are shown below.

A compound represented by formula (B3)

(B3)

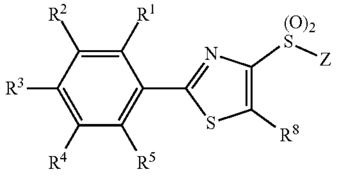

wherein the combination of Z, $R^1$, $R^2$, $R^3$, $R^4$, $R^5$, and $R^8$ represents the combination indicated in Table IIB3.

TABLE IIB3

| Compound of the present invention | Z | $R^1$ | $R^2$ | $R^3$ | $R^4$ | $R^5$ | $R^8$ |
|---|---|---|---|---|---|---|---|
| IIB-4 | Pr | H | H | Cl | H | H | H |

Compound of the present invention IIB-4: $^1$H-NMR ($CDCl_3$) δ: 8.16 (1H, s), 7.93 (2H, m), 7.46 (2H, m), 3.35 (2H, m), 1.87 (2H, m), 1.06 (3H, t).

Reference Preparation Example 7

A mixture of 4-fluoro-3-(trifluoromethyl)phenacyl bromide (1.35 g), thiocarbamic acid O-ethyl (0.5 g), and ethanol (5 mL) was stirred at 85° C. for 5 hours. The resulting mixture was concentrated under reduced pressure. To the resulting residue were sequentially added toluene (5 mL) and Lawesson's reagent (0.73 g), and the resulting mixture was stirred at 110° C. for 8 hours. To the resulting mixture was added saturated brine, and the resulting mixture was extracted with ethyl acetate. The resulting organic layer was washed with saturated brine, dried over sodium sulfate, and concentrated under reduced pressure. The resulting residue was subjected to silica gel column chromatography to give the Intermediate compound MC1-1 represented by the following formula (0.34 g).

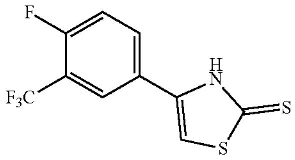 [SMILES: Fc1ccc(-c2csc(=S)[nH]2)cc1C(F)(F)F]

Intermediate compound MC1-1: $^1$H-NMR ($CDCl_3$) δ: 7.76-7.73 (1H, m), 7.71-7.67 (1H, m), 7.37-7.32 (1H, m), 6.73 (1H, s).

Reference Preparation Example 7-1

The Intermediate compound MC1-2 (1 g) was prepared according to the Reference Preparation Example 7 by using 4-fluoro-3-bromophenacyl bromide instead of 4-fluoro-3-(trifluoromethyl)phenacyl bromide.

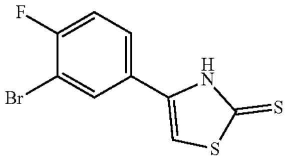 [SMILES: Fc1ccc(-c2csc(=S)[nH]2)cc1Br]

Intermediate compound MC1-2: $^1$H-NMR ($CDCl_3$) δ: 7.66 (1H, dd), 7.28-7.25 (1H, m), 7.17 (1H, dd), 6.75 (1H, s).

Preparation Example 8

A mixture of the Intermediate compound MC1-1 (0.34 g), 1-iodopropane (0.14 mL), potassium carbonate (0.25 g), and acetone (5 mL) was stirred at 80° C. for 5 hours. The resulting mixture was concentrated under reduced pressure, and the resulting residue was subjected to silica gel column chromatography (hexane:ethyl acetate=40:60) to give the Present compound IC-1 represented by the following formula (0.38 g).

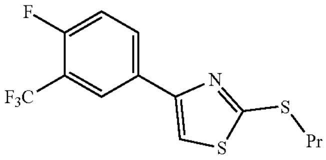

Present compound IC-1: $^1$H-NMR ($CDCl_3$) δ: 8.13-8.11 (1H, m), 8.06-8.03 (1H, m), 7.35 (1H, s), 7.26-7.21 (1H, m), 3.26 (2H, t), 1.90-1.81 (2H, m), 1.11-1.07 (3H, m).

Preparation Example 8-1

The compounds prepared according to the Preparation Example 8 and the physical properties thereof are shown below.

A compound represented by formula (C1)

(C1)

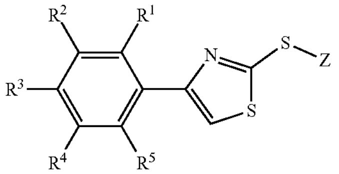

wherein the combination of Z, $R^1$, $R^2$, $R^3$, $R^4$, and $R^5$ represents any one combination indicated in Table IC1.

TABLE IC1

| Present compound | Z | $R^1$ | $R^2$ | $R^3$ | $R^4$ | $R^5$ |
|---|---|---|---|---|---|---|
| IC-2 | S-Bu | H | H | Cl | H | H |
| IC-3 | i-Pr | H | H | Cl | H | H |
| IC-4 | Pr | H | H | OMe | H | H |
| IC-5 | Pr | H | H | Me | H | H |
| IC-6 | Et | H | H | $OCF_3$ | H | H |
| IC-7 | Pr | H | H | Br | H | H |
| IC-8 | Et | H | Cl | Cl | H | H |
| IC-9 | Pr | H | H | Bu | H | H |
| IC-10 | Pr | Br | H | H | H | H |
| IC-11 | Pr | Me | H | H | H | H |
| IC-12 | Pr | H | H | $CF_3$ | H | H |
| IC-13 | Pr | H | H | t-Bu | H | H |
| IC-14 | Pr | H | H | F | H | H |
| IC-15 | Pr | H | Br | H | H | H |
| IC-16 | Et | H | F | H | H | H |
| IC-17 | Pr | H | F | H | H | H |
| IC-18 | Et | H | F | Me | H | H |
| IC-19 | Pr | H | F | Me | H | H |
| IC-20 | $CH_2CH_2CF{=}CF_2$ | H | F | H | H | H |
| IC-21 | Et | H | H | I | H | H |
| IC-22 | Et | H | H | Br | H | H |
| IC-23 | Et | H | F | Br | H | H |
| IC-24 | Pr | H | F | Br | H | H |
| IC-25 | Me | H | H | H | H | H |
| IC-26 | Et | H | H | Cl | H | H |
| IC-27 | Me | H | H | Cl | H | H |
| IC-28 | Pr | H | H | Cl | H | H |
| IC-29 | Bu | H | H | Cl | H | H |
| IC-30 | Pr | H | H | H | H | H |

Present compound IC-2: $^1$H-NMR ($CDCl_3$) δ: 7.83 (2H, dt), 7.38 (2H, dt), 7.35 (1H, s), 3.77-3.69 (1H, m), 1.88-1.68 (2H, m), 1.47 (3H, d), 1.06 (3H, t).

Present compound IC-3: $^1$H-NMR ($CDCl_3$) δ: 7.85-7.81 (2H, m), 7.40-7.36 (2H, m), 7.36 (1H, s), 3.95-3.84 (1H, m), 1.48 (6H, d).

Present compound IC-4: $^1$H-NMR ($CDCl_3$) δ: 7.82 (2H, dt), 7.20 (1H, s), 6.94 (2H, dt), 3.85 (3H, s), 3.24 (2H, t), 1.89-1.80 (2H, m), 1.08 (3H, t).

Present compound IC-5: $^1$H-NMR ($CDCl_3$) δ: 7.79-7.76 (2H, m), 7.28 (1H, s), 7.22-7.20 (2H, m), 3.24 (2H, t), 2.38 (3H, s), 1.89-1.80 (2H, m), 1.08 (3H, t).

Present compound IC-6: $^1$H-NMR ($CDCl_3$) δ: 7.93-7.89 (2H, m), 7.34 (1H, s), 7.26-7.24 (2H, m), 3.29 (2H, q), 1.48 (3H, t).

Present compound IC-7: $^1$H-NMR ($CDCl_3$) δ: 7.78-7.74 (2H, m), 7.55-7.51 (2H, m), 7.34 (1H, s), 3.25 (2H, t), 1.89-1.80 (2H, m), 1.08 (3H, t).

Present compound IC-8: $^1$H-NMR ($CDCl_3$) δ: 8.00 (1H, s), 7.70 (1H, d), 7.46 (1H, d), 7.36 (1H, s), 3.29 (2H, q), 1.48 (3H, t).

Present compound IC-9: $^1$H-NMR ($CDCl_3$) δ: 7.79 (2H, d), 7.28 (1H, s), 7.22 (2H, d), 3.24 (2H, t), 2.63 (2H, t), 1.89-1.80 (2H, m), 1.65-1.58 (2H, m), 1.41-1.32 (2H, m), 1.07 (3H, t), 0.93 (3H, t).

Present compound IC-10: $^1$H-NMR ($CDCl_3$) δ: 7.80 (1H, dd), 7.66 (1H, d), 7.62 (1H, s), 7.37 (1H, t), 7.19 (1H, td), 3.24 (2H, t), 1.89-1.80 (2H, m), 1.07 (3H, t).

Present compound IC-11: $^1$H-NMR ($CDCl_3$) δ: 7.57 (1H, d), 7.27-7.21 (3H, m), 7.12 (1H, s), 3.24 (2H, t), 2.45 (3H, s), 1.88-1.79 (2H, m), 1.06 (3H, t).

Present compound IC-12: $^1$H-NMR ($CDCl_3$) δ: 8.00 (2H, d), 7.66 (2H, d), 7.45 (1H, d), 3.27 (2H, t), 1.91-1.82 (2H, m), 1.09 (3H, t).

Present compound IC-13: $^1$H-NMR ($CDCl_3$) δ: 7.81 (2H, d), 7.43 (2H, d), 7.29 (1H, s), 3.25 (2H, t), 1.89-1.80 (2H, m), 1.35 (9H, s), 1.07 (3H, t).

Present compound IC-14: $^1$H-NMR ($CDCl_3$) δ: 7.88-7.83 (2H, m), 7.27 (1H, s), 7.12-7.06 (2H, m), 3.25 (2H, t), 1.90-1.80 (2H, m), 1.08 (3H, t).

Present compound IC-15: $^1$H-NMR ($CDCl_3$) δ: 8.05 (1H, s), 7.80 (1H, d), 7.45 (1H, d), 7.36 (1H, s), 7.27 (1H, t), 3.26 (2H, t), 1.90-1.80 (2H, m), 1.08 (3H, t).

Present compound IC-16: $^1$H-NMR ($CDCl_3$) δ: 7.66-7.60 (2H, m), 7.39-7.34 (2H, m), 7.04-6.99 (1H, m), 3.30 (2H, q), 1.48 (3H, t).

Present compound IC-17: $^1$H-NMR ($CDCl_3$) δ: 7.66-7.59 (2H, m), 7.41-7.34 (2H, m), 7.04-6.99 (1H, m), 3.26 (2H, t), 1.90-1.81 (2H, m), 1.08 (3H, t).

Present compound IC-19: $^1$H-NMR ($CDCl_3$) δ: 7.56-7.53 (2H, m), 7.30 (1H, s), 7.22-7.18 (1H, m), 3.25 (2H, t), 2.30 (3H, s), 1.90-1.80 (2H, m), 1.08 (3H, t).

Present compound IC-20: $^1$H-NMR ($CDCl_3$) δ: 7.65-7.59 (2H, m), 7.40-7.35 (2H, m), 7.06-7.01 (1H, m), 3.48 (2H, t), 2.95-2.83 (2H, m).

Present compound IC-21: $^1$H-NMR ($CDCl_3$) δ: 7.74 (2H, dt), 7.63 (2H, dt), 7.36 (1H, s), 3.28 (2H, q), 1.48 (3H, t).

Present compound IC-22: $^1$H-NMR ($CDCl_3$) δ: 7.76 (2H, dt), 7.53 (2H, dt), 7.35 (1H, s), 3.28 (2H, q), 1.48 (3H, t).

Present compound IC-23: $^1$H-NMR ($CDCl_3$) δ: 7.68 (1H, dd), 7.59-7.52 (2H, m), 7.38 (1H, s), 3.29 (2H, q), 1.48 (3H, t).

Present compound IC-24: $^1$H-NMR ($CDCl_3$) δ: 7.68 (1H, dd), 7.59-7.51 (2H, m), 7.37 (1H, s), 3.26 (2H, t), 1.90-1.81 (2H, m), 1.08 (3H, t).

Preparation Example 9

To a mixture of the Present compound IC-26 (0.2 g) and chloroform (5 mL) was added mCPBA (purity: 75%, water content: 25%) (0.4 g) at 0° C., and the resulting mixture was stirred at room temperature for 3 hours. To the resulting mixture was added a saturated aqueous solution of sodium thiosulfate (10 mL), the resulting mixture was stirred for 1 hour, and then extracted with ethyl acetate. The resulting organic layer was washed with saturated brine, dried over sodium sulfate, and concentrated under reduced pressure. The resulting residue was subjected to silica gel column chromatography (hexane:ethyl acetate=80:20) to give the Compound of the present invention IIC-1 represented by the following formula (0.2 g).

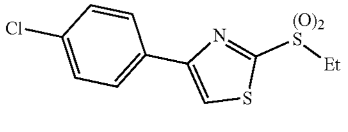

Compound of the present invention IIC-1: $^1$H-NMR ($CDCl_3$) δ: 7.87 (2H, d), 7.82 (1H, s), 7.44 (2H, d), 3.51 (2H, q), 1.44 (3H, t).

Preparation Example 9-1

The compounds prepared according to the Preparation Example 9 and the physical properties thereof are shown below.
A compound represented by formula (C3)

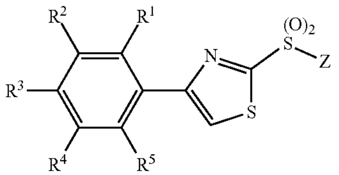

(C3)

wherein the combination of Z, $R^1$, $R^2$, $R^3$, $R^4$, and $R^5$ represents any one combination indicated in Table IIC3 and Table IC3.

TABLE IIC3

| Compound of the present invention | Z | $R^1$ | $R^2$ | $R^3$ | $R^4$ | $R^5$ |
|---|---|---|---|---|---|---|
| IIC-2 | S-Bu | H | H | Cl | H | H |
| IIC-3 | i-Pr | H | H | Cl | H | H |
| IIC-4 | Pr | H | H | Cl | H | H |
| IIC-5 | Bu | H | H | Cl | H | H |
| IIC-6 | Pr | H | H | OMe | H | H |
| IIC-7 | Pr | H | H | Me | H | H |
| IIC-8 | Et | H | H | $OCF_3$ | H | H |
| IIC-9 | Pr | H | H | Br | H | H |
| IIC-10 | Et | H | Cl | Cl | H | H |
| IIC-11 | Pr | H | H | Bu | H | H |
| IIC-12 | Pr | Br | H | H | H | H |
| IIC-13 | Pr | H | $CF_3$ | F | H | H |
| IIC-14 | Pr | Me | H | H | H | H |
| IIC-15 | Pr | H | H | $CF_3$ | H | H |
| IIC-16 | Pr | H | H | t-Bu | H | H |
| IIC-17 | Pr | H | H | F | H | H |
| IIC-18 | Pr | H | Br | H | H | H |
| IIC-19 | Et | H | F | H | H | H |
| IIC-20 | Pr | H | F | H | H | H |
| IIC-21 | Et | H | F | Me | H | H |
| IIC-22 | Pr | H | F | Me | H | H |
| IIC-23 | $CH_2CH_2CF{=}CF_2$ | H | F | H | H | H |
| IIC-24 | Et | H | H | I | H | H |
| IIC-25 | Et | H | H | Br | H | H |
| IIC-26 | Et | H | F | Br | H | H |
| IIC-27 | Pr | H | F | Br | H | H |

Compound of the present invention IIC-2: $^1$H-NMR ($CDCl_3$) δ: 7.89-7.86 (2H, m), 7.84-7.83 (1H, m), 7.45-7.42 (2H, ma), 3.48-3.46 (1H, m), 2.17-2.14 (1H, m), 1.70-1.63 (1H, m), 1.45 (3H, d), 1.06 (3H, t).

Compound of the present invention IIC-3: $^1$H-NMR ($CDCl_3$) δ: 7.87 (2H, d), 7.84 (1H, s), 7.45-7.41 (2H, m), 3.73-3.66 (1H, m), 1.47 (6H, d).

Compound of the present invention IIC-4: $^1$H-NMR ($CDCl_3$) δ: 7.87 (2H, dt), 7.82 (1H, s), 7.44 (2H, dt), 3.48-3.44 (2H, m), 1.97-1.87 (2H, m), 1.08 (3H, t).

Compound of the present invention IIC-5: $^1$H-NMR ($CDCl_3$) δ: 7.87 (2H, dt), 7.82 (1H, s), 7.44 (2H, dt), 3.50-3.46 (2H, m), 1.90-1.82 (2H, m), 1.53-1.43 (2H, m), 0.94 (3H, t).

Compound of the present invention IIC-6: $^1$H-NMR ($CDCl_3$) δ: 7.86 (2H, dt), 7.68 (1H, s), 6.98 (2H, dt), 3.87 (3H, s), 3.47-3.43 (2H, m), 1.96-1.87 (2H, m), 1.08 (3H, t).

Compound of the present invention IIC-7: $^1$H-NMR ($CDCl_3$) δ: 7.82 (2H, d), 7.76 (1H, s), 7.45-7.41 (2H, m), 3.48-3.44 (2H, m), 2.40 (3H, s), 1.96-1.87 (2H, m), 1.08 (3H, t).

Compound of the present invention IIC-8: $^1$H-NMR ($CDCl_3$) δ: 7.96 (2H, dt), 7.84 (1H, s), 7.31 (2H, d), 3.51 (2H, q), 1.44 (3H, t).

Compound of the present invention IIC-9: $^1$H-NMR ($CDCl_3$) δ: 7.83 (1H, s), 7.80 (2H, dt), 7.43 (2H, t), 3.48-3.44 (2H, m), 1.97-1.87 (2H, m), 1.08 (3H, t).

Compound of the present invention IIC-10: $^1$H-NMR ($CDCl_3$) δ: 8.05 (1H, d), 7.86 (1H, s), 7.75 (1H, dd), 7.53 (1H, d), 3.52 (2H, q), 1.45 (3H, t).

Compound of the present invention IIC-11: $^1$H-NMR ($CDCl_3$) δ: 7.83 (2H, d), 7.76 (1H, s), 7.30-7.28 (2H, m), 3.48-3.44 (2H, m), 2.66 (2H, t), 1.96-1.86 (2H, m), 1.66-1.59 (2H, m), 1.42-1.33 (2H, m), 1.07 (3H, t), 0.94 (3H, t).

Compound of the present invention IIC-12: $^1$H-NMR ($CDCl_3$) δ: 8.13 (1H, s), 7.80 (1H, d), 7.70 (1H, d), 7.44-7.40 (1H, m), 7.29-7.27 (1H, m), 3.48-3.45 (2H, m), 1.97-1.88 (2H, m), 1.08 (3H, t).

Compound of the present invention IIC-13: $^1$H-NMR ($CDCl_3$) δ: 8.17 (1H, dd), 8.11 (1H, m), 7.86 (1H, s), 7.31 (1H, t), 3.49-3.45 (2H, m), 1.97-1.88 (2H, m), 1.10 (3H, t).

Compound of the present invention IIC-14: $^1$H-NMR ($CDCl_3$) δ: 8.08 (1H, t), 7.64 (1H, s), 7.59-7.56 (1H, m), 7.43 (1H, t), 7.36-7.28 (1H, m), 3.48-3.44 (2H, m), 2.46 (3H, s), 1.96-1.87 (2H, m), 1.07 (3H, t).

Compound of the present invention IIC-15: $^1$H-NMR ($CDCl_3$) δ: 8.05 (2H, d), 7.94 (1H, s), 7.72 (2H, d), 3.49-3.45 (2H, m), 1.98-1.88 (2H, m), 1.09 (3H, t).

Compound of the present invention IIC-16: $^1$H-NMR ($CDCl_3$) δ: 7.85 (2H, dt), 7.77 (1H, s), 7.48 (2H, dt), 3.48-3.44 (2H, m), 1.95-1.86 (2H, m), 1.36 (9H, s), 1.07 (3H, t).

Compound of the present invention IIC-17: $^1$H-NMR ($CDCl_3$) δ: 7.93-7.90 (2H, m), 7.77 (1H, s), 7.18-7.13 (2H, m), 3.48-3.44 (2H, m), 1.97-1.88 (2H, m), 1.09 (3H, t).

Compound of the present invention IIC-18: $^1$H-NMR ($CDCl_3$) δ: 8.10 (1H, s), 7.85 (1H, s), 7.84 (1H, d), 7.54 (1H, d), 7.34 (1H, t), 3.49-3.45 (2H, m), 1.97-1.87 (2H, m), 1.09 (3H, t).

Compound of the present invention IIC-19: $^1$H-NMR ($CDCl_3$) δ: 7.66-7.60 (2H, m), 7.39-7.34 (2H, m), 7.04-6.99 (1H, m), 3.30 (2H, q), 1.48 (3H, t).

Compound of the present invention IIC-20: $^1$H-NMR ($CDCl_3$) δ: 7.66-7.59 (2H, m), 7.39-7.34 (2H, m), 7.04-6.99 (1H, m), 3.26 (2H, t), 1.90-1.81 (2H, m), 1.08 (3H, t).

Compound of the present invention IIC-21: $^1$H-NMR ($CDCl_3$) δ: 7.79 (1H, s), 7.60-7.57 (2H, m), 7.28-7.24 (1H, m), 3.51 (2H, q), 2.32 (3H, s), 1.44 (3H, t).

Compound of the present invention IIC-22: $^1$H-NMR ($CDCl_3$) δ: 7.78 (1H, s), 7.61-7.57 (2H, m), 7.28-7.24 (1H, m), 3.48-3.44 (2H, m), 2.33 (3H, s), 1.97-1.87 (2H, m), 1.08 (3H, t).

Compound of the present invention IIC-23: $^1$H-NMR ($CDCl_3$) δ: 7.81 (1H, s), 7.66-7.63 (1H, m), 7.62-7.58 (1H, m), 7.45-7.39 (1H, m), 7.12-7.06 (1H, m), 3.52-3.35 (2H, m), 3.04-2.61 (2H, m).

Compound of the present invention IIC-24: $^1$H-NMR ($CDCl_3$) δ: 7.84 (1H, s), 7.80 (2H, d), 7.66 (2H, d), 3.51 (2H, q), 1.44 (3H, t).

Compound of the present invention IIC-25: $^{1}$H-NMR ($CDCl_3$) δ: 7.84 (1H, s), 7.80 (2H, d), 7.59 (2H, d), 3.51 (2H, q), 1.44 (3H, t).

Compound of the present invention IIC-26: $^{1}$H-NMR ($CDCl_3$) δ: 7.87 (1H, s), 7.72 (1H, dd), 7.64 (1H, dd), 7.58 (1H, dd), 3.52 (2H, q), 1.45 (3H, t).

Compound of the present invention IIC-27: $^{1}$H-NMR ($CDCl_3$) δ: 7.86 (1H, s), 7.72 (1H, dd), 7.64 (1H, dd), 7.58 (1H, dd), 3.48-3.44 (2H, m), 1.95-1.89 (2H, m), 1.09 (3H, t).

TABLE IC3

| Present compound | Z | $R^1$ | $R^2$ | $R^3$ | $R^4$ | $R^5$ |
|---|---|---|---|---|---|---|
| IC-31 | Pr | H | H | H | H | H |
| IC-32 | Me | H | H | H | H | H |
| IC-33 | Me | H | H | Cl | H | H |

Present compound IC-31: $^{1}$H-NMR ($CDCl_3$) δ: 7.94-7.92 (2H, m), 7.83 (1H, s), 7.48-7.41 (3H, m), 3.49-3.45 (2H, m), 1.97-1.88 (2H, m), 1.08 (3H, t).

Present compound IC-32: $^{1}$H-NMR ($CDCl_3$) δ: 7.94-7.91 (2H, m), 7.82 (1H, s), 7.49-7.39 (3H, m), 3.39 (3H, s).

Preparation Example 10

To a mixture of the Intermediate compound MA4-1 (0.30 g), pyridine (0.16 mL), and chloroform (10 mL) was added ethyl chloroformate (0.18 g) at 0° C., and the resulting mixture was stirred at room temperature for 4 hours. To the resulting mixture was added water, and the resulting mixture was extracted with chloroform. The resulting organic layer was dried over magnesium sulfate, and concentrated under reduced pressure. The resulting residue was subjected to silica gel column chromatography (hexane:ethyl acetate=60:40) to give the Compound of the present invention IIA-137 represented by the following formula (0.25 g).

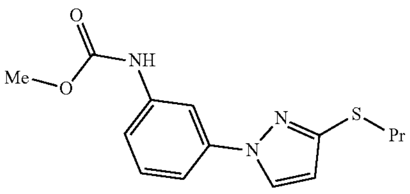

Compound of the present invention IIA-137: $^{1}$H-NMR ($CDCl_3$) δ: 7.88 (1H, d), 7.78 (1H, br s), 7.38-7.26 (3H, m), 6.70 (1H, br s), 6.40 (1H, d), 3.80 (3H, s), 3.01 (2H, m), 1.75 (2H, m), 1.04 (3H, t).

Preparation Example 10-1

The compounds prepared according to the Preparation Example 10 and the physical properties thereof are shown below.

A compound represented by formula (A1)

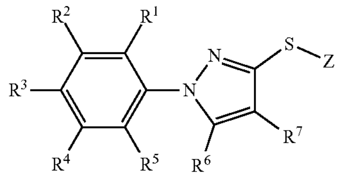

(A1)

wherein the combination of Z, $R^1$, $R^2$, $R^3$, $R^4$, $R^5$, $R^6$, and $R^7$ represents any one combination indicated in Table IIA1-3.

TABLE IIA1-3

| Compound of the present invention | Z | $R^1$ | $R^2$ | $R^3$ | $R^4$ | $R^5$ | $R^6$ | $R^7$ |
|---|---|---|---|---|---|---|---|---|
| IIA-138 | Pr | H | NHC(O)OEt | H | H | H | H | H |
| IIA-139 | Pr | H | NHC(O)Oi-Pr | H | H | H | H | H |
| IIA-140 | Pr | H | H | NHC(O)OMe | H | H | H | H |
| IIA-141 | Pr | H | H | NHC(O)OEt | H | H | H | H |
| IIA-142 | Pr | H | H | NHC(O)Oi-Pr | H | H | H | H |

Compound of the present invention IIA-138: $^{1}$H-NMR ($CDCl_3$) δ: 7.88 (1H, d), 7.79 (1H, br s), 7.38-7.26 (3H, m), 6.68 (1H, br s), 6.39 (1H, d), 4.24 (2H, q), 3.01 (2H, m), 1.75 (2H, m), 1.33 (3H, t), 1.04 (3H, t).

Compound of the present invention IIA-139: $^{1}$H-NMR ($CDCl_3$) δ: 7.88 (1H, d), 7.80 (1H, br s), 7.38-7.26 (3H, m), 6.64 (1H, br s), 6.39 (1H, d), 5.03 (1H, m), 3.01 (2H, m), 1.75 (2H, m), 1.31 (6H, d), 1.04 (3H, t).

Compound of the present invention IIA-140: $^{1}$H-NMR ($CDCl_3$) δ: 7.81 (1H, d), 7.61 (2H, m), 7.45 (2H, m), 6.65 (1H, br s), 6.40 (1H, d), 3.79 (3H, s), 3.00 (2H, m), 1.75 (2H, m), 1.04 (3H, t).

Compound of the present invention IIA-141: $^{1}$H-NMR ($CDCl_3$) δ: 7.81 (1H, d), 7.60 (2H, m), 7.45 (2H, m), 6.62 (1H, br s), 6.39 (1H, d), 4.24 (2H, q), 3.00 (2H, m), 1.75 (2H, m), 1.32 (3H, t), 1.04 (3H, t).

Compound of the present invention IIA-142: $^{1}$H-NMR ($CDCl_3$) δ: 7.81 (1H, d), 7.60 (2H, m), 7.45 (2H, m), 6.58 (1H, br s), 6.40 (1H, d), 5.03 (1H, m), 3.00 (2H, m), 1.75 (2H, m), 1.31 (6H, d), 1.04 (3H, t).

Preparation Example 11

To a mixture of the Intermediate compound MA4-3 (0.5 g), pyridine (0.32 mL), and chloroform (10 mL) was added acetyl chloride (0.24 g) at 0° C., and the resulting mixture was stirred at room temperature for 4 hours. To the resulting mixture was added water, and the resulting mixture was extracted with chloroform. The resulting organic layer was dried over anhydrous magnesium sulfate, and concentrated under reduced pressure. The resulting residue was subjected to silica gel column chromatography (hexane:ethyl acetate=2:1) to give the Compound of the present invention IIA-179 represented by the following formula (0.47 g).

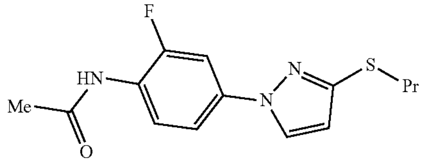

Compound of the present invention IIA-179: $^1$H-NMR ($CDCl_3$) δ: 8.38 (1H, t), 7.82 (1H, d), 7.55 (1H, m), 7.40-7.33 (2H, m), 6.40 (1H, d), 3.01 (2H, t), 2.24 (3H, s), 1.45 (2H, m), 1.04 (3H, t).

Preparation Example 11-1

The compounds prepared according to the Preparation Example 11 and the physical properties thereof are shown below.

A compound represented by formula (A1)

(A1)

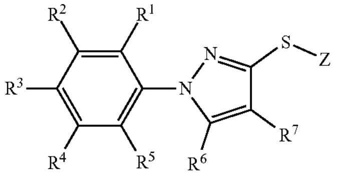

wherein the combination of Z, $R^1$, $R^2$, $R^3$, $R^4$, $R^5$, $R^6$, and $R^7$ represents any one combination indicated in Table IIA1-4.

(1H, m), 7.64-7.59 (2H, m), 7.40 (1H, m), 7.16 (1H, m), 6.42 (1H, d), 3.03 (2H, t), 1.77 (2H, m), 1.05 (3H, t).

Compound of the present invention IIA-185: $^1$H-NMR ($CDCl_3$) δ: 8.05 (1H, m), 7.93 (1H, d), 7.90 (1H, br s), 7.78 (2H, m), 7.60 (1H, m), 7.46-7.40 (2H, m), 7.31 (2H, m), 6.42 (1H, d), 3.01 (2H, t), 2.44 (3H, s), 1.76 (2H, m), 1.05 (3H, t).

Compound of the present invention IIA-186: $^1$H-NMR ($CDCl_3$) δ: 8.02 (1H, m), 7.92-7.89 (2H, m), 7.82 (2H, m), 7.60 (1H, m), 7.05-7.40 (4H, m), 6.42 (1H, d), 3.01 (2H, t), 1.75 (2H, m), 1.04 (3H, t).

Compound of the present invention IIA-187: $^1$H-NMR ($CDCl_3$) δ: 7.96 (1H, br s), 7.89 (1H, d), 7.43-7.34 (4H, m), 6.39 (1H, d), 3.01 (2H, t), 1.75 (2H, m), 1.52 (1H, m), 1.11 (2H, m), 1.04 (3H, t), 0.89 (2H, m).

Compound of the present invention IIA-188: $^1$H-NMR ($CDCl_3$) δ: 7.95-7.88 (2H, m), 7.43-7.23 (4H, m), 6.42 (1H, m), 3.01 (2H, m), 2.43 (2H, m), 1.76 (2H, m), 1.27 (3H, m), 0.05 (3H, m).

Preparation Example 12

A mixture of the Intermediate compound MA5-2 (0.26 g), p-toluidine (0.16 g), 1-ethyl-3-(3-dimethylaminopropyl)carbodiimide hydrochloride (0.38 g), 4-dimethylaminopyridine (0.24 g), and chloroform (10 mL) was stirred at room temperature for 6 hours. To the resulting mixture was added water, and the resulting mixture was extracted with chloroform. The resulting organic layer was dried over anhydrous magnesium sulfate, and concentrated under reduced pressure. The resulting residue was subjected to silica gel column chromatography (hexane:ethyl acetate=3:1) to give

TABLE IIA1-4

| Compound of the present invention | Z | $R^1$ | $R^2$ | $R^3$ | $R^4$ | $R^5$ | $R^6$ | $R^7$ |
|---|---|---|---|---|---|---|---|---|
| IIA-180 | Pr | H | F | NHC(O)c-Pr | H | H | H | H |
| IIA-181 | Pr | H | F | NHC(O)Bu | H | H | H | H |
| IIA-182 | Pr | H | F | NHC(O)-(4-(OMe)—Ph) | H | H | H | H |
| IIA-183 | Pr | H | F | NHC(O)-(4-Cl—Ph) | H | H | H | H |
| IIA-184 | Pr | H | F | NHC(O)-(2-thienyl) | H | H | H | H |
| IIA-185 | Pr | H | NHC(O)-(4-Me—Ph) | H | H | H | H | H |
| IIA-186 | Pr | H | NHC(O)-(4-Cl—Ph) | H | H | H | H | H |
| IIA-187 | Pr | H | NHC(O)c-Pr | H | H | H | H | H |
| IIA-188 | Pr | H | NHC(O)Et | H | H | H | H | H |

Compound of the present invention IIA-180: $^1$H-NMR ($CDCl_3$) δ: 8.39 (1H, m), 7.81 (1H, d), 7.60-7.53 (2H, m), 7.33 (1H, m), 6.40 (1H, d), 3.01 (2H, t), 1.75 (2H, m), 1.58 (1H, m), 1.13 (2H, m), 1.04 (3H, t), 0.91 (2H, m).

Compound of the present invention IIA-181: $^1$H-NMR ($CDCl_3$) δ: 8.42 (1H, t), 7.82 (1H, d), 7.55 (1H, m), 7.36-7.30 (2H, m), 6.40 (1H, d), 3.01 (2H, t), 2.43 (2H, t), 1.80-1.69 (4H, m), 1.43 (2H, m), 1.04 (3H, t), 0.97 (3H, t).

Compound of the present invention IIA-182: $^1$H-NMR ($CDCl_3$) δ: 8.55 (1H, t), 7.99 (1H, br s), 7.89-7.84 (3H, m), 7.61 (1H, m), 7.41 (1H, m), 7.01 (2H, m), 6.41 (1H, d), 3.89 (3H, s), 3.03 (2H, t), 1.77 (2H, m), 1.05 (3H, t).

Compound of the present invention IIA-183: $^1$H-NMR ($CDCl_3$) δ: 8.52 (1H, t), 7.99 (1H, br s), 7.86-7.83 (3H, m), 7.62 (1H, m), 7.50 (2H, m), 7.42 (1H, m), 6.42 (1H, d), 3.03 (2H, t), 1.77 (2H, m), 1.06 (3H, t).

Compound of the present invention IIA-184: $^1$H-NMR ($CDCl_3$) δ: 8.49 (1H, t), 7.91 (1H, br s), 7.85 (1H, d), 7.60 the Compound of the present invention IIA-189 represented by the following formula (0.29 g).

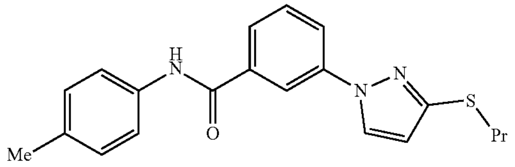

Compound of the present invention IIA-189: $^1$H-NMR ($CDCl_3$) δ: 8.05 (1H, m), 7.93 (1H, d), 7.90 (1H, br s), 7.78 (2H, m), 7.60 (1H, m), 7.46-7.40 (2H, m), 7.31 (2H, m), 6.42 (1H, d), 3.01 (2H, t), 2.44 (3H, s), 1.76 (2H, m), 1.05 (3H, t).

Preparation Example 12-1

The compounds prepared according to the Preparation Example 12 and the physical properties thereof are shown below.

A compound represented by formula (A1)

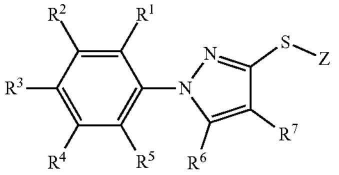

(A1)

wherein the combination of Z, $R^1$, $R^2$, $R^1$, $R^4$, $R^5$, $R^6$, and $R^7$ represents any one combination indicated in Table IIA1-5.

TABLE IIA1-5

| Compound of the present invention | Z | $R^1$ | $R^2$ | $R^3$ | $R^4$ | $R^5$ | $R^6$ | $R^7$ |
|---|---|---|---|---|---|---|---|---|
| IIA-190 | Pr | H | C(O)NH-(4-(OMe)—Ph) | H | H | H | H | H |
| IIA-191 | Pr | H | C(O)NH-(4-Cl—Ph) | H | H | H | H | H |
| IIA-192 | Pr | H | C(O)NH-(3-Cl—Ph) | H | H | H | H | H |
| IIA-193 | Pr | H | C(O)NMePh | H | H | H | H | H |
| IIA-194 | Pr | H | C(O)NHc-Pr | H | H | H | H | H |
| IIA-195 | Pr | H | C(O)NHPr | H | H | H | H | H |
| IIA-196 | Pr | H | C(O)NMe(OMe) | H | H | H | H | H |
| IIA-197 | Pr | H | H | C(O)NHPh | H | H | H | H |
| IIA-198 | Pr | H | H | C(O)NHc-Pr | H | H | H | H |
| IIA-199 | Pr | H | H | C(O)NMe(OMe) | H | H | H | H |

Compound of the present invention IIA-190: $^1$H-NMR ($CDCl_3$) δ: 8.18 (1H, m), 8.96 (1H, d), 7.90 (1H, br s), 7.83 (1H, m), 7.75 (1H, m), 7.58-7.53 (3H, m), 6.93 (2H, m), 6.45 (1H, d), 3.83 (3H, s), 3.03 (2H, t), 1.76 (2H, m), 1.05 (3H, t).

Compound of the present invention IIA-191: $^1$H-NMR ($CDCl_3$) δ: 8.20 (1H, m), 7.98 (1H, br s), 7.96 (1H, d), 7.84 (1H, m), 7.76 (1H, m), 7.64 (2H, m), 7.57 (1H, t), 7.36 (2H, m), 6.47 (1H, d), 3.03 (2H, t), 1.76 (2H, m), 1.05 (3H, t).

Compound of the present invention IIA-192: $^1$H-NMR ($CDCl_3$) δ: 8.18 (1H, m), 8.97-8.92 (2H, m), 7.87-7.81 (2H, m), 7.74 (1H, m), 7.56 (1H, t), 7.50 (1H, m), 7.31 (1H, t), 7.16 (1H, m), 6.46 (1H, d), 3.03 (2H, t), 1.76 (2H, m), 1.05 (3H, t).

Compound of the present invention IIA-193: $^1$H-NMR ($CDCl_3$) δ: 7.66 (1H, d), 7.63-7.60 (2H, m), 7.27-7.07 (7H, m), 6.35 (1H, d), 3.52 (3H, s), 3.00 (2H, t), 1.74 (2H, m), 1.04 (3H, t).

Compound of the present invention IIA-194: $^1$H-NMR ($CDCl_3$) δ: 8.05 (1H, m), 7.94 (1H, d), 7.80 (1H, m), 7.63 (1H, m), 7.49 (1H, t), 6.44 (1H, d), 6.36 (1H, br s), 3.01 (2H, t), 2.93 (1H, m), 1.75 (2H, m), 1.05 (3H, t), 0.90 (2H, m), 0.66 (2H, m).

Compound of the present invention IIA-195: $^1$H-NMR ($CDCl_3$) δ: 8.08 (1H, m), 7.95 (1H, d), 7.81 (1H, m), 7.64 (1H, m), 7.50 (1H, t), 6.44 (1H, d), 6.23 (1H, br s), 3.45 (2H, m), 3.02 (2H, t), 1.76 (2H, m), 1.67 (2H, m), 1.05 (3H, t), 1.01 (3H, t).

Compound of the present invention IIA-196: $^1$H-NMR ($CDCl_3$) δ: 7.95 (1H, m), 7.90 (1H, d), 7.81 (1H, m), 7.57 (1H, m), 7.48 (1H, t), 6.42 (1H, d), 3.58 (3H, s), 3.39 (3H, s), 3.03 (2H, t), 1.76 (2H, m), 1.05 (3H, t).

Compound of the present invention IIA-197: $^1$H-NMR ($CDCl_3$) δ: 7.97-7.93 (3H, m), 7.83 (1H, br s), 7.80 (2H, m), 7.65 (2H, m), 7.39 (2H, m), 7.17 (1H, m), 6.45 (1H, d), 3.05 (2H, t), 1.78 (2H, m), 1.06 (3H, t).

Compound of the present invention IIA-198: $^1$H-NMR ($CDCl_3$) δ: 7.92 (1H, d), 7.82 (2H, m), 7.72 (2H, m), 6.43 (1H, d), 6.27 (1H, br s), 3.03 (2H, t), 2.92 (1H, m), 1.77 (2H, m), 1.05 (3H, t), 0.89 (2H, m), 0.65 (2H, m).

Compound of the present invention IIA-199: $^1$H-NMR ($CDCl_3$) δ: 7.92 (1H, d), 7.82 (2H, m), 7.71 (2H, m), 6.43 (1H, d), 3.56 (3H, s), 3.39 (3H, s), 3.04 (2H, t), 1.77 (2H, m), 1.05 (3H, t).

Preparation Example 13

To a mixture of the Intermediate compound MA6-1 (2.5 g), pyridine (0.8 mL), and chloroform (30 mL) was added dropwise benzoyl chloride (1.1 mL) at 0° C., and the resulting mixture was stirred at 0° C. for 2 hours. To the resulting mixture was added water, and the resulting mixture was extracted with ethyl acetate. The resulting organic layer was dried over anhydrous magnesium sulfate, and concentrated under reduced pressure. The resulting residue was subjected to silica gel column chromatography to give the Compound of the present invention IIA-203 represented by the following formula (1.3 g).

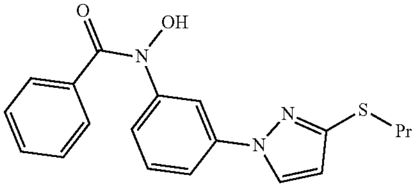

Compound of the present invention IIA-203: $^1$H-NMR ($CDCl_3$) δ: 7.71 (1H, d), 7.60 (1H, m), 7.57 (1H, m), 7.50-7.46 (2H, m), 7.41 (1H, m), 7.33-7.28 (3H, m), 7.01 (1H, m), 6.38 (1H, d), 3.0 (2H, t), 1.74 (2H, m), 1.04 (3H, t).

Preparation Example 13-1

The Compound of the present invention IIA-204 represented by the following formula was prepared according to the Preparation Example 13 using the Intermediate compound MA6-2 instead of the Intermediate compound MA6-1.

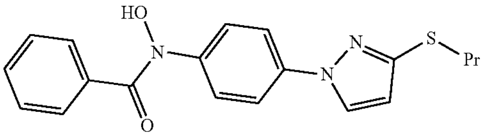

Compound of the present invention IIA-204: $^{1}$H-NMR ($CDCl_3$) δ: 7.83 (1H, d), 7.59 (2H, m), 7.45 (2H, m), 7.39 (1H, m), 7.30-7.26 (4H, m), 6.40 (1H, d), 3.00 (2H, t), 1.74 (2H, m), 1.03 (3H, t).

Preparation Example 14

To a mixture of the Compound of the present invention IIA-203 (1.1 g), potassium carbonate (0.6 g), and DMF (15 mL) was added iodomethane (0.6 g) at 0° C., and the resulting mixture was stirred at room temperature for 4 hours. To the resulting mixture was added water, and the resulting mixture was extracted with ethyl acetate. The resulting organic layer was dried over anhydrous magnesium sulfate, and concentrated under reduced pressure. The resulting residue was subjected to silica gel column chromatography (hexane:ethyl acetate=4:1) to give the Compound of the present invention IIA-200 represented by the following formula (1.1 g).

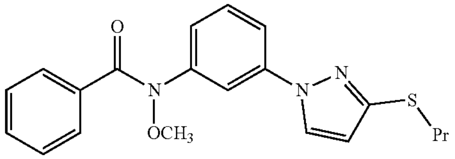

Compound of the present invention IIA-200: $^{1}$H-NMR ($CDCl_3$) δ: 7.88 (1H, m), 7.84 (1H, d), 7.69-7.66 (2H, m), 7.56 (1H, m), 7.49-7.36 (5H, m), 6.41 (1H, d), 3.70 (3H, s), 3.02 (2H, t), 1.76 (2H, m), 1.05 (3H, t).

Preparation Example 14-1

The Compound of the present invention IIA-201 represented by the following formula was prepared according to the Preparation Example 14 by using the Compound of the present invention IIA-204 instead of the Compound of the present invention IIA-203.

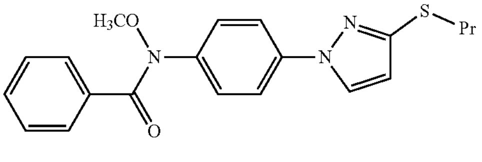

Compound of the present invention IIA-201: $^{1}$H-NMR ($CDCl_3$) δ: 7.86 (1H, d), 7.69-7.63 (4H, m), 7.53 (2H, m), 7.44 (1H, m), 7.37 (2H, m), 6.41 (1H, d), 3.71 (3H, s), 3.02 (2H, t), 1.76 (2H, m), 1.05 (3H, t).

Preparation Example 15

To a mixture of the Compound of the present invention IIA-40 (2.0 g) and THF (20 mL) was added dropwise butyllithium (2.8 M solution in hexane) (3.2 mL) at −78° C., and the resulting mixture was stirred at −78° C. for 30 minutes. To the resulting mixture was added a mixture of N-fluorobis(phenylsulfonyl)amine (3.1 g) and THF (20 mL) at −78° C., and the resulting mixture was stirred at room temperature for 4 hours. To the resulting mixture was added water, and the resulting mixture was extracted with ethyl acetate. The resulting organic layer was dried over anhydrous magnesium sulfate, and concentrated under reduced pressure. The resulting residue was subjected to silica gel column chromatography (hexane:ethyl acetate=20:1) to give the Compound of the present invention IIA-202 represented by the following formula (1.2 g).

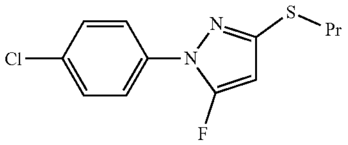

Compound of the present invention IIA-202: $^{1}$H-NMR ($CDCl_3$) δ: 7.58 (2H, m), 7.41 (2H, m), 5.90 (1H, d), 3.00 (2H, t), 1.75 (2H, m), 1.04 (3H, t).

Examples of the Present compound and the Compound of the present invention prepared according to the above Production methods and Preparation Examples are shown below.

A compound represented by formula (L-1)

(L-1)

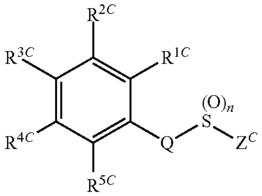

wherein Q represents the group represented by Q1, n represents 0, $R^6$ and $R^7$ each represent a hydrogen atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX1").

Combination A consists of Substituent Numbers A1 to A2717. Substituent Numbers A1 to A2717 indicate the combinations of $R^{1C}$, $R^{2C}$, $R^{3C}$, $R^{4C}$, $R^{5C}$, and $Z^C$ in the compound represented by formula (L-1), and hereinafter referred to as [Substituent Number; $R^{1C}$, $R^{2C}$, $R^{3C}$, $R^{4C}$, $R^{5C}$, $Z^C$].

For example, Substituent Number A5 indicates a combination wherein $R^{1C}$, $R^{2C}$, $R^{4C}$, and $R^{5C}$ each represent a hydrogen atom, $R^{3C}$ represents a methyl group, and $Z^C$ represents an ethyl group.

Combination A

[Substituent Number; $R^{1C}$, $R^{2C}$, $R^{3C}$, $R^{4C}$, $R^{5C}$, $Z^C$];

[A1; H, H, F, H, H, Et], [A2; H, H, Cl, H, H, Et], [A3; H, H, Br, H, H, Et], [A4; H, H, I, H, H, Et], [A5; H, H, Me, H, H, Et], [A6; H, H, OMe, H, H, Et], [A7; H, H, $CF_3$, H, H, Et], [A8; H, H, $CHF_2$, H, H, Et], [A9; H, H, $NO_2$, H, H, Et],

[A10; H, H, F, H, H, Pr], [A11; H, H, Cl, H, H, Pr], [A12; H, H, Br, H, H, Pr], [A13; H, H, I, H, H, Pr], [A14; H, H, Me, H, H, Pr], [A15; H, H, OMe, H, H, Pr], [A16; H, H, $CF_3$, H, H, Pr], [A17; H, H, $CHF_2$, H, H, Pr], [A18; H, H, $NO_2$, H, H, Pr], [A19; H, H, F, H, H, i-Pr], [A20; H, H, Cl, H, H, i-Pr], [A21; H, H, Br, H, H, i-Pr], [A22; H, H, I, H, H, i-Pr], [A23; H, H, Me, H, H, i-Pr], [A24; H, H, OMe, H, H, i-Pr], [A25; H, H, $CF_3$, H, H, i-Pr], [A26; H, H, $CHF_2$, H, H, i-Pr], [A27; H, H, $NO_2$, H, H, i-Pr], [A28; H, H, F, H, H, c-Pr], [A29; H, H, Cl, H, H, c-Pr], [A30; H, H, Br, H, H, c-Pr], [A31; H, H, I, H, H, c-Pr], [A32; H, H, Me, H, H, c-Pr], [A33; H, H, OMe, H, H, c-Pr], [A34; H, H, $CF_3$, H, H, c-Pr], [A35; H, H, $CHF_2$, H, H, c-Pr], [A36; H, H, $NO_2$, H, H, c-Pr], [A37; H, H, F, H, H, Bu], [A38; H, H, Cl, HH, Bu], [A39; H, H, Br, H, H, Bu], [A40; H, H, I, H, H, Bu], [A41; H, H, Me, H, H, Bu], [A42; H, H, OMe, H, H, Bu], [A43; H, H, $CF_3$, H, H, Bu], [A44; H, H, $CHF_2$, H, H, Bu], [A45; H, H, $NO_2$, H, H, Bu], [A46; H, H, F, H, H, i-Bu], [A47; H, H, Cl, H, H, i-Bu], [A48; H, H, Br, H, H, i-Bu], [A49; H, H, I, H, H, i-Bu], [A50; H, H, Me, H, H, i-Bu], [A51; H, H, OMe, H, H, i-Bu], [A52; H, H, $CF_3$, H, H, i-Bu], [A53; H, H, $CHF_2$, H, H, i-Bu], [A54; H, H, $NO_2$, H, H, i-Bu], [A55; H, H, F, H, H, $CH_2CF_3$], [A56; H, H, Cl, H, H, $CH_2CF_3$], [A57; H, H, Br, H, H, $CH_2CF_3$], [A58; H, H, I, H, H, $CH_2CF_3$], [A59; H, H, Me, H, H, $CH_2CF_3$], [A60; H, H, OMe, H, H, $CH_2CF_3$], [A61; H, H, $CF_3$, H, H, $CH_2CF_3$], [A62; H, H, $CHF_2$, H, H, $CH_2CF_3$], [A63; H, H, $NO_2$, H, H, $CH_2CF_3$], [A64; H, H, F, H, H, $CF_2CH_3$], [A65; H, H, Cl, H, H, $CF_2CH_3$], [A66; H, H, Br, H, H, $CF_2CH_3$], [A67; H, H, I, H, H, $CF_2CH_3$], [A68; H, H, Me, H, H, $CF_2CH_3$], [A69; H, H, OMe, H, H, $CF_2CH_3$], [A70; H, H, $CF_3$, H, H, $CF_2CH_3$], [A71; H, H, $CHF_2$, H, H, $CF_2CH_3$], [A72; H, H, $NO_2$, H, H, $CF_2CH_3$], [A73; H, H, F, H, H, 2-Py], [A74; H, H, Cl, H, H, 2-Py], [A75; H, H, Br, H, H, 2-Py], [A76; H, H, I, H, H, 2-Py], [A77; H, H, Me, H, H, 2-Py], [A78; H, H, OMe, H, H, 2-Py], [A79; H, H, $CF_3$, H, H, 2-Py], [A80; H, H, $CHF_2$, H, H, 2-Py], [A81; H, H, $NO_2$, H, H, 2-Py], [A82; H, H, F, H, H, 3-Py], [A83; H, H, Cl, H, H, 3-Py], [A84; H, H, Br, H, H, 3-Py], [A85; H, H, I, H, H, 3-Py], [A86; H, H, Me, H, H, 3-Py], [A87; H, H, OMe, H, H, 3-Py], [A88; H, H, $CF_3$, H, H, 3-Py], [A89; H, H, $CHF_2$, H, H, 3-Py], [A90; H, H, $NO_2$, H, H, 3-Py], [A91; H, H, F, H, H, 4-Py], [A92; H, H, Cl, H, H, 4-Py], [A93; H, H, Br, H, H, 4-Py], [A94; H, H, I, H, H, 4-Py], [A95; H, H, Me, H, H, 4-Py], [A96; H, H, OMe, H, H, 4-Py], [A97; H, H, $CF_3$, H, H, 4-Py], [A98; H, H, $CHF_2$, H, H, 4-Py], [A99; H, H, $NO_2$, H, H, 4-Py], [A100; H, F, H, H, H, Et], [A101; H, F, F, H, H, Et], [A102; H, F, Cl, H, H, Et], [A103; H, F, Br, H, H, Et], [A104; H, F, I, H, H, Et], [A105; H, F, Me, H, H, Et], [A106; H, F, OMe, H, H, Et], [A107; H, F, $CF_3$, H, H, Et], [A108; H, F, $CHF_2$, H, H, Et], [A109; H, F, $NO_2$, H, H, Et], [A110; H, F, H, H, H, Pr], [A111; H, F, F, H, H, Pr], [A112; H, F, Cl, H, H, Pr], [A113; H, F, Br, H, H, Pr], [A114; H, F, I, H, H, Pr], [A115; H, F, Me, H, H, Pr], [A116; H, F, OMe, H, H, Pr], [A117; H, F, $CF_3$, H, H, Pr], [A118; H, F, $CHF_2$, H, H, Pr], [A119; H, F, $NO_2$, H, H, Pr], [A120; H, F, H, H, H, i-Pr], [A121; H, F, F, H, H, i-Pr], [A122; H, F, Cl, H, H, i-Pr], [A123; H, F, Br, H, H, i-Pr], [A124; H, F, I, H, H, i-Pr], [A125; H, F, Me, H, H, i-Pr], [A126; H, F, OMe, H, H, i-Pr], [A127; H, F, $CF_3$, H, H, i-Pr], [A128; H, F, $CHF_2$, H, H, i-Pr], [A129; H, F, $NO_2$, H, H, i-Pr], [A130; H, F, H, H, H, c-Pr], [A131; H, F, F, H, H, c-Pr], [A132; H, F, Cl, H, H, c-Pr], [A133; H, F, Br, H, H, c-Pr], [A134; H, F, I, H, H, c-Pr], [A135; H, F, Me, H, H, c-Pr], [A136; H, F, OMe, H, H, c-Pr], [A137; H, F, $CF_3$, H, H, c-Pr], [A138; H, F, $CHF_2$, H, H, c-Pr], [A139; H, F, $NO_2$, H, H, c-Pr], [A140; H, F, H, H, H, Bu], [A141; H, F, F, H, H, Bu], [A142; H, F, Cl, H, H, Bu], [A143; H, F, Br, H, H, Bu], [A144; H, F, I, H, H, Bu], [A145; H, F, Me, H, H, Bu], [A146; H, F, OMe, H, H, Bu], [A147; H, F, $CF_3$, H, H, Bu], [A148; H, F, $CHF_2$, H, H, Bu], [A149; H, F, $NO_2$, H, H, Bu], [A150; H, F, H, H, H, i-Bu], [A151; H, F, F, H, H, i-Bu], [A152; H, F, Cl, H, H, i-Bu], [A153; H, F, Br, H, H, i-Bu], [A154; H, F, I, H, H, i-Bu], [A155; H, F, Me, H, H, i-Bu], [A156; H, F, OMe, H, H, i-Bu], [A157; H, F, $CF_3$, H, H, i-Bu], [A158; H, F, $CHF_2$, H, H, i-Bu], [A159; H, F, $NO_2$, H, H, i-Bu], [A160; H, F, H, H, H, $CH_2CF_3$], [A161; H, F, F, H, H, $CH_2CF_3$], [A162; H, F, Cl, H, H, $CH_2CF_3$], [A163; H, F, Br, H, H, $CH_2CF_3$], [A164; H, F, I, H, H, $CH_2CF_3$], [A165; H, F, Me, H, H, $CH_2CF_3$], [A166; H, F, OMe, H, H, $CH_2CF_3$], [A167; H, F, $CF_3$, H, H, $CH_2CF_3$], [A168; H, F, $CHF_2$, H, H, $CH_2CF_3$], [A169; H, F, $NO_2$, H, H, $CH_2CF_3$], [A170; H, F, H, H, H, $CF_2CH_3$], [A171; H, F, F, H, H, $CF_2CH_3$], [A172; H, F, Cl, H, H, $CF_2CH_3$], [A173; H, F, Br, H, H, $CF_2CH_3$], [A174; H, F, I, H, H, $CF_2CH_3$], [A175; H, F, Me, H, H, $CF_2CH_3$], [A176; H, F, OMe, H, H, $CF_2CH_3$], [A177; H, F, $CF_3$, H, H, $CF_2CH_3$], [A178; H, F, $CHF_2$, H, H, $CF_2CH_3$], [A179; H, F, $NO_2$, H, H, $CF_2CH_3$], [A180; H, F, H, H, H, 2-Py], [A181; H, F, F, H, H, 2-Py], [A182; H, F, Cl, H, H, 2-Py], [A183; H, F, Br, H, H, 2-Py], [A184; H, F, I, H, H, 2-Py], [A185; H, F, Me, H, H, 2-Py], [A186; H, F, OMe, H, H, 2-Py], [A187; H, F, $CF_3$, H, H, 2-Py], [A188; H, F, $CHF_2$, H, H, 2-Py], [A189; H, F, $NO_2$, H, H, 2-Py], [A190; H, F, H, H, H, 3-Py], [A191; H, F, F, H, H, 3-Py], [A192; H, F, Cl, H, H, 3-Py], [A193; H, F, Br, H, H, 3-Py], [A194; H, F, I, H, H, 3-Py], [A195; H, F, Me, H, H, 3-Py], [A196; H, F, OMe, H, H, 3-Py], [A197; H, F, $CF_3$, H, H, 3-Py], [A198; H, F, $CHF_2$, H, H, 3-Py], [A199; H, F, $NO_2$, H, H, 3-Py], [A200; H, F, H, H, H, 4-Py], [A201; H, F, F, H, H, 4-Py], [A202; H, F, Cl, H, H, 4-Py], [A203; H, F, Br, H, H, 4-Py], [A204; H, F, I, H, H, 4-Py], [A205; H, F, Me, H, H, 4-Py], [A206; H, F, OMe, H, H, 4-Py], [A207; H, F, $CF_3$, H, H, 4-Py], [A208; H, F, $CHF_2$, H, H, 4-Py], [A209; H, F, $NO_2$, H, H, 4-Py], [A210; H, Cl, H, H, H, Et], [A211; H, Cl, F, H, H, Et], [A212; H, Cl, Cl, H, H, Et], [A213; H, Cl, Br, H, H, Et], [A214; H, Cl, I, H, H, Et], [A215; H, Cl, Me, H, H, Et], [A216; H, Cl, OMe, H, H, Et], [A217; H, Cl, $CF_3$, H, H, Et], [A218; H, Cl, $CHF_2$, H, H, Et], [A219; H, Cl, $NO_2$, H, H, Et], [A220; H, Cl, H, H, H, Pr], [A221; H, Cl, F, H, H, Pr], [A222; H, Cl, Cl, H, H, Pr], [A223; H, Cl, Br, H, H, Pr], [A224; H, Cl, I, H, H, Pr], [A225; H, Cl, Me, H, H, Pr], [A226; H, Cl, OMe, H, H, Pr], [A227; H, Cl, $CF_3$, H, H, Pr], [A228; H, Cl, $CHF_2$, H, H, Pr], [A229; H, Cl, $NO_2$, H, H, Pr], [A230; H, Cl, H, H, H, i-Pr], [A231; H, Cl, F, H, H, i-Pr], [A232; H, Cl, Cl, H, H, i-Pr], [A233; H, Cl, Br, H, H, i-Pr], [A234; H, Cl, I, H, H, i-Pr], [A235; H, Cl, Me, H, H, i-Pr], [A236; H, Cl, OMe, H, H, i-Pr], [A237; H, Cl, $CF_3$, H, H, i-Pr], [A238; H, Cl, $CHF_2$, H, H, i-Pr], [A239; H, Cl, $NO_2$, H, H, i-Pr], [A240; H, Cl, H, H, H, c-Pr], [A241; H, Cl, F, H, H, c-Pr], [A242; H, Cl, Cl, H, H, c-Pr], [A243; H, Cl, Br, H, H, c-Pr], [A244; H, Cl, I, H, H, c-Pr], [A245; H, Cl, Me, H, H, c-Pr], [A246; H, Cl, OMe, H, H, c-Pr], [A247; H, Cl, $CF_3$, H, H, c-Pr], [A248; H, Cl, $CHF_2$, H, H, c-Pr], [A249; H, Cl, $NO_2$, H, H, c-Pr], [A250; H, Cl, H, H, H, Bu], [A251; H, Cl, F, H, H, Bu], [A252; H, Cl, Cl, H, H, Bu], [A253; H, Cl, Br, H, H, Bu], [A254; H, Cl, I, H, H, Bu], [A255; H, Cl, Me, H, H, Bu], [A256; H, Cl, OMe, H, H, Bu], [A257; H, Cl, $CF_3$, H, H, Bu], [A258; H, Cl, $CHF_2$, H, H, Bu], [A259; H, Cl, $NO_2$, H, H, Bu], [A260; H, Cl, H, H, H, i-Bu], [A261; H, Cl, F, H, H, i-Bu], [A262; H, Cl, Cl, H, H, i-Bu], [A263; H, Cl, Br, H, H, i-Bu], [A264; H, Cl, I, H, H, i-Bu], [A265; H, Cl, Me, H, H, i-Bu], [A266; H, Cl, OMe, H, H, i-Bu], [A267; H, Cl, $CF_3$, H, H, i-Bu], [A268; H, Cl, $CHF_2$, H, H, i-Bu], [A269; H, Cl, $NO_2$, H, H, i-Bu], [A270; H, Cl, H, H, H, $CH_2CF_3$],

[A271; H, Cl, F, H, H, $CH_2CF_3$], [A272; H, Cl, Cl, H, H, $CH_2CF_3$], [A273; H, Cl, Br, H, H, $CH_2CF_3$], [A274; H, Cl, I, H, H, $CH_2CF_3$], [A275; H, Cl, Me, H, H, $CH_2CF_3$], [A276; H, Cl, OMe, H, H, $CH_2CF_3$], [A277; H, Cl, $CF_3$, H, H, $CH_2CF_3$], [A278; H, Cl, $CHF_2$, H, H, $CH_2CF_3$], [A279; H, Cl, $NO_2$, H, H, $CH_2CF_3$][A280; H, Cl, H, H, H, $CF_2CH_3$], [A281; H, Cl, F, H, H, $CF_2CH_3$], [A282; H, Cl, Cl, H, H, $CF_2CH_3$], [A283; H, Cl, Br, H, H, $CF_2CH_3$], [A284; H, Cl, I, H, H, $CF_2CH_3$], [A285; H, Cl, Me, H, H, $CF_2CH_3$], [A286; H, Cl, OMe, H, H, $CF_2CH_3$], [A287; H, Cl, $CF_3$, H, H, $CF_2CH_3$], [A288; H, Cl, $CHF_2$, H, H, $CF_2CH_3$], [A289; H, Cl, $NO_2$, H, H, $CF_2CH_3$][A290; H, Cl, H, H, H, 2-Py], [A291; H, Cl, F, H, H, 2-Py], [A292; H, Cl, Cl, H, H, 2-Py], [A293; H, Cl, Br, H, H, 2-Py], [A294; H, Cl, I, H, H, 2-Py], [A295; H, Cl, Me, H, H, 2-Py], [A296; H, Cl, OMe, H, H, 2-Py], [A297; H, Cl, $CF_3$, H, H, 2-Py], [A298; H, Cl, $CHF_2$, H, H, 2-Py], [A299; H, Cl, $NO_2$, H, H, 2-Py], [A300; H, Cl, H, H, H, 3-Py], [A301; H, Cl, F, H, H, 3-Py], [A302; H, Cl, Cl, H, H, 3-Py], [A303; H, Cl, Br, H, H, 3-Py], [A304; H, Cl, I, H, H, 3-Py], [A305; H, Cl, Me, H, H, 3-Py], [A306; H, Cl, OMe, H, H, 3-Py], [A307; H, Cl, $CF_3$, H, H, 3-Py], [A308; H, Cl, $CHF_2$, H, H, 3-Py], [A309; H, Cl, $NO_2$, H, H, 3-Py], [A310; H, Cl, H, H, H, 4-Py], [A311; H, Cl, F, H, H, 4-Py], [A312; H, Cl, Cl, H, H, 4-Py], [A313; H, Cl, Br, H, H, 4-Py], [A314; H, Cl, I, H, H, 4-Py], [A315; H, Cl, Me, H, H, 4-Py], [A316; H, Cl, OMe, H, H, 4-Py], [A317; H, Cl, $CF_3$, H, H, 4-Py], [A318; H, Cl, $CHF_2$, H, H, 4-Py], [A319; H, Cl, $NO_2$, H, H, 4-Py], [A320; H, Br, H, H, H, Et], [A321; H, Br, F, H, H, Et], [A322; H, Br, Cl, H, H, Et], [A323; H, Br, Br, H, H, Et], [A324; H, Br, I, H, H, Et], [A325; H, Br, Me, H, H, Et], [A326; H, Br, OMe, H, H, Et], [A327; H, Br, $CF_3$, H, H, Et], [A328; H, Br, $CHF_2$, H, H, Et], [A329; H, Br, $NO_2$, H, H, Et], [A330; H, Br, H, H, H, Pr], [A331; H, Br, F, H, H, Pr], [A332; H, Br, Cl, H, H, Pr], [A333; H, Br, Br, H, H, Pr], [A334; H, Br, I, H, H, Pr], [A335; H, Br, Me, H, H, Pr], [A336; H, Br, OMe, H, H, Pr], [A337; H, Br, $CF_3$, H, H, Pr], [A338; H, Br, $CHF_2$, H, H, Pr], [A339; H, Br, $NO_2$, H, H, Pr], [A340; H, Br, H, H, H, i-Pr], [A341; H, Br, F, H, H, i-Pr], [A342; H, Br, Cl, H, H, i-Pr], [A343; H, Br, Br, H, H, i-Pr], [A344; H, Br, I, H, H, i-Pr], [A345; H, Br, Me, H, H, i-Pr], [A346; H, Br, OMe, H, H, i-Pr], [A347; H, Br, $CF_3$, H, H, i-Pr], [A348; H, Br, $CHF_2$, H, H, i-Pr], [A349; H, Br, $NO_2$, H, H, i-Pr], [A350; H, Br, H, H, H, c-Pr], [A351; H, Br, F, H, H, c-Pr], [A352; H, Br, Cl, H, H, c-Pr], [A353; H, Br, Br, H, H, c-Pr], [A354; H, Br, I, H, H, c-Pr], [A355; H, Br, Me, H, H, c-Pr], [A356; H, Br, OMe, H, H, c-Pr], [A357; H, Br, $CF_3$, H, H, c-Pr], [A358; H, Br, $CHF_2$, H, H, c-Pr], [A359; H, Br, $NO_2$, H, H, c-Pr], [A360; H, Br, H, H, H, Bu], [A361; H, Br, F, H, H, Bu], [A362; H, Br, Cl, H, H, Bu], [A363; H, Br, Br, H, H, Bu], [A364; H, Br, I, H, H, Bu], [A365; H, Br, Me, H, H, Bu], [A366; H, Br, OMe, H, H, Bu], [A367; H, Br, $CF_3$, H, H, Bu], [A368; H, Br, $CHF_2$, H, H, Bu], [A369; H, Br, $NO_2$, H, H, Bu], [A370; H, Br, H, H, H, i-Bu], [A371; H, Br, F, H, H, i-Bu], [A372; H, Br, Cl, H, H, i-Bu], [A373; H, Br, Br, H, H, i-Bu], [A374; H, Br, I, H, H, i-Bu], [A375; H, Br, Me, H, H, i-Bu], [A376; H, Br, OMe, H, H, i-Bu], [A377; H, Br, $CF_3$, H, H, i-Bu], [A378; H, Br, $CHF_2$, H, H, i-Bu], [A379; H, Br, $NO_2$, H, H, i-Bu], [A380; H, Br, H, H, H, $CH_2CF_3$], [A381; H, Br, F, H, H, $CH_2CF_3$], [A382; H, Br, Cl, H, H, $CH_2CF_3$], [A383; H, Br, Br, H, H, $CH_2CF_3$], [A384; H, Br, I, H, H, $CH_2CF_3$], [A385; H, Br, Me, H, H, $CH_2CF_3$], [A386; H, Br, OMe, H, H, $CH_2CF_3$], [A387; H, Br, $CF_3$, H, H, $CH_2CF_3$], [A388; H, Br, $CHF_2$, H, H, $CH_2CF_3$], [A389; H, Br, $NO_2$, H, H, $CH_2CF_3$], [A390; H, Br, H, H, H, $CF_2CH_3$], [A391; H, Br, F, H, H, $CF_2CH_3$], [A392; H, Br, Cl, H, H, $CF_2CH_3$], [A393; H, Br, Br, H, H, $CF_2CH_3$], [A394; H, Br, I, H, H, $CF_2CH_3$], [A395; H, Br, Me, H, H, $CF_2CH_3$], [A396; H, Br, OMe, H, H, $CF_2CH_3$], [A397; H, Br, $CF_3$, H, H, $CF_2CH_3$], [A398; H, Br, $CHF_2$, H, H, $CF_2CH_3$], [A399; H, Br, $NO_2$, H, H, $CF_2CH_3$], [A400; H, Br, H, H, H, 2-Py], [A401; H, Br, F, H, H, 2-Py], [A402; H, Br, Cl, H, H, 2-Py], [A403; H, Br, Br, H, H, 2-Py], [A404; H, Br, I, H, H, 2-Py], [A405; H, Br, Me, H, H, 2-Py], [A406; H, Br, OMe, H, H, 2-Py], [A407; H, Br, $CF_3$, H, H, 2-Py], [A408; H, Br, $CHF_2$, H, H, 2-Py], [A409; H, Br, $NO_2$, H, H, 2-Py], [A410; H, Br, H, H, H, 3-Py], [A411; H, Br, F, H, H, 3-Py], [A412; H, Br, Cl, H, H, 3-Py], [A413; H, Br, Br, H, H, 3-Py], [A414; H, Br, I, H, H, 3-Py], [A415; H, Br, Me, H, H, 3-Py], [A416; H, Br, OMe, H, H, 3-Py], [A417; H, Br, $CF_3$, H, H, 3-Py], [A418; H, Br, $CHF_2$, H, H, 3-Py], [A419; H, Br, $NO_2$, H, H, 3-Py], [A420; H, Br, H, H, H, 4-Py], [A421; H, Br, F, H, H, 4-Py], [A422; H, Br, Cl, H, H, 4-Py], [A423; H, Br, Br, H, H, 4-Py], [A424; H, Br, I, H, H, 4-Py], [A425; H, Br, Me, H, H, 4-Py], [A426; H, Br, OMe, H, H, 4-Py], [A427; H, Br, $CF_3$, H, H, 4-Py], [A428; H, Br, $CHF_2$, H, H, 4-Py], [A429; H, Br, $NO_2$, H, H, 4-Py], [A430; H, $CF_3$, H, H, H, Et], [A431; H, $CF_3$, F, H, H, Et], [A432; H, $CF_3$, Cl, H, H, Et], [A433; H, $CF_3$, Br, H, H, Et], [A434; H, $CF_3$, I, H, H, Et], [A435; H, $CF_3$, Me, H, H, Et], [A436; H, $CF_3$, OMe, H, H, Et], [A437; H, $CF_3$, $CF_3$, H, H, Et], [A438; H, $CF_3$, $CHF_2$, H, H, Et], [A439; H, $CF_3$, $NO_2$, H, H, Et], [A440; H, $CF_3$, H, H, H, Pr], [A441; H, $CF_3$, F, H, H, Pr], [A442; H, $CF_3$, Cl, H, H, Pr], [A443; H, $CF_3$, Br, H, H, Pr], [A444; H, $CF_3$, I, H, H, Pr], [A445; H, $CF_3$, Me, H, H, Pr], [A446; H, $CF_3$, OMe, H, H, Pr], [A447; H, $CF_3$, $CF_3$, H, H, Pr], [A448; H, $CF_3$, $CHF_2$, H, H, Pr], [A449; H, $CF_3$, $NO_2$, H, H, Pr], [A450; H, $CF_3$, H, H, H, i-Pr], [A451; H, $CF_3$, F, H, H, i-Pr], [A452; H, $CF_3$, Cl, H, H, i-Pr], [A453; H, $CF_3$, Br, H, H, i-Pr], [A454; H, $CF_3$, I, H, H, i-Pr], [A455; H, $CF_3$, Me, H, H, i-Pr], [A456; H, $CF_3$, OMe, H, H, i-Pr], [A457; H, $CF_3$, $CF_3$, H, H, i-Pr], [A458; H, $CF_3$, $CHF_2$, H, H, i-Pr], [A459; H, $CF_3$, $NO_2$, H, H, i-Pr], [A460; H, $CF_3$, H, H, H, c-Pr], [A461; H, $CF_3$, F, H, H, c-Pr], [A462; H, $CF_3$, Cl, H, H, c-Pr], [A463; H, $CF_3$, Br, H, H, c-Pr], [A464; H, $CF_3$, I, H, H, c-Pr], [A465; H, $CF_3$, Me, H, H, c-Pr], [A466; H, $CF_3$, OMe, H, H, c-Pr], [A467; H, $CF_3$, $CF_3$, H, H, c-Pr], [A468; H, $CF_3$, $CHF_2$, H, H, c-Pr], [A469; H, $CF_3$, $NO_2$, H, H, c-Pr], [A470; H, $CF_3$, H, H, H, Bu], [A471; H, $CF_3$, F, H, H, Bu], [A472; H, $CF_3$, Cl, H, H, Bu], [A473; H, $CF_3$, Br, H, H, Bu], [A474; H, $CF_3$, I, H, H, Bu], [A475; H, $CF_3$, Me, H, H, Bu], [A476; H, $CF_3$, OMe, H, H, Bu], [A477; H, $CF_3$, $CF_3$, H, H, Bu], [A478; H, $CF_3$, $CHF_2$, H, H, Bu], [A479; H, $CF_3$, $NO_2$, H, H, Bu], [A480; H, $CF_3$, H, H, H, i-Bu], [A481; H, $CF_3$, F, H, H, i-Bu], [A482; H, $CF_3$, Cl, H, H, i-Bu], [A483; H, $CF_3$, Br, H, H, i-Bu], [A484; H, $CF_3$, I, H, H, i-Bu], [A485; H, $CF_3$, Me, H, H, i-Bu], [A486; H, $CF_3$, OMe, H, H, i-Bu], [A487; H, $CF_3$, $CF_3$, H, H, i-Bu], [A488; H, $CF_3$, $CHF_2$, H, H, i-Bu], [A489; H, $CF_3$, $NO_2$, H, H, i-Bu], [A490; H, $CF_3$, H, H, H, $CH_2CF_3$], [A491; H, $CF_3$, F, H, H, $CH_2CF_3$], [A492; H, $CF_3$, Cl, H, H, $CH_2CF_3$], [A493; H, $CF_3$, Br, H, H, $CH_2CF_3$], [A494; H, $CF_3$, I, H, H, $CH_2CF_3$], [A495; H, $CF_3$, Me, H, H, $CH_2CF_3$], [A496; H, $CF_3$, OMe, H, H, $CH_2CF_3$], [A497; H, $CF_3$, $CF_3$, H, H, $CH_2CF_3$][A498; H, $CF_3$, $CHF_2$, H, H, $CH_2CF_3$], [A499; H, $CF_3$, $NO_2$, H, H, $CH_2CF_3$], [A500; H, $CF_3$, H, H, H, $CF_2CH_3$], [A501; H, $CF_3$, F, H, H, $CF_2CH_3$], [A502; H, $CF_3$, Cl, H, H, $CF_2CH_3$], [A503; H, $CF_3$, Br, H, H, $CF_2CH_3$], [A504; H, $CF_3$, I, H, H, $CF_2CH_3$], [A505; H, $CF_3$, Me, H, H, $CF_2CH_3$], [A506; H, $CF_3$, OMe, H, H, $CF_2CH_3$], [A507; H, $CF_3$, $CF_3$, H, H, $CF_2CH_3$], [A508; H, $CF_3$, $CHF_2$, H, H, $CF_2CH_3$], [A509; H, $CF_3$, $NO_2$, H, H, $CF_2CH_3$], [A510; H, $CF_3$, H, H, H, 2-Py], [A511; H, $CF_3$, F, H, H, 2-Py], [A512; H, $CF_3$, Cl, H, H, 2-Py], [A513; H, $CF_3$, Br, H, H, 2-Py], [A514; H, $CF_3$, I, H, H, 2-Py], [A515; H, $CF_3$, Me, H, H, 2-Py], [A516; H, $CF_3$,

OMe, H, H, 2-Py], [A517; H, $CF_3$, $CF_3$, H, H, 2-Py], [A518; H, $CF_3$, $CHF_2$, H, H, 2-Py], [A519; H, $CF_3$, $NO_2$, H, H, 2-Py], [A520; H, $CF_3$, H, H, H, 3-Py], [A521; H, $CF_3$, F, H, H, 3-Py], [A522; H, $CF_3$, Cl, H, H, 3-Py], [A523; H, $CF_3$, Br, H, H, 3-Py], [A524; H, $CF_3$, I, H, H, 3-Py], [A525; H, $CF_3$, Me, H, H, 3-Py], [A526; H, $CF_3$, OMe, H, H, 3-Py], [A527; H, $CF_3$, $CF_3$, H, H, 3-Py], [A528; H, $CF_3$, $CHF_2$, H, H, 3-Py], [A529; H, $CF_3$, $NO_2$, H, H, 3-Py], [A530; H, $CF_3$, H, H, H, 4-Py], [A531; H, $CF_3$, F, H, H, 4-Py], [A532; H, $CF_3$, Cl, H, H, 4-Py], [A533; H, $CF_3$, Br, H, H, 4-Py], [A534; H, $CF_3$, I, H, H, 4-Py], [A535; H, $CF_3$, Me, H, H, 4-Py], [A536; H, $CF_3$, OMe, H, H, 4-Py], [A537; H, $CF_3$, $CF_3$, H, H, 4-Py], [A538; H, $CF_3$, $CHF_2$, H, H, 4-Py], [A539; H, $CF_3$, $NO_2$, H, H, 4-Py], [A540; H, $NO_2$, H, H, H, Et], [A541; H, $NO_2$, F, H, H, Et], [A542; H, $NO_2$, Cl, H, H, Et], [A543; H, $NO_2$, Br, H, H, Et], [A544; H, $NO_2$, I, H, H, Et], [A545; H, $NO_2$, Me, H, H, Et], [A546; H, $NO_2$, OMe, H, H, Et], [A547; H, $NO_2$, $CF_3$, H, H, Et], [A548; H, $NO_2$, $CHF_2$, H, H, Et], [A549; H, $NO_2$, $NO_2$, H, H, Et], [A550; H, $NO_2$, H, H, H, Pr], [A551; H, $NO_2$, F, H, H, Pr], [A552; H, $NO_2$, Cl, H, H, Pr], [A553; H, $NO_2$, Br, H, H, Pr], [A554; H, $NO_2$, I, H, H, Pr], [A555; H, $NO_2$, Me, H, H, Pr], [A556; H, $NO_2$, OMe, H, H, Pr], [A557; H, $NO_2$, $CF_3$, H, H, Pr], [A558; H, $NO_2$, $CHF_2$, H, H, Pr], [A559; H, $NO_2$, $NO_2$, H, H, Pr], [A560; H, $NO_2$, H, H, H, i-Pr], [A561; H, $NO_2$, F, H, H, i-Pr], [A562; H, $NO_2$, Cl, H, H, i-Pr], [A563; H, $NO_2$, Br, H, H, i-Pr], [A564; H, $NO_2$, I, H, H, i-Pr], [A565; H, $NO_2$, Me, H, H, i-Pr], [A566; H, $NO_2$, OMe, H, H, i-Pr], [A567; H, $NO_2$, $CF_3$, H, H, i-Pr], [A568; H, $NO_2$, $CHF_2$, H, H, i-Pr], [A569; H, $NO_2$, $NO_2$, H, H, i-Pr], [A570; H, $NO_2$, H, H, H, c-Pr], [A571; H, $NO_2$, F, H, H, c-Pr], [A572; H, $NO_2$, Cl, H, H, c-Pr], [A573; H, $NO_2$, Br, H, H, c-Pr], [A574; H, $NO_2$, I, H, H, c-Pr], [A575; H, $NO_2$, Me, H, H, c-Pr], [A576; H, $NO_2$, OMe, H, H, c-Pr], [A577; H, $NO_2$, $CF_3$, H, H, c-Pr], [A578; H, $NO_2$, $CHF_2$, H, H, c-Pr], [A579; H, $NO_2$, $NO_2$, H, H, c-Pr], [A580; H, $NO_2$, H, H, H, Bu], [A581; H, $NO_2$, F, H, H, Bu], [A582; H, $NO_2$, Cl, H, H, Bu], [A583; H, $NO_2$, Br, H, H, Bu], [A584; H, $NO_2$, I, H, H, Bu], [A585; H, $NO_2$, Me, H, H, Bu], [A586; H, $NO_2$, OMe, H, H, Bu], [A587; H, $NO_2$, $CF_3$, H, H, Bu], [A588; H, $NO_2$, $CHF_2$, H, H, Bu], [A589; H, $NO_2$, $NO_2$, H, H, Bu], [A590; H, $NO_2$, H, H, H, i-Bu], [A591; H, $NO_2$, F, H, H, i-Bu], [A592; H, $NO_2$, Cl, H, H, i-Bu], [A593; H, $NO_2$, Br, H, H, i-Bu], [A594; H, $NO_2$, I, H, H, i-Bu], [A595; H, $NO_2$, Me, H, H, i-Bu], [A596; H, $NO_2$, OMe, H, H, i-Bu], [A597; H, $NO_2$, $CF_3$, H, H, i-Bu], [A598; H, $NO_2$, $CHF_2$, H, H, i-Bu], [A599; H, $NO_2$, $NO_2$, H, H, i-Bu], [A600; H, $NO_2$, H, H, H, $CH_2CF_3$], [A601; H, $NO_2$, F, H, H, $CH_2CF_3$], [A602; H, $NO_2$, Cl, H, H, $CH_2CF_3$], [A603; H, $NO_2$, Br, H, H, $CH_2CF_3$], [A604; H, $NO_2$, I, H, H, $CH_2CF_3$], [A605; H, $NO_2$, Me, H, H, $CH_2CF_3$], [A606; H, $NO_2$, OMe, H, H, $CH_2CF_3$], [A607; H, $NO_2$, $CF_3$, H, H, $CH_2CF_3$], [A608; H, $NO_2$, $CHF_2$, H, H, $CH_2CF_3$], [A609; H, $NO_2$, $NO_2$, H, H, $CH_2CF_3$], [A610; H, $NO_2$, H, H, H, $CF_2CH_3$], [A611; H, $NO_2$, F, H, H, $CF_2CH_3$], [A612; H, $NO_2$, Cl, H, H, $CF_2CH_3$], [A613; H, $NO_2$, Br, H, H, $CF_2CH_3$], [A614; H, $NO_2$, I, H, H, $CF_2CH_3$], [A615; H, $NO_2$, Me, H, H, $CF_2CH_3$], [A616; H, $NO_2$, OMe, H, H, $CF_2CH_3$], [A617; H, $NO_2$, $CF_3$, H, H, $CF_2CH_3$], [A618; H, $NO_2$, $CHF_2$, H, H, $CF_2CH_3$], [A619; H, $NO_2$, $NO_2$, H, H, $CF_2CH_3$], [A620; H, $NO_2$, H, H, H, 2-Py], [A621; H, $NO_2$, F, H, H, 2-Py], [A622; H, $NO_2$, Cl, H, H, 2-Py], [A623; H, $NO_2$, Br, H, H, 2-Py], [A624; H, $NO_2$, I, H, H, 2-Py], [A625; H, $NO_2$, Me, H, H, 2-Py], [A626; H, $NO_2$, OMe, H, H, 2-Py], [A627; H, $NO_2$, $CF_3$, H, H, 2-Py], [A628; H, $NO_2$, $CHF_2$, H, H, 2-Py], [A629; H, $NO_2$, $NO_2$, H, H, 2-Py], [A630; H, $NO_2$, H, H, H, 3-Py], [A631; H, $NO_2$, F, H, H, 3-Py], [A632; H, $NO_2$, Cl, H, H, 3-Py], [A633; H, $NO_2$, Br, H, H, 3-Py], [A634; H, $NO_2$, I, H, H, 3-Py], [A635; H, $NO_2$, Me, H, H, 3-Py], [A636; H, $NO_2$, OMe, H, H, 3-Py], [A637; H, $NO_2$, $CF_3$, H, H, 3-Py], [A638; H, $NO_2$, $CHF_2$, H, H, 3-Py], [A639; H, $NO_2$, $NO_2$, H, H, 3-Py], [A640; H, $NO_2$, H, H, H, 4-Py], [A641; H, $NO_2$, F, H, H, 4-Py], [A642; H, $NO_2$, Cl, H, H, 4-Py], [A643; H, $NO_2$, Br, H, H, 4-Py], [A644; H, $NO_2$, I, H, H, 4-Py], [A645; H, $NO_2$, Me, H, H, 4-Py], [A646; H, $NO_2$, OMe, H, H, 4-Py], [A647; H, $NO_2$, $CF_3$, H, H, 4-Py], [A648; H, $NO_2$, $CHF_2$, H, H, 4-Py], [A649; H, $NO_2$, $NO_2$, H, H, 4-Py], [A650; H, $OCH_2Ph$, H, H, H, Et], [A651; H, $OCH_2Ph$, F, H, H, Et], [A652; H, $OCH_2Ph$, Cl, H, H, Et], [A653; H, $OCH_2Ph$, Br, H, H, Et], [A654; H, $OCH_2Ph$, I, H, H, Et], [A655; H, $OCH_2Ph$, Me, H, H, Et], [A656; H, $OCH_2Ph$, OMe, H, H, Et], [A657; H, $OCH_2Ph$, $CF_3$, H, H, Et], [A658; H, $OCH_2Ph$, $CHF_2$, H, H, Et], [A659; H, $OCH_2Ph$, $NO_2$, H, H, Et], [A660; H, $OCH_2Ph$, H, H, H, Pr], [A661; H, $OCH_2Ph$, F, H, H, Pr], [A662; H, $OCH_2Ph$, Cl, H, H, Pr], [A663; H, $OCH_2Ph$, Br, H, H, Pr], [A664; H, $OCH_2Ph$, I, H, H, Pr], [A665; H, $OCH_2Ph$, Me, H, H, Pr], [A666; H, $OCH_2Ph$, OMe, H, H, Pr], [A667; H, $OCH_2Ph$, $CF_3$, H, H, Pr], [A668; H, $OCH_2Ph$, $CHF_2$, H, H, Pr], [A669; H, $OCH_2Ph$, $NO_2$, H, H, Pr], [A670; H, $OCH_2Ph$, H, H, H, i-Pr], [A671; H, $OCH_2Ph$, F, H, H, i-Pr], [A672; H, $OCH_2Ph$, Cl, H, H, i-Pr], [A673; H, $OCH_2Ph$, Br, H, H, i-Pr], [A674; H, $OCH_2Ph$, I, H, H, i-Pr], [A675; H, $OCH_2Ph$, Me, H, H, i-Pr], [A676; H, $OCH_2Ph$, OMe, H, H, i-Pr], [A677; H, $OCH_2Ph$, $CF_3$, H, H, i-Pr], [A678; H, $OCH_2Ph$, $CHF_2$, H, H, i-Pr], [A679; H, $OCH_2Ph$, $NO_2$, H, H, i-Pr], [A680; H, $OCH_2Ph$, H, H, H, c-Pr], [A681; H, $OCH_2Ph$, F, H, H, c-Pr], [A682; H, $OCH_2Ph$, Cl, H, H, c-Pr], [A683; H, $OCH_2Ph$, Br, H, H, c-Pr], [A684; H, $OCH_2Ph$, I, H, H, c-Pr], [A685; H, $OCH_2Ph$, Me, H, H, c-Pr], [A686; H, $OCH_2Ph$, OMe, H, H, c-Pr], [A687; H, $OCH_2Ph$, $CF_3$, H, H, c-Pr], [A688; H, $OCH_2Ph$, $CHF_2$, H, H, c-Pr], [A689; H, $OCH_2Ph$, $NO_2$, H, H, c-Pr], [A690; H, $OCH_2Ph$, H, H, H, Bu], [A691; H, $OCH_2Ph$, F, H, H, Bu], [A692; H, $OCH_2Ph$, Cl, H, H, Bu], [A693; H, $OCH_2Ph$, Br, H, H, Bu], [A694; H, $OCH_2Ph$, I, H, H, Bu], [A695; H, $OCH_2Ph$, Me, H, H, Bu], [A696; H, $OCH_2Ph$, OMe, H, H, Bu], [A697; H, $OCH_2Ph$, $CF_3$, H, H, Bu], [A698; H, $OCH_2Ph$, $CHF_2$, H, H, Bu], [A699; H, $OCH_2Ph$, $NO_2$, H, H, Bu], [A700; H, $OCH_2Ph$, H, H, H, i-Bu], [A701; H, $OCH_2Ph$, F, H, H, i-Bu], [A702; H, $OCH_2Ph$, Cl, H, H, i-Bu], [A703; H, $OCH_2Ph$, Br, H, H, i-Bu], [A704; H, $OCH_2Ph$, I, H, H, i-Bu], [A705; H, $OCH_2Ph$, Me, H, H, i-Bu], [A706; H, $OCH_2Ph$, OMe, H, H, i-Bu], [A707; H, $OCH_2Ph$, $CF_3$, H, H, i-Bu], [A708; H, $OCH_2Ph$, $CHF_2$, H, H, i-Bu], [A709; H, $OCH_2Ph$, $NO_2$, H, H, i-Bu], [A710; H, $OCH_2Ph$, H, H, H, $CH_2CF_3$], [A711; H, $OCH_2Ph$, F, H, H, $CH_2CF_3$], [A712; H, $OCH_2Ph$, Cl, H, H, $CH_2CF_3$], [A713; H, $OCH_2Ph$, Br, H, H, $CH_2CF_3$], [A714; H, $OCH_2Ph$, I, H, H, $CH_2CF_3$], [A715; H, $OCH_2Ph$, Me, H, H, $CH_2CF_3$], [A716; H, $OCH_2Ph$, OMe, H, H, $CH_2CF_3$], [A717; H, $OCH_2Ph$, $CF_3$, H, H, $CH_2CF_3$], [A718; H, $OCH_2Ph$, $CHF_2$, H, H, $CH_2CF_3$], [A719; H, $OCH_2Ph$, $NO_2$, H, H, $CH_2CF_3$], [A720; H, $OCH_2Ph$, H, H, H, $CF_2CH_3$], [A721; H, $OCH_2Ph$, F, H, H, $CF_2CH_3$], [A722; H, $OCH_2Ph$, Cl, H, H, $CF_2CH_3$], [A723; H, $OCH_2Ph$, Br, H, H, $CF_2CH_3$], [A724; H, $OCH_2Ph$, I, H, H, $CF_2CH_3$], [A725; H, $OCH_2Ph$, Me, H, H, $CF_2CH_3$], [A726; H, $OCH_2Ph$, OMe, H, H, $CF_2CH_3$], [A727; H, $OCH_2Ph$, $CF_3$, H, H, $CF_2CH_3$], [A728; H, $OCH_2Ph$, $CHF_2$, H, H, $CF_2CH_3$], [A729; H, $OCH_2Ph$, $NO_2$, H, H, $CF_2CH_3$], [A730; H, $OCH_2Ph$, H, H, H, 2-Py], [A731; H, $OCH_2Ph$, F, H, H, 2-Py], [A732; H, $OCH_2Ph$, Cl, H, H, 2-Py], [A733; H, $OCH_2Ph$, Br, H, H, 2-Py], [A734; H, $OCH_2Ph$, I, H, H, 2-Py], [A735; H, $OCH_2Ph$, Me, H, H, 2-Py], [A736; H, $OCH_2Ph$, OMe, H, H, 2-Py], [A737; H, $OCH_2Ph$, $CF_3$, H, H, 2-Py], [A738; H, $OCH_2Ph$, $CHF_2$, H, H, 2-Py], [A739; H, $OCH_2Ph$, $NO_2$, H, H, 2-Py], [A740; H, $OCH_2Ph$, H, H, H, 3-Py], [A741; H, $OCH_2Ph$, F, H, H, 3-Py], [A742; H, $OCH_2Ph$, Cl, H, H, 3-Py], [A743; H, $OCH_2Ph$, Br, H, H, 3-Py], [A744; H, $OCH_2Ph$, I, H, H, 3-Py], [A745; H, $OCH_2Ph$, Me, H, H, 3-Py], [A746; H, $OCH_2Ph$, OMe, H, H, 3-Py], [A747; H, $OCH_2Ph$, $CF_3$, H, H, 3-Py], [A748; H, $OCH_2Ph$, $CHF_2$, H, H, 3-Py], [A749; H, $OCH_2Ph$, $NO_2$, H, H, 3-Py], [A750; H, $OCH_2Ph$, H, H, H, 4-Py], [A751; H, $OCH_2Ph$, F, H, H, 4-Py], [A752; H, $OCH_2Ph$, Cl, H, H, 4-Py], [A753; H, $OCH_2Ph$, Br, H, H, 4-Py], [A754; H, $OCH_2Ph$, I, H, H, 4-Py], [A755; H, $OCH_2Ph$, Me, H, H, 4-Py], [A756; H, $OCH_2Ph$, OMe, H, H, 4-Py], [A757; H, $OCH_2Ph$, $CF_3$, H, H, 4-Py], [A758; H, $OCH_2Ph$, $CHF_2$, H, H, 4-Py], [A759; H, $OCH_2Ph$, $NO_2$, H, H, 4-Py], [A760; H, F, H, F, H, Et], [A761; H, F, F, F, H, Et], [A762; H, F, Cl, F, H, Et], [A763; H, F, Br, F, H, Et], [A764; H, F, I, F, H, Et], [A765; H, F, Me, F, H, Et], [A766; H, F, OMe, F, H, Et], [A767; H, F, $CF_3$, F, H, Et], [A768; H, F, $CHF_2$, F, H, Et], [A769; H, F, $NO_2$, F, H, Et], [A770; H, F, H, F, H, Pr], [A771; H, F, F, F, H, Pr], [A772; H, F, Cl, F, H, Pr], [A773; H, F, Br, F, H, Pr], [A774; H, F, I, F, H, Pr], [A775; H, F, Me, F, H, Pr], [A776; H, F, OMe, F, H, Pr], [A777; H, F, $CF_3$, F, H, Pr], [A778; H, F, $CHF_2$, F, H, Pr], [A779; H, F, $NO_2$, F, H, Pr], [A780; H, F, H, F, H, i-Pr], [A781; H, F, F, F, H, i-Pr], [A782; H, F, Cl, F, H, i-Pr], [A783; H, F, Br, F, H, i-Pr], [A784; H, F, I, F, H, i-Pr], [A785; H, F, Me, F, H, i-Pr], [A786; H, F, OMe, F, H, i-Pr], [A787; H, F, $CF_3$, F, H, i-Pr], [A788; H, F, $CHF_2$, F, H, i-Pr], [A789; H, F, $NO_2$, F, H, i-Pr], [A790; H, F, H, F, H, c-Pr], [A791; H, F, F, F, H, c-Pr], [A792; H, F, Cl, F, H, c-Pr], [A793; H, F, Br, F, H, c-Pr], [A794; H, F, I, F, H, c-Pr], [A795; H, F, Me, F, H, c-Pr], [A796; H, F, OMe, F, H, c-Pr], [A797; H, F, $CF_3$, F, H, c-Pr], [A798; H, F, $CHF_2$, F, H, c-Pr], [A799; H, F, $NO_2$, F, H, c-Pr], [A800; H, F, H, F, H, Bu], [A801; H, F, F, F, H, Bu], [A802; H, F, Cl, F, H, Bu], [A803; H, F, Br, F, H, Bu], [A804; H, F, I, F, H, Bu], [A805; H, F, Me, F, H, Bu], [A806; H, F, OMe, F, H, Bu], [A807; H, F, $CF_3$, F, H, Bu], [A808; H, F, $CHF_2$, F, H, Bu], [A809; H, F, $NO_2$, F, H, Bu], [A810; H, F, H, F, H, i-Bu], [A811; H, F, F, F, H, i-Bu], [A812; H, F, Cl, F, H, i-Bu], [A813; H, F, Br, F, H, i-Bu], [A814; H, F, I, F, H, i-Bu], [A815; H, F, Me, F, H, i-Bu], [A816; H, F, OMe, F, H, i-Bu], [A817; H, F, $CF_3$, F, H, i-Bu], [A818; H, F, $CHF_2$, F, H, i-Bu], [A819; H, F, $NO_2$, F, H, i-Bu], [A820; H, F, H, F, H, $CH_2CF_3$], [A821; H, F, F, F, H, $CH_2CF_3$], [A822; H, F, Cl, F, H, $CH_2CF_3$], [A823; H, F, Br, F, H, $CH_2CF_3$], [A824; H, F, I, F, H, $CH_2CF_3$], [A825; H, F, Me, F, H, $CH_2CF_3$], [A826; H, F, OMe, F, H, $CH_2CF_3$], [A827; H, F, $CF_3$, F, H, $CH_2CF_3$], [A828; H, F, $CHF_2$, F, H, $CH_2CF_3$], [A829; H, F, $NO_2$, F, H, $CH_2CF_3$], [A830; H, F, H, F, H, $CF_2CH_3$], [A831; H, F, F, F, H, $CF_2CH_3$], [A832; H, F, Cl, F, H, $CF_2CH_3$], [A833; H, F, Br, F, H, $CF_2CH_3$], [A834; H, F, I, F, H, $CF_2CH_3$], [A835; H, F, Me, F, H, $CF_2CH_3$], [A836; H, F, OMe, F, H, $CF_2CH_3$], [A837; H, F, $CF_3$, F, H, $CF_2CH_3$], [A838; H, F, $CHF_2$, F, H, $CF_2CH_3$], [A839; H, F, $NO_2$, F, H, $CF_2CH_3$], [A840; H, F, H, F, H, 2-Py], [A841; H, F, F, F, H, 2-Py], [A842; H, F, Cl, F, H, 2-Py], [A843; H, F, Br, F, H, 2-Py], [A844; H, F, I, F, H, 2-Py], [A845; H, F, Me, F, H, 2-Py], [A846; H, F, OMe, F, H, 2-Py], [A847; H, F, $CF_3$, F, H, 2-Py], [A848; H, F, $CHF_2$, F, H, 2-Py], [A849; H, F, $NO_2$, F, H, 2-Py], [A850; H, F, H, F, H, 3-Py], [A851; H, F, F, F, H, 3-Py], [A852; H, F, Cl, F, H, 3-Py], [A853; H, F, Br, F, H, 3-Py], [A854; H, F, I, F, H, 3-Py], [A855; H, F, Me, F, H, 3-Py], [A856; H, F, OMe, F, H, 3-Py], [A857; H, F, $CF_3$, F, H, 3-Py], [A858; H, F, $CHF_2$, F, H, 3-Py], [A859; H, F, $NO_2$, F, H, 3-Py], [A860; H, F, H, F, H, 4-Py], [A861; H, F, F, F, H, 4-Py], [A862; H, F, Cl, F, H, 4-Py], [A863; H, F, Br, F, H, 4-Py], [A864; H, F, I, F, H, 4-Py], [A865; H, F, Me, F, H, 4-Py], [A866; H, F, OMe, F, H, 4-Py], [A867; H, F, $CF_3$, F, H, 4-Py], [A868; H, F, $CHF_2$, F, H, 4-Py], [A869; H, F, $NO_2$, F, H, 4-Py], [A870; H, C, H, F, H, Et], [A871; H, C, F, F, H, Et], [A872; H, Cl, Cl, F, H, Et], [A873; H, Cl, Br, F, H, Et], [A874; H, Cl, I, F, H, Et], [A875; H, Cl, Me, F, H, Et], [A876; H, Cl, OMe, F, H, Et], [A877; H, C, $CF_3$, F, H, Et], [A878; H, Cl, $CHF_2$, F, H, Et], [A879; H, Cl, $NO_2$, F, H, Et], [A880; H, Cl, H, F, H, Pr], [A881; H, Cl, F, F, H, Pr], [A882; H, Cl, Cl, F, H, Pr], [A883; H, Cl, Br, F, H, Pr], [A884; H, Cl, I, F, H, Pr], [A885; H, Cl, Me, F, H, Pr], [A886; H, Cl, OMe, F, H, Pr], [A887; H, Cl, $CF_3$, F, H, Pr], [A888; H, Cl, $CHF_2$, F, H, Pr], [A889; H, Cl, $NO_2$, F, H, Pr], [A890; H, Cl, H, F, H, i-Pr], [A891; H, Cl, F, F, H, i-Pr], [A892; H, Cl, Cl, F, H, i-Pr], [A893; H, Cl, Br, F, H, i-Pr], [A894; H, Cl, I, F, H, i-Pr], [A895; H, Cl, Me, F, H, i-Pr], [A896; H, Cl, OMe, F, H, i-Pr], [A897; H, Cl, $CF_3$, F, H, i-Pr], [A898; H, Cl, $CHF_2$, F, H, i-Pr], [A899; H, Cl, $NO_2$, F, H, i-Pr], [A900; H, Cl, H, F, H, c-Pr], [A901; H, Cl, F, F, H, c-Pr], [A902; H, Cl, Cl, F, H, c-Pr], [A903; H, Cl, Br, F, H, c-Pr], [A904; H, Cl, I, F, H, c-Pr], [A905; H, Cl, Me, F, H, c-Pr], [A906; H, Cl, OMe, F, H, c-Pr], [A907; H, Cl, $CF_3$, F, H, c-Pr], [A908; H, Cl, $CHF_2$, F, H, c-Pr], [A909; H, Cl, $NO_2$, F, H, c-Pr], [A910; H, Cl, H, F, H, Bu], [A911; H, Cl, F, F, H, Bu], [A912; H, Cl, Cl, F, H, Bu], [A913; H, Cl, Br, F, H, Bu], [A914; H, Cl, I, F, H, Bu], [A915; H, Cl, Me, F, H, Bu], [A916; H, Cl, OMe, F, H, Bu], [A917; H, Cl, $CF_3$, F, H, Bu], [A918; H, Cl, $CHF_2$, F, H, Bu], [A919; H, Cl, $NO_2$, F, H, Bu], [A920; H, Cl, H, F, H, i-Bu], [A921; H, Cl, F, F, H, i-Bu], [A922; H, Cl, Cl, F, H, i-Bu], [A923; H, Cl, Br, F, H, i-Bu], [A924; H, Cl, I, F, H, i-Bu], [A925; H, Cl, Me, F, H, i-Bu], [A926; H, Cl, OMe, F, H, i-Bu], [A927; H, Cl, $CF_3$, F, H, i-Bu], [A928; H, Cl, $CHF_2$, F, H, i-Bu], [A929; H, Cl, $NO_2$, F, H, i-Bu], [A930; H, Cl, H, F, H, $CH_2CF_3$], [A931; H, Cl, F, F, H, $CH_2CF_3$], [A932; H, Cl, Cl, F, H, $CH_2CF_3$], [A933; H, Cl, Br, F, H, $CH_2CF_3$], [A934; H, Cl, I, F, H, $CH_2CF_3$], [A935; H, Cl, Me, F, H, $CH_2CF_3$], [A936; H, Cl, OMe, F, H, $CH_2CF_3$], [A937; H, Cl, $CF_3$, F, H, $CH_2CF_3$], [A938; H, Cl, $CHF_2$, F, H, $CH_2CF_3$], [A939; H, Cl, $NO_2$, F, H, $CH_2CF_3$], [A940; H, Cl, H, F, H, $CF_2CH_3$], [A941; H, Cl, F, F, H, $CF_2CH_3$], [A942; H, Cl, Cl, F, H, $CF_2CH_3$], [A943; H, Cl, Br, F, H, $CF_2CH_3$], [A944; H, Cl, I, F, H, $CF_2CH_3$], [A945; H, Cl, Me, F, H, $CF_2CH_3$], [A946; H, Cl, OMe, F, H, $CF_2CH_3$], [A947; H, Cl, $CF_3$, F, H, $CF_2CH_3$], [A948; H, Cl, $CHF_2$, F, H, $CF_2CH_3$], [A949; H, Cl, $NO_2$, F, H, $CF_2CH_3$], [A950; H, Cl, H, F, H, 2-Py], [A951; H, Cl, F, F, H, 2-Py], [A952; H, Cl, Cl, F, H, 2-Py], [A953; H, Cl, Br, F, H, 2-Py], [A954; H, Cl, I, F, H, 2-Py], [A955; H, Cl, Me, F, H, 2-Py], [A956; H, Cl, OMe, F, H, 2-Py], [A957; H, Cl, $CF_3$, F, H, 2-Py], [A958; H, Cl, $CHF_2$, F, H, 2-Py], [A959; H, Cl, $NO_2$, F, H, 2-Py], [A960; H, Cl, H, F, H, 3-Py], [A961; H, Cl, F, F, H, 3-Py], [A962; H, Cl, Cl, F, H, 3-Py], [A963; H, Cl, Br, F, H, 3-Py], [A964; H, Cl, I, F, H, 3-Py], [A965; H, Cl, Me, F, H, 3-Py], [A966; H, Cl, OMe, F, H, 3-Py], [A967; H, Cl, $CF_3$, F, H, 3-Py], [A968; H, Cl, $CHF_2$, F, H, 3-Py], [A969; H, Cl, $NO_2$, F, H, 3-Py], [A970; H, Cl, H, F, H, 4-Py], [A971; H, Cl, F, F, H, 4-Py], [A972; H, Cl, Cl, F, H, 4-Py], [A973; H, Cl, Br, F, H, 4-Py], [A974; H, Cl, I, F, H, 4-Py], [A975; H, Cl, Me, F, H, 4-Py], [A976; H, Cl, OMe, F, H, 4-Py], [A977; H, Cl, $CF_3$, F, H, 4-Py], [A978; H, Cl, $CHF_2$, F, H, 4-Py], [A979; H, Cl, $NO_2$, F, H, 4-Py], [A980; H, Br, H, F, H, Et], [A981; H, Br, F, F, H, Et], [A982; H, Br, Cl, F, H, Et], [A983; H, Br, Br, F, H, Et], [A984; H, Br, I, F, H, Et], [A985; H, Br, Me, F, H, Et], [A986; H, Br, OMe, F, H, Et], [A987; H, Br, $CF_3$, F, H, Et], [A988; H, Br, $CHF_2$, F, H, Et], [A989; H, Br, $NO_2$, F, H, Et], [A990; H, Br, H, F, H, Pr], [A991; H, Br, F, F, H, Pr], [A992;

H, Br, Cl, F, H, Pr], [A993; H, Br, Br, F, H, Pr], [A994; H, Br, I, F, H, Pr], [A995; H, Br, Me, F, H, Pr], [A996; H, Br, OMe, F, H, Pr], [A997; H, Br, $CF_3$, F, H, Pr], [A998; H, Br, $CHF_2$, F, H, Pr], [A999; H, Br, $NO_2$, F, H, Pr], [A1000; H, Br, H, F, H, i-Pr], [A1001; H, Br, F, F, H, i-Pr], [A1002; H, Br, Cl, F, H, i-Pr], [A1003; H, Br, Br, F, H, i-Pr], [A1004; H, Br, I, F, H, i-Pr], [A1005; H, Br, Me, F, H, i-Pr], [A1006; H, Br, OMe, F, H, i-Pr], [A1007; H, Br, $CF_3$, F, H, i-Pr], [A1008; H, Br, $CHF_2$, F, H, i-Pr], [A1009; H, Br, $NO_2$, F, H, i-Pr], [A100; H, Br, H, F, H, c-Pr], [A101; H, Br, F, F, H, c-Pr], [A1012; H, Br, Cl, F, H, c-Pr], [A1013; H, Br, Br, F, H, c-Pr], [A1014; H, Br, I, F, H, c-Pr], [A1015; H, Br, Me, F, H, c-Pr], [A1016; H, Br, OMe, F, H, c-Pr], [A1017; H, Br, $CF_3$, F, H, c-Pr], [A1018; H, Br, $CHF_2$, F, H, c-Pr], [A1019; H, Br, $NO_2$, F, H, c-Pr], [A1020; H, Br, H, F, H, Bu], [A1021; H, Br, F, F, H, Bu], [A1022; H, Br, Cl, F, H, Bu], [A1023; H, Br, Br, F, H, Bu], [A1024; H, Br, I, F, H, Bu], [A1025; H, Br, Me, F, H, Bu], [A1026; H, Br, OMe, F, H, Bu], [A1027; H, Br, $CF_3$, F, H, Bu], [A1028; H, Br, $CHF_2$, F, H, Bu], [A1029; H, Br, $NO_2$, F, H, Bu], [A1030; H, Br, H, F, H, i-Bu], [A1031; H, Br, F, F, H, i-Bu], [A1032; H, Br, Cl, F, H, i-Bu], [A1033; H, Br, Br, F, H, i-Bu], [A1034; H, Br, I, F, H, i-Bu], [A1035; H, Br, Me, F, H, i-Bu], [A1036; H, Br, OMe, F, H, i-Bu], [A1037; H, Br, $CF_3$, F, H, i-Bu], [A1038; H, Br, $CHF_2$, F, H, i-Bu], [A1039; H, Br, $NO_2$, F, H, i-Bu], [A1040; H, Br, H, F, H, $CH_2CF_3$], [A1041; H, Br, F, F, H, $CH_2CF_3$], [A1042; H, Br, Cl, F, H, $CH_2CF_3$], [A1043; H, Br, Br, F, H, $CH_2CF_3$], [A1044; H, Br, I, F, H, $CH_2CF_3$], [A1045; H, Br, Me, F, H, $CH_2CF_3$], [A1046; H, Br, OMe, F, H, $CH_2CF$], [A1047; H, Br, $CF_3$, F, H, $CH_2CF_3$], [A1048; H, Br, $CHF_2$, F, H, $CH_2CF_3$], [A1049; H, Br, $NO_2$, F, H, $CH_2CF_3$], [A1050; H, Br, H, F, H, $CF_2CH_3$], [A1051; H, Br, F, F, H, $CF_2CH_3$], [A1052; H, Br, Cl, F, H, $CF_2CH_3$], [A1053; H, Br, Br, F, H, $CF_2CH_3$], [A1054; H, Br, I, F, H, $CF_2CH_3$], [A1055; H, Br, Me, F, H, $CF_2CH_3$], [A1056; H, Br, OMe, F, H, $CF_2CH_3$], [A1057; H, Br, $CF_3$, F, H, $CF_2CH_3$], [A1058; H, Br, $CHF_2$, F, H, $CF_2CH_3$], [A1059; H, Br, $NO_2$, F, H, $CF_2CH_3$], [A1060; H, Br, H, F, H, 2-Py], [A1061; H, Br, F, F, H, 2-Py], [A1062; H, Br, Cl, F, H, 2-Py], [A1063; H, Br, Br, F, H, 2-Py], [A1064; H, Br, I, F, H, 2-Py], [A1065; H, Br, Me, F, H, 2-Py], [A1066; H, Br, OMe, F, H, 2-Py], [A1067; H, Br, $CF_3$, F, H, 2-Py], [A1068; H, Br, $CHF_2$, F, H, 2-Py], [A1069; H, Br, $NO_2$, F, H, 2-Py], [A1070; H, Br, H, F, H, 3-Py], [A1071; H, Br, F, F, H, 3-Py], [A1072; H, Br, Cl, F, H, 3-Py], [A1073; H, Br, Br, F, H, 3-Py], [A1074; H, Br, I, F, H, 3-Py], [A1075; H, Br, Me, F, H, 3-Py], [A1076; H, Br, OMe, F, H, 3-Py], [A1077; H, Br, $CF_3$, F, H, 3-Py], [A1078; H, Br, $CHF_2$, F, H, 3-Py], [A1079; H, Br, $NO_2$, F, H, 3-Py], [A1080; H, Br, H, F, H, 4-Py], [A1081; H, Br, F, F, H, 4-Py], [A1082; H, Br, Cl, F, H, 4-Py], [A1083; H, Br, Br, F, H, 4-Py], [A1084; H, Br, I, F, H, 4-Py], [A1085; H, Br, Me, F, H, 4-Py], [A1086; H, Br, OMe, F, H, 4-Py], [A1087; H, Br, $CF_3$, F, H, 4-Py], [A1088; H, Br, $CHF_2$, F, H, 4-Py], [A1089; H, Br, $NO_2$, F, H, 4-Py], [A1090; H, $CF_3$, H, F, H, Et], [A1091; H, $CF_3$, F, F, H, Et], [A1092; H, $CF_3$, Cl, F, H, Et], [A1093; H, $CF_3$, Br, F, H, Et], [A1094; H, $CF_3$, I, F, H, Et], [A1095; H, $CF_3$, Me, F, H, Et], [A1096; H, $CF_3$, OMe, F, H, Et], [A1097; H, $CF_3$, CFs, F, H, Et], [A1098; H, $CF_3$, $CHF_2$, F, H, Et], [A1099; H, $CF_3$, $NO_2$, F, H, Et], [A1100; H, $CF_3$, H, F, H, Pr], [A1101; H, $CF_3$, F, F, H, Pr], [A1102; H, $CF_3$, Cl, F, H, Pr], [A1103; H, $CF_3$, Br, F, H, Pr], [A1104; H, $CF_3$, I, F, H, Pr], [A1105; H, $CF_3$, Me, F, H, Pr], [A1106; H, $CF_3$, OMe, F, H, Pr], [A1107; H, $CF_3$, $CF_3$, F, H, Pr], [A1108; H, $CF_3$, $CHF_2$, F, H, Pr], [A1109; H, $CF_3$, $NO_2$, F, H, Pr], [A1110; H, $CF_3$, H, F, H, i-Pr], [A1111; H, $CF_3$, F, F, H, i-Pr], [A1112; H, $CF_3$, Cl, F, H, i-Pr], [A1113; H, $CF_3$, Br, F, H, i-Pr], [A1114; H, $CF_3$, I, F, H, i-Pr], [A1115; H, $CF_3$, Me, F, H, i-Pr], [A1116; H, $CF_3$, OMe, F, H, i-Pr], [A1117; H, $CF_3$, $CF_3$, F, H, i-Pr], [A1118; H, $CF_3$, $CHF_2$, F, H, i-Pr], [A1119; H, $CF_3$, $NO_2$, F, H, i-Pr], [A1120; H, $CF_3$, H, F, H, c-Pr], [A1121; H, $CF_3$, F, F, H, c-Pr], [A1122; H, $CF_3$, Cl, F, H, c-Pr], [A1123; H, $CF_3$, Br, F, H, c-Pr], [A1124; H, $CF_3$, I, F, H, c-Pr], [A1125; H, $CF_3$, Me, F, H, c-Pr], [A1126; H, $CF_3$, OMe, F, H, c-Pr], [A1127; H, $CF_3$, $CF_3$, F, H, c-Pr], [A1128; H, $CF_3$, $CHF_2$, F, H, c-Pr], [A1129; H, $CF_3$, $NO_2$, F, H, c-Pr], [A1130; H, $CF_3$, H, F, H, Bu], [A1131; H, $CF_3$, F, F, H, Bu], [A1132; H, $CF_3$, Cl, F, H, Bu], [A1133; H, $CF_3$, Br, F, H, Bu], [A1134; H, $CF_3$, I, F, H, Bu], [A1135; H, $CF_3$, Me, F, H, Bu], [A1136; H, $CF_3$, OMe, F, H, Bu], [A1137; H, $CF_3$, $CF_3$, F, H, Bu], [A1138; H, $CF_3$, $CHF_2$, F, H, Bu], [A1139; H, $CF_3$, $NO_2$, F, H, Bu], [A1140; H, $CF_3$, H, F, H, i-Bu], [A1141; H, $CF_3$, F, F, H, i-Bu], [A1142; H, $CF_3$, Cl, F, H, i-Bu], [A1143; H, $CF_3$, Br, F, H, i-Bu], [A1144; H, $CF_3$, I, F, H, i-Bu], [A1145; H, $CF_3$, Me, F, H, i-Bu], [A1146; H, $CF_3$, OMe, F, H, i-Bu], [A1147; H, $CF_3$, $CF_3$, F, H, i-Bu], [A1148; H, $CF_3$, $CHF_2$, F, H, i-Bu], [A1149; H, $CF_3$, $NO_2$, F, H, i-Bu], [A1150; H, $CF_3$, H, F, H, $CH_2CF_3$], [A1151; H, $CF_3$, F, F, H, $CH_2CF_3$], [A1152; H, $CF_3$, Cl, F, H, $CH_2CF_3$], [A1153; H, $CF_3$, Br, F, H, $CH_2CF_3$], [A1154; H, $CF_3$, I, F, H, $CH_2CF_3$], [A1155; H, $CF_3$, Me, F, H, $CH_2CF_3$], [A1156; H, $CF_3$, OMe, F, H, $CH_2CF_3$], [A1157; H, $CF_3$, $CF_3$, F, H, $CH_2CF_3$], [A1158; H, $CF_3$, $CHF_2$, F, H, $CH_2CF_3$], [A1159; H, $CF_3$, $NO_2$, F, H, $CH_2CF_3$], [A1160; H, $CF_3$, H, F, H, $CF_2CH_3$], [A1161; H, $CF_3$, F, F, H, $CF_2CH_3$], [A1162; H, $CF_3$, Cl, F, H, $CF_2CH_3$], [A1163; H, $CF_3$, Br, F, H, $CF_2CH_3$], [A1164; H, $CF_3$, I, F, H, $CF_2CH_3$], [A1165; H, $CF_3$, Me, F, H, $CF_2CH_3$], [A1166; H, $CF_3$, OMe, F, H, $CF_2CH_3$], [A1167; H, $CF_3$, $CF_3$, F, H, $CF_2CH_3$], [A1168; H, $CF_3$, $CHF_2$, F, H, $CF_2CH_3$], [A1169; H, $CF_3$, $NO_2$, F, H, $CF_2CH_3$], [A1170; H, $CF_3$, H, F, H, 2-Py], [A1171; H, $CF_3$, F, F, H, 2-Py], [A1172; H, $CF_3$, Cl, F, H, 2-Py], [A1173; H, $CF_3$, Br, F, H, 2-Py], [A1174; H, $CF_3$, I, F, H, 2-Py], [A1175; H, $CF_3$, Me, F, H, 2-Py], [A1176; H, $CF_3$, OMe, F, H, 2-Py], [A1177; H, $CF_3$, $CF_3$, F, H, 2-Py], [A1178; H, $CF_3$, $CHF_2$, F, H, 2-Py], [A1179; H, $CF_3$, $NO_2$, F, H, 2-Py], [A1180; H, $CF_3$, H, F, H, 3-Py], [A1181; H, $CF_3$, F, F, H, 3-Py], [A1182; H, $CF_3$, Cl, F, H, 3-Py], [A1183; H, $CF_3$, Br, F, H, 3-Py], [A1184; H, $CF_3$, I, F, H, 3-Py], [A1185; H, $CF_3$, Me, F, H, 3-Py], [A1186; H, $CF_3$, OMe, F, H, 3-Py], [A1187; H, $CF_3$, $CF_3$, F, H, 3-Py], [A1188; H, $CF_3$, $CHF_2$, F, H, 3-Py], [A1189; H, $CF_3$, $NO_2$, F, H, 3-Py], [A1190; H, $CF_3$, H, F, H, 4-Py], [A1191; H, $CF_3$, F, F, H, 4-Py], [A1192; H, $CF_3$, Cl, F, H, 4-Py], [A1193; H, $CF_3$, Br, F, H, 4-Py], [A1194; H, $CF_3$, I, F, H, 4-Py], [A1195; H, $CF_3$, Me, F, H, 4-Py], [A1196; H, $CF_3$, OMe, F, H, 4-Py], [A1197; H, $CF_3$, $CF_3$, F, H, 4-Py], [A1198; H, $CF_3$, $CHF_2$, F, H, 4-Py], [A1199; H, $CF_3$, $NO_2$, F, H, 4-Py], [A1200; H, $NO_2$, H, F, H, Et], [A1201; H, $NO_2$, F, F, H, Et], [A1202; H, $NO_2$, Cl, F, H, Et], [$Al_2O_3$; H, $NO_2$, Br, F, H, Et], [A1204; H, $NO_2$, I, F, H, Et], [A1205; H, $NO_2$, Me, F, H, Et], [A1206; H, $NO_2$, OMe, F, H, Et], [A1207; H, $NO_2$, $CF_3$, F, H, Et], [A1208; H, $NO_2$, $CHF_2$, F, H, Et], [A1209; H, $NO_2$, $NO_2$, F, H, Et], [A1210; H, $NO_2$, H, F, H, Pr], [A1211; H, $NO_2$, F, F, H, Pr], [A1212; H, $NO_2$, Cl, F, H, Pr], [A1213; H, $NO_2$, Br, F, H, Pr], [A1214; H, $NO_2$, I, F, H, Pr], [A1215; H, $NO_2$, Me, F, H, Pr], [A1216; H, $NO_2$, OMe, F, H, Pr], [A1217; H, $NO_2$, $CF_3$, F, H, Pr], [A1218; H, $NO_2$, $CHF_2$, F, H, Pr], [A1219; H, $NO_2$, $NO_2$, F, H, Pr], [A1220; H, $NO_2$, H, F, H, i-Pr], [A1221; H, $NO_2$, F, F, H, i-Pr], [A1222; H, $NO_2$, Cl, F, H, i-Pr], [A1223; H, $NO_2$, Br, F, H, i-Pr], [A1224; H, $NO_2$, I, F, H, i-Pr], [A1225; H, $NO_2$, Me, F, H, i-Pr], [A1226; H, $NO_2$, OMe, F, H, i-Pr], [A1227; H, $NO_2$, $CF_3$, F, H, i-Pr], [A1228; H, $NO_2$, $CHF_2$, F, H, i-Pr], [A1229; H, $NO_2$, $NO_2$, F, H, i-Pr], [A1230; H, $NO_2$, H, F, H, c-Pr], [A1231; H, $NO_2$,

F, F, H, c-Pr], [A1232; H, $NO_2$, Cl, F, H, c-Pr], [A1233; H, $NO_2$, Br, F, H, c-Pr], [A1234; H, $NO_2$, I, F, H, c-Pr], [A1235; H, $NO_2$, Me, F, H, c-Pr], [A1236; H, $NO_2$, OMe, F, H, c-Pr], [A1237; H, $NO_2$, $CF_3$, F, H, c-Pr], [A1238; H, $NO_2$, $CHF_2$, F, H, c-Pr], [A1239; H, $NO_2$, $NO_2$, F, H, c-Pr], [A1240; H, $NO_2$, H, F, H, Bu], [A1241; H, $NO_2$, F, F, H, Bu], [A1242; H, $NO_2$, Cl, F, H, Bu], [A1243; H, $NO_2$, Br, F, H, Bu], [A1244; H, $NO_2$, I, F, H, Bu], [A1245; H, $NO_2$, Me, F, H, Bu], [A1246; H, $NO_2$, OMe, F, H, Bu], [A1247; H, $NO_2$, CFs, F, H, Bu], [A1248; H, $NO_2$, $CHF_2$, F, H, Bu], [A1249; H, $NO_2$, $NO_2$, F, H, Bu], [A1250; H, $NO_2$, H, F, H, i-Bu], [A1251; H, $NO_2$, F, F, H, i-Bu], [A1252; H, $NO_2$, Cl, F, H, i-Bu], [A1253; H, $NO_2$, Br, F, H, i-Bu], [A1254; H, $NO_2$, I, F, H, i-Bu], [A1255; H, $NO_2$, Me, F, H, i-Bu], [A1256; H, $NO_2$, OMe, F, H, i-Bu], [A1257; H, $NO_2$, $CF_3$, F, H, i-Bu], [A1258; H, $NO_2$, $CHF_2$, F, H, i-Bu], [A1259; H, $NO_2$, $NO_2$, F, H, i-Bu], [A1260; H, $NO_2$, H, F, H, $CH_2CF_3$], [A1261; H, $NO_2$, F, F, H, $CH_2CF_3$], [A1262; H, $NO_2$, Cl, F, H, $CH_2CF_3$], [A1263; H, $NO_2$, Br, F, H, $CH_2CF_3$], [A1264; H, $NO_2$, I, F, H, $CH_2CF_3$], [A1265; H, $NO_2$, Me, F, H, $CH_2CF_3$], [A1266; H, $NO_2$, OMe, F, H, $CH_2CF_3$], [A1267; H, $NO_2$, $CF_3$, F, H, $CH_2CF_3$], [A1268; H, $NO_2$, $CHF_2$, F, H, $CH_2CF_3$], [A1269; H, $NO_2$, $NO_2$, F, H, $CH_2CF_3$], [A1270; H, $NO_2$, H, F, H, $CF_2CH_3$], [A1271; H, $NO_2$, F, F, H, $CF_2CH_3$], [A1272; H, $NO_2$, Cl, F, H, $CF_2CH_3$], [A1273; H, $NO_2$, Br, F, H, $CF_2CH_3$], [A1274; H, $NO_2$, I, F, H, $CF_2CH_3$], [A1275; H, $NO_2$, Me, F, H, $CF_2CH_3$], [A1276; H, $NO_2$, OMe, F, H, $CF_2CH_3$], [A1277; H, $NO_2$, $CF_3$, F, H, $CF_2CH_3$], [A1278; H, $NO_2$, $CHF_2$, F, H, $CF_2CH_3$], [A1279; H, $NO_2$, $NO_2$, F, H, $CF_2CH_3$], [A1280; H, $NO_2$, H, F, H, 2-Py], [A1281; H, $NO_2$, F, F, H, 2-Py], [A1282; H, $NO_2$, Cl, F, H, 2-Py], [A1283; H, $NO_2$, Br, F, H, 2-Py], [A1284; H, $NO_2$, I, F, H, 2-Py], [A1285; H, $NO_2$, Me, F, H, 2-Py], [A1286; H, $NO_2$, OMe, F, H, 2-Py], [A1287; H, $NO_2$, $CF_3$, F, H, 2-Py], [A1288; H, $NO_2$, $CHF_2$, F, H, 2-Py], [A1289; H, $NO_2$, $NO_2$, F, H, 2-Py], [A1290; H, $NO_2$, H, F, H, 3-Py], [A1291; H, $NO_2$, F, F, H, 3-Py], [A1292; H, $NO_2$, Cl, F, H, 3-Py], [A1293; H, $NO_2$, Br, F, H, 3-Py], [A1294; H, $NO_2$, I, F, H, 3-Py], [A1295; H, $NO_2$, Me, F, H, 3-Py], [A1296; H, $NO_2$, OMe, F, H, 3-Py], [A1297; H, $NO_2$, $CF_3$, F, H, 3-Py], [A1298; H, $NO_2$, $CHF_2$, F, H, 3-Py], [A1299; H, $NO_2$, $NO_2$, F, H, 3-Py], [A1300; H, $NO_2$, H, F, H, 4-Py], [A1301; H, $NO_2$, F, F, H, 4-Py], [A1302; H, $NO_2$, Cl, F, H, 4-Py], [A1303; H, $NO_2$, Br, F, H, 4-Py], [A1304; H, $NO_2$, I, F, H, 4-Py], [A1305; H, $NO_2$, Me, F, H, 4-Py], [A1306; H, $NO_2$, OMe, F, H, 4-Py], [A1307; H, $NO_2$, $CF_3$, F, H, 4-Py], [A1308; H, $NO_2$, $CHF_2$, F, H, 4-Py], [A1309; H, $NO_2$, $NO_2$, F, H, 4-Py], [A1310; H, $OCH_2Ph$, H, F, H, Et], [A1311; H, $OCH_2Ph$, F, F, H, Et], [A1312; H, $OCH_2Ph$, Cl, F, H, Et], [A1313; H, $OCH_2Ph$, Br, F, H, Et], [A1314; H, $OCH_2Ph$, I, F, H, Et], [A1315; H, $OCH_2Ph$, Me, F, H, Et], [A1316; H, $OCH_2Ph$, OMe, F, H, Et], [A1317; H, $OCH_2Ph$, $CF_3$, F, H, Et], [A1318; H, $OCH_2Ph$, $CHF_2$, F, H, Et], [A1319; H, $OCH_2Ph$, $NO_2$, F, H, Et], [A1320; H, $OCH_2Ph$, H, F, H, Pr], [A1321; H, $OCH_2Ph$, F, F, H, Pr], [A1322; H, $OCH_2Ph$, Cl, F, H, Pr], [A1323; H, $OCH_2Ph$, Br, F, H, Pr], [A1324; H, $OCH_2Ph$, I, F, H, Pr], [A1325; H, $OCH_2Ph$, Me, F, H, Pr], [A1326; H, $OCH_2Ph$, OMe, F, H, Pr], [A1327; H, $OCH_2Ph$, $CF_3$, F, H, Pr], [A1328; H, $OCH_2Ph$, $CHF_2$, F, H, Pr], [A1329; H, $OCH_2Ph$, $NO_2$, F, H, Pr], [A1330; H, $OCH_2Ph$, H, F, H, i-Pr], [A1331; H, $OCH_2Ph$, F, F, H, i-Pr], [A1332; H, $OCH_2Ph$, Cl, F, H, i-Pr], [A1333; H, $OCH_2Ph$, Br, F, H, i-Pr], [A1334; H, $OCH_2Ph$, I, F, H, i-Pr], [A1335; H, $OCH_2Ph$, Me, F, H, i-Pr], [A1336; H, $OCH_2Ph$, OMe, F, H, i-Pr], [A1337; H, $OCH_2Ph$, $CF_3$, F, H, i-Pr], [A1338; H, $OCH_2Ph$, $CHF_2$, F, H, i-Pr], [A1339; H, $OCH_2Ph$, $NO_2$, F, H, i-Pr], [A1340; H, $OCH_2Ph$, H, F, H, c-Pr], [A1341; H, $OCH_2Ph$, F, F, H, c-Pr], [A1342; H, $OCH_2Ph$, Cl, F, H, c-Pr], [A1343; H, $OCH_2Ph$, Br, F, H, c-Pr], [A1344; H, $OCH_2Ph$, I, F, H, c-Pr], [A1345; H, $OCH_2Ph$, Me, F, H, c-Pr], [A1346; H, $OCH_2Ph$, OMe, F, H, c-Pr], [A1347; H, $OCH_2Ph$, $CF_3$, F, H, c-Pr], [A1348; H, $OCH_2Ph$, $CHF_2$, F, H, c-Pr], [A1349; H, $OCH_2Ph$, $NO_2$, F, H, c-Pr], [A1350; H, $OCH_2Ph$, H, F, H, Bu], [A1351; H, $OCH_2Ph$, F, F, H, Bu], [A1352; H, $OCH_2Ph$, Cl, F, H, Bu], [A1353; H, $OCH_2Ph$, Br, F, H, Bu], [A1354; H, $OCH_2Ph$, I, F, H, Bu], [A1355; H, $OCH_2Ph$, Me, F, H, Bu], [A1356; H, $OCH_2Ph$, OMe, F, H, Bu], [A1357; H, $OCH_2Ph$, $CF_3$, F, H, Bu], [A1358; H, $OCH_2Ph$, $CHF_2$, F, H, Bu], [A1359; H, $OCH_2Ph$, $NO_2$, F, H, Bu], [A1360; H, $OCH_2Ph$, H, F, H, i-Bu], [A1361; H, $OCH_2Ph$, F, F, H, i-Bu], [A1362; H, $OCH_2Ph$, Cl, F, H, i-Bu], [A1363; H, $OCH_2Ph$, Br, F, H, i-Bu], [A1364; H, $OCH_2Ph$, I, F, H, i-Bu], [A1365; H, $OCH_2Ph$, Me, F, H, i-Bu], [A1366; H, $OCH_2Ph$, OMe, F, H, i-Bu], [A1367; H, $OCH_2Ph$, $CF_3$, F, H, i-Bu], [A1368; H, $OCH_2Ph$, $CHF_2$, F, H, i-Bu], [A1369; H, $OCH_2Ph$, $NO_2$, F, H, i-Bu], [A1370; H, $OCH_2Ph$, H, F, H, $CH_2CF_3$], [A1371; H, $OCH_2Ph$, F, F, H, $CH_2CF_3$], [A1372; H, $OCH_2Ph$, Cl, F, H, $CH_2CF_3$], [A1373; H, $OCH_2Ph$, Br, F, H, $CH_2CF_3$], [A1374; H, $OCH_2Ph$, I, F, H, $CH_2CF_3$], [A1375; H, $OCH_2Ph$, Me, F, H, $CH_2CF_3$], [A1376; H, $OCH_2Ph$, OMe, F, H, $CH_2CF_3$], [A1377; H, $OCH_2Ph$, $CF_3$, F, H, $CH_2CF_3$], [A1378; H, $OCH_2Ph$, $CHF_2$, F, H, $CH_2CF_3$], [A1379; H, $OCH_2Ph$, $NO_2$, F, H, $CH_2CF_3$], [A1380; H, $OCH_2Ph$, H, F, H, $CF_2CH_3$], [A1381; H, $OCH_2Ph$, F, F, H, $CF_2CH_3$], [A1382; H, $OCH_2Ph$, Cl, F, H, $CF_2CH_3$], [A1383; H, $OCH_2Ph$, Br, F, H, $CF_2CH_3$], [A1384; H, $OCH_2Ph$, I, F, H, $CF_2CH_3$], [A1385; H, $OCH_2Ph$, Me, F, H, $CF_2CH_3$], [A1386; H, $OCH_2Ph$, OMe, F, H, $CF_2CH_3$], [A1387; H, $OCH_2Ph$, $CF_3$, F, H, $CF_2CH_3$], [A1388; H, $OCH_2Ph$, $CHF_2$, F, H, $CF_2CH_3$], [A1389; H, $OCH_2Ph$, $NO_2$, F, H, $CF_2CH_3$], [A1390; H, $OCH_2Ph$, H, F, H, 2-Py], [A1391; H, $OCH_2Ph$, F, F, H, 2-Py], [A1392; H, $OCH_2Ph$, Cl, F, H, 2-Py], [A1393; H, $OCH_2Ph$, Br, F, H, 2-Py], [A1394; H, $OCH_2Ph$, I, F, H, 2-Py], [A1395; H, $OCH_2Ph$, Me, F, H, 2-Py], [A1396; H, $OCH_2Ph$, OMe, F, H, 2-Py], [A1397; H, $OCH_2Ph$, $CF_3$, F, H, 2-Py], [A1398; H, $OCH_2Ph$, $CHF_2$, F, H, 2-Py], [A1399; H, $OCH_2Ph$, $NO_2$, F, H, 2-Py], [A1400; H, $OCH_2Ph$, H, F, H, 3-Py], [A1401; H, $OCH_2Ph$, F, F, H, 3-Py], [A1402; H, $OCH_2Ph$, Cl, F, H, 3-Py], [A1403; H, $OCH_2Ph$, Br, F, H, 3-Py], [A1404; H, $OCH_2Ph$, I, F, H, 3-Py], [A1405; H, $OCH_2Ph$, Me, F, H, 3-Py], [A1406; H, $OCH_2Ph$, OMe, F, H, 3-Py], [A1407; H, $OCH_2Ph$, $CF_3$, F, H, 3-Py], [A1408; H, $OCH_2Ph$, $CHF_2$, F, H, 3-Py], [A1409; H, $OCH_2Ph$, $NO_2$, F, H, 3-Py], [A1410; H, $OCH_2Ph$, H, F, H, 4-Py], [A1411; H, $OCH_2Ph$, F, F, H, 4-Py], [A1412; H, $OCH_2Ph$, Cl, F, H, 4-Py], [A1413; H, $OCH_2Ph$, Br, F, H, 4-Py], [A1414; H, $OCH_2Ph$, I, F, H, 4-Py], [A1415; H, $OCH_2Ph$, Me, F, H, 4-Py], [A1416; H, $OCH_2Ph$, OMe, F, H, 4-Py], [A1417; H, $OCH_2Ph$, $CF_3$, F, H, 4-Py], [A1418; H, $OCH_2Ph$, $CHF_2$, F, H, 4-Py], [A1419; H, $OCH_2Ph$, $NO_2$, F, H, 4-Py], [A1420; F, H, H, H, H, Et], [A1421; F, H, F, H, H, Et], [A1422; F, H, Cl, H, H, Et], [A1423; F, H, Br, H, H, Et], [A1424; F, H, I, H, H, Et], [A1425; F, H, Me, H, H, Et], [A1426; F, H, OMe, H, H, Et], [A1427; F, H, $CF_3$, H, H, Et], [A1428; F, H, $CHF_2$, H, H, Et], [A1429; F, H, $NO_2$, H, H, Et], [A1430; F, H, H, H, H, Pr], [A1431; F, H, F, H, H, Pr], [A1432; F, H, Cl, H, H, Pr], [A1433; F, H, Br, H, H, Pr], [A1434; F, H, I, H, H, Pr], [A1435; F, H, Me, H, H, Pr], [A1436; F, H, OMe, H, H, Pr], [A1437; F, H, $CF_3$, H, H, Pr], [A1438; F, H, $CHF_2$, H, H, Pr], [A1439; F, H, $NO_2$, H, H, Pr], [A1440; F, H, H, H, H, i-Pr], [A1441; F, H, F, H, H, i-Pr], [A1442; F, H, Cl, H, H, i-Pr], [A1443; F, H, Br, H, H, i-Pr], [A1444; F, H, I, H, H, i-Pr], [A1445; F, H, Me, H, H, i-Pr], [A1446; F, H, OMe, H, H, i-Pr], [A1447; F, H, $CF_3$, H, H, i-Pr], [A1448; F, H, $CHF_2$, H, H, i-Pr], [A1449; F, H, $NO_2$, H, H, i-Pr], [A1450; F, H, H, H, H, c-Pr], [A1451; F, H, F, H, H, c-Pr], [A1452; F, H, Cl, H, H, c-Pr], [A1453; F, H, Br, H, H, c-Pr], [A1454; F, H, I, H, H, c-Pr], [A1455; F, H, Me, H, H, c-Pr], [A1456; F, H, OMe, H, H, c-Pr], [A1457; F, H, $CF_3$, H, H, c-Pr], [A1458; F, H, $CHF_2$, H, H, c-Pr], [A1459; F, H, $NO_2$, H, H, c-Pr], [A1460; F, H, H, H, H, Bu], [A1461; F, H, F, H, H, Bu], [A1462; F, H, Cl, H, H, Bu], [A1463; F, H, Br, H, H, Bu], [A1464; F, H, I, H, H, Bu], [A1465; F, H, Me, H, H, Bu], [A1466; F, H, OMe, H, H, Bu], [A1467; F, H, $CF_3$, H, H, Bu], [A1468; F, H, $CHF_2$, H, H, Bu], [A1469; F, H, $NO_2$, H, H, Bu], [A1470; F, H, H, H, H, i-Bu], [A1471; F, H, F, H, H, i-Bu], [A1472; F, H, Cl, H, H, i-Bu], [A1473; F, H, Br, H, H, i-Bu], [A1474; F, H, I, H, H, i-Bu], [A1475; F, H, Me, H, H, i-Bu], [A1476; F, H, OMe, H, H, i-Bu], [A1477; F, H, $CF_3$, H, H, i-Bu], [A1478; F, H, $CHF_2$, H, H, i-Bu], [A1479; F, H, $NO_2$, H, H, i-Bu], [A1480; F, H, H, H, H, $CH_2CF_3$], [A1481; F, H, F, H, H, $CH_2CF_3$], [A1482; F, H, Cl, H, H, $CH_2CF_3$], [A1483; F, H, Br, H, H, $CH_2CF_3$], [A1484; F, H, I, H, H, $CH_2CF_3$], [A1485; F, H, Me, H, H, $CH_2CF_3$], [A1486; F, H, OMe, H, H, $CH_2CF_3$], [A1487; F, H, $CF_3$, H, H, $CH_2CF_3$], [A1488; F, H, $CHF_2$, H, H, $CH_2CF_3$], [A1489; F, H, $NO_2$, H, H, $CH_2CF_3$], [A1490; F, H, H, H, H, $CF_2CH_3$], [A1491; F, H, F, H, H, $CF_2CH_3$], [A1492; F, H, Cl, H, H, $CF_2CH_3$], [A1493; F, H, Br, H, H, $CF_2CH_3$], [A1494; F, H, I, H, H, $CF_2CH_3$], [A1495; F, H, Me, H, H, $CF_2CH_3$], [A1496; F, H, OMe, H, H, $CF_2CH_3$], [A1497; F, H, $CF_3$, H, H, $CF_2CH_3$], [A1498; F, H, $CHF_2$, H, H, $CF_2CH_3$], [A1499; F, H, $NO_2$, H, H, $CF_2CH_3$], [A1500; F, H, H, H, H, 2-Py], [A1501; F, H, F, H, H, 2-Py], [A1502; F, H, Cl, H, H, 2-Py], [A1503; F, H, Br, H, H, 2-Py], [A1504; F, H, I, H, H, 2-Py], [A1505; F, H, Me, H, H, 2-Py], [A1506; F, H, OMe, H, H, 2-Py], [A1507; F, H, $CF_3$, H, H, 2-Py], [A1508; F, H, $CHF_2$, H, H, 2-Py], [A1509; F, H, $NO_2$, H, H, 2-Py], [A1510; F, H, H, H, H, 3-Py], [A1511; F, H, F, H, H, 3-Py], [A1512; F, H, Cl, H, H, 3-Py], [A1513; F, H, Br, H, H, 3-Py], [A1514; F, H, I, H, H, 3-Py], [A1515; F, H, Me, H, H, 3-Py], [A1516; F, H, OMe, H, H, 3-Py], [A1517; F, H, $CF_3$, H, H, 3-Py], [A1518; F, H, $CHF_2$, H, H, 3-Py], [A1519; F, H, $NO_2$, H, H, 3-Py], [A1520; F, H, H, H, H, 4-Py], [A1521; F, H, F, H, H, 4-Py], [A1522; F, H, Cl, H, H, 4-Py], [A1523; F, H, Br, H, H, 4-Py], [A1524; F, H, I, H, H, 4-Py], [A1525; F, H, Me, H, H, 4-Py], [A1526; F, H, OMe, H, H, 4-Py], [A1527; F, H, $CF_3$, H, H, 4-Py], [A1528; F, H, $CHF_2$, H, H, 4-Py], [A1529; F, H, $NO_2$, H, H, 4-Py], [A1530; H, H, H, H, H, Et], [A1531; H, H, H, H, H, Pr], [A1532; H, H, H, H, H, i-Pr], [A1533; H, H, H, H, H, c-Pr], [A1534; H, H, H, H, H, Bu], [A1535; H, H, H, H, H, i-Bu], [A1536; H, H, H, H, H, 2-Py], [A1537; H, H, H, H, H, 3-Py], [A1538; H, H, H, H, H, 4-Py], [A1539; H, H, H, H, H, $CH_2CF_3$], [A1540; H, H, H, H, H, $CF_2CH_3$], [A1541; H, H, H, H, H, Me], [A1542; H, H, F, H, H, Me], [A1543; H, H, Cl, H, H, Me], [A1544; H, H, Br, H, H, Me], [A1545; H, H, I, H, H, Me], [A1546; H, H, Me, H, H, Me], [A1547; H, H, OMe, H, H, Me], [A1548; H, H, $CF_3$, H, H, Me], [A1549; H, H, $CHF_2$, H, H, Me], [A1550; H, H, $NO_2$, H, H, Me], [A1551; H, H, H, H, H, Ph], [A1552; H, H, F, H, H, Ph], [A1553; H, H, Cl, H, H, Ph], [A1554; H, H, Br, H, H, Ph], [A1555; H, H, I, H, H, Ph], [A1556; H, H, Me, H, H, Ph], [A1557; H, H, OMe, H, H, Ph], [A1558; H, H, $CF_3$, H, H, Ph], [A1559; H, H, $CHF_2$, H, H, Ph], [A1560; H, H, $NO_2$, H, H, Ph], [A1561; H, F, H, H, H, Me], [A1562; H, F, F, H, H, Me], [A1563; H, F, Cl, H, H, Me], [A1564; H, F, Br, H, H, Me], [A1565; H, F, I, H, H, Me], [A1566; H, F, Me, H, H, Me], [A1567; H, F, OMe, H, H, Me], [A1568; H, F, $CF_3$, H, H, Me], [A1569; H, F, $CHF_2$, H, H, Me], [A1570; H, F, $NO_2$, H, H, Me], [A1571; H, F, H, H, H, Ph], [A1572; H, F, F, H, H, Ph], [A1573; H, F, Cl, H, H, Ph], [A1574; H, F, Br, H, H, Ph], [A1575; H, F, I, H, H, Ph], [A1576; H, F, Me, H, H, Ph], [A1577; H, F, OMe, H, H, Ph], [A1578; H, F, $CF_3$, H, H, Ph], [A1579; H, F, $CHF_2$, H, H, Ph], [A1580; H, F, $NO_2$, H, H, Ph], [A1581; H, Cl, H, H, H, Me], [A1582; H, Cl, F, H, H, Me], [A1583; H, Cl, Cl, H, H, Me], [A1584; H, Cl, Br, H, H, Me], [A1585; H, Cl, I, H, H, Me], [A1586; H, C, Me, H, H, Me], [A1587; H, Cl, OMe, H, H, Me], [A1588; H, Cl, $CF_3$, H, H, Me], [A1589; H, Cl, $CHF_2$, H, H, Me][A1590; H, Cl, $NO_2$, H, H, Me], [A1591; H, Cl, H, H, H, Ph], [A1592; H, Cl, F, H, H, Ph], [A1593; H, Cl, Cl, H, H, Ph], [A1594; H, Cl, Br, H, H, Ph], [A1595; H, Cl, I, H, H, Ph], [A1596; H, Cl, Me, H, H, Ph], [A1597; H, Cl, OMe, H, H, Ph], [A1598; H, Cl, $CF_3$, H, H, Ph], [A1599; H, Cl, $CHF_2$, H, H, Ph][A1600; H, Cl, $NO_2$, H, H, Ph], [A1601; H, Br, H, H, H, Me], [A1602; H, Br, F, H, H, Me], [A1603; H, Br, Cl, H, H, Me], [A1604; H, Br, Br, H, H, Me], [A1605; H, Br, I, H, H, Me], [A1606; H, Br, Me, H, H, Me], [A1607; H, Br, OMe, H, H, Me], [A1608; H, Br, $CF_3$, H, H, Me], [A1609; H, Br, $CHF_2$, H, H, Me][A1610; H, Br, $NO_2$, H, H, Me], [A1611; H, Br, H, H, H, Ph], [A1612; H, Br, F, H, H, Ph], [A1613; H, Br, Cl, H, H, Ph], [A1614; H, Br, Br, H, H, Ph], [A1615; H, Br, I, H, H, Ph], [A1616; H, Br, Me, H, H, Ph], [A1617; H, Br, OMe, H, H, Ph], [A1618; H, Br, CFs, H, H, Ph], [A1619; H, Br, $CHF_2$, H, H, Ph], [A1620; H, Br, $NO_2$, H, H, Ph], [A1621; H, $CF_3$, H, H, H, Me], [A1622; H, $CF_3$, F, H, H, Me], [A1623; H, $CF_3$, Cl, H, H, Me], [A1624; H, $CF_3$, Br, H, H, Me], [A1625; H, $CF_3$, I, H, H, Me], [A1626; H, $CF_3$, Me, H, H, Me], [A1627; H, $CF_3$, OMe, H, H, Me], [A1628; H, $CF_3$, $CF_3$, H, H, Me], [A1629; H, $CF_3$, $CHF_2$, H, H, Me], [A1630; H, $CF_3$, $NO_2$, H, H, Me], [A1631; H, $CF_3$, H, H, H, Ph], [A1632; H, $CF_3$, F, H, H, Ph], [A1633; H, $CF_3$, Cl, H, H, Ph], [A1634; H, $CF_3$, Br, H, H, Ph], [A1635; H, $CF_3$, I, H, H, Ph], [A1636; H, $CF_3$, Me, H, H, Ph], [A1637; H, $CF_3$, OMe, H, H, Ph], [A1638; H, $CF_3$, $CF_3$, H, H, Ph], [A1639; H, $CF_3$, $CHF_2$, H, H, Ph], [A1640; H, $CF_3$, $NO_2$, H, H, Ph], [A1641; H, $NO_2$, H, H, H, Me], [A1642; H, $NO_2$, F, H, H, Me], [A1643; H, $NO_2$, Cl, H, H, Me], [A1644; H, $NO_2$, Br, H, H, HMe], [A1645; H, $NO_2$, I, H, H, Me], [A1646; H, $NO_2$, Me, H, H, Me], [A1647; H, $NO_2$, OMe, H, H, Me], [A1648; H, $NO_2$, $CF_3$, H, H, Me][A1649; H, $NO_2$, $CHF_2$, H, H, Me], [A1650; H, $NO_2$, $NO_2$, H, H, Me], [A1651; H, $NO_2$, H, H, H, Ph], [A1652; H, $NO_2$, F, H, H, Ph], [A1653; H, $NO_2$, Cl, H, H, Ph], [A1654; H, $NO_2$, Br, H, H, Ph], [A1655; H, $NO_2$, I, H, H, Ph], [A1656; H, $NO_2$, Me, H, H, Ph], [A1657; H, $NO_2$, OMe, H, H, Ph], [A1658; H, $NO_2$, $CF_3$, H, H, Ph], [A1659; H, $NO_2$, $CHF_2$, H, H, Ph], [A1660; H, $NO_2$, $NO_2$, H, H, Ph], [A1661; H, $OCH_2Ph$, H, H, H, Me], [A1662; H, $OCH_2Ph$, F, H, H, Me], [A1663; H, $OCH_2Ph$, Cl, H, H, Me], [A1664; H, $OCH_2Ph$, Br, H, H, Me], [A1665; H, $OCH_2Ph$, I, H, H, Me], [A1666; H, $OCH_2Ph$, Me, H, H, Me], [A1667; H, $OCH_2Ph$, OMe, H, H, Me], [A1668; H, $OCH_2Ph$, $CF_3$, H, H, Me], [A1669; H, $OCH_2Ph$, $CHF_2$, H, H, Me], [A1670; H, $OCH_2Ph$, $NO_2$, H, H, Me], [A1671; H, $OCH_2Ph$, H, H, H, Ph], [A1672; H, $OCH_2Ph$, F, H, H, Ph], [A1673; H, $OCH_2Ph$, Cl, H, H, Ph], [A1674; H, $OCH_2Ph$, Br, H, H, Ph], [A1675; H, $OCH_2Ph$, I, H, H, Ph], [A1676; H, $OCH_2Ph$, Me, H, H, Ph], [A1677; H, $OCH_2Ph$, OMe, H, H, Ph], [A1678; H, $OCH_2Ph$, $CF_3$, H, H, Ph], [A1679; H, $OCH_2Ph$, $CHF_2$, H, H, Ph], [A1680; H, $OCH_2Ph$, $NO_2$, H, H, Ph], [A1681; H, F, H, F, H, Me], [A1682; H, F, F, F, H, Me], [A1683; H, F, Cl, F, H, Me], [A1684; H, F, Br, F, H, Me], [A1685; H, F, I, F, H, Me], [A1686; H, F, Me, F, H, Me], [A1687; H, F, OMe, F, H, Me], [A1688; H, F, $CF_3$, F, H, Me], [A1689; H, F, $CHF_2$, F, H, Me], [A1690; H, F, $NO_2$, F, H, Me], [A1691; H, F, H, F, H, Ph], [A1692; H, F, F, F, H, Ph], [A1693; H, F, Cl, F, H, Ph],

[A1694; H, F, Br, F, H, Ph], [A1695; H, F, I, F, H, Ph], [A1696; H, F, Me, F, H, Ph], [A1697; H, F, OMe, F, H, Ph], [A1698; H, F, $CF_3$, F, H, Ph], [A1699; H, F, $CHF_2$, F, H, Ph], [A1700; H, F, $NO_2$, F, H, Ph], [A1701; H, Cl, H, F, H, Me], [A1702; H, Cl, F, F, H, Me], [A1703; H, Cl, Cl, F, H, Me], [A1704; H, Cl, Br, F, H, Me], [A1705; H, Cl, I, F, H, Me], [A1706; H, Cl, Me, F, H, Me], [A1707; H, Cl, OMe, F, H, Me], [A1708; H, Cl, $CF_3$, F, H, Me], [A1709; H, Cl, $CHF_2$, F, H, Me], [A1710; H, Cl, $NO_2$, F, H, Me], [A1711; H, Cl, H, F, H, Ph], [A1712; H, Cl, F, F, H, Ph], [A1713; H, Cl, Cl, F, H, Ph], [A1714; H, Cl, Br, F, H, Ph], [A1715; H, Cl, I, F, H, Ph], [A1716; H, Cl, Me, F, H, Ph], [A1717; H, Cl, OMe, F, H, Ph], [A1718; H, Cl, $CF_3$, F, H, Ph], [A1719; H, Cl, $CHF_2$, F, H, Ph], [A1720; H, Cl, $NO_2$, F, H, Ph], [A1721; H, Br, H, F, H, Me], [A1722; H, Br, F, F, H, Me], [A1723; H, Br, Cl, F, H, Me], [A1724; H, Br, Br, F, H, Me], [A1725; H, Br, I, F, H, Me], [A1726; H, Br, Me, F, H, Me], [A1727; H, Br, OMe, F, H, Me], [A1728; H, Br, $CF_3$, F, H, Me], [A1729; H, Br, $CHF_2$, F, H, Me], [A1730; H, Br, $NO_2$, F, H, Me], [A1731; H, Br, H, F, H, Ph], [A1732; H, Br, F, F, H, Ph], [A1733; H, Br, Cl, F, H, Ph], [A1734; H, Br, Br, F, H, Ph], [A1735; H, Br, I, F, H, Ph], [A1736; H, Br, Me, F, H, Ph], [A1737; H, Br, OMe, F, H, Ph], [A1738; H, Br, $CF_3$, F, H, Ph], [A1739; H, Br, $CHF_2$, F, H, Ph], [A1740; H, Br, $NO_2$, F, H, Ph], [A1741; H, $CF_3$, H, F, H, Me], [A1742; H, $CF_3$, F, F, H, Me], [A1743; H, $CF_3$, Cl, F, H, Me], [A1744; H, $CF_3$, Br, F, H, Me], [A1745; H, $CF_3$, I, F, H, Me], [A1746; H, $CF_3$, Me, F, H, Me], [A1747; H, $CF_3$, OMe, F, H, Me], [A1748; H, $CF_3$, $CF_3$, F, H, Me], [A1749; H, $CF_3$, $CHF_2$, F, H, Me], [A1750; H, $CF_3$, $NO_2$, F, H, Me], [A1751; H, $CF_3$, H, F, H, Ph], [A1752; H, $CF_3$, F, F, H, Ph], [A1753; H, $CF_3$, Cl, F, H, Ph], [A1754; H, $CF_3$, Br, F, H, Ph], [A1755; H, $CF_3$, I, F, H, Ph], [A1756; H, $CF_3$, Me, F, H, Ph], [A1757; H, $CF_3$, OMe, F, H, Ph], [A1758; H, $CF_3$, $CF_3$, F, H, Ph], [A1759; H, $CF_3$, $CHF_2$, F, H, Ph], [A1760; H, $CF_3$, $NO_2$, F, H, Ph], [A1761; H, $NO_2$, H, F, H, Me], [A1762; H, $NO_2$, F, F, H, Me], [A1763; H, $NO_2$, Cl, F, H, Me], [A1764; H, $NO_2$, Br, F, H, Me], [A1765; H, $NO_2$, I, F, H, Me], [A1766; H, $NO_2$, Me, F, H, Me], [A1767; H, $NO_2$, OMe, F, H, Me], [A1768; H, $NO_2$, $CF_3$, F, H, Me], [A1769; H, $NO_2$, $CHF_2$, F, H, Me], [A1770; H, $NO_2$, $NO_2$, F, H, Me], [A1771; H, $NO_2$, H, F, H, Ph], [A1772; H, $NO_2$, F, F, H, Ph], [A1773; H, $NO_2$, Cl, F, H, Ph], [A1774; H, $NO_2$, Br, F, H, Ph], [A1775; H, $NO_2$, I, F, H, Ph], [A1776; H, $NO_2$, Me, F, H, Ph], [A1777; H, $NO_2$, OMe, F, H, Ph], [A1778; H, $NO_2$, $CF_3$, F, H, Ph], [A1779; H, $NO_2$, $CHF_2$, F, H, Ph], [A1780; H, $NO_2$, $NO_2$, F, H, Ph], [A1781; H, $OCH_2Ph$, H, F, H, Me], [A1782; H, $OCH_2Ph$, F, F, H, Me], [A1783; H, $OCH_2Ph$, Cl, F, H, Me], [A1784; H, $OCH_2Ph$, Br, F, H, Me], [A1785; H, $OCH_2Ph$, I, F, H, Me], [A1786; H, $OCH_2Ph$, Me, F, H, Me], [A1787; H, $OCH_2Ph$, OMe, F, H, Me], [A1788; H, $OCH_2Ph$, $CF_3$, F, H, Me], [A1789; H, $OCH_2Ph$, $CHF_2$, F, H, Me], [A1790; H, $OCH_2Ph$, $NO_2$, F, H, Me], [A1791; H, $OCH_2Ph$, H, F, H, Ph], [A1792; H, $OCH_2Ph$, F, F, H, Ph], [A1793; H, $OCH_2Ph$, Cl, F, H, Ph], [A1794; H, $OCH_2Ph$, Br, F, H, Ph], [A1795; H, $OCH_2Ph$, I, F, H, Ph], [A1796; H, $OCH_2Ph$, Me, F, H, Ph], [A1797; H, $OCH_2Ph$, OMe, F, H, Ph], [A1798; H, $OCH_2Ph$, $CF_3$, F, H, Ph], [A1799; H, $OCH_2Ph$, $CHF_2$, F, H, Ph], [A1800; H, $OCH_2Ph$, $NO_2$, F, H, Ph], [A1801; F, H, H, H, H, Me], [A1802; F, H, F, H, H, Me], [A1803; F, H, Cl, H, H, Me], [A1804; F, H, Br, H, H, Me], [A1805; F, H, I, H, H, Me], [A1806; F, H, Me, H, H, Me], [A1807; F, H, OMe, H, H, Me], [A1808; F, H, $CF_3$, H, H, Me], [A1809; F, H, $CHF_2$, H, H, Me], [A1810; F, H, $NO_2$, H, H, Me], [A1811; F, H, H, H, H, Ph], [A1812; F, H, F, H, H, Ph], [A1813; F, H, Cl, H, H, Ph], [A1814; F, H, Br, H, H, Ph], [A1815; F, H, I, H, H, Ph], [A1816; F, H, Me, H, H, Ph], [A1817; F, H, OMe, H, H, Ph], [A1818; F, H, $CF_3$, H, H, Ph], [A1819; F, H, $CHF_2$, H, H, Ph], [A1820; F, H, $NO_2$, H, H, Ph], [A1821; H, NHC(O)OMe, H, H, H, Et], [A1822; H, NHC(O)OMe, F, H, H, Et], [A1823; H, NHC(O)OMe, Cl, H, H, Et], [A1824; H, NHC(O)OMe, Br, H, H, Et], [A1825; H, NHC(O)OMe, I, H, H, Et], [A1826; H, NHC(O)OMe, Me, H, H, Et], [A1827; H, NHC(O)OMe, OMe, H, H, Et], [A1828; H, NHC(O) OMe, $CF_3$, H, H, Et], [A1829; H, NHC(O) OMe, $CHF_2$, H, H, Et][A1830; H, NHC(O) OMe, $NO_2$, H, H, Et], [A1831; H, NHC(O)OMe, H, H, H, Pr], [A1832; H, NHC (O)OMe, F, H, H, Pr], [A1833; H, NHC(O)OMe, Cl, H, H, Pr], [A1834; H, NHC(O)OMe, Br, H, H, Pr], [A1835; H, NHC(O)OMe, I, H, H, Pr], [A1836; H, NHC(O) OMe, Me, H, H, Pr], [A1837; H, NHC(O)OMe, OMe, H, H, Pr], [A1838; H, NHC(O)OMe, $CF_3$, H, H, Pr], [A1839; H, NHC(O) OMe, $CHF_2$, H, H, Pr], [A1840; H, NHC(O)OMe, $NO_2$, H, H, Pr], [A1841; H, NHC(O)OMe, H, H, H, i-Pr], [A1842; H, NHC(O)OMe, F, H, H, i-Pr], [A1843; H, NHC (O)OMe, Cl, H, H, i-Pr], [A1844; H, NHC(O)OMe, Br, H, H, i-Pr], [A1845; H, NHC(O)OMe, I, H, H, i-Pr], [A1846; H, NHC(O)OMe, Me, H, H, i-Pr], [A1847; H, NHC(O) OMe, OMe, H, H, i-Pr], [A1848; H, NHC(O)OMe, $CF_3$, H, H, i-Pr], [A1849; H, NHC(O)OMe, $CHF_2$, H, H, i-Pr], [A1850; H, NHC(O)OMe, $NO_2$, H, H, i-Pr], [A1851; H, NHC(O)OMe, H, H, H, c-Pr], [A1852; H, NHC(O)OMe, F, H, H, c-Pr], [A1853; H, NHC(O)OMe, Cl, H, H, c-Pr], [A1854; H, NHC(O)OMe, Br, H, H, c-Pr], [A1855; H, NHC(O)OMe, I, H, H, c-Pr], [A1856; H, NHC(O)OMe, Me, H, H, c-Pr], [A1857; H, NHC(O)OMe, OMe, H, H, c-Pr], [A1858; H, NHC(O) OMe, $CF_3$, H, H, c-Pr], [A1859; H, NHC(O) OMe, $CHF_2$, H, H, c-Pr], [A1860; H, NHC(O) OMe, $NO_2$, H, H, c-Pr], [A1861; H, NHC(O)OMe, H, H, H, Bu], [A1862; H, NHC(O)OMe, F, H, H, Bu], [A1863; H, NHC(O) OMe, Cl, H, H, Bu], [A1864; H, NHC(O) OMe, Br, H, H, Bu], [A1865; H, NHC(O)OMe, I, H, H, Bu], [A1866; H, NHC(O)OMe, Me, H, H, Bu], [A1867; H, NHC(O) OMe, OMe, H, H, Bu], [A1868; H, NHC(O) OMe, $CF_3$, H, H, Bu][A1869; H, NHC(O) OMe, $CHF_2$, H, H, Bu], [A1870; H, NHC(O)OMe, $NO_2$, H, H, Bu], [A1871; H, NHC(O)OMe, H, H, H, i-Bu], [A1872; H, NHC(O)OMe, F, H, H, i-Bu], [A1873; H, NHC(O)OMe, Cl, H, H, i-Bu], [A1874; H, NHC(O)OMe, Br, H, H, i-Bu], [A1875; H, NHC(O)OMe, I, H, H, i-Bu], [A1876; H, NHC(O)OMe, Me, H, H, i-Bu], [A1877; H, NHC(O)OMe, OMe, H, H, i-Bu], [A1878; H, NHC(O)OMe, $CF_3$, H, H, i-Bu], [A1879; H, NHC(O)OMe, $CHF_2$, H, H, i-Bu], [A1880; H, NHC(O) OMe, $NO_2$, H, H, i-Bu], [A1881; H, NHC(O) OMe, H, H, H, $CH_2CF_3$], [A1882; H, NHC(O)OMe, F, H, H, $CH_2CF_3$], [A1883; H, NHC(O) OMe, Cl, H, H, $CH_2CF_3$], [A1884; H, NHC(O) OMe, Br, H, H, $CH_2CF_3$], [A1885; H, NHC(O) OMe, I, H, H, $CH_2CF_3$], [A1886; H, NHC(O) OMe, Me, H, H, $CH_2CF_3$], [A1887; H, NHC(O)OMe, OMe, H, H, $CH_2CF_3$], [A1888; H, NHC(O) OMe, $CF_3$, H, H, $CH_2CF_3$], [A1889; H, NHC(O) OMe, $CHF_2$, H, H, $CH_2CF_3$][A1890; H, NHC(O) OMe, $NO_2$, H, H, $CH_2CF_3$], [A1891; H, NHC (O) OMe, H, H, H, $CF_2CH_3$], [A1892; H, NHC(O)OMe, F, H, H, $CF_2CH_3$], [A1893; H, NHC(O) OMe, Cl, H, H, $CF_2CH_3$], [A1894; H, NHC(O) OMe, Br, H, H, $CF_2CH_3$], [A1895; H, NHC(O)OMe, I, H, H, $CF_2CH_3$], [A1896; H, NHC(O) OMe, Me, H, H, $CF_2CH_3$], [A1897; H, NHC(O) OMe, OMe, H, H, $CF_2CH_3$], [A1898; H, NHC(O) OMe, $CF_3$, H, H, $CF_2CH_3$], [A1899; H, NHC(O) OMe, $CHF_2$, H, H, $CF_2CH_3$], [A1900; H, NHC(O) OMe, $NO_2$, H, H, $CF_2CH_3$], [A1901; H, NHC(O)OMe, H, H, H, 2-Py], [A1902; H, NHC(O)OMe, F, H, H, 2-Py], [A1903; H, NHC(O)OMe, Cl, H, H, 2-Py], [A1904; H, NHC(O)OMe, Br, H, H, 2-Py], [A1905; H, NHC(O)OMe, I, H, H, 2-Py],

[A1906; H, NHC(O)OMe, Me, H, H, 2-Py], [A1907; H, NHC(O)OMe, OMe, H, H, 2-Py], [A1908; H, NHC(O) OMe, $CF_3$, H, H, 2-Py], [A1909; H, NHC(O)OMe, $CHF_2$, H, H, 2-Py], [A1910; H, NHC(O)OMe, $NO_2$, H, H, 2-Py], [A1911; H, NHC(O)OMe, H, H, H, 3-Py], [A1912; H, NHC(O)OMe, F, H, H, 3-Py], [A1913; H, NHC(O)OMe, Cl, H, H, 3-Py], [A1914; H, NHC(O)OMe, Br, H, H, 3-Py], [A1915; H, NHC(O)OMe, I, H, H, 3-Py], [A1916; H, NHC(O)OMe, Me, H, H, 3-Py], [A1917; H, NHC(O) OMe, OMe, H, H, 3-Py], [A1918; H, NHC(O) OMe, $CF_3$, H, H, 3-Py][A1919; H, NHC(O)OMe, $CHF_2$, H, H, 3-Py], [A1920; H, NHC(O) OMe, $NO_2$, H, H, 3-Py], [A1921; H, NHC(O)OMe, H, H, H, 4-Py], [A1922; H, NHC(O)OMe, F, H, H, 4-Py], [A1923; H, NHC(O)OMe, Cl, H, H, 4-Py], [A1924; H, NHC(O) OMe, Br, H, H, 4-Py], [A1925; H, NHC(O)OMe, I, H, H, 4-Py], [A1926; H, NHC(O)OMe, Me, H, H, 4-Py], [A1927; H, NHC(O)OMe, OMe, H, H, 4-Py], [A1928; H, NHC(O)OMe, $CF_3$, H, H, 4-Py], [A1929; H, NHC(O)OMe, $CHF_2$, H, H, 4-Py], [A1930; H, NHC(O) OMe, $NO_2$, H, H, 4-Py], [A1931; H, NHC(O)OMe, H, F, H, Et], [A1932; H, NHC(O)OMe, F, F, H, Et], [A1933; H, NHC(O)OMe, Cl, F, H, Et], [A1934; H, NHC(O)OMe, Br, F, H, Et], [A1935; H, NHC(O)OMe, I, F, H, Et], [A1936; H, NHC(O)OMe, Me, F, H, Et], [A1937; H, NHC(O)OMe, OMe, F, H, Et], [A1938; H, NHC(O) OMe, $CF_3$, F, H, Et], [A1939; H, NHC(O) OMe, $CHF_2$, F, H, Et], [A1940; H, NHC(O) OMe, $NO_2$, F, H, Et], [A1941; H, NHC(O)OMe, H, F, H, Pr], [A1942; H, NHC(O)OMe, F, F, H, Pr], [A1943; H, NHC(O)OMe, Cl, F, H, Pr][A1944; H, NHC(O) OMe, Br, F, H, Pr], [A1945; H, NHC(O)OMe, I, F, H, Pr][A1946; H, NHC(O) OMe, Me, F, H, Pr][A1947; H, NHC(O)OMe, OMe, F, H, Pr], [A1948; H, NHC(O) OMe, $CF_3$, F, H, Pr], [A1949; H, NHC(O) OMe, $CHF_2$, F, H, Pr], [A1950; H, NHC(O)OMe, $NO_2$, F, H, Pr], [A1951; H, NHC(O)OMe, H, F, H, i-Pr], [A1952; H, NHC(O)OMe, F, F, H, i-Pr], [A1953; H, NHC(O)OMe, Cl, F, H, i-Pr], [A1954; H, NHC(O)OMe, Br, F, H, i-Pr], [A1955; H, NHC(O)OMe, I, F, H, i-Pr], [A1956; H, NHC(O)OMe, Me, F, H, i-Pr], [A1957; H, NHC(O)OMe, OMe, F, H, i-Pr], [A1958; H, NHC(O)OMe, $CF_3$, F, H, i-Pr], [A1959; H, NHC(O)OMe, $CHF_2$, F, H, i-Pr], [A1960; H, NHC(O)OMe, $NO_2$, F, H, i-Pr], [A1961; H, NHC(O)OMe, H, F, H, c-Pr], [A1962; H, NHC(O)OMe, F, F, H, c-Pr], [A1963; H, NHC(O)OMe, Cl, F, H, c-Pr], [A1964; H, NHC(O)OMe, Br, F, H, c-Pr], [A1965; H, NHC(O)OMe, I, F, H, c-Pr], [A1966; H, NHC(O)OMe, Me, F, H, c-Pr], [A1967; H, NHC(O) OMe, OMe, F, H, c-Pr], [A1968; H, NHC(O) OMe, $CF_3$, F, H, c-Pr], [A1969; H, NHC(O)OMe, $CHF_2$, F, H, c-Pr], [A1970; H, NHC(O) OMe, $NO_2$, F, H, c-Pr], [A1971; H, NHC(O)OMe, H, F, H, Bu], [A1972; H, NHC(O)OMe, F, F, H, Bu], [A1973; H, NHC(O)OMe, Cl, F, H, Bu], [A1974; H, NHC(O) OMe, Br, F, H, Bu][A1975; H, NHC(O)OMe, I, F, H, Bu], [A1976; H, NHC(O) OMe, Me, F, H, Bu], [A1977; H, NHC(O) OMe, OMe, F, H, Bu], [A1978; H, NHC(O) OMe, $CF_3$, F, H, Bu], [A1979; H, NHC(O) OMe, $CHF_2$, F, H, Bu], [A1980; H, NHC(O)OMe, $NO_2$, F, H, Bu], [A1981; H, NHC(O)OMe, H, F, H, i-Bu], [A1982; H, NHC(O)OMe, F, F, H, i-Bu], [A1983; H, NHC(O)OMe, Cl, F, H, i-Bu], [A1984; H, NHC(O)OMe, Br, F, H, i-Bu], [A1985; H, NHC(O)OMe, I, F, H, i-Bu], [A1986; H, NHC(O)OMe, Me, F, H, i-Bu], [A1987; H, NHC(O)OMe, OMe, F, H, i-Bu], [A1988; H, NHC(O)OMe, $CF_3$, F, H, i-Bu], [A1989; H, NHC(O)OMe, $CHF_2$, F, H, i-Bu], [A1990; H, NHC(O)OMe, $NO_2$, F, H, i-Bu], [A1991; H, NHC(O)OMe, H, F, H, $CH_2CF_3$], [A1992; H, NHC(O)OMe, F, F, H, $CH_2CF_3$][A1993; H, NHC(O)OMe, Cl, F, H, $CH_2CF_3$], [A1994; H, NHC(O) OMe, Br, F, H, $CH_2CF_3$], [A1995; H, NHC(O)OMe, I, F, H, $CH_2CF_3$][A1996; H, NHC(O)OMe, Me, F, H, $CH_2CF_3$], [A1997; H, NHC(O)OMe, OMe, F, H, $CH_2CF_3$], [A1998; H, NHC(O)OMe, $CF_3$, F, H, $CH_2CF_3$], [A1999; H, NHC(O) OMe, $CHF_2$, F, H, $CH_2CF_3$], [A2000; H, NHC(O)OMe, $NO_2$, F, H, $CH_2CF_3$][A2001; H, NHC(O)OMe, H, F, H, $CF_2CH_3$], [A2002; H, NHC(O)OMe, F, F, H, $CF_2CH_3$], [A2003; H, NHC(O)OMe, Cl, F, H, $CF_2CH_3$], [A2004; H, NHC(O)OMe, Br, F, H, $CF_2CH_3$], [A2005; H, NHC(O) OMe, I, F, H, $CF_2CH_3$], [A2006; H, NHC(O)OMe, Me, F, H, $CF_2CH_3$], [A2007; H, NHC(O) OMe, OMe, F, H, $CF_2CH_3$], [A2008; H, NHC(O) OMe, $CF_3$, F, H, $CF_2CH_3$], [A2009; H, NHC(O) OMe, $CHF_2$, F, H, $CF_2CH_3$], [A2010; H, NHC(O) OMe, $NO_2$, F, H, $CF_2CH_3$], [A2011; H, NHC(O)OMe, H, F, H, 2-Py], [A2012; H, NHC(O)OMe, F, F, H, 2-Py], [A2013; H, NHC(O)OMe, Cl, F, H, 2-Py], [A2014; H, NHC(O)OMe, Br, F, H, 2-Py], [A2015; H, NHC(O)OMe, I, F, H, 2-Py], [A2016; H, NHC(O)OMe, Me, F, H, 2-Py], [A2017; H, NHC(O)OMe, OMe, F, H, 2-Py], [A2018; H, NHC(O)OMe, $CF_3$, F, H, 2-Py], [A2019; H, NHC(O)OMe, $CHF_2$, F, H, 2-Py], [A2020; H, NHC(O) OMe, $NO_2$, F, H, 2-Py], [A2021; H, NHC(O)OMe, H, F, H, 3-Py], [A2022; H, NHC(O)OMe, F, F, H, 3-Py], [A2023; H, NHC(O)OMe, Cl, F, H, 3-Py], [A2024; H, NHC(O)OMe, Br, F, H, 3-Py], [A2025; H, NHC(O)OMe, I, F, H, 3-Py], [A2026; H, NHC(O)OMe, Me, F, H, 3-Py], [A2027; H, NHC(O)OMe, OMe, F, H, 3-Py], [A2028; H, NHC(O)OMe, $CF_3$, F, H, 3-Py], [A2029; H, NHC(O)OMe, $CHF_2$, F, H, 3-Py], [A2030; H, NHC(O) OMe, $NO_2$, F, H, 3-Py], [A2031; H, NHC(O)OMe, H, F, H, 4-Py], [A2032; H, NHC(O)OMe, F, F, H, 4-Py], [A2033; H, NHC(O)OMe, Cl, F, H, 4-Py], [A2034; H, NHC(O)OMe, Br, F, H, 4-Py], [A2035; H, NHC(O)OMe, I, F, H, 4-Py], [A2036; H, NHC(O)OMe, Me, F, H, 4-Py], [A2037; H, NHC(O) OMe, OMe, F, H, 4-Py], [A2038; H, NHC(O)OMe, $CF_3$, F, H, 4-Py], [A2039; H, NHC(O)OMe, $CHF_2$, F, H, 4-Py], [A2040; H, NHC(O) OMe, $NO_2$, F, H, 4-Py], [A2041; H, NHC(O)OEt, H, H, H, Et], [A2042; H, NHC(O)OEt, F, H, H, Et], [A2043; H, NHC(O)OEt, Cl, H, H, Et], [A2044; H, NHC(O)OEt, Br, H, H, Et], [A2045; H, NHC(O)OEt, I, H, H, Et], [A2046; H, NHC(O)OEt, Me, H, H, Et], [A2047; H, NHC(O)OEt, OMe, H, H, Et], [A2048; H, NHC(O)OEt, $CF_3$, H, H, Et], [A2049; H, NHC(O)OEt, $CHF_2$, H, H, Et], [A2050; H, NHC(O)OEt, $NO_2$, H, H, Et], [A2051; H, NHC(O)OEt, H, H, H, Pr], [A2052; H, NHC(O)OEt, F, H, H, Pr], [A2053; H, NHC(O)OEt, Cl, H, H, Pr], [A2054; H, NHC(O)OEt, Br, H, H, Pr], [A2055; H, NHC(O)OEt, I, H, H, Pr], [A2056; H, NHC(O)OEt, Me, H, H, Pr], [A2057; H, NHC(O)OEt, OMe, H, H, Pr], [A2058; H, NHC(O)OEt, $CF_3$, H, H, Pr], [A2059; H, NHC(O)OEt, $CHF_2$, H, H, Pr], [A2060; H, NHC(O)OEt, $NO_2$, H, H, Pr], [A2061; H, NHC(O)OEt, H, H, H, i-Pr], [A2062; H, NHC(O)OEt, F, H, H, i-Pr], [A2063; H, NHC(O)OEt, Cl, H, H, i-Pr], [A2064; H, NHC(O)OEt, Br, H, H, i-Pr], [A2065; H, NHC(O)OEt, I, H, H, i-Pr], [A2066; H, NHC(O)OEt, Me, H, H, i-Pr], [A2067; H, NHC(O)OEt, OMe, H, H, i-Pr], [A2068; H, NHC(O)OEt, $CF_3$, H, H, i-Pr], [A2069; H, NHC(O)OEt, $CHF_2$, H, H, i-Pr], [A2070; H, NHC(O)OEt, $NO_2$, H, H, i-Pr], [A2071; H, NHC(O)OEt, H, H, H, c-Pr], [A2072; H, NHC(O)OEt, F, H, H, c-Pr], [A2073; H, NHC(O)OEt, Cl, H, H, c-Pr], [A2074; H, NHC(O)OEt, Br, H, H, c-Pr], [A2075; H, NHC(O)OEt, I, H, H, c-Pr], [A2076; H, NHC(O)OEt, Me, H, H, c-Pr], [A2077; H, NHC(O)OEt, OMe, H, H, c-Pr], [A2078; H, NHC(O)OEt, $CF_3$, H, H, c-Pr], [A2079; H, NHC(O)OEt, $CHF_2$, H, H, c-Pr], [A2080; H, NHC(O)OEt, $NO_2$, H, H, c-Pr], [A2081; H, NHC(O)OEt, H, H, H, Bu], [A2082; H, NHC(O)OEt, F, H, H, Bu], [A2083; H, NHC (O)OEt, Cl, H, H, Bu], [A2084; H, NHC(O)OEt, Br, H, H, Bu], [A2085; H, NHC(O)OEt, I, H, H, Bu], [A2086; H,

NHC(O)OEt, Me, H, H, Bu], [A2087; H, NHC(O)OEt, OMe, H, H, Bu], [A2088; H, NHC(O)OEt, $CF_3$, H, H, Bu], [A2089; H, NHC(O)OEt, $CHF_2$, H, H, Bu], [A2090; H, NHC(O)OEt, $NO_2$, H, H, Bu], [A2091; H, NHC(O)OEt, H, H, H, i-Bu], [A2092; H, NHC(O)OEt, F, H, H, i-Bu], [A2093; H, NHC(O)OEt, Cl, H, H, i-Bu], [A2094; H, NHC(O)OEt, Br, H, H, i-Bu], [A2095; H, NHC(O)OEt, I, H, H, i-Bu], [A2096; H, NHC(O)OEt, Me, H, H, i-Bu], [A2097; H, NHC(O)OEt, OMe, H, H, i-Bu], [A2098; H, NHC(O)OEt, $CF_3$, H, H, i-Bu], [A2099; H, NHC(O)OEt, $CHF_2$, H, H, i-Bu], [A2100; H, NHC(O)OEt, $NO_2$, H, H, i-Bu], [A2101; H, NHC(O)OEt, H, H, H, $CH_2CF_3$], [A2102; H, NHC(O)OEt, F, H, H, $CH_2CF_3$], [A2103; H, NHC(O)OEt, Cl, H, H, $CH_2CF_3$], [A2104; H, NHC(O)OEt, Br, H, H, $CH_2CF_3$], [A2105; H, NHC(O)OEt, I, H, H, $CH_2CF_3$], [A2106; H, NHC(O)OEt, Me, H, H, $CH_2CF_3$], [A2107; H, NHC(O)OEt, OMe, H, H, $CH_2CF_3$], [A2108; H, NHC(O)OEt, $CF_3$, H, H, $CH_2CF_3$], [A2109; H, NHC(O)OEt, $CHF_2$, H, H, $CH_2CF_3$], [A2110; H, NHC(O)OEt, $NO_2$, H, H, $CH_2CF_3$], [A2111; H, NHC(O)OEt, H, H, H, $CF_2CH_3$], [A2112; H, NHC(O)OEt, F, H, H, $CF_2CH_3$], [A2113; H, NHC(O)OEt, Cl, H, H, $CF_2CH_3$], [A2114; H, NHC(O)OEt, Br, H, H, $CF_2CH_3$], [A2115; H, NHC(O)OEt, I, H, H, $CF_2CH_3$], [A2116; H, NHC(O)OEt, Me, H, H, $CF_2CH_3$], [A2117; H, NHC(O)OEt, OMe, H, H, $CF_2CH_3$], [A2118; H, NHC(O)OEt, $CF_3$, H, H, $CF_2CH_3$], [A2119; H, NHC(O)OEt, $CHF_2$, H, H, $CF_2CH_3$], [A2120; H, NHC(O)OEt, $NO_2$, H, H, $CF_2CH_3$], [A2121; H, NHC(O)OEt, H, H, H, 2-Py], [A2122; H, NHC(O)OEt, F, H, H, 2-Py], [A2123; H, NHC(O)OEt, Cl, H, H, 2-Py], [A2124; H, NHC(O)OEt, Br, H, H, 2-Py], [A2125; H, NHC(O)OEt, I, H, H, 2-Py], [A2126; H, NHC(O)OEt, Me, H, H, 2-Py], [A2127; H, NHC(O)OEt, OMe, H, H, 2-Py], [A2128; H, NHC(O)OEt, $CF_3$, H, H, 2-Py], [A2129; H, NHC(O)OEt, $CHF_2$, H, H, 2-Py], [A2130; H, NHC(O)OEt, $NO_2$, H, H, 2-Py], [A2131; H, NHC(O)OEt, H, H, H, 3-Py], [A2132; H, NHC(O)OEt, F, H, H, 3-Py], [A2133; H, NHC(O)OEt, Cl, H, H, 3-Py], [A2134; H, NHC(O)OEt, Br, H, H, 3-Py], [A2135; H, NHC(O)OEt, I, H, H, 3-Py], [A2136; H, NHC(O)OEt, Me, H, H, 3-Py], [A2137; H, NHC(O)OEt, OMe, H, H, 3-Py], [A2138; H, NHC(O)OEt, $CF_3$, H, H, 3-Py], [A2139; H, NHC(O)OEt, $CHF_2$, H, H, 3-Py], [A2140; H, NHC(O)OEt, $NO_2$, H, H, 3-Py], [A2141; H, NHC(O)OEt, H, H, H, 4-Py], [A2142; H, NHC(O)OEt, F, H, H, 4-Py], [A2143; H, NHC(O)OEt, Cl, H, H, 4-Py], [A2144; H, NHC(O)OEt, Br, H, H, 4-Py], [A2145; H, NHC(O)OEt, I, H, H, 4-Py], [A2146; H, NHC(O)OEt, Me, H, H, 4-Py], [A2147; H, NHC(O)OEt, OMe, H, H, 4-Py], [A2148; H, NHC(O)OEt, $CF_3$, H, H, 4-Py], [A2149; H, NHC(O)OEt, $CHF_2$, H, H, 4-Py], [A2150; H, NHC(O)OEt, $NO_2$, H, H, 4-Py], [A2151; H, NHC(O)OEt, H, F, H, Et], [A2152; H, NHC(O)OEt, F, F, H, Et], [A2153; H, NHC(O)OEt, Cl, F, H, Et], [A2154; H, NHC(O)OEt, Br, F, H, Et], [A2155; H, NHC(O)OEt, I, F, H, Et], [A2156; H, NHC(O)OEt, Me, F, H, Et], [A2157; H, NHC(O)OEt, OMe, F, H, Et], [A2158; H, NHC(O)OEt, $CF_3$, F, H, Et], [A2159; H, NHC(O)OEt, $CHF_2$, F, H, Et], [A2160; H, NHC(O)OEt, $NO_2$, F, H, Et], [A2161; H, NHC(O)OEt, H, F, H, Pr], [A2162; H, NHC(O)OEt, F, F, H, Pr], [A2163; H, NHC(O)OEt, Cl, F, H, Pr], [A2164; H, NHC(O)OEt, Br, F, H, Pr], [A2165; H, NHC(O)OEt, I, F, H, Pr], [A2166; H, NHC(O)OEt, Me, F, H, Pr], [A2167; H, NHC(O)OEt, OMe, F, H, Pr], [A2168; H, NHC(O)OEt, $CF_3$, F, H, Pr], [A2169; H, NHC(O)OEt, $CHF_2$, F, H, Pr], [A2170; H, NHC(O)OEt, $NO_2$, F, H, Pr], [A2171; H, NHC(O)OEt, H, F, H, i-Pr], [A2172; H, NHC(O)OEt, F, F, H, i-Pr], [A2173; H, NHC(O)OEt, Cl, F, H, i-Pr], [A2174; H, NHC(O)OEt, Br, F, H, i-Pr], [A2175; H, NHC(O)OEt, I, F, H, i-Pr], [A2176; H, NHC(O)OEt, Me, F, H, i-Pr], [A2177; H, NHC(O)OEt, OMe, F, H, i-Pr], [A2178; H, NHC(O)OEt, $CF_3$, F, H, i-Pr], [A2179; H, NHC(O)OEt, $CHF_2$, F, H, i-Pr], [A2180; H, NHC(O)OEt, $NO_2$, F, H, i-Pr], [A2181; H, NHC(O)OEt, H, F, H, c-Pr], [A2182; H, NHC(O)OEt, F, F, H, c-Pr], [A2183; H, NHC(O)OEt, Cl, F, H, c-Pr], [A2184; H, NHC(O)OEt, Br, F, H, c-Pr], [A2185; H, NHC(O)OEt, I, F, H, c-Pr], [A2186; H, NHC(O)OEt, Me, F, H, c-Pr], [A2187; H, NHC(O)OEt, OMe, F, H, c-Pr], [A2188; H, NHC(O)OEt, $CF_3$, F, H, c-Pr], [A2189; H, NHC(O)OEt, $CHF_2$, F, H, c-Pr], [A2190; H, NHC(O)OEt, $NO_2$, F, H, c-Pr], [A2191; H, NHC(O)OEt, H, F, H, Bu], [A2192; H, NHC(O)OEt, F, F, H, Bu], [A2193; H, NHC(O)OEt, Cl, F, H, Bu], [A2194; H, NHC(O)OEt, Br, F, H, Bu], [A2195; H, NHC(O)OEt, I, F, H, Bu], [A2196; H, NHC(O)OEt, Me, F, H, Bu], [A2197; H, NHC(O)OEt, OMe, F, H, Bu], [A2198; H, NHC(O)OEt, $CF_3$, F, H, Bu], [A2199; H, NHC(O)OEt, $CHF_2$, F, H, Bu], [A2200; H, NHC(O)OEt, $NO_2$, F, H, Bu], [A2201; H, NHC(O)OEt, H, F, H, i-Bu], [A2202; H, NHC(O)OEt, F, F, H, i-Bu], [A2203; H, NHC(O)OEt, Cl, F, H, i-Bu], [A2204; H, NHC(O)OEt, Br, F, H, i-Bu], [A2205; H, NHC(O)OEt, I, F, H, i-Bu], [A2206; H, NHC(O)OEt, Me, F, H, i-Bu], [A2207; H, NHC(O)OEt, OMe, F, H, i-Bu], [A2208; H, NHC(O)OEt, $CF_3$, F, H, i-Bu], [A2209; H, NHC(O)OEt, $CHF_2$, F, H, i-Bu], [A2210; H, NHC(O)OEt, $NO_2$, F, H, i-Bu], [A2211; H, NHC(O)OEt, H, F, H, $CH_2CF_3$], [A2212; H, NHC(O)OEt, F, F, H, $CH_2CF_3$], [A2213; H, NHC(O)OEt, Cl, F, H, $CH_2CF_3$], [A2214; H, NHC(O)OEt, Br, F, H, $CH_2CF_3$], [A2215; H, NHC(O)OEt, I, F, H, $CH_2CF_3$], [A2216; H, NHC(O)OEt, Me, F, H, $CH_2CF_3$], [A2217; H, NHC(O)OEt, OMe, F, H, $CH_2CF_3$], [A2218; H, NHC(O)OEt, $CF_3$, F, H, $CH_2CF_3$], [A2219; H, NHC(O)OEt, $CHF_2$, F, H, $CH_2CF_3$], [A2220; H, NHC(O)OEt, $NO_2$, F, H, $CH_2CF_3$], [A2221; H, NHC(O)OEt, H, F, H, $CF_2CH_3$], [A2222; H, NHC(O)OEt, F, F, H, $CF_2CH_3$], [A2223; H, NHC(O)OEt, Cl, F, H, $CF_2CH_3$], [A2224; H, NHC(O)OEt, Br, F, H, $CF_2CH_3$], [A2225; H, NHC(O)OEt, I, F, H, $CF_2CH_3$], [A2226; H, NHC(O)OEt, Me, F, H, $CF_2CH_3$], [A2227; H, NHC(O)OEt, OMe, F, H, $CF_2CH_3$], [A2228; H, NHC(O)OEt, $CF_3$, F, H, $CF_2CH_3$], [A2229; H, NHC(O)OEt, $CHF_2$, F, H, $CF_2CH_3$], [A2230; H, NHC(O)OEt, $NO_2$, F, H, $CF_2CH_3$], [A2231; H, NHC(O)OEt, H, F, H, 2-Py], [A2232; H, NHC(O)OEt, F, F, H, 2-Py], [A2233; H, NHC(O)OEt, Cl, F, H, 2-Py], [A2234; H, NHC(O)OEt, Br, F, H, 2-Py], [A2235; H, NHC(O)OEt, I, F, H, 2-Py], [A2236; H, NHC(O)OEt, Me, F, H, 2-Py], [A2237; H, NHC(O)OEt, OMe, F, H, 2-Py], [A2238; H, NHC(O)OEt, $CF_3$, F, H, 2-Py], [A2239; H, NHC(O)OEt, $CHF_2$, F, H, 2-Py], [A2240; H, NHC(O)OEt, $NO_2$, F, H, 2-Py], [A2241; H, NHC(O)OEt, H, F, H, 3-Py], [A2242; H, NHC(O)OEt, F, F, H, 3-Py], [A2243; H, NHC(O)OEt, Cl, F, H, 3-Py], [A2244; H, NHC(O)OEt, Br, F, H, 3-Py], [A2245; H, NHC(O)OEt, I, F, H, 3-Py], [A2246; H, NHC(O)OEt, Me, F, H, 3-Py], [A2247; H, NHC(O)OEt, OMe, F, H, 3-Py], [A2248; H, NHC(O)OEt, $CF_3$, F, H, 3-Py], [A2249; H, NHC(O)OEt, $CHF_2$, F, H, 3-Py], [A2250; H, NHC(O)OEt, $NO_2$, F, H, 3-Py], [A2251; H, NHC(O)OEt, H, F, H, 4-Py], [A2252; H, NHC(O)OEt, F, F, H, 4-Py], [A2253; H, NHC(O)OEt, Cl, F, H, 4-Py], [A2254; H, NHC(O)OEt, Br, F, H, 4-Py], [A2255; H, NHC(O)OEt, I, F, H, 4-Py], [A2256; H, NHC(O)OEt, Me, F, H, 4-Py], [A2257; H, NHC(O)OEt, OMe, F, H, 4-Py], [A2258; H, NHC(O)OEt, $CF_3$, F, H, 4-Py], [A2259; H, NHC(O)OEt, $CHF_2$, F, H, 4-Py], [A2260; H, NHC(O)OEt, $NO_2$, F, H, 4-Py], [A2261; H, NHC(O)OPr, H, H, H, Et], [A2262; H, NHC(O)OPr, F, H, H, Et], [A2263; H, NHC(O)OPr, Cl, H, H, Et], [A2264; H, NHC(O)OPr, Br, H, H, Et], [A2265; H, NHC(O)OPr, I, H, H, Et], [A2266; H, NHC(O)OPr, Me, H, H, Et], [A2267; H, NHC(O)OPr, OMe, H, H,

Et], [A2268; H, NHC(O)OPr, $CF_3$, H, H, Et], [A2269; H, NHC(O)OPr, $CHF_2$, H, H, Et], [A2270; H, NHC(O)OPr, $NO_2$, H, H, Et], [A2271; H, NHC(O)OPr, H, H, H, Pr], [A2272; H, NHC(O)OPr, F, H, H, Pr], [A2273; H, NHC(O) OPr, Cl, H, H, Pr], [A2274; H, NHC(O)OPr, Br, H, H, Pr], [A2275; H, NHC(O)OPr, I, H, H, Pr], [A2276; H, NHC(O) OPr, Me, H, H, Pr], [A2277; H, NHC(O)OPr, OMe, H, H, Pr], [A2278; H, NHC(O)OPr, $CF_3$, H, H, Pr], [A2279; H, NHC(O)OPr, $CHF_2$, H, H, Pr], [A2280; H, NHC(O)OPr, $NO_2$, H, H, Pr], [A2281; H, NHC(O)OPr, H, H, H, i-Pr], [A2282; H, NHC(O)OPr, F, H, H, i-Pr], [A2283; H, NHC (O)OPr, Cl, H, H, i-Pr], [A2284; H, NHC(O)OPr, Br, H, H, i-Pr], [A2285; H, NHC(O)OPr, I, H, H, i-Pr], [A2286; H, NHC(O)OPr, Me, H, H, i-Pr], [A2287; H, NHC(O)OPr, OMe, H, H, i-Pr], [A2288; H, NHC(O)OPr, $CF_3$, H, H, i-Pr], [A2289; H, NHC(O)OPr, $CHF_2$, H, H, i-Pr], [A2290; H, NHC(O)OPr, $NO_2$, H, H, i-Pr], [A2291; H, NHC(O)OPr, H, H, H, c-Pr], [A2292; H, NHC(O)OPr, F, H, H, c-Pr], [A2293; H, NHC(O)OPr, Cl, H, H, c-Pr], [A2294; H, NHC(O)OPr, Br, H, H, c-Pr], [A2295; H, NHC(O)OPr, I, H, H, c-Pr], [A2296; H, NHC(O)OPr, Me, H, H, c-Pr], [A2297; H, NHC(O)OPr, OMe, H, H, c-Pr], [A2298; H, NHC(O) OPr, $CF_3$, H, H, c-Pr], [A2299; H, NHC(O)OPr, $CHF_2$, H, H, c-Pr], [A2300; H, NHC(O)OPr, $NO_2$, H, H, c-Pr], [A2301; H, NHC(O)OPr, H, H, H, Bu], [A2302; H, NHC (O)OPr, F, H, H, Bu], [A2303; H, NHC(O)OPr, Cl, H, H, Bu], [A2304; H, NHC(O)OPr, Br, H, H, Bu], [A2305; H, NHC(O)OPr, I, H, H, Bu], [A2306; H, NHC(O)OPr, Me, H, H, Bu], [A2307; H, NHC(O)OPr, OMe, H, H, Bu], [A2308; H, NHC(O)OPr, $CF_3$, H, H, Bu], [A2309; H, NHC(O)OPr, $CHF_2$, H, H, Bu], [A2310; H, NHC(O)OPr, $NO_2$, H, H, Bu], [A2311; H, NHC(O)OPr, H, H, H, i-Bu], [A2312; H, NHC (O)OPr, F, H, H, i-Bu], [A2313; H, NHC(O)OPr, Cl, H, H, i-Bu], [A2314; H, NHC(O)OPr, Br, H, H, i-Bu], [A2315; H, NHC(O)OPr, I, H, H, i-Bu], [A2316; H, NHC(O)OPr, Me, H, H, i-Bu], [A2317; H, NHC(O)OPr, OMe, H, H, i-Bu], [A2318; H, NHC(O)OPr, $CF_3$, H, H, i-Bu], [A2319; H, NHC(O)OPr, $CHF_2$, H, H, i-Bu], [A2320; H, NHC(O)OPr, $NO_2$, H, H, i-Bu], [A2321; H, NHC(O)OPr, H, H, H, $CH_2CF_3$], [A2322; H, NHC(O)OPr, F, H, H, $CH_2CF_3$], [A2323; H, NHC(O)OPr, Cl, H, H, $CH_2CF_3$], [A2324; H, NHC(O)OPr, Br, H, H, $CH_2CF_3$], [A2325; H, NHC(O)OPr, I, H, H, $CH_2CF_3$], [A2326; H, NHC(O)OPr, Me, H, H, $CH_2CF_3$], [A2327; H, NHC(O)OPr, OMe, H, H, $CH_2CF_3$], [A2328; H, NHC(O)OPr, $CF_3$, H, H, $CH_2CF_3$], [A2329; H, NHC(O)OPr, $CHF_2$, H, H, $CH_2CF_3$], [A2330; H, NHC(O) OPr, $NO_2$, H, H, $CH_2CF_3$], [A2331; H, NHC(O)OPr, H, H, H, $CF_2CH_3$], [A2332; H, NHC(O)OPr, F, H, H, $CF_2CH_3$], [A2333; H, NHC(O)OPr, Cl, H, H, $CF_2CH_3$], [A2334; H, NHC(O)OPr, Br, H, H, $CF_2CH_3$], [A2335; H, NHC(O)OPr, I, H, H, $CF_2CH_3$], [A2336; H, NHC(O)OPr, Me, H, H, $CF_2CH_3$], [A2337; H, NHC(O)OPr, OMe, H, H, $CF_2CH_3$], [A2338; H, NHC(O)OPr, $CF_3$, H, H, $CF_2CH_3$], [A2339; H, NHC(O)OPr, $CHF_2$, H, H, $CF_2CH_3$], [A2340; H, NHC(O) OPr, $NO_2$, H, H, $CF_2CH_3$], [A2341; H, NHC(O)OPr, H, H, H, 2-Py], [A2342; H, NHC(O)OPr, F, H, H, 2-Py], [A2343; H, NHC(O)OPr, Cl, H, H, 2-Py], [A2344; H, NHC(O)OPr, Br, H, H, 2-Py], [A2345; H, NHC(O)OPr, I, H, H, 2-Py], [A2346; H, NHC(O)OPr, Me, H, H, 2-Py], [A2347; H, NHC(O)OPr, OMe, H, H, 2-Py], [A2348; H, NHC(O)OPr, $CF_3$, H, H, 2-Py], [A2349; H, NHC(O)OPr, $CHF_2$, H, H, 2-Py], [A2350; H, NHC(O)OPr, $NO_2$, H, H, 2-Py], [A2351; H, NHC(O)OPr, H, H, H, 3-Py], [A2352; H, NHC(O)OPr, F, H, H, 3-Py], [A2353; H, NHC(O)OPr, Cl, H, H, 3-Py], [A2354; H, NHC(O)OPr, Br, H, H, 3-Py], [A2355; H, NHC(O)OPr, I, H, H, 3-Py], [A2356; H, NHC(O)OPr, Me, H, H, 3-Py], [A2357; H, NHC(O)OPr, OMe, H, H, 3-Py], [A2358; H, NHC(O)OPr, $CF_3$, H, H, 3-Py], [A2359; H, NHC(O)OPr, $CHF_2$, H, H, 3-Py], [A2360; H, NHC(O)OPr, $NO_2$, H, H, 3-Py], [A2361; H, NHC(O)OPr, H, H, H, 4-Py], [A2362; H, NHC(O)OPr, F, H, H, 4-Py], [A2363; H, NHC (O)OPr, Cl, H, H, 4-Py], [A2364; H, NHC(O)OPr, Br, H, H, 4-Py], [A2365; H, NHC(O)OPr, I, H, H, 4-Py], [A2366; H, NHC(O)OPr, Me, H, H, 4-Py], [A2367; H, NHC(O)OPr, OMe, H, H, 4-Py], [A2368; H, NHC(O)OPr, $CF_3$, H, H, 4-Py], [A2369; H, NHC(O)OPr, $CHF_2$, H, H, 4-Py], [A2370; H, NHC(O)OPr, $NO_2$, H, H, 4-Py], [A2371; H, NHC(O)OPr, H, F, H, Et], [A2372; H, NHC(O)OPr, F, F, H, Et], [A2373; H, NHC(O)OPr, Cl, F, H, Et], [A2374; H, NHC(O)OPr, Br, F, H, Et], [A2375; H, NHC(O)OPr, I, F, H, Et], [A2376; H, NHC(O)OPr, Me, F, H, Et], [A2377; H, NHC(O)OPr, OMe, F, H, Et], [A2378; H, NHC(O)OPr, $CF_3$, F, H, Et], [A2379; H, NHC(O)OPr, $CHF_2$, F, H, Et], [A2380; H, NHC(O)OPr, $NO_2$, F, H, Et], [A2381; H, NHC(O)OPr, H, F, H, Pr], [A2382; H, NHC(O)OPr, F, F, H, Pr], [A2383; H, NHC(O)OPr, Cl, F, H, Pr], [A2384; H, NHC(O)OPr, Br, F, H, Pr], [A2385; H, NHC(O)OPr, I, F, H, Pr], [A2386; H, NHC(O)OPr, Me, F, H, Pr], [A2387; H, NHC(O)OPr, OMe, F, H, Pr], [A2388; H, NHC(O)OPr, $CF_3$, F, H, Pr], [A2389; H, NHC(O)OPr, $CHF_2$, F, H, Pr], [A2390; H, NHC(O)OPr, $NO_2$, F, H, Pr], [A2391; H, NHC(O)OPr, H, F, H, i-Pr], [A2392; H, NHC(O)OPr, F, F, H, i-Pr], [A2393; H, NHC (O)OPr, Cl, F, H, i-Pr], [A2394; H, NHC(O)OPr, Br, F, H, i-Pr], [A2395; H, NHC(O)OPr, I, F, H, i-Pr], [A2396; H, NHC(O)OPr, Me, F, H, i-Pr], [A2397; H, NHC(O)OPr, OMe, F, H, i-Pr], [A2398; H, NHC(O)OPr, $CF_3$, F, H, i-Pr], [A2399; H, NHC(O)OPr, $CHF_2$, F, H, i-Pr], [A2400; H, NHC(O)OPr, $NO_2$, F, H, i-Pr], [A2401; H, NHC(O)OPr, H, F, H, c-Pr], [A2402; H, NHC(O)OPr, F, F, H, c-Pr], [A2403; H, NHC(O)OPr, Cl, F, H, c-Pr], [A2404; H, NHC(O)OPr, Br, F, H, c-Pr], [A2405; H, NHC(O)OPr, I, F, H, c-Pr], [A2406; H, NHC(O)OPr, Me, F, H, c-Pr], [A2407; H, NHC(O)OPr, OMe, F, H, c-Pr], [A2408; H, NHC(O)OPr, $CF_3$, F, H, c-Pr], [A2409; H, NHC(O)OPr, $CHF_2$, F, H, c-Pr], [A2410; H, NHC(O)OPr, $NO_2$, F, H, c-Pr], [A2411; H, NHC(O)OPr, H, F, H, Bu], [A2412; H, NHC(O)OPr, F, F, H, Bu], [A2413; H, NHC(O)OPr, Cl, F, H, Bu], [A2414; H, NHC(O)OPr, Br, F, H, Bu], [A2415; H, NHC(O)OPr, I, F, H, Bu], [A2416; H, NHC(O)OPr, Me, F, H, Bu], [A2417; H, NHC(O)OPr, OMe, F, H, Bu], [A2418; H, NHC(O)OPr, $CF_3$, F, H, Bu], [A2419; H, NHC(O)OPr, $CHF_2$, F, H, Bu], [A2420; H, NHC(O)OPr, $NO_2$, F, H, Bu], [A2421; H, NHC(O)OPr, H, F, H, i-Bu], [A2422; H, NHC(O)OPr, F, F, H, i-Bu], [A2423; H, NHC(O)OPr, Cl, F, H, i-Bu], [A2424; H, NHC(O)OPr, Br, F, H, i-Bu], [A2425; H, NHC(O)OPr, I, F, H, i-Bu], [A2426; H, NHC(O)OPr, Me, F, H, i-Bu], [A2427; H, NHC(O)OPr, OMe, F, H, i-Bu], [A2428; H, NHC(O)OPr, $CF_3$, F, H, i-Bu], [A2429; H, NHC(O)OPr, $CHF_2$, F, H, i-Bu], [A2430; H, NHC(O)OPr, $NO_2$, F, H, i-Bu], [A2431; H, NHC(O)OPr, H, F, H, $CH_2CF_3$], [A2432; H, NHC(O)OPr, F, F, H, $CH_2CF_3$], [A2433; H, NHC(O)OPr, Cl, F, H, $CH_2CF_3$], [A2434; H, NHC(O)OPr, Br, F, H, $CH_2CF_3$], [A2435; H, NHC(O)OPr, I, F, H, $CH_2CF_3$], [A2436; H, NHC(O)OPr, Me, F, H, $CH_2CF_3$], [A2437; H, NHC(O)OPr, OMe, F, H, $CH_2CF_3$], [A2438; H, NHC(O) OPr, $CF_3$, F, H, $CH_2CF_3$], [A2439; H, NHC(O)OPr, $CHF_2$, F, H, $CH_2CF_3$], [A2440; H, NHC(O)OPr, $NO_2$, F, H, $CH_2CF_3$], [A2441; H, NHC(O)OPr, H, F, H, $CF_2CH_3$], [A2442; H, NHC(O)OPr, F, F, H, $CF_2CH_3$], [A2443; H, NHC(O)OPr, Cl, F, H, $CF_2CH_3$], [A2444; H, NHC(O)OPr, Br, F, H, $CF_2CH_3$], [A2445; H, NHC(O)OPr, I, F, H, $CF_2CH_3$], [A2446; H, NHC(O)OPr, Me, F, H, $CF_2CH_3$], [A2447; H, NHC(O)OPr, OMe, F, H, $CF_2CH_3$], [A2448; H, NHC(O)OPr, $CF_3$, F, H, $CF_2CH_3$], [A2449; H, NHC(O)OPr, $CHF_2$, F, H, $CF_2CH_3$], [A2450; H, NHC(O)OPr, $NO_2$, F, H, $CF_2CH_3$], [A2451; H, NHC(O)OPr, H, F, H, 2-Py], [A2452; H, NHC(O)OPr, F, F, H, 2-Py], [A2453; H, NHC(O)OPr, Cl, F, H, 2-Py], [A2454; H, NHC(O)OPr, Br, F, H, 2-Py], [A2455; H, NHC(O)OPr, I, F, H, 2-Py], [A2456; H, NHC (O)OPr, Me, F, H, 2-Py], [A2457; H, NHC(O)OPr, OMe, F, H, 2-Py], [A2458; H, NHC(O)OPr, $CF_3$, F, H, 2-Py], [A2459; H, NHC(O)OPr, $CHF_2$, F, H, 2-Py], [A2460; H, NHC(O)OPr, $NO_2$, F, H, 2-Py], [A2461; H, NHC(O)OPr, H, F, H, 3-Py], [A2462; H, NHC(O)OPr, F, F, H, 3-Py], [A2463; H, NHC(O)OPr, Cl, F, H, 3-Py], [A2464; H, NHC(O)OPr, Br, F, H, 3-Py], [A2465; H, NHC(O)OPr, I, F, H, 3-Py], [A2466; H, NHC(O)OPr, Me, F, H, 3-Py], [A2467; H, NHC(O)OPr, OMe, F, H, 3-Py], [A2468; H, NHC(O)OPr, $CF_3$, F, H, 3-Py], [A2469; H, NHC(O)OPr, $CHF_2$, F, H, 3-Py], [A2470; H, NHC(O)OPr, $NO_2$, F, H, 3-Py], [A2471; H, NHC(O)OPr, H, F, H, 4-Py], [A2472; H, NHC(O)OPr, F, F, H, 4-Py], [A2473; H, NHC(O)OPr, Cl, F, H, 4-Py], [A2474; H, NHC(O)OPr, Br, F, H, 4-Py], [A2475; H, NHC(O)OPr, I, F, H, 4-Py], [A2476; H, NHC(O)OPr, Me, F, H, 4-Py], [A2477; H, NHC(O)OPr, OMe, F, H, 4-Py], [A2478; H, NHC(O)OPr, $CF_3$, F, H, 4-Py], [A2479; H, NHC(O)OPr, $CHF_2$, F, H, 4-Py], [A2480; H, NHC(O)OPr, $NO_2$, F, H, 4-Py], [A2481; H, H, NHC(O)OMe, H, H, Et], [A2482; H, H, NHC(O)OMe, H, H, Pr], [A2483; H, H, NHC(O)OMe, H, H, i-Pr], [A2484; H, H, NHC(O)OMe, H, H, c-Pr], [A2485; H, H, NHC(O)OMe, H, H, Bu], [A2486; H, H, NHC(O)OMe, H, H, i-Bu], [A2487; H, H, NHC(O) OMe, H, H, $CH_2CF_3$], [A2488; H, H, NHC(O)OMe, H, H, $CF_2CH_3$], [A2489; H, H, NHC(O)OMe, H, H, 2-Py], [A2490; H, H, NHC(O)OMe, H, H, 3-Py], [A2491; H, H, NHC(O)OMe, H, H, 4-Py], [A2492; H, F, NHC(O)OMe, H, H, Et], [A2493; H, F, NHC(O)OMe, H, H, Pr], [A2494; H, F, NHC(O)OMe, H, H, i-Pr], [A2495; H, F, NHC(O)OMe, H, H, c-Pr], [A2496; H, F, NHC(O)OMe, H, H, Bu], [A2497; H, F, NHC(O)OMe, H, H, i-Bu], [A2498; H, F, NHC(O)OMe, H, H, $CH_2CF_3$], [A2499; H, F, NHC(O)OMe, H, H, $CF_2CH_3$], [A2500; H, F, NHC(O)OMe, H, H, 2-Py], [A2501; H, F, NHC(O)OMe, H, H, 3-Py], [A2502; H, F, NHC(O)OMe, H, H, 4-Py], [A2503; H, F, NHC(O)OMeF, H, Et], [A2504; H, F, NHC(O)OMeF, H, Pr], [A2505; H, F, NHC(O)OMeF, H, i-Pr], [A2506; H, F, NHC(O)OMeF, H, c-Pr], [A2507; H, F, NHC(O)OMeF, H, Bu], [A2508; H, F, NHC(O)OMeF, H, i-Bu], [A2509; H, F, NHC(O)OMeF, H, $CH_2CF_3$], [A2510; H, F, NHC(O)OOMeF, H, $CF_2CH_3$], [A2511; H, F, NHC(O)OMeF, H, 2-Py], [A2512; H, F, NHC(O)OMeF, H, 3-Py], [A2513; H, F, NHC(O)OMeF, H, 4-Py], [A2514; H, H, NHC(O)OEt, H, H, Et], [A2515; H, H, NHC(O)OEt, H, H, Pr], [A2516; H, H, NHC(O)OEt, H, H, i-Pr], [A2517; H, H, NHC(O)OEt, H, H, c-Pr], [A2518; H, H, NHC(O)OEt, H, H, Bu], [A2519; H, H, NHC(O)OEt, H, H, i-Bu], [A2520; H, H, NHC(O)OEt, H, H, $CH_2CF_3$], [A2521; H, H, NHC(O)OEt, H, H, $CF_2CH_3$], [A2522; H, H, NHC(O)OEt, H, H, 2-Py], [A2523; H, H, NHC(O)OEt, H, H, 3-Py], [A2524; H, H, NHC(O)OEt, H, H, 4-Py], [A2525; H, F, NHC(O)OEt, H, H, Et], [A2526; H, F, NHC(O)OEt, H, H, Pr], [A2527; H, F, NHC(O)OEt, H, H, i-Pr], [A2528; H, F, NHC(O)OEt, H, H, c-Pr], [A2529; H, F, NHC(O)OEt, H, H, Bu], [A2530; H, F, NHC(O)OEt, H, H, i-Bu], [A2531; H, F, NHC(O)OEt, H, H, $CH_2CF_3$], [A2532; H, F, NHC(O)OEt, H, H, $CF_2CH_3$], [A2533; H, F, NHC(O)OEt, H, H, 2-Py], [A2534; H, F, NHC(O)OEt, H, H, 3-Py], [A2535; H, F, NHC(O)OEt, H, H, 4-Py], [A2536; H, F, NHC(O)OEtF, H, Et], [A2537; H, F, NHC(O)OEtF, H, Pr], [A2538; H, F, NHC(O)OEtF, H, i-Pr], [A2539; H, F, NHC(O)OEtF, H, c-Pr], [A2540; H, F, NHC(O)OEtF, H, Bu], [A2541; H, F, NHC(O)OEtF, H, i-Bu], [A2542; H, F, NHC(O)OEtF, H, $CH_2CF_3$], [A2543; H, F, NHC(O)OEtF, H, $CF_2CH_3$], [A2544; H, F, NHC(O)OEtF, H, 2-Py], [A2545; H, F, NHC(O)OEtF, H, 3-Py], [A2546; H, F, NHC(O)OEtF, H, 4-Py], [A2547; H, H, NHC(O)OPr, H, H, Et], [A2548; H, H, NHC(O)OPr, H, H, Pr], [A2549; H, H, NHC(O)OPr, H, H, i-Pr], [A2550; H, H, NHC(O)OPr, H, H, c-Pr], [A2551; H, H, NHC(O)OPr, H, H, Bu], [A2552; H, H, NHC(O)OPr, H, H, i-Bu], [A2553; H, H, NHC(O)OPr, H, H, $CH_2CF_3$], [A2554; H, H, NHC(O)OPr, H, H, $CF_2CH_3$], [A2555; H, H, NHC(O)OPr, H, H, 2-Py], [A2556; H, H, NHC(O)OPr, H, H, 3-Py], [A2557; H, H, NHC(O)OPr, H, H, 4-Py], [A2558; H, F, NHC(O)OPr, H, H, Et], [A2559; H, F, NHC(O)OPr, H, H, Pr], [A2560; H, F, NHC(O)OPr, H, H, i-Pr], [A2561; H, F, NHC(O)OPr, H, H, c-Pr], [A2562; H, F, NHC(O)OPr, H, H, Bu], [A2563; H, F, NHC(O)OPr, H, H, i-Bu], [A2564; H, F, NHC(O)OPr, H, H, $CH_2CF_3$], [A2565; H, F, NHC(O)OPr, H, H, $CF_2CH_3$], [A2566; H, F, NHC(O)OPr, H, H, 2-Py], [A2567; H, F, NHC(O)OPr, H, H, 3-Py], [A2568; H, F, NHC(O)OPr, H, H, 4-Py], [A2569; H, F, NHC(O)OPr, F, H, Et], [A2570; H, F, NHC(O)OPr, F, H, Pr], [A2571; H, F, NHC(O)OPr, F, H, i-Pr], [A2572; H, F, NHC(O)OPr, F, H, c-Pr], [A2573; H, F, NHC(O)OPr, F, H, Bu], [A2574; H, F, NHC(O)OPr, F, H, i-Bu], [A2575; H, F, NHC(O)OPr, F, H, $CH_2CF_3$], [A2576; H, F, NHC(O)OPr, F, H, $CF_2CH_3$], [A2577; H, F, NHC(O)OPr, F, H, 2-Py], [A2578; H, F, NHC(O)OPr, F, H, 3-Py], [A2579; H, F, NHC(O)OPr, F, H, 4-Py], [A2580; H, NHC(O)OMe, H, H, H, Me], [A2581; H, NHC(O)OMe, F, H, H, Me], [A2582; H, NHC(O)OMe, Cl, H, H, Me], [A2583; H, NHC(O)OMe, Br, H, H, Me], [A2584; H, NHC(O)OMe, I, H, H, Me], [A2585; H, NHC (O)OMe, Me, H, H, Me], [A2586; H, NHC(O)OMe, OMe, H, H, Me], [A2587; H, NHC(O)OMe, $CF_3$, H, H, Me], [A2588; H, NHC(O) OMe, $CHF_2$, H, H, Me], [A2589; H, NHC(O) OMe, $NO_2$, H, H, Me], [A2590; H, NHC(O)OMe, H, H, H, Ph], [A2591; H, NHC(O)OMe, F, H, H, Ph], [A2592; H, NHC(O)OMe, Cl, H, H, Ph], [A2593; H, NHC (O)OMe, Br, H, H, Ph], [A2594; H, NHC(O) OMe, I, H, H, Ph], [A2595; H, NHC(O)OMe, Me, H, H, Ph], [A2596; H, NHC(O)OMe, OMe, H, H, Ph], [A2597; H, NHC(O) OMe, $CF_3$, H, H, Ph], [A2598; H, NHC(O)OMe, $CHF_2$, H, H, Ph], [A2599; H, NHC(O)OMe, $NO_2$, H, H, Ph], [A2600; H, NHC(O)OMe, H, F, H, Me], [A2601; H, NHC(O)OMe, F, F, H, Me], [A2602; H, NHC(O)OMe, Cl, F, H, Me], [A2603; H, NHC(O)OMe, Br, F, H, Me], [A2604; H, NHC(O)OMe, I, F, H, Me], [A2605; H, NHC(O) OMe, Me, F, H, Me], [A2606; H, NHC(O) OMe, OMe, F, H, Me], [A2607; H, NHC(O) OMe, $CF_3$, F, H, Me][A2608; H, NHC(O) OMe, $CHF_2$, F, H, Me][A2609; H, NHC(O) OMe, $NO_2$, F, H, Me], [A2610; H, NHC(O)OMe, H, F, H, Ph], [A2611; H, NHC (O)OMe, F, F, H, Ph], [A2612; H, NHC(O) OMe, Cl, F, H, Ph], [A2613; H, NHC(O) OMe, Br, F, H, Ph], [A2614; H, NHC(O) OMe, I, F, H, Ph], [A2615; H, NHC(O)OMe, Me, F, H, Ph], [A2616; H, NHC(O) OMe, OMe, F, H, Ph] [A2617; H, NHC(O) OMe, $CF_3$, F, H, Ph][A2618; H, NHC(O) OMe, $CHF_2$, F, H, Ph], [A2619; H, NHC(O) OMe, $NO_2$, F, H, Ph], [A2620; H, NHC(O)OEt, H, H, H, Me], [A2621; H, NHC(O)OEt, F, H, H, Me], [A2622; H, NHC (O)OEt, Cl, H, H, Me], [A2623; H, NHC(O)OEt, Br, H, H, Me], [A2624; H, NHC(O)OEt, I, H, H, Me], [A2625; H, NHC(O)OEt, Me, H, H, Me], [A2626; H, NHC(O)OEt, OMe, H, H, Me], [A2627; H, NHC(O)OEt, $CF_3$, H, H, Me], [A2628; H, NHC(O)OEt, $CHF_2$, H, H, Me], [A2629; H, NHC(O)OEt, $NO_2$, H, H, Me], [A2630; H, NHC(O)OEt, H, H, H, Ph], [A2631; H, NHC(O)OEt, F, H, H, Ph], [A2632; H, NHC(O)OEt, Cl, H, H, Ph], [A2633; H, NHC(O)OEt, Br, H, H, Ph], [A2634; H, NHC(O)OEt, I, H, H, Ph], [A2635; H, NHC(O)OEt, Me, H, H, Ph], [A2636; H, NHC(O)OEt,

OMe, H, H, Ph], [A2637; H, NHC(O)OEt, $CF_3$, H, H, Ph], [A2638; H, NHC(O)OEt, $CHF_2$, H, H, Ph], [A2639; H, NHC(O)OEt, $NO_2$, H, H, Ph], [A2640; H, NHC(O)OEt, H, F, H, Me], [A2641; H, NHC(O)OEt, F, F, H, Me], [A2642; H, NHC(O)OEt, Cl, F, H, Me], [A2643; H, NHC(O)OEt, Br, F, H, Me], [A2644; H, NHC(O)OEt, I, F, H, Me], [A2645; H, NHC(O)OEt, Me, F, H, Me], [A2646; H, NHC(O)OEt, OMe, F, H, Me], [A2647; H, NHC(O)OEt, $CF_3$, F, H, Me][A2648; H, NHC(O)OEt, $CHF_2$, F, H, Me], [A2649; H, NHC(O)OEt, $NO_2$, F, H, Me], [A2650; H, NHC(O)OEt, H, F, H, Ph], [A2651; H, NHC(O)OEt, F, F, H, Ph], [A2652; H, NHC(O)OEt, Cl, F, H, Ph], [A2653; H, NHC(O)OEt, Br, F, H, Ph], [A2654; H, NHC(O)OEt, I, F, H, Ph], [A2655; H, NHC(O)OEt, Me, F, H, Ph], [A2656; H, NHC(O)OEt, OMe, F, H, Ph], [A2657; H, NHC(O)OEt, $CF_3$, F, H, Ph], [A2658; H, NHC(O)OEt, $CHF_2$, F, H, Ph], [A2659; H, NHC(O)OEt, $NO_2$, F, H, Ph], [A2660; H, NHC(O)OPr, H, H, H, Me], [A2661; H, NHC(O)OPr, F, H, H, Me], [A2662; H, NHC (O)OPr, Cl, H, H, Me], [A2663; H, NHC(O)OPr, Br, H, H, Me], [A2664; H, NHC(O)OPr, I, H, H, Me], [A2665; H, NHC(O)OPr, Me, H, H, Me], [A2666; H, NHC(O)OPr, OMe, H, H, Me], [A2667; H, NHC(O)OPr, $CF_3$, H, H, Me], [A2668; H, NHC(O)OPr, $CHF_2$, H, H, Me], [A2669; H, NHC(O)OPr, $NO_2$, H, H, Me], [A2670; H, NHC(O)OPr, H, H, H, Ph], [A2671; H, NHC(O)OPr, F, H, H, Ph], [A2672; H, NHC(O)OPr, Cl, H, H, Ph], [A2673; H, NHC(O)OPr, Br, H, H, Ph], [A2674; H, NHC(O)OPr, I, H, H, Ph], [A2675; H, NHC(O)OPr, Me, H, H, Ph], [A2676; H, NHC(O)OPr, OMe, H, H, Ph], [A2677; H, NHC(O)OPr, $CF_3$, H, H, Ph], [A2678; H, NHC(O)OPr, $CHF_2$, H, H, Ph], [A2679; H, NHC(O)OPr, $NO_2$, H, H, Ph], [A2680; H, NHC(O)OPr, H, F, H, Me], [A2681; H, NHC(O)OPr, F, F, H, Me], [A2682; H, NHC(O)OPr, Cl, F, H, Me], [A2683; H, NHC(O)OPr, Br, F, H, Me], [A2684; H, NHC(O)OPr, I, F, H, Me], [A2685; H, NHC(O)OPr, Me, F, H, Me], [A2686; H, NHC(O)OPr, OMe, F, H, Me], [A2687; H, NHC(O)OPr, $CF_3$, F, H, Me], [A2688; H, NHC(O)OPr, $CHF_2$, F, H, Me], [A2689; H, NHC(O)OPr, $NO_2$, F, H, Me], [A2690; H, NHC(O)OPr, H, F, H, Ph], [A2691; H, NHC(O)OPr, F, F, H, Ph], [A2692; H, NHC(O)OPr, Cl, F, H, Ph], [A2693; H, NHC(O)OPr, Br, F, H, Ph], [A2694; H, NHC(O)OPr, I, F, H, Ph], [A2695; H, NHC(O)OPr, Me, F, H, Ph], [A2696; H, NHC(O)OPr, OMe, F, H, Ph], [A2697; H, NHC(O)OPr, $CF_3$, F, H, Ph][A2698; H, NHC(O)OPr, $CHF_2$, F, H, Ph], [A2699; H, NHC(O)OPr, $NO_2$, F, H, Ph], [A2700; H, H, NHC(O)OMe, H, H, Me], [A2701; H, F, NHC(O)OMe, H, H, Me], [A2702; H, F, NHC(O)OMe, F, H, Me], [A2703; H, H, NHC(O)OMe, H, H, Ph], [A2704; H, F, NHC(O)OMe, H, H, Ph], [A2705; H, F, NHC(O)OMe, F, H, Ph], [A2706; H, H, NHC(O)OEt, H, H, Me], [A2707; H, F, NHC(O)OEt, H, H, Me], [A2708; H, F, NHC(O)OEt, F, H, Me], [A2709; H, H, NHC(O)OEt, H, H, Ph], [A2710; H, F, NHC(O)OEt, H, H, Ph], [A2711; H, F, NHC(O)OEt, F, H, Ph], [A2712; H, H, NHC(O)OPr, H, H, Me], [A2713; H, F, NHC(O)OPr, H, H, Me], [A2714; H, F, NHC(O)OPr, F, H, Me], [A2715; H, H, NHC(O)OPr, H, H, Ph], [A2716; H, F, NHC(O)OPr, H, H, Ph], [A2717; H, F, NHC(O)OPr, F, H, Ph].

The compound represented by formula (L-1), wherein Q represents the group represented by Q1, n represents 0, $R^6$ represents a fluorine atom, $R^7$ represents a hydrogen atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX2").

The compound represented by formula (L-1), wherein Q represents the group represented by Q1, n represents 0, $R^6$ represents a hydrogen atom, $R^7$ represents a fluorine atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX3").

The compound represented by formula (L-1), wherein Q represents the group represented by Q1, n represents 1, $R^6$ and $R^7$ each represent a hydrogen atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX4").

The compound represented by formula (L-1), wherein Q represents the group represented by Q1, n represents 1, $R^6$ represents a fluorine atom, $R^7$ represents a hydrogen atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX5").

The compound represented by formula (L-1), wherein Q represents the group represented by Q1, n represents 1, $R^6$ represents a hydrogen atom, $R^7$ represents a fluorine atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX6").

The compound represented by formula (L-1), wherein Q represents the group represented by Q1, n represents 2, $R^6$ and $R^7$ each represent a hydrogen atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX7").

The compound represented by formula (L-1), wherein Q represents the group represented by Q1, n represents 2, $R^6$ represents a fluorine atom, $R^7$ represents a hydrogen atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX8").

The compound represented by formula (L-1), wherein Q represents the group represented by Q1, n represents 2, $R^6$ represents a hydrogen atom, $R^7$ represents a fluorine atom, and the combination of $R^{1C}$, $R^{2C}$, $R^{3C}$, $R^{4C}$, $R^{5C}$, and $Z^2$ represents any one combination indicated in Combination A (hereinafter referred to as "Compound group SX9").

The compound represented by formula (L-1), wherein Q represents the group represented by Q2, n represents 0, $R^8$ represents a hydrogen atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX10").

The compound represented by formula (L-1), wherein Q represents the group represented by Q2, n represents 0, $R^8$ represents a fluorine atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX11").

The compound represented by formula (L-1), wherein Q represents the group represented by Q2, n represents 1, $R^8$ represents a hydrogen atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX12").

The compound represented by formula (L-1), wherein Q represents the group represented by Q2, n represents 1, $R^8$ represents a fluorine atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX13").

The compound represented by formula (L-1), wherein Q represents the group represented by Q2, n represents 2, $R^8$ represents a hydrogen atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX14").

The compound represented by formula (L-1), wherein Q represents the group represented by Q2, n represents 2, $R^9$ represents a fluorine atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX15").

The compound represented by formula (L-1), wherein Q represents the group represented by Q3, n represents 0, $R^9$ represents a hydrogen atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX16").

The compound represented by formula (L-1), wherein Q represents the group represented by Q3, n represents 0, $R^5$ represents a fluorine atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX17").

The compound represented by formula (L-1), wherein Q represents the group represented by Q3, n represents 1, $R^9$ represents a hydrogen atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX18").

The compound represented by formula (L-1), wherein Q represents the group represented by Q3, n represents 1, $R^9$ represents a fluorine atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX19").

The compound represented by formula (L-1), wherein Q represents the group represented by Q3, n represents 2, $R^9$ represents a hydrogen atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX20").

The compound represented by formula (L-1), wherein Q represents the group represented by Q3, n represents 2, $R^9$ represents a fluorine atom, and the combination of $R^{1C}$, $R^{2C}$, $R^{3C}$, $R^{4C}$, $R^{5C}$, and $Z^C$ represents any one combination indicated in Combination A (hereinafter referred to as "Compound group SX21").

A compound represented by formula (L-2)

(L-2)

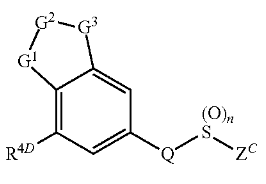

wherein Q represents the group represented by Q1, n represents 0, $R^6$ and $R^7$ each represent a hydrogen atom, and the combination of $G^1$, $G^2$, $G^3$, $R^{4D}$, and $Z^D$ represents any one combination indicated in Combination B (hereinafter referred to as "Compound group SX22").

Combination B consists of Substituent Numbers B1 to B294. Substituent Numbers B1 to B294 indicate the combinations of $G^1$, $G^2$, $G^3$, $R^{4D}$, and $Z^D$ in the compound represented by formula (L-2), and hereinafter referred to as [Substituent Number; G, $G^2$, $G^3$, $R^{4D}$, $Z^D$]

For example, Substituent Number B1 indicates a combination wherein $G^1$, $G^2$, and $G^3$ each represent a $CH_2$, $R^{4D}$ represents a hydrogen atom, and $Z^D$ represents an ethyl group.

Combination B

[Substituent Number; $G^1$, $G^2$, $G^3$, $R^{4D}$, $Z^D$]:

[B1; $CH_2$, $CH_2$, $CH_2$, H, Et], [B2; O, $CH_2$, O, H, Et], [B3; O, $CF_2$, O, H, Et], [B4; $CH_2$, O, $CH_2$, H, Et], [B5; $CF_2$, O, $CH_2$, H, Et], [B6; $CH_2$, O, $CF_2$, H, Et], [B7; $CF_2$, O, $CF_2$, H, Et], [B8; $CH_2$, $CH_2$, $CH_2$, F, Et], [B9; O, $CH_2$, O, F, Et], [B10; O, $CF_2$, O, F, Et], [B11; $CH_2$, O, $CH_2$, F, Et], [B12; $CF_2$, O, $CH_2$, F, Et], [B13; $CH_2$, O, $CF_2$, F, Et], [B14; $CF_2$, O, $CF_2$, F, Et], [B15; $CH_2$, $CH_2$, $CH_2$, Cl, Et], [B16; O, $CH_2$, O, Cl, Et], [B17; O, $CF_2$, O, Cl, Et], [B18; $CH_2$, O, $CH_2$, Cl, Et], [B19; $CF_2$, O, $CH_2$, Cl, Et], [B20; $CH_2$, O, $CF_2$, Cl, Et], [B21; $CF_2$, O, $CF_2$, Cl, Et], [B22; $CH_2$, $CH_2$, $CH_2$, H, Pr], [B23; O, $CH_2$, O, H, Pr], [B24; O, $CF_2$, O, H, Pr], [B25; $CH_2$, O, $CH_2$, H, Pr], [B26; $CF_2$, O, $CH_2$, H, Pr], [B27; $CH_2$, O, $CF_2$, H, Pr], [B28; $CF_2$, O, $CF_2$, H, Pr], [B29; $CH_2$, $CH_2$, $CH_2$, F, Pr], [B30; O, $CH_2$, O, F, Pr], [B31; O, $CF_2$, O, F, Pr], [B32; $CH_2$, O, $CH_2$, F, Pr], [B33; $CF_2$, O, $CH_2$, F, Pr], [B34; $CH_2$, O, $CF_2$, F, Pr], [B35; $CF_2$, O, $CF_2$, F, Pr], [B36; $CH_2$, $CH_2$, $CH_2$, Cl, Pr], [B37; O, $CH_2$, O, Cl, Pr], [B38; O, $CF_2$, O, Cl, Pr], [B39; $CH_2$, O, $CH_2$, Cl, Pr], [B40; $CF_2$, O, $CH_2$, Cl, Pr], [B41; $CH_2$, O, $CF_2$, Cl, Pr], [B42; $CF_2$, O, $CF_2$, Cl, Pr], [B43; $CH_2$, $CH_2$, $CH_2$, H, i-Pr], [B44; O, $CH_2$, O, H, i-Pr], [B45; O, $CF_2$, O, H, i-Pr], [B46; $CH_2$, O, $CH_2$, H, i-Pr], [B47; $CF_2$, O, $CH_2$, H, i-Pr], [B48; $CH_2$, O, $CF_2$, H, i-Pr], [B49; $CF_2$, O, $CF_2$, H, i-Pr], [B50; $CH_2$, $CH_2$, $CH_2$, F, i-Pr], [B51; O, $CH_2$, O, F, i-Pr], [B52; O, $CF_2$, O, F, i-Pr], [B53; $CH_2$, O, $CH_2$, F, i-Pr], [B54; $CF_2$, O, $CH_2$, F, i-Pr], [B55; $CH_2$, O, $CF_2$, F, i-Pr], [B56; $CF_2$, O, $CF_2$, F, i-Pr], [B57; H2, $CH_2$, $CH_2$, Cl, i-Pr], [B58; O, $CH_2$, O, Cl, i-Pr], [B59; O, $CF_2$, O, Cl, i-Pr], [B60; $CH_2$, O, $CH_2$, Cl, i-Pr], [B61; $CF_2$, O, $CH_2$, Cl, i-Pr], [B62; $CH_2$, O, $CF_2$, Cl, i-Pr], [B63; $CF_2$, O, $CF_2$, Cl, i-Pr], [B64; $CH_2$, $CH_2$, $CH_2$, H, c-Pr], [B65; O, $CH_2$, O, H, c-Pr], [B66; O, $CF_2$, O, H, c-Pr], [B67; $CH_2$, O, $CH_2$, H, c-Pr], [B68; $CF_2$, O, $CH_2$, H, c-Pr], [B69; $CH_2$, O, $CF_2$, H, c-Pr], [B70; $CF_2$, O, $CF_2$, H, c-Pr], [B71; $CH_2$, $CH_2$, $CH_2$, F, c-Pr], [B72; O, $CH_2$, O, F, c-Pr], [B73; O, $CF_2$, O, F, c-Pr], [B74; $CH_2$, O, $CH_2$, F, c-Pr], [B75; $CF_2$, O, $CH_2$, F, c-Pr], [B76; $CH_2$, O, $CF_2$, F, c-Pr], [B77; $CF_2$, O, $CF_2$, F, c-Pr], [B78; $CH_2$, $CH_2$, $CH_2$, Cl, c-Pr], [B79; O, $CH_2$, O, Cl, c-Pr], [B80; O, $CF_2$, O, Cl, c-Pr], [B81; $CH_2$, O, $CH_2$, Cl, c-Pr], [B82; $CF_2$, O, $CH_2$, Cl, c-Pr], [B83; $CH_2$, O, $CF_2$, Cl, c-Pr], [B84; $CF_2$, O, $CF_2$, Cl, c-Pr], [B85; $CH_2$, $CH_2$, $CH_2$, H, Bu], [B86; O, $CH_2$, O, H, Bu], [B87; O, $CF_2$, O, H, Bu], [B88; $CH_2$, O, $CH_2$, H, Bu], [B89; $CF_2$, O, $CH_2$, H, Bu], [B90; $CH_2$, O, $CF_2$, H, Bu], [B91; $CF_2$, O, $CF_2$, H, Bu], [B92; $CH_2$, $CH_2$, $CH_2$, F, Bu], [B93; O, $CH_2$, O, F, Bu], [B94; O, $CF_2$, O, F, Bu], [B95; $CH_2$, O, $CH_2$, F, Bu], [B96; $CF_2$, O, $CH_2$, F, Bu], [B97; $CH_2$, O, $CF_2$, F, Bu], [B98; $CF_2$, O, $CF_2$, F, Bu], [B99; $CH_2$, $CH_2$, $CH_2$, Cl, Bu], [B100; O, $CH_2$, O, Cl, Bu], [B101; O, $CF_2$, O, Cl, Bu], [B102; $CH_2$, O, $CH_2$, Cl, Bu], [B103; $CF_2$, O, $CH_2$, Cl, Bu], [B104; $CH_2$, O, $CF_2$, Cl, Bu], [B105; $CF_2$, O, $CF_2$, Cl, Bu], [B106; $CH_2$, $CH_2$, $CH_2$, H, i-Bu], [B107; O, $CH_2$, O, H, i-Bu], [B108; O, $CF_2$, O, H, i-Bu], [B109; $CH_2$, O, $CH_2$, H, i-Bu], [B110; $CF_2$, O, $CH_2$, H, i-Bu], [B111; $CH_2$, O, $CF_2$, H, i-Bu], [B112; $CF_2$, O, $CF_2$, H, i-Bu], [B113; $CH_2$, $CH_2$, $CH_2$, F, i-Bu], [B114; O, $CH_2$, O, F, i-Bu], [B115; O, $CF_2$, O, F, i-Bu], [B116; $CH_2$, O, $CH_2$, F, i-Bu], [B117; $CF_2O$, $CH_2$, F, i-Bu], [B118; $CH_2$, O, $CF_2$, F, i-Bu], [B119; $CF_2$, O, $CF_2$, F, i-Bu], [B120; $CH_2$, $CH_2$, $CH_2$, Cl, i-Bu], [B121; O, $CH_2$, O, Cl, i-Bu], [B122; O, $CF_2$, O, Cl, i-Bu], [B123; $CH_2$, O, $CH_2$, Cl, i-Bu], [B124; $CF_2$, O, $CH_2$, Cl, i-Bu], [B125; $CH_2$, O, $CF_2$, Cl, i-Bu], [B126; $CF_2$, O, $CF_2$, Cl, i-Bu], [B127; $CH_2$, $CH_2$, $CH_2$, H, i-Bu], [B128; O, $CH_2O$, H, i-Bu], [B129; O, $CF_2$, O, H, i-Bu], [B130; $CH_2$, O, $CH_2$, H, i-Bu], [B131; $CF_2$, O, $CH_2$, H, i-Bu], [B132; $CH_2$, O, $CF_2$, H, i-Bu], [B133; $CF_2$, O, $CF_2$, H, i-Bu], [B134; $CH_2$, $CH_2$, $CH_2$, F, i-Bu], [B135; O, $CH_2$, O, F, i-Bu], [B136; O, $CF_2$, O, F, i-Bu], [B137; $CH_2$, O, $CH_2$, F, i-Bu], [B138; $CF_2$, O, $CH_2$, F, i-Bu], [B139; $CH_2$, O, $CF_2$, F, i-Bu], [B140; $CF_2$, O, $CF_2$, F, i-Bu], [B141; $CH_2$, $CH_2$, $CH_2$, Cl, i-Bu], [B142; O, $CH_2$, O, Cl, i-Bu], [B143; O, $CF_2$, O, Cl, i-Bu], [B144; $CH_2$, O, $CH_2$, Cl, i-Bu], [B145; $CF_2$, O, $CH_2$, Cl, i-Bu], [B146; $CH_2$, O, $CF_2$, Cl, i-Bu], [B147; $CF_2$, O, $CF_2$, Cl, i-Bu], [B148; $CH_2$, $CH_2$, $CH_2$, H, $CH_2CF_3$], [B149; O, $CH_2$, O, H, $CH_2CF_3$], [B150; O, $CF_2$, O, H, $CH_2CF_3$], [B151; $CH_2O$, $CH_2$, H, $CH_2CF_3$], [B152; $CF_2$, O, $CH_2$, H, $CH_2CF_3$], [B153; $CH_2$, O, $CF_2$, H, $CH_2CF_3$], [B154; $CF_2$, O, $CF_2$, H, $CH_2CF_3$], [B155; $CH_2$, $CH_2$, $CH_2$, F, $CH_2CF_3$], [B156; O, $CH_2$, O, F, $CH_2CF_3$], [B157; O, $CF_2$, O, F, $CH_2CF_3$], [B158; $CH_2$, O, $CH_2$, F, $CH_2CF_3$], [B159; $CF_2$, O, $CH_2$, F, $CH_2CF_3$], [B160; $CH_2$, O, $CF_2$, F, $CH_2CF_3$], [B161; $CF_2$, O, $CF_2$, F, $CH_2CF_3$], [B162; $CH_2$, $CH_2$, $CH_2$, Cl, $CH_2CF_3$], [B163; O, $CH_2$, O, Cl, $CH_2CF_3$][B164; O, $CF_2$, O, Cl, $CH_2CF_3$], [B165; $CH_2$, O, $CH_2$, Cl, $CH_2CF_3$], [B166; $CF_2$, O, $CH_2$, Cl, $CH_2CF_3$], [B167; $CH_2$, O, $CF_2$, Cl, $CH_2CF_3$], [B168; $CF_2$, O, $CF_2$, Cl, $CH_2CF_3$], [B169; $CH_2$, $CH_2$, $CH_2$, H, $CF_2CH_3$], [B170; O, $CH_2$, O, H, $CF_2CH_3$], [B171; O, $CF_2$, O, H, $CF_2CH_3$], [B172; $CH_2$, O, $CH_2$, H, $CF_2CH_3$], [B173; $CF_2$, O, $CH_2$, H, $CF_2CH_3$], [B174; $CH_2$, O, $CF_2$, H, $CF_2CH_3$], [B175; $CF_2$, O, $CF_2$, H, $CF_2CH_3$], [B176; $CH_2$, $CH_2$, $CH_2$, F, $CF_2CH_3$], [B177; O, $CH_2$, O, F, $CF_2CH_3$], [B178; O, $CF_2$, O, F, $CF_2CH_3$], [B179; $CH_2$, O, $CH_2$, F, $CF_2CH_3$], [B180; $CF_2$, O, $CH_2$, F, $CF_2CH_3$], [B181; $CH_2$, O, $CF_2$, F, $CF_2CH_3$], [B182; $CF_2$, O, $CF_2$, F, $CF_2CH_3$], [B183; $CH_2$, $CH_2$, $CH_2$, Cl, $CF_2CH_3$], [B184; O, $CH_2$, O, Cl, $CF_2CH_3$], [B185; O, $CF_2$, O, Cl, $CF_2CH_3$], [B186; $CH_2$, O, $CH_2$, Cl, $CF_2CH_3$], [B187; $CF_2$, O, $CH_2$, Cl, $CF_2CH_3$], [B188; $CH_2$, O, $CF_2$, Cl, $CF_2CH_3$], [B189; $CF_2$, O, $CF_2$, Cl, $CF_2CH_3$], [B190; $CH_2$, $CH_2$, $CH_2$, H, 2-Py], [B191; O, $CH_2$, O, H, 2-Py], [B192; O, $CF_2$, O, H, 2-Py], [B193; $CH_2O$, $CH_2$, H, 2-Py], [B194; $CF_2$, O, $CH_2$, H, 2-Py], [B195; $CH_2$, O, $CF_2$, H, 2-Py], [B196; $CF_2$, O, $CF_2$, H, 2-Py], [B197; $CH_2$, $CH_2$, $CH_2$, F, 2-Py], [B198; O, $CH_2$, O, F, 2-Py], [B199; O, $CF_2$, O, F, 2-Py], [B200; $CH_2$, O, $CH_2$, F, 2-Py], [B201; $CF_2$, O, $CH_2$, F, 2-Py], [B202; $CH_2$, O, $CF_2$, F, 2-Py], [B203; $CF_2$, O, $CF_2$, F, 2-Py], [B204; $CH_2$, $CH_2$, $CH_2$, Cl, 2-Py], [B205; O, $CH_2$, O, Cl, 2-Py], [B206; O, $CF_2$, O, Cl, 2-Py], [B207; $CH_2$, O, $CH_2$, Cl, 2-Py], [B208; $CF_2$, O, $CH_2$, Cl, 2-Py], [B209; $CH_2$, O, $CF_2$, Cl, 2-Py], [B210; $CF_2$, O, $CF_2$, Cl, 2-Py], [B211; $CH_2$, $CH_2$, $CH_2$, H, 3-Py], [B212; O, $CH_2$, O, H, 3-Py], [B213; O, $CF_2$, O, H, 3-Py], [B214; $CH_2$, O, $CH_2$, H, 3-Py], [B215; $CF_2$, O, $CH_2$, H, 3-Py], [B216; $CH_2$, O, $CF_2$, H, 3-Py], [B217; $CF_2$, O, $CF_2$, H, 3-Py], [B218; $CH_2$, $CH_2$, $CH_2$, F, 3-Py], [B219; O, $CH_2$, O, F, 3-Py], [B220; O, $CF_2$, O, F, 3-Py], [B221; $CH_2$, O, $CH_2$, F, 3-Py], [B222; $CF_2$, O, $CH_2$, F, 3-Py], [B223; $CH_2$, O, $CF_2$, F, 3-Py], [B224; $CF_2$, O, $CF_2$, F, 3-Py], [B225; $CH_2$, $CH_2$, $CH_2$, Cl, 3-Py], [B226; O, $CH_2$, O, Cl, 3-Py], [B227; O, $CF_2$, O, Cl, 3-Py], [B228; $CH_2$, O, $CH_2$, Cl, 3-Py], [B229; $CF_2$, O, $CH_2$, Cl, 3-Py], [B230; $CH_2$, O, $CF_2$, Cl, 3-Py], [B231; $CF_2$, O, $CF_2$, Cl, 3-Py], [B232; $CH_2$, $CH_2$, $CH_2$, H, 4-Py], [B233; O, $CH_2$, O, H, 4-Py], [B234; O, $CF_2O$, H, 4-Py], [B235; $CH_2$, O, $CH_2$, H, 4-Py], [B236; $CF_2$, O, $CH_2$, H, 4-Py], [B237; $CH_2$, O, $CF_2$, H, 4-Py], [B238; $CF_2$, O, $CF_2$, H, 4-Py], [B239; $CH_2$, $CH_2$, $CH_2$, F, 4-Py], [B240; O, $CH_2$, F, 4-Py], [B241; O, $CF_2$, O, F, 4-Py], [B242; $CH_2$, O, $CH_2$, F, 4-Py], [B243; $CF_2$, O, $CH_2$, F, 4-Py], [B244; $CH_2$, O, $CF_2$, F, 4-Py], [B245; $CF_2$, O, $CF_2$, F, 4-Py], [B246; $CH_2$, $CH_2$, $CH_2$, Cl, 4-Py], [B247; O, $CH_2$, O, Cl, 4-Py], [B248; O, $CF_2$, O, Cl, 4-Py], [B249; $CH_2$, O, $CH_2$, Cl, 4-Py], [B250; $CF_2$, O, $CH_2$, Cl, 4-Py], [B251; $CH_2$, O, $CF_2$, Cl, 4-Py], [B252; $CF_2$, O, $CF_2$, Cl, 4-Py], [B253; $CH_2$, $CH_2$, $CH_2$, H, Me], [B254; O, $CH_2$, O, H, Me], [B255; O, $CF_2$, O, H, Me], [B256; $CH_2$, O, $CH_2$, H, Me], [B257; $CF_2$, O, $CH_2$, H, Me], [B258; $CH_2$, O, $CF_2$, H, Me], [B259; $CF_2$, O, $CF_2$, H, Me], [B260; $CH_2$, $CH_2$, $CH_2$, F, Me], [B261; O, $CH_2$, O, F, Me], [B262; O, $CF_2$, O, F, Me], [B263; $CH_2$, O, $CH_2$, F, Me], [B264; $CF_2$, O, $CH_2$, F, Me], [B265; $CH_2$, O, $CF_2$, F, Me], [B266; $CF_2$, O, $CF_2$, F, Me], [B267; $CH_2$, $CH_2$, $CH_2$, Cl, Ph], [B268; O, $CH_2$, O, Cl, Ph], [B269; O, $CF_2$, O, Cl, Ph], [B270; $CH_2$, O, $CH_2$, Cl, Ph], [B271; $CF_2$, O, $CH_2$, Cl, Ph], [B272; $CH_2$, O, $CF_2$, Cl, Ph], [B273; $CF_2$, O, $CF_2$, Cl, Ph], [B274; $CH_2$, $CH_2$, $CH_2$, H, Ph], [B275; O, $CH_2$, O, H, Ph], [B276; O, $CF_2$, O, H, Ph], [B277; $CH_2$, O, $CH_2$, H, Ph], [B278; $CF_2$, O, $CH_2$, H, Ph], [B279; $CH_2$, O, $CF_2$, H, Ph], [B280; $CF_2$, O, $CF_2$, H, Ph], [B281; $CH_2$, $CH_2$, $CH_2$, F, Ph], [B282; O, $CH_2$, O, F, Ph], [B283; O, $CF_2$, O, F, Ph], [B284; $CH_2$, O, $CH_2$, F, Ph], [B285; $CF_2$, O, $CH_2$, F, Ph], [B286; $CH_2$, O, $CF_2$, F, Ph], [B287; $CF_2$, O, $CF_2$, F, Ph], [B288; $CH_2$, $CH_2$, $CH_2$, Cl, Ph], [B289; O, $CH_2$, O, Cl, Ph], [B290; O, $CF_2$, O, Cl, Ph], [B291; $CH_2O$, $CH_2$, Cl, Ph], [B292; $CF_2$, O, $CH_2$, Cl, Ph], [B293; $CH_2$, O, $CF_2$, Cl, Ph], [B294; $CF_2$, O, $CF_2$, Cl, Ph].

The compound represented by formula (L-2), wherein Q represents the group represented by Q1, n represents 0, $R^6$ represents a fluorine atom, $R^7$ represents a hydrogen atom, and the combination of $G^1$, $G^2$, $G^3$, $R^{4D}$, and $Z^D$ represents any one combination indicated in Combination B (hereinafter referred to as "Compound group SX23").

The compound represented by formula (L-2), wherein Q represents the group represented by Q1, n represents 0, $R^6$ represents a hydrogen atom, $R^7$ represents a fluorine atom, and the combination of $G^1$, $G^2$, $G^3$, $R^{4D}$, and $Z^D$ represents any one combination indicated in Combination B (hereinafter referred to as "Compound group SX24").

The compound represented by formula (L-2), wherein Q represents the group represented by Q1, n represents 1, $R^6$ and $R^7$ each represent a hydrogen atom, and the combination of $G^1$, $G^2$, $G^3$, $R^{4D}$, and $Z^D$ represents any one combination indicated in Combination B (hereinafter referred to as "Compound group SX25").

The compound represented by formula (L-2), wherein Q represents the group represented by Q1, n represents 1, $R^6$ represents a fluorine atom, $R^7$ represents a hydrogen atom, and the combination of $G^1$, $G^2$, $G^3$, $R^{4D}$, and $Z^D$ represents any one combination indicated in Combination B (hereinafter referred to as "Compound group SX26").

The compound represented by formula (L-2), wherein Q represents the group represented by Q1, n represents 1, $R^6$ represents a hydrogen atom, $R^7$ represents a fluorine atom, and the combination of $G^1$, $G^2$, $G^3$, $R^{4D}$, and $Z^D$ represents any one combination indicated in Combination B (hereinafter referred to as "Compound group SX27").

The compound represented by formula (L-2), wherein Q represents the group represented by Q1, n represents 2, $R^6$ and $R^7$ each represent a hydrogen atom, and the combination of $G^1$, $G^2$, $G^3$, $R^{4D}$, and $Z^D$ represents any one combination indicated in Combination B (hereinafter referred to as "Compound group SX28").

The compound represented by formula (L-2), wherein Q represents the group represented by Q1, n represents 2, $R^6$ represents a fluorine atom, $R^7$ represents a hydrogen atom, and the combination of $G^1$, $G^2$, $G^3$, $R^{4D}$, and $Z^D$ represents any one combination indicated in Combination B (hereinafter referred to as "Compound group SX29").

The compound represented by formula (L-2), wherein Q represents the group represented by Q1, n represents 2, $R^6$ represents a hydrogen atom, $R^7$ represents a fluorine atom, and the combination of $G^1$, $G^2$, $G^3$, $R^{4D}$, and $Z^D$ represents any one combination indicated in Combination B (hereinafter referred to as "Compound group SX30").

The compound represented by formula (L-2), wherein Q represents the group represented by Q2, n represents 0, $R^8$ represents a hydrogen atom, and the combination of $G^1$, $G^2$, $G^3$, $R^{4D}$, and $Z^D$ represents any one combination indicated in Combination B (hereinafter referred to as "Compound group SX31").

The compound represented by formula (L-2), wherein Q represents the group represented by Q2, n represents 0, $R^8$ represents a fluorine atom, and the combination of $G^1$, $G^2$, $G^3$, $R^{4D}$, and $Z^D$ represents any one combination indicated in Combination B (hereinafter referred to as "Compound group SX32").

The compound represented by formula (L-2), wherein Q represents the group represented by Q2, n represents 1, $R^8$ represents a hydrogen atom, and the combination of $G^1$, $G^2$, $G^3$, $R^{4D}$, and $Z^D$ represents any one combination indicated in Combination B (hereinafter referred to as "Compound group SX33").

The compound represented by formula (L-2), wherein Q represents the group represented by Q2, n represents 1, $R^8$ represents a fluorine atom, and the combination of $G^1$, $G^2$, $G^3$, $R^{4D}$, and $Z^D$ represents any one combination indicated in Combination B (hereinafter referred to as "Compound group SX34").

The compound represented by formula (L-2), wherein Q represents the group represented by Q2, n represents 2, $R^8$ represents a hydrogen atom, and the combination of $G^1$, $G^2$, $G^3$, $R^{4D}$, and $Z^D$ represents any one combination indicated in Combination B (hereinafter referred to as "Compound group SX35").

The compound represented by formula (L-2), wherein Q represents the group represented by Q2, n represents 2, $R^8$ represents a fluorine atom, and the combination of $G^1$, $G^2$, $G^3$, $R^{4D}$, and $Z^D$ represents any one combination indicated in Combination B (hereinafter referred to as "Compound group SX36").

The compound represented by formula (L-2), wherein Q represents the group represented by Q3, n represents 0, $R^9$ represents a hydrogen atom, and the combination of $G^1$, $G^2$, $G^3$, $R^{4D}$, and $Z^D$ represents any one combination indicated in Combination B (hereinafter referred to as "Compound group SX37").

The compound represented by formula (L-2), wherein Q represents the group represented by Q3, n represents 0, $R^9$ represents a fluorine atom, and the combination of $G^1$, $G^2$, $G^3$, $R^{4D}$, and $Z^D$ represents any one combination indicated in Combination B (hereinafter referred to as "Compound group SX38").

The compound represented by formula (L-2), wherein Q represents the group represented by Q3, n represents 1, $R^9$ represents a hydrogen atom, and the combination of $G^1$, $G^2$, $G^3$, $R^{4D}$, and $Z^D$ represents any one combination indicated in Combination B (hereinafter referred to as "Compound group SX39").

The compound represented by formula (L-2), wherein Q represents the group represented by Q3, n represents 1, $R^9$ represents a fluorine atom, and the combination of $G^1$, $G^2$, $G^3$, $R^{4D}$, and $Z^D$ represents any one combination indicated in Combination B (hereinafter referred to as "Compound group SX40").

The compound represented by formula (L-2), wherein Q represents the group represented by Q3, n represents 2, $R^D$ represents a hydrogen atom, and the combination of $G^1$, $G^2$, $G^3$, $R^{4D}$, and $Z^D$ represents any one combination indicated in Combination B (hereinafter referred to as "Compound group SX41").

The compound represented by formula (L-2), wherein Q represents the group represented by Q3, n represents 2, $R^D$ represents a fluorine atom, and the combination of G, $G^2$, $G^3$, $R^{4D}$, and $Z^D$ represents any one combination indicated in Combination B (hereinafter referred to as "Compound group SX42").

Next, Formulation Examples are shown below. The "part(s)" in Formulation Examples represents "part(s) by weight". Also, the expression of "Present compound S" represents the compounds described in the Compound groups SX1 to SX42.

Formulation Example 1

Any one of the Present compound S (50 parts), calcium lignin sulfonate (3 parts), magnesium lauryl sulfate (2 parts), and synthetic hydrated silicon oxide (45 parts) are fully ground and mixed to obtain each formulation.

Formulation Example 2

Any one of the Present compound S (20 parts) and sorbitan trioleate (1.5 parts) are mixed with an aqueous solution (28.5 parts) comprising polyvinyl alcohol (2 parts), the resulting mixture is subjected to fine grinding according to a wet grinding method, then an aqueous solution (40 parts) comprising xanthan gum (0.05 part) and aluminum magnesium silicate (0.1 part) is added thereto, propylene glycol (10 parts) is added thereto, and the resulting mixture is mixed with stirring to obtain each formulation.

Formulation Example 3

Any one of the Present compound S (2 parts), kaolin clay (88 parts), and talc (10 parts) are fully ground and mixed to obtain each formulation.

Formulation Example 4

Any one of the Present compound S (5 parts), polyoxyethylene styryl phenyl ether (14 parts), calcium dodecylbenzene sulfonate (6 parts), and xylene (75 parts) are fully mixed to obtain each formulation.

Formulation Example 5

Any one of the Present compound S (2 parts), synthetic hydrated silicon oxide (1 part), calcium lignin sulfonate (2 parts), bentonite (30 parts), and kaolin clay (65 parts) are fully ground and mixed, then water is added thereto, the resulting mixture is fully kneaded, and subjected to dry granulation to obtain each formulation.

Formulation Example 6

Any one of the Present compound S (20 parts), a mixture of white carbon and polyoxyethylene alkyl ether sulfate ammonium salt (weight ratio of 1:1) (35 parts), and water are mixed to obtain a mixture (total amount: 100 parts), and the resulting mixture is treated with a grinding mill to obtain each formulation.

Next, Test Examples are shown below. The term of "non-treated area" in Test Example 1 and Test Example 2 represents a test area wherein a test is carried out under the same conditions as those described in each Test Example except for dispensing dimethylsulfoxide instead of a diluted solution comprising the Present compound or the Compound of the present invention with dimethylsulfoxide. Also, the term of "non-treated" in Test Example 3 to Test Example 10 means that a diluted solution of a formulation comprising the Present compound or the Compound of the present invention with water is not sprayed to foliage.

Test Example 1 Test for Controlling Wheat Leaf Blotch (*Septoria tritici*)

The Compound of the present invention IIA-1, IIA-3, IIA-5 to IIA-7, IIA-9 to IIA-11, IIA-13, IIA-15, IIA-17, IIA-21, IIA-23, IIA-24, IIA-31, IIA-34, IIA-40, IIA-41, IIA-43, IIA-44, IIA-50, IIA-51, IIA-56 to IIA-58, IIA-83, IIA-104, IIA-110, IIA-111, IIA-116 to IIA-119, IIA-149, IIA-150, IIA-187, IIC-1, IIC-3 to IIC-9, IIC-18, IIC-23, IIC-26, the Present compound IA-1 to IA-4, IA-12, IA-16, IC-10, IC-14, IC-25, or IC-33 was diluted with dimethylsulfoxide to obtain a diluted solution containing 1500 ppm of the compound, and 1 μL of the diluted solution was dispensed into a titer plate (96 well), and thereto was then dispensed 150 μL of a potato dextrose broth (PDB broth) to which spores of *Septoria tritici* were inoculated in advance. This plate was cultured at 18° C. for 5 days, thereby allowing *Septoria tritici* to undergo proliferation, and the absorbance at 550 nm of each well of the titer plate was then measured to determine a degree of growth of *Septoria tritici*. As a result, the degree of growth in the area treated with each compound was 50% or less relative to the degree of growth in the non-treated area.

Test Example 2 Test for Controlling Soybean Anthracnose (*Colletotrichum truncatum*)

The Compound of the present invention IIA-1 to IIA-4, IIA-6, IIA-7, IIA-9 to IIA-11, IIA-13, IIA-15, IIA-17, IIA-21, IIA-24, IIA-31, IIA-34, IIA-40, IIA-43, IIA-44, IIA-50, IIA-52 to IIA-56, IIA-83, IIA-91, IIA-95, IIA-106, IIA-115 to IIA-119, IIC-4, IIC-5, IIC-23, IIC-26, or the Present compound IA-1 was diluted with dimethylsulfoxide obtain a diluted solution containing 1500 ppm of the compound, and 1 μL of the diluted solution was dispensed into a titer plate (96 well), and thereto was then dispensed 150 μL of a potato dextrose broth (PDB broth) to which spores of *Colletotrichum truncatum* were inoculated in advance. This plate was cultured at 18° C. for 4 days, thereby allowing *Colletotrichum truncatum* to undergo proliferation, and the absorbance at 550 nm of each well of the titer plate was then measured to determine a degree of growth of *Colletotrichum truncatum*. As a result, the degree of growth in the area treated with each compound was 50% or less relative to the degree of growth in the non-treated area.

Test Example 3 Test for Controlling Soybean Rust (*Phakopsora pachyrhizi*)

A plastic pot was filled with soil, soybeans (cultivar; Kurosengoku) were seeded thereto, and grown in a greenhouse for 10 to 14 days. The Compound of the present invention IIA-59, IIA-65, IIA-66, IIA-96, IIA-98, IIA-114, IIA-122, IIA-123, IIA-125, IIB-2, IIC-1, IIC-9, IIC-15, or IIC-17 formulated according to the method described in the Formulation Example 6 was mixed with water in such a way that the concentration thereof was 200 ppm, and the resulting mixture was sprayed to foliage of the above soybeans so as to adequately adhere onto the surfaces of leaves of the above soybeans. After spraying the mixture, the soybeans were air-dried. After 2 to 5 days, an aqueous suspension of spores of *Phakopsora pachyrhizi* was inoculated by spraying to the soybeans. After the inoculation, the soybeans were placed in a greenhouse at 23° C. in daytime and at 20° C. in nighttime under a humid condition for 1 to 2 day(s), then cultured in a green house for 10 to 14 days, and then a lesion area was investigated. As a result, the lesion area in the soybeans treated with each compound was 30% or less relative to the lesion area in the non-treated soybeans.

Test Example 4 Test for Controlling Wheat Leaf Blotch (*Septoria tritici*)

A plastic pot was filled with soil, wheat (cultivar; Apogee) was seeded thereto, and cultured in a greenhouse for 10 days. The Compound of the present invention IIA-3, IIA-4, IIA-10, IIA-15, IIA-17, IIA-21, IIA-24, IIA-40, IIA-55, IIA-57, IIA-62, IIA-65, IIA-66, IIA-67, IIA-71, IIA-79, IIA-81, IIA-85, IIA-86, IIA-88, IIA-104, IIA-108, IIA-123, IIA-186, IIB-2, IIB-4, IIC-5, the Present compound IA-2 to IA-4, IA-6 to IA-10, or IA-17 formulated according to the method described in the Formulation Example 6 was mixed with water in such a way that the concentration thereof was 200 ppm, the resulting mixture was sprayed to foliage of the above wheat so as to adequately adhere onto the surfaces of leaves of the above wheat. After spraying the mixture, the wheat was air-dried. After 4 days, an aqueous suspension comprising spores of *Septoria tritici* was inoculated by spraying to the wheat. After the inoculation, the wheat was placed at 18° C. under a humid condition for 3 days, and then cultured under lighting for 14 to 18 days, and then a lesion area was investigated. As a result, the lesion area in the wheat treated with each compound was 30% or less relative to the lesion area in the non-treated wheat.

Test Example 5 Test for Controlling Rice Blast (*Pyricularia oryzae*)

A plastic pot was filled with soil, rice (cultivar; Hinohikari) was seeded thereto, and cultured in a greenhouse for 20 days. Then, the Compound of the present invention IIA-92, IIA-128, or the Present compound IA-5 formulated according to the method described in the Formulation Example 6 was mixed with water in such a way that the concentration thereof was 200 ppm, and the resulting mixture was sprayed to foliage of the above rice so as to adequately adhere onto the surfaces of leaves of the above rice. After the spraying, the rice was air-dried. Rice with the spray treatment was placed at 24° C. in daytime and at 20° C. in nighttime under a humid condition for 6 to 7 days with contacting rice seedlings (cultivar; Hinohikari) infected with *Pyricularia oryzae*, and then a lesion area was investigated. As a result, the lesion area in the rice treated with each compound was 30% or less relative to the lesion area in the non-treated rice.

Test Example 6 Test for Controlling Tomato Late Blight (*Phytophthora infestans*)

A plastic pot was filled with soil, tomatoes (cultivar; Patio) were seeded thereto, and cultured in a greenhouse for 13 days. The Compound of the present invention IIC-16 formulated according to the method described in the Formulation Example 6 was mixed with water in such a way that the concentration thereof was 200 ppm, and the mixture was sprayed to foliage of the above tomatoes so as to adequately adhere onto the surfaces of leaves of the above tomatoes. After spraying the mixture, tomatoes were air-dried. After 1 day, an aqueous suspension of spores of *Phytophthora infestans* was inoculated by spraying to the tomatoes. After the inoculation, the tomatoes were placed at 23° C. under a humid condition for 1 day, then cultured in a greenhouse at 18° C. for 5 days, and then a lesion area was investigated. As a result, the lesion area in the tomatoes treated with the compound was 30% or less relative to the lesion area in the non-treated tomatoes.

Test Example 7 Test for Controlling Wheat Leaf Blotch (*Septoria tritici*)

A plastic pot was filled with soil, wheat (cultivar; Apogee) was seeded thereto, and cultured in a greenhouse for 10 days. An aqueous suspension of spores of *Septoria tritici* was inoculated by spraying to the wheat. After the inoculation, the wheat was placed at 18° C. under a humid condition for 3 days. Then, the Compound of the present invention IIA-15, IIA-17, IIA-24, IIA-40, IIA-50, IIA-71, IIA-81, the Present compound IA-2, IA-3, or IA-8 formulated according to the method described in the Formulation Example 6 was mixed with water in such a way that the concentration thereof was 200 ppm, and the resulting mixture was sprayed to foliage of the above wheat so as to adequately adhere onto the surfaces of leaves of the above wheat. After spraying the mixture, the wheat was air-dried, then placed under lighting for 14 to 18 days, and then a lesion area was investigated. As a result, the lesion area in the wheat treated with each compound was 30% or less relative to the lesion area in the non-treated wheat.

Test Example 8 Test for Controlling Wheat Leaf Rust (*Puccinia recondita*)

A plastic pot was filled with soil, wheat (cultivar; Shirogane) was seeded thereto, and cultured in a greenhouse for 9 days. The Compound of the present invention IIA-63, IIA-76, IIA-77, IIA-88, IIA-98, IIA-126, IIA-185, IIA-186, or the Present compound IA-8 formulated according to the method described in the Formulation Example 6 was mixed with water in such a way that the concentration thereof was 200 ppm, the resulting mixture was sprayed to foliage of the above wheat so as to adequately adhere onto the surfaces of leaves of the above wheat. After spraying the mixture, the wheat was air-dried, cultured at 20° C. under lighting for 5 to 7 days, and then spores of *Puccinia recondita* were inoculated by dusting thereto. After the inoculation, the wheat was placed at 23° C. under a dark humid condition for 1 day, then cultured at 20° C. under lighting for 8 days, and a lesion area was investigated. As a result, the lesion area in the wheat treated with each compound was 30% or less relative to the lesion area in the non-treated wheat.

Test Example 9 Test for Controlling Soybean *Cercospora* Leaf Spot (*Cercospora sojina*)

A plastic pot was filled with soil, soybeans (cultivar; Tachinagaha) were seeded thereto, and cultured in a greenhouse for 13 days. An aqueous suspension of spores of *Cercospora sojina* was inoculated by spraying to the soybeans. After the inoculation, the soybeans were placed in a greenhouse at 23° C. under a humid condition for 4 days, and then cultured in a greenhouse at 23° C. for 1 day. Then, the Compound of the present invention IIA-10, IIA-128, IIA-157, IIA-180, IIA-192, IIC-2, or IIC-3 formulated according to the method described in the Formulation Example 6 was mixed with water in such a way that the concentration thereof was 200 ppm, and the mixture was sprayed to foliage of the above soybeans so as to adequately adhere onto the surfaces of leaves of the above soybeans. After spraying the mixture, the soybeans were air-dried, cultured in a greenhouse at 24° C. in daytime and at 20° C. in nighttime for 21 days, and then a lesion area was investigated. As a result, the lesion area in the soybeans treated with each compound was 30% or less relative to the lesion area in the non-treated soybeans.

Test Example 10 Test for Controlling Soybean Powdery Mildew (*Microsphaera diffusa*)

A plastic pot was filled with soil, soybeans (cultivar; Kurosengoku) were seeded thereto, and cultured in a greenhouse for 7 to 13 days. Spores of soybean seedlings (cultivar; Kurosengoku) infected with *Microsphaera diffusa* were inoculated by dusting onto the soybeans. The soybeans were cultured in a greenhouse at 24° C. in daytime and at 20° C. in nighttime for 2 days. Then, the Compound of the present invention IIA-53 formulated according to the method described in the Formulation Example 6 was mixed with water in such a way that the concentration thereof was 200 ppm, and the resulting mixture was sprayed to foliage of the above soybeans so as to adequately adhere onto the surfaces of leaves of the above soybeans. After spraying the mixture, soybeans were air-dried, then cultured in a greenhouse for 7 to 11 days, and then a lesion area was investigated. As a result, the lesion area in the soybeans treated with the compound was 30% or less relative to the lesion area in the non-treated soybeans.

Test Example 11 Test for Controlling Soybean Rust (*Phakopsora pachyrhizi*)

A 1.2% agar medium (3 mL) was placed in a plastic petri dish, and solidified. Each test compound was diluted with dimethylsulfoxide in such a way that the concentration of the resulting diluted solution was 10000 ppm, and 1 μL of the diluted solution was dispensed into the plastic petri dish. Then, ion-exchanged water (500 μL) and an aqueous suspension of spores of *Phakopsora pachyrhizi* ($1.0\times10^4$/mL) (499 PL) to which spores of *Phakopsora pachyrhizi* were suspended in advance were dispensed into the plastic petri dish. This plastic petri dish was cultured at 23° C. for 1 day, and then germinated spores of *Phakopsora pachyrhizi* were counted. As a result, when the prescribed concentration was 10 ppm, and any one of the Compound of the present invention IIA-1 to IIA-5, IIA-9, IIA-10, IIA-15, IIA-21, IIA-24, IIA-31, IIA-40, IIA-41, IIA-43, IIA-44, IIA-50 to IIA-52, IIA-56, IIA-57, IIA-62 to IIA-66, IIA-68, IIA-72 to IIA-74, IIA-78, IIA-79, IIA-85, IIA-86, IIA-88, IIA-94 to IIA-101, IIA-104, IIA-105, IIA-107 to IIA-111, IIA-114, IIA-115, IIA-120, IIA-122, IIA-124, IIA-177, IIA-202, IIB-2, IIB-4, IIC-1, IIC-4 to IIC-7, IIC-9, IIC-10, IIC-15, IIC-17, IIC-20, IIC-21, IIC-24 to IIC-27, the Present compound IA-2, IA-3, IA-12, IA-13, IC-10, or IC-31 was used as the test compound, the number of germinated spores in the plastic petri dish was 30% or less relative to the number of germinated spores in the non-treated plastic petri dish. Here, the term of "non-treated" means that dimethylsulfoxide comprising each test compound was not dispensed into the plastic petri dish.

INDUSTRIAL APPLICABILITY

The Present compound and the Compound of the present invention have control efficacy against plant diseases, and can be used in controlling plant diseases.

The invention claimed is:

1. A compound represented by the following formula (II) or an N-oxide thereof, or a salt thereof:

(II)

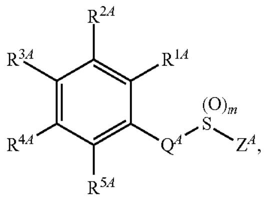

wherein $Q^A$ represents a group represented by $Q^A1$; and m represents 0, 1, or 2;

the group represented by $Q^A1$ represents a group represented by the following formula, wherein # represents a binding site to the phenyl group; and • represents a binding site to the sulfur atom;

$Q^A1$

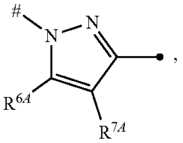

$R^{6A}$ and $R^{7A}$ are the same or different from each other, and each represent a hydrogen atom or a fluorine atom;

$Z^A$ represents a C2-C6 chain hydrocarbon group, a C3-C6 cycloalkyl group, wherein the C2-C6 chain hydrocarbon group and the C3-C6 cycloalkyl group are optionally substituted with at least one halogen atom; or a 5-10 membered aromatic heterocyclic group optionally substituted with at least one substituent selected from Group $E^A$;

$R^{3A}$ represents a C1-C6 chain hydrocarbon group optionally substituted with at least one substituent selected from Group $A^A$; a C3-C6 cycloalkyl group, a C6-C10 aryl group, a 5-10 membered aromatic heterocyclic group, wherein the C3-C6 cycloalkyl group, the C6-C10 aryl group, and the 5-10 membered aromatic heterocyclic group are optionally substituted with at least one substituent selected from Group $C^A$; a hydrogen atom, a halogen atom, a nitro group, a cyano group, a —$OR^{10A}$, a —$S(O)_pR^{11A}$, a —$C(O)R^{12A}$, a —$CR^{13A}$=N—O—$R^{14A}$, a —O—N=$CR^{15A}R^{16A}$, a —N=N—$CR^{17A}R^{18A}R^{19A}$, a —$C(O)NR^{20A}R^{21A}$, a —$NR^{22A}C(O)R^{23A}$, a —$C(O)N(OR^{24A})R^{25A}$, a —$N(OR^{26A})C(O)R^{27A}$, a —$NR^{28A}C(O)NR^{29A}R^{30A}$, a —$OC(O)NR^{31A}R^{32A}$, a —$NR^{33A}C(O)OR^{34A}$, a —$NR^{35A}C(O)C(O)NR^{36A}R^{37A}$, a —$CR^{38A}R^{39A}NR^{40A}C(O)C(O)NR^{41A}R^{42A}$, or a —$NR^{43A}C(O)C(O)N(OR^{44A})R^{45A}$;

$R^{2A}$ and $R^{4A}$ are the same or different from each other, and each represent a C1-C6 chain hydrocarbon group optionally substituted with at least one substituent selected from Group $A^A$; a C3-C6 cycloalkyl group, a C6-C10 aryl group, a 5-10 membered aromatic heterocyclic group, wherein the C3-C6 cycloalkyl group, the C6-C10 aryl group, and the 5-10 membered aromatic heterocyclic group are optionally substituted with at least one substituent selected from Group $C^A$; a hydrogen atom, a halogen atom, a nitro group, a cyano group, a —$OR^{10A}$, a —$C(O)R^{12A}$, a —$CR^{13A}$=N—O—$R^{14A}$, a —O—N—$CR^{15A}R^{16A}$, a —N=N—$CR^{17A}R^{18A}R^{19A}$, a —$C(O)NR^{20A}R^{21A}$, a —$NR^{22A}C(O)R^{23B}$, a —$C(O)N(OR^{24A})R^{25A}$, a —$N(OR^{26A})C(O)R^{27A}$, a —$NR^{28A}C(O)NR^{29A}R^{30A}$, a —$OC(O)NR^{31A}R^{32A}$, a —$NR^{33A}C(O)OR^{34A}$, a —$NR^{35A}C(O)C(O)NR^{36A}R^{37A}$, a —$CR^{38A}R^{39A}NR^{40A}C(O)C(O)NR^{41A}R^{42A}$, or a —$NR^{43A}C(O)C(O)N(OR^{44A})R^{45A}$;

$R^{1A}$ and $R^{5A}$ are the same or different from each other, and each represent a C1-C6 chain hydrocarbon group optionally substituted with at least one substituent selected from Group $A^A$; a C3-C6 cycloalkyl group, a C6-C10 aryl group, a 5-10 membered aromatic heterocyclic group, wherein the C3-C6 cycloalkyl group, the C6-C10 aryl group, and the 5-10 membered aromatic heterocyclic group are optionally substituted with at least one substituent selected from Group $C^A$; a hydrogen atom, a halogen atom, a nitro group, a cyano group, a —$OR^{10A}$, a —$S(O)_pR^{11A}$, a —$C(O)R^{12A}$, a —$CR^{13A}$N—O—$R^{14A}$, a —O—N=$CR^{15A}R^{16A}$, a —N=N—$CR^{17A}R^{18A}R^{19A}$, a —$C(O)NR^{20A}R^{21A}$, a —$NR^{22B}C(O)R^{23A}$, a —$C(O)N(OR^{24A})R^{25A}$, a —$N(OR^{26A})$ $C(O)R^{27A}$, a —$NR^{28B}C(O)NR^{29A}R^{30A}$, a —$OC(O)NR^{31A}R^{32A}$, a —$NR^{33B}C(O)OR^{34A}$, a —$NR^{35A}C(O)C(O)NR^{36A}R^{37A}$, a —$CR^{38A}R^{39A}NR^{40A}C(O)C(O)NR^{41A}R^{42A}$, or a —$NR^{43A}C(O)C(O)N(OR^{44A})R^{45A}$;

provided that at least one of $R^{1A}$, $R^{2A}$, $R^{3A}$, $R^{4A}$, and $R^{5A}$ is not a hydrogen atom; or $R^{1A}$ and $R^{2A}$ are optionally combined with the carbon atoms to which they are attached to form a C4-C7 carbocycle or a 5-7 membered heterocycle, wherein the C4-C7 carbocycle and the 5-7 membered heterocycle are optionally substituted with at least one substituent selected from Group $B^A$; or $R^{2A}$ and $R^{3A}$ are optionally combined with the carbon atoms to which they are attached to form a C4-C7 carbocycle or a 5-7 membered heterocycle, wherein the C4-C7 carbocycle and the 5-7 membered heterocycle are optionally substituted with at least one substituent selected from Group $B^A$;

$R^{10A}$, $R^{12A}$, $R^{13A}$, $R^{14A}$, $R^{15A}$, $R^{16A}$, $R^{17A}$, $R^{18A}$, $R^{19A}$, $R^{20A}$, $R^{21A}$, $R^{22A}$, $R^{23A}$, $R^{24A}$, $R^{25A}$, $R^{26A}$, $R^{27A}$, $R^{28A}$, $R^{29A}$, $R^{30A}$, $R^{31A}$, $R^{32A}$, $R^{33A}$, $R^{35A}$, $R^{36A}$, $R^{37A}$, $R^{38A}$, $R^{39A}$, $R^{40A}$, $R^{41A}$, $R^{42A}$, $R^{43A}$, $R^{44A}$, and $R^{45A}$ are the same or different from each other, and each represent a C1-C6 chain hydrocarbon group optionally substituted with at least one substituent selected from Group $D^A$; a C3-C6 cycloalkyl group, a C6-C10 aryl group, a 5-10 membered aromatic heterocyclic group, wherein the C3-C6 cycloalkyl group, the C6-C10 aryl group, and the 5-10 membered aromatic heterocyclic group are optionally substituted with at least one substituent selected from Group $C^A$; or a hydrogen atom;

$R^{34A}$, $R^{22B}$, $R^{28B}$, and $R^{33B}$ are the same or different from each other, and each represent a C1-C6 chain hydrocarbon group optionally substituted with at least one substituent selected from Group $D^A$; a C3-C6 cycloalkyl group, a C6-C10 aryl group, or a 5-10 membered aromatic heterocyclic group, wherein the C3-C6 cycloalkyl group, the C6-C10 aryl group, and the 5-10 membered aromatic heterocyclic group are optionally substituted with at least one substituent selected from Group $C^A$;

$R^{23B}$ represents a C1-C6 chain hydrocarbon group optionally substituted with at least one substituent selected from Group $D^A$; a C3-C6 cycloalkyl group, or a C6-C10 aryl group, wherein the C3-C6 cycloalkyl group and the C6-C10 aryl group are optionally substituted with at least one substituent selected from Group $C^A$; or a hydrogen atom;

$R^{11A}$ represents a C1-C6 chain hydrocarbon group optionally substituted with at least one substituent selected from Group $D^A$; or a C3-C6 cycloalkyl group, wherein the C3-C6 cycloalkyl group is optionally substituted with at least one substituent selected from the group consisting of a halogen atom and a cyano group; and p represents 0, 1, or 2;

wherein

Group $A^A$ consists of a C3-C6 cycloalkyl group, a C1-C3 alkoxy group, a C1-C3 alkylsulfanyl group, a C1-C3 alkylsulfinyl group, a C1-C3 alkylsulfonyl group, wherein the C3-C6 cycloalkyl group, the C1-C3 alkoxy group, the C1-C3 alkylsulfanyl group, the C1-C3 alkylsulfinyl group, and the C1-C3 alkylsulfonyl group are optionally substituted with at least one halogen atom; a halogen atom, and a cyano group;

Group $B^A$ consists of a C1-C3 chain hydrocarbon group, a C3-C6 cycloalkyl group, a C1-C3 alkoxy group, wherein the C1-C3 chain hydrocarbon group, the C3-C6 cycloalkyl group, and the C1-C3 alkoxy group are optionally substituted with at least one halogen atom; a halogen atom, a nitro group, and a cyano group;

Group $C^A$ consists of a C1-C3 chain hydrocarbon group, a C3-C6 cycloalkyl group, a C1-C3 alkoxy group, a C1-C3 alkylsulfanyl group, a C1-C3 alkylsulfinyl group, a C1-C3 alkylsulfonyl group, wherein the C1-C3 chain hydrocarbon group, the C3-C6 cycloalkyl group, the C1-C3 alkoxy group, the C1-C3 alkylsulfanyl group, the C1-C3 alkylsulfinyl group, and the C1-C3 alkylsulfonyl group are optionally substituted with at least one substituent selected from the group consisting of a halogen atom and a cyano group; a halogen atom, and a cyano group;

Group $D^A$ consists of a C1-C3 alkoxy group, a C1-C3 alkylsulfanyl group, a C1-C3 alkylsulfinyl group, a C1-C3 alkylsulfonyl group, wherein the C1-C3 alkoxy group, the C1-C3 alkylsulfanyl group, the C1-C3 alkylsulfinyl group, and the C1-C3 alkylsulfonyl group are optionally substituted with at least one halogen atom; a C3-C6 cycloalkyl group, a C6-C10 aryl group, a 5-10 membered aromatic heterocyclic group, wherein the C3-C6 cycloalkyl group, the C6-C10 aryl group, and the 5-10 membered aromatic heterocyclic group are optionally substituted with at least one substituent selected from Group $C^A$; a halogen atom, and a cyano group;

Group $E^A$ consists of a C1-C3 chain hydrocarbon group, a C3-C6 cycloalkyl group, a C1-C3 alkoxy group, wherein the C1-C3 chain hydrocarbon group, the C3-C6 cycloalkyl group, and the C1-C3 alkoxy group are optionally substituted with at least one halogen atom; a halogen atom, and a cyano group.

2. The compound or an N-oxide thereof, or a salt thereof according to claim 1, wherein $R^{3A}$ represents a C1-C6 chain hydrocarbon group optionally substituted with at least one halogen atom; a C3-C6 cycloalkyl group, wherein the C3-C6 cycloalkyl group is optionally substituted with at least one substituent selected from the group consisting of a C1-C3 chain hydrocarbon group and a halogen atom; a hydrogen atom, a halogen atom, a nitro group, a cyano group, a $—OR^{10A}$, a $—S(O)_pR^{11A}$, a $—C(O)R^{12A}$, a $—CR^{13A}{=}N—O—R^{14A}$, a $—C(O)NR^{20A}R^{21A}$, a $—NR^{22A}C(O)R^{23A}$, a $—C(O)N(OR^{24A})R^{25A}$, a $—N(OR^{26A})C(O)R^{27A}$, or a $—NR^{33A}C(O)OR^{34A}$;

$R^{2A}$ and $R^{4A}$ are the same or different from each other, and each represent a C1-C6 chain hydrocarbon group optionally substituted with at least one halogen atom, a C3-C6 cycloalkyl group, wherein the C3-C6 cycloalkyl group is optionally substituted with at least one substituent selected from the group consisting of a C1-C3 chain hydrocarbon group and a halogen atom; a hydrogen atom, a halogen atom, a nitro group, a cyano group, a $—OR^{10A}$, a $—C(O)R^{12A}$, a $—CR^{13A}{=}N—O—R^{14A}$, a $—C(O)NR^{20A}R^{21A}$, a $—NR^{22A}C(O)R^{23B}$, a $—C(O)N(OR^{24A})R^{25A}$, a $—N(OR^{26A})C(O)R^{27A}$, or a $—NR^{33A}C(O)OR^{34A}$; and $R^{1A}$ and $R^{5A}$ are the same or different from each other, and each represent a C1-C6 chain hydrocarbon group optionally substituted with at least one halogen atom, a C3-C6 cycloalkyl group, wherein the C3-C6 cycloalkyl group is optionally substituted with at least one halogen atom; a hydrogen atom, a halogen atom, a nitro group, a cyano group, a $—OR^{10A}$, a $—S(O)_pR^{11A}$, a $—C(O)R^{12A}$, a $—CR^{13A}{=}N—O—R^{14A}$, a $—C(O)NR^{20A}R^{21A}$, a $—NR^{22B}C(O)R^{23A}$, a $—C(O)N(OR^{24A})R^{25A}$, a $—N(OR^{26A})C(O)R^{27A}$, or a $—NR^{33B}C(O)OR^{34A}$;

provided that at least one of $R^{1A}$, $R^{2A}$, $R^{3A}$, $R^{4A}$, and $R^{5A}$ is not a hydrogen atom; or $R^{1A}$ and $R^{2A}$ are optionally combined with the carbon atoms to which they are attached to form a C4-C7 carbocycle or a 5-7 membered heterocycle, wherein the C4-C7 carbocycle and the 5-7 membered heterocycle are optionally substituted with at least one substituent selected from Group $B^A$; or $R^{2A}$ and $R^{3A}$ are optionally combined with the carbon atoms to which they are attached to form a C4-C7 carbocycle or a 5-7 membered heterocycle, wherein the C4-C7 carbocycle and the 5-7 membered heterocycle are optionally substituted with at least one substituent selected from Group $B^A$.

3. The compound or an N-oxide thereof, or a salt thereof according to claim 1, wherein $R^{6A}$ and $R^{7A}$ each represent a hydrogen atom.

4. A composition for controlling a plant disease, comprising:

the compound or an N-oxide thereof, or a salt thereof according to claim 1.

5. A method for controlling a plant disease, the method comprising:

applying an effective amount of the compound or an N-oxide thereof, or a salt thereof according to claim 1 to a plant or soil for cultivating a plant.

6. A composition, comprising:

at least one component selected from the group consisting of an insecticidal active ingredient, a miticidal active ingredient, a nematicidal active ingredient, a fungicidal active ingredient, a plant growth regulatory ingredient, and a repellent ingredient, and the compound or an N-oxide thereof, or a salt thereof according to claim 1.

7. A seed or a vegetative reproduction organ holding an effective amount of the compound or an N-oxide thereof, or a salt thereof according to claim 1.

8. A seed or a vegetative reproduction organ holding an effective amount of the composition according to claim 6.

* * * * *